US006757911B1

(12) United States Patent
Shimoji et al.

(10) Patent No.: US 6,757,911 B1
(45) Date of Patent: Jun. 29, 2004

(54) DIGITAL BROADCASTING SYSTEM, DIGITAL BROADCASTING APPARATUS, AND A RECEPTION APPARATUS FOR DIGITAL BROADCASTS

(75) Inventors: Tatsuya Shimoji, Neyagawa (JP); Kazuo Okamura, Hirakata (JP); Junichi Hirai, Suita (JP); Masahiro Oashi, Hirakata (JP); Takashi Kakiuchi, Toyonaka (JP); Yuki Kusumi, Kashiba (JP); Yoshiyuki Miyabe, Osaka (JP); Ikuo Minakata, Kyoto-fu (JP); Masayuki Kozuka, Neyagawa (JP); Yoshihiro Mimura, Hirakata (JP); Shinji Inoue, Neyagawa (JP); Toshiya Mori, Settsu (JP); Naoya Takao, Kadoma (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 08/920,954

(22) Filed: Aug. 29, 1997

(30) Foreign Application Priority Data

Aug. 30, 1996 (JP) .............................................. 8-230015
Mar. 11, 1997 (JP) .............................................. 9-056687

(51) Int. Cl.[7] ........................... H04N 7/173; H04N 7/10
(52) U.S. Cl. ......................... 725/136; 725/40; 725/109; 725/132; 348/460; 348/465; 348/461
(58) Field of Search ................... 725/90, 94, 135–138, 725/32, 36, 40, 112, 109, 143–148; 348/473, 460–465

(56) References Cited

U.S. PATENT DOCUMENTS 5,260,778 A * 11/1993 Kauffman et al. .......... 725/133
5,422,674 A    6/1995 Hooper et al.
5,541,662 A * 7/1996 Adams et al. .............. 725/136

(List continued on next page.)

FOREIGN PATENT DOCUMENTS

| EP | 680216 | 11/1995 |
|---|---|---|
| JP | 7-107446 | 4/1995 |
| WO | 9605699 | 2/1996 |
| WO | 9642144 | 12/1996 |

OTHER PUBLICATIONS

"Basic Functions of Multimedia Information Broadcasting Service," by H. Seno et al., The Journal of The Institute of Television Engineers of Japan, Mar. 20, 1995, vol. 49, No. 3, pp 336–343.

"Navigation Methods in Multimedia Information Broadcasting Services," by K. Kai et al., Information Processing Society of Japan Research, Sep. 14, 1995, vol. 95, No. 90, pp. 9–16.

(List continued on next page.)

*Primary Examiner*—Andrew Faile
*Assistant Examiner*—Reuben M. Brown

(57) ABSTRACT

A broadcasting system which includes a broadcasting apparatus and a reception apparatus and which achieves interactiveness using a broadcast wave. The broadcasting apparatus includes a content storing unit for storing the plurality of contents, each content including a set of video data and a set of control information that indicates another content that is a link destination for a present content, and a transmitting unit for multiplexing a set of video data and a plurality of sets of the same control information included in a same content as the set of video data, and for transmitting the multiplexed sets of video data and control information. The reception apparatus includes an extracting unit for extracting a set of video data and a set of control information in a same content as the set of video data, a storing unit for storing the extracted set of control information, a reproducing unit for reproducing the extracted set of video data and outputting an image signal, an operation unit for receiving a user operation that indicates a content switching, and a control unit for controlling the extracting unit to extract another content indicated by the set of control information stored in the storing unit, in accordance with the user operation.

22 Claims, 114 Drawing Sheets

U.S. PATENT DOCUMENTS

| | | | | |
|---|---|---|---|---|
| 5,600,378 A | * | 2/1997 | Wasilewski | 725/107 |
| 5,708,845 A | * | 1/1998 | Wistendahl et al. | 707/500.1 |
| 5,729,471 A | * | 3/1998 | Jain et al. | 725/131 |
| 5,818,441 A | * | 10/1998 | Throckmorton et al. | 725/110 |
| 5,861,881 A | * | 1/1999 | Freeman et al. | 725/139 |
| 5,864,682 A | * | 1/1999 | Porter et al. | 709/247 |
| 5,894,320 A | * | 4/1999 | Vancelette | 725/138 |
| 6,006,256 A | * | 12/1999 | Zdepski et al. | 709/217 |
| 6,076,094 A | * | 6/2000 | Cohen et al. | 707/104 |
| 6,108,042 A | * | 8/2000 | Adams et al. | 348/460 |
| 6,111,611 A | * | 8/2000 | Ozkan et al. | 348/465 |
| 6,338,131 B1 | * | 1/2002 | Dillon | 712/201 |

OTHER PUBLICATIONS

"Multimedia Services Through Broadcasting," by T. Isobe, Proceedings of the 1994 IEICE Fall Conference, Sep. 1994, SB–9–8, pp. 633–634.

"MHEG Explained," by T. Meyer–Boudnik et al., 8440 IEEE MultiMedia, 2(1995) Spring, No. 1.

"The MHEG Standard for Video on Demand and Digital Television Services," by F. Colaitis et al., 8454 REE: Revue de L'Electronique (1995), No. 4.

Transmission of Hypertextual Information Using MPEG–2 Private Data, by L. Atzori et al., Proceedings of the SPIE, Oct. 7, 1996, vol. 2952.

* cited by examiner

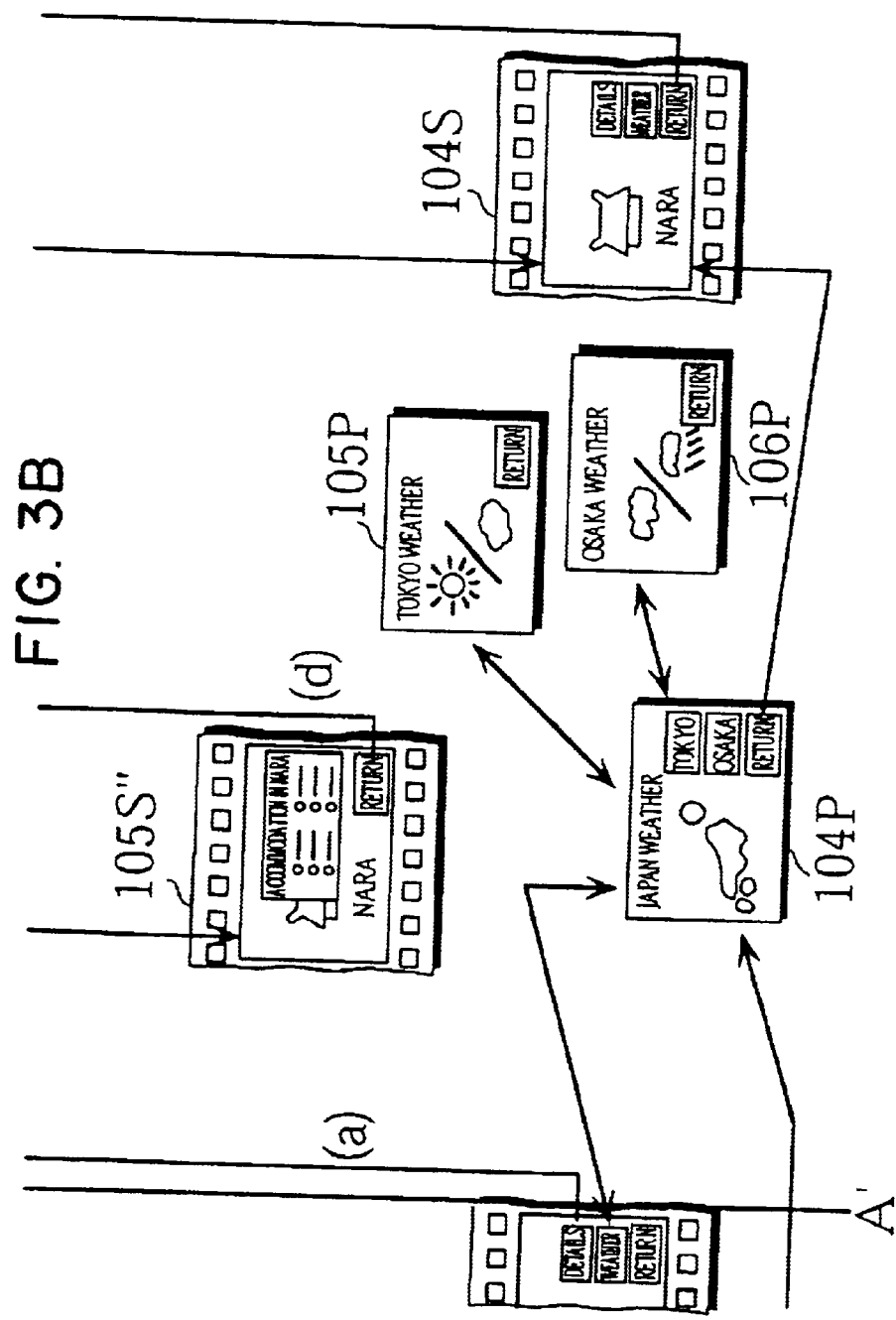

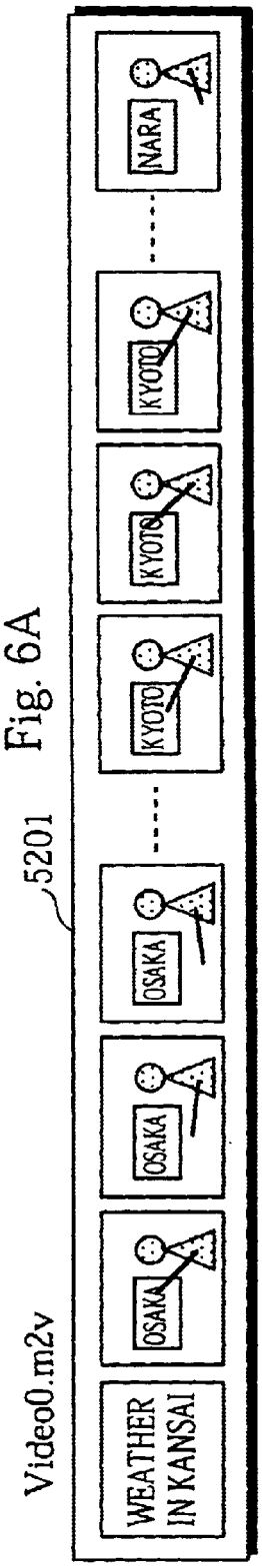
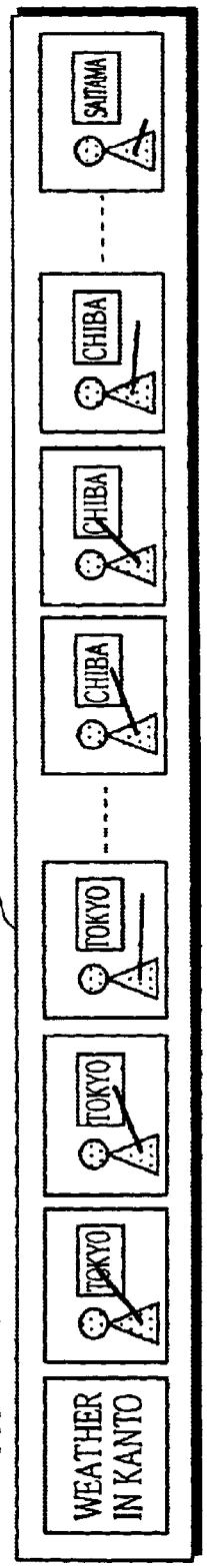
Fig. 6A
Fig. 6B
Fig. 6C
Fig. 6D

Fig. 7

Navi0-0.nif

Object Definition Table : 5301, 5302

| Object Index | type | X | Y | Handler | Normal Bitmap | FocusedBitmap |
|---|---|---|---|---|---|---|
| 0 | Button | 20 | 400 | 0 | 0 | 1 |
| 1 | Button | 200 | 400 | 1 | 2 | 3 |

Handler Definition Table : 5303

| Handler Index | Script |
|---|---|
| 0 | goto_content(Hyperlink index 0) |
| 1 | goto_content(Hyperlink index 1) |

Hyperlink Table : 5304

| Hyperlink Index | Content number |
|---|---|
| 0 | 1 |
| 1 | 2 |

Bitmap Table : 5305

| Bitmap Index | Bitmap Data |
|---|---|
| 0 | DETAILS FOR OSAKA |
| 1 | DETAILS FOR OSAKA |
| 2 | GOTO KANTO |
| 3 | GOTO KANTO |

Time Information Table : 5306

| start_time | 5 |
|---|---|
| end_time | 65 |

Fig. 8

Navi1-0.nif          5401

Object Definition Table :     5402

| Object Index | type | X | Y | Handler | Normal Bitmap | FocusedBitmap |
|---|---|---|---|---|---|---|
| 0 | Button | 20 | 400 | 0 | 0 | 1 |
| 1 | Picture | 300 | 20 | — | 2 | — |

Handler Definition Table :     5403

| Handler Index | Script |
|---|---|
| 0 | goto_entry |

Bitmap Table :     5404

| Bitmap Index | Bitmap Data |
|---|---|
| 0 | MENU |
| 1 | MENU |
| 2 | WEATHER IN OSAKA<br><br>MAX.TEMPERATURE  10°C<br>MIN.TEMPERATURE   3°C<br>HUMIDITY          60%<br>PROBABILITY OF RAIN<br>  TODAY            10%<br>  TOMORROW         20%<br>  DAY AFTER TOMORROW 30% |

Time Information Table :     5405

| start_time | 5 |
|---|---|
| end_time | 65 |

Fig. 9

Navi0-1.nif  5501

Object Definition Table :

| Object Index | type | X | Y | Handler | Normal Bitmap | Focused Bitmap |
|---|---|---|---|---|---|---|
| 0 | Button | 20 | 400 | 0 | 0 | 1 |
| 1 | Button | 200 | 400 | 1 | 2 | 3 |

Handler Definition Table :

| Handler Index | Script |
|---|---|
| 0 | goto_content(Hyperlink index 0) |
| 1 | goto_content(Hyperlink index 1) |

Hyperlink Table :

| Hyperlink Index | Content number |
|---|---|
| 0 | 1 |
| 1 | 2 |

Bitmap Table :

| Bitmap Index | Bitmap Data |
|---|---|
| 0 | DETAILS FOR KYOTO |
| 1 | DETAILS FOR KYOTO |
| 2 | GOTO KANTO |
| 3 | GOTO KANTO |

Time Information Table :

| start_time | 70 |
|---|---|
| end_time | 130 |

Fig. 10

Navi1-1.nif 5601

Object Definition Table :

| Object Index | type | X | Y | Handler | Normal Bitmap | FocusedBitmap |
|---|---|---|---|---|---|---|
| 0 | Button | 20 | 400 | 0 | 0 | 1 |
| 1 | Picture | 300 | 20 | — | 2 | — |

Handler Definition Table :

| Handler Index | Script |
|---|---|
| 0 | goto_entry |

Bitmap Table :

| Bitmap Index | Bitmap Data |
|---|---|
| 0 | MENU |
| 1 | MENU |
| 2 | WEATHER IN KYOTO<br><br>MAX.TEMPERATURE  8℃<br>MIN.TEMPERATURE  0℃<br>HUMIDITY  80%<br>PROBABILITY OF RAIN<br>  TODAY  20%<br>  TOMORROW  15%<br>  DAY AFTER TOMORROW  0% |

Time Information Table :

| start_time | 70 |
|---|---|
| end_time | 130 |

Fig. 11

Navi2-0.nif     /5701

Object Definition Table :

| Object Index | type | X | Y | Handler | Normal Bitmap | FocusedBitmap |
|---|---|---|---|---|---|---|
| 0 | Button | 20 | 400 | 0 | 0 | 1 |
| 1 | Button | 200 | 400 | 1 | 2 | 3 |

Handler Definition Table :

| Handler Index | Script |
|---|---|
| 0 | goto_content(Hyperlink index 0) |
| 1 | goto_entry |

Hyperlink Table :

| Hyperlink Index | Content number |
|---|---|
| 0 | 3 |

Bitmap Table :

| Bitmap Index | Bitmap Data |
|---|---|
| 0 | DETAILS FOR TOKYO |
| 1 | DETAILS FOR TOKYO |
| 2 | GO TO KANSAI |
| 3 | GO TO KANSAI |

Time Information Table :

| start_time | 5 |
|---|---|
| end_time | 65 |

Fig. 12

CONSTRUCTION INFORMATION TABLE ⟋5801

| CONTENT NUMBER | VIDEO DATA | AUDIO DATA | NAVIGATION INFORMATION |
|---|---|---|---|
| 0 | Video0.m2v | Audio0.m2a | (Navi0-0.nif,Navi0-1.nif,Navi0-2.nif,Navi0-3.nif,Navi0-4.nif) |
| 1 | Video0.m2v | Audio0.m2a | (Navi1-0.nif,Navi1-1.nif,Navi1-2.nif,Navi1-3.nif,Navi1-4.nif) |
| 2 | Video1.m2v | Audio1.m2a | (Navi2-0.nif,Navi2-1.nif,Navi2-2.nif,Navi2-3.nif,Navi2-4.nif) |
| 3 | Video1.m2v | Audio1.m2a | (Navi3-0.nif,Navi3-1.nif,Navi3-2.nif,Navi3-3.nif,Navi3-4.nif) |

Fig. 13

ENTRY INFORMATION 5901

| ENTRY CONTENT NUMBER | 0 |
|---|---|

Fig. 14

MULTIPLEXING INFORMATION TABLE 6001

| | |
|---|---|
| original_network_id | 0x0001 |
| transport_stream_id | 0x0001 |
| service_id | 0x0002 |
| event_id | 0x0002 |
| PMT_PID | 0x0090 |
| PCR_PID | 0x0091 |
| NE_component(0)_Bitrate | 1000000 bps |
| NE_component(0)_pid | 0x0092 |
| NE_component(1)_Bitrate | 1000000 bps |
| NE_component(1)_pid | 0x0093 |
| NE_component(2)_Bitrate | 1000000 bps |
| NE_component(2)_pid | 0x0094 |
| NE_component(3)_Bitrate | 1000000 bps |
| NE_component(3)_pid | 0x0095 |
| VE_component(0)_Bitrate | 4000000 bps |
| VE_component(0)_pid | 0x0096 |
| VE_component(1)_Bitrate | 4000000 bps |
| VE_component(1)_pid | 0x0097 |
| AE_component(0)_Bitrate | 500000 bps |
| AE_component(0)_pid | 0x0098 |
| AE_component(1)_Bitrate | 500000 bps |
| AE_component(1)_pid | 0x0099 |

Fig. 15

CONTENT IDENTIFIER ASSIGNING TABLE 6101

| CONTENT NUMBER | orig_nw_id 6102 | ts_id 6103 | VE_svc_id 6104 | VE_event_id 6105 | VE_comp_tag 6106 | VE_id 6107 | AE_svc_id 6108 | AE_event_id 6109 | AE_comp_tag 6110 | AE_id | NE_svc_id 6111 | NE_event_id 6112 | NE_id 6113 |
|---|---|---|---|---|---|---|---|---|---|---|---|---|---|
| 0 | 0x0001 | 0x0001 | 0x0002 | 0x0002 | 0x00 | — | 0x0002 | 0x0002 | 0x00 | — | 0x0002 | 0x0002 | 0x0000 |
| 1 | 0x0001 | 0x0001 | 0x0002 | 0x0002 | 0x00 | — | 0x0002 | 0x0002 | 0x00 | — | 0x0002 | 0x0002 | 0x0001 |
| 2 | 0x0001 | 0x0001 | 0x0002 | 0x0002 | 0x01 | — | 0x0002 | 0x0002 | 0x01 | — | 0x0002 | 0x0002 | 0x0002 |
| 3 | 0x0001 | 0x0001 | 0x0002 | 0x0002 | 0x01 | — | 0x0002 | 0x0002 | 0x01 | — | 0x0002 | 0x0002 | 0x0003 |

Fig. 16

VERSION NUMBER ASSIGNING TABLE

| NAVIGATION INFORMATION | VERSION NUMBER /6201 |
|---|---|
| Navi0-0.nif | 0x00 |
| Navi0-1.nif | 0x01 |
| Navi0-2.nif | 0x02 |
| ⋮ | ⋮ |
| Navi1-0.nif | 0x00 |
| Navi1-1.nif | 0x01 |
| ⋮ | ⋮ |
| Navi2-0.nif | 0x00 |
| Navi2-1.nif | 0x01 |
| ⋮ | ⋮ |

Fig. 17

NVT(0, 0) ⌐6301

Object Definition Table : ⌐6302

| Object Index | type | X | Y | Handler | Normal Bitmap | FocusedBitmap |
|---|---|---|---|---|---|---|
| 0 | Button | 20 | 400 | 0 | 0 | 1 |
| 1 | Button | 200 | 400 | 1 | 2 | 3 |

Handler Definition Table : ⌐6303

| Handler Index | Script |
|---|---|
| 0 | goto_content(Hyperlink index 0) |
| 1 | goto_content(Hyperlink index 1) |

Hyperlink Table : ⌐6304

| Hyperlink Index | orig_nw_id | ts_id | VE_service_id | VE_event_id | VE_comp_tag | AE_service_id | AE_event_id | AE_comp_tag | AE_id | NE_service_id | NE_event_id | NE_id |
|---|---|---|---|---|---|---|---|---|---|---|---|---|
| 0 | – | – | – | – | – | – | – | – | – | – | – | 0x0001 |
| 1 | – | – | – | – | 0x01 | – | – | 0x01 | – | – | – | 0x0002 |

Time Information Table : ⌐6306

| start_time | 5 |
|---|---|
| end_time | 65 |

Bitmap Table : ⌐6305

| Bitmap Index | Bitmap Data |
|---|---|
| 0 | DETAILS FOR OSAKA |
| 1 | DETAILS FOR OSAKA |
| 2 | GO TO KANTO |
| 3 | GO TO KANTO |

Fig. 18

NVT(1,0)

Object Definition Table: 6402

| Object Index | type | X | Y | Handler | Normal Bitmap | FocusedBitmap |
|---|---|---|---|---|---|---|
| 0 | Button | 20 | 400 | 0 | 0 | 1 |
| 1 | Picture | 300 | 20 | — | 2 | — |

Handler Definition Table: 6403

| Handler Index | Script |
|---|---|
| 0 | goto_entry |

Bitmap Table: 6404

| Bitmap Index | Bitmap Data |
|---|---|
| 0 | MENU |
| 1 | MENU |
| 2 | WEATHER IN OSAKA<br><br>MAX.TEMPERATURE 10°C<br>MIN.TEMPERATURE 3°C<br>HUMIDITY 60%<br>PROBABILITY OF RAIN<br>  TODAY 10%<br>  TOMORROW 20%<br>  DAY AFTER TOMORROW 30% |

Time Information Table: 6405

| start_time | 5 |
|---|---|
| end_time | 65 |

Fig. 19  6501

NVT(0, 1)

Object Definition Table : 6502

| Object Index | type | X | Y | Handler | Normal Bitmap | Focused Bitmap |
|---|---|---|---|---|---|---|
| 0 | Button | 20 | 400 | 0 | 0 | 1 |
| 1 | Button | 200 | 400 | 1 | 2 | 3 |

Handler Definition Table : 6503

| Handler Index | Script |
|---|---|
| 0 | goto_content(Hyperlink index 0) |
| 1 | goto_content(Hyperlink index 1) |

Hyperlink Table : 6504

| Hyperlink Index | orig_nw_id | ts_id | VE_service_id | VE_event_id | VE_comp_tag | VE_id | AE_service_id | AE_event_id | AE_comp_tag | AE_id | NE_service_id | NE_event_id | NE_id |
|---|---|---|---|---|---|---|---|---|---|---|---|---|---|
| 0 | – | – | – | – | – | – | – | – | – | – | – | – | 0x0001 |
| 1 | – | – | – | – | 0x01 | – | – | – | 0x01 | – | – | – | 0x0002 |

Bitmap Table : 6505

| Bitmap Index | Bitmap Data |
|---|---|
| 0 | DETAILS FOR KYOTO |
| 1 | DETAILS FOR KYOTO |
| 2 | GO TO KANTO |
| 3 | GO TO KANTO |

Time Information Table : 6506

| start_time | 70 |
|---|---|
| end_time | 130 |

Fig. 20

NVT(1,1)

Object Definition Table : 6602

| Object Index | type | X | Y | Handler | Normal Bitmap | FocusedBitmap |
|---|---|---|---|---|---|---|
| 0 | Button | 20 | 400 | 0 | 0 | 1 |
| 1 | Picture | 300 | 20 | — | 2 | — |

Handler Definition Table :

| Handler Index | Script |
|---|---|
| 0 | goto_entry |

6603

Bitmap Table : 6604

| Bitmap Index | Bitmap Data |
|---|---|
| 0 | MENU |
| 1 | MENU |
| 2 | WEATHER IN KYOTO<br><br>MAX TEMPERATURE  8°C<br>MIN TEMPERATURE  0°C<br>HUMIDITY  80%<br>PROBABILITY OF RAIN<br>  TODAY  20%<br>  TOMORROW  15%<br>  DAY AFTER TOMORROW  0% |

Time Information Table : 6605

| start_time | 70 |
|---|---|
| end_time | 130 |

NVT(2, 0) — 6701

Object Definition Table: 6702

| Object Index | type | X | Y | Handler | Normal Bitmap | Focused Bitmap |
|---|---|---|---|---|---|---|
| 0 | Button | 20 | 400 | 0 | 0 | 1 |
| 1 | Button | 200 | 400 | 1 | 2 | 3 |

Handler Definition Table: 6703

| Handler Index | Script |
|---|---|
| 0 | goto_content(Hyperlink index 0) |
| 1 | goto_entry |

Hyperlink Table: 6704

| Hyperlink Index | orig_nw_id | ts_id | VE_service_id | VE_event_id | VE_comp_tag | VE_id | AE_service_id | AE_event_id | AE_comp_tag | AE_id | NE_service_id | NE_event_id | NE_id |
|---|---|---|---|---|---|---|---|---|---|---|---|---|---|
| 0 | — | — | — | — | — | — | — | — | — | — | — | — | 0x0003 |

Bitmap Table: 6705

| Bitmap Index | Bitmap Data |
|---|---|
| 0 | DETAILS FOR TOKYO |
| 1 | DETAILS FOR TOKYO |
| 2 | GO TO KANSAI |
| 3 | GO TO KANSAI |

Time Information Table: 6706

| start_time | 5 |
|---|---|
| end_time | 65 |

Fig. 22A Network Information Table 6801

| table_id=0x40 |   |   |
|---|---|---|
| network_id=0x0001 |   |   |
| original_network_id | transport_stream_id | descriptor |
| 0x0001 | 0x0001 | TRANSFER PREFACE |
| ... | ... | ... |

Fig. 22B Service Description Table 6802

| table_id=0x42 |   |
|---|---|
| transport_stream_id=0x0001 |   |
| service_id | descriptor |
| 0x0002 | SERVICE NAME AND OTHER INFORMATION |
| ... | ... |

Fig. 22C Event Information Table 6803

| table_id=0x4e |   |
|---|---|
| service_id=0x0002 |   |
| event_id | descriptor |
| 0x0002 | EVENT NAME AND OTHER INFORMATION |
| ... | ... |

Fig. 23

Program Association Table 6901 table_id=0x0000
⋮
transport_stream_id=0x0001
⋮

| program_no | PMT_pid |
|---|---|
| ⋮ | ⋮ |
| 0x0002 | 0x0090 |
| ⋮ | ⋮ |

Fig. 24

Program Map Table 7001 table_id=0x0002
⋮
program_number=0x0002
⋮
PCR_PID=0x0091 —7002
⋮
Entry_Descriptor —7003
⋮

7005  7006  7004  7007

| PID | stream_type | descriptor |
|---|---|---|
| 0x0092 | 0x05 | NE_Component_Descriptor(0) |
| 0x0093 | 0x05 | NE_Component_Descriptor(1) |
| 0x0094 | 0x05 | NE_Component_Descriptor(2) |
| 0x0095 | 0x05 | NE_Component_Descriptor(3) |
| 0x0096 | 0x02 | stream_identifier_descriptor(0) |
| 0x0097 | 0x02 | stream_identifier_descriptor(1) |
| 0x0098 | 0x03 | stream_identifier_descriptor(0) |
| 0x0099 | 0x03 | stream_identifier_descriptor(1) |

Fig. 26A

NE_Component_Descriptor(0) — 7201

| descriptor_tag | 0x99 |
| --- | --- |
| .. | |
| min_NE_id | 0x0000 |
| max_NE_id | 0x0000 |

Fig. 26B

NE_Component_Descriptor(1) — 7202

| descriptor_tag | 0x99 |
| --- | --- |
| .. | |
| min_NE_id | 0x0001 |
| max_NE_id | 0x0001 |

Fig. 26C

NE_Component_Descriptor(2) — 7203

| descriptor_tag | 0x99 |
| --- | --- |
| .. | |
| min_NE_id | 0x0002 |
| max_NE_id | 0x0002 |

Fig. 26D

NE_Component_Descriptor(3) — 7204

| descriptor_tag | 0x99 |
| --- | --- |
| .. | |
| min_NE_id | 0x0003 |
| max_NE_id | 0x0003 |

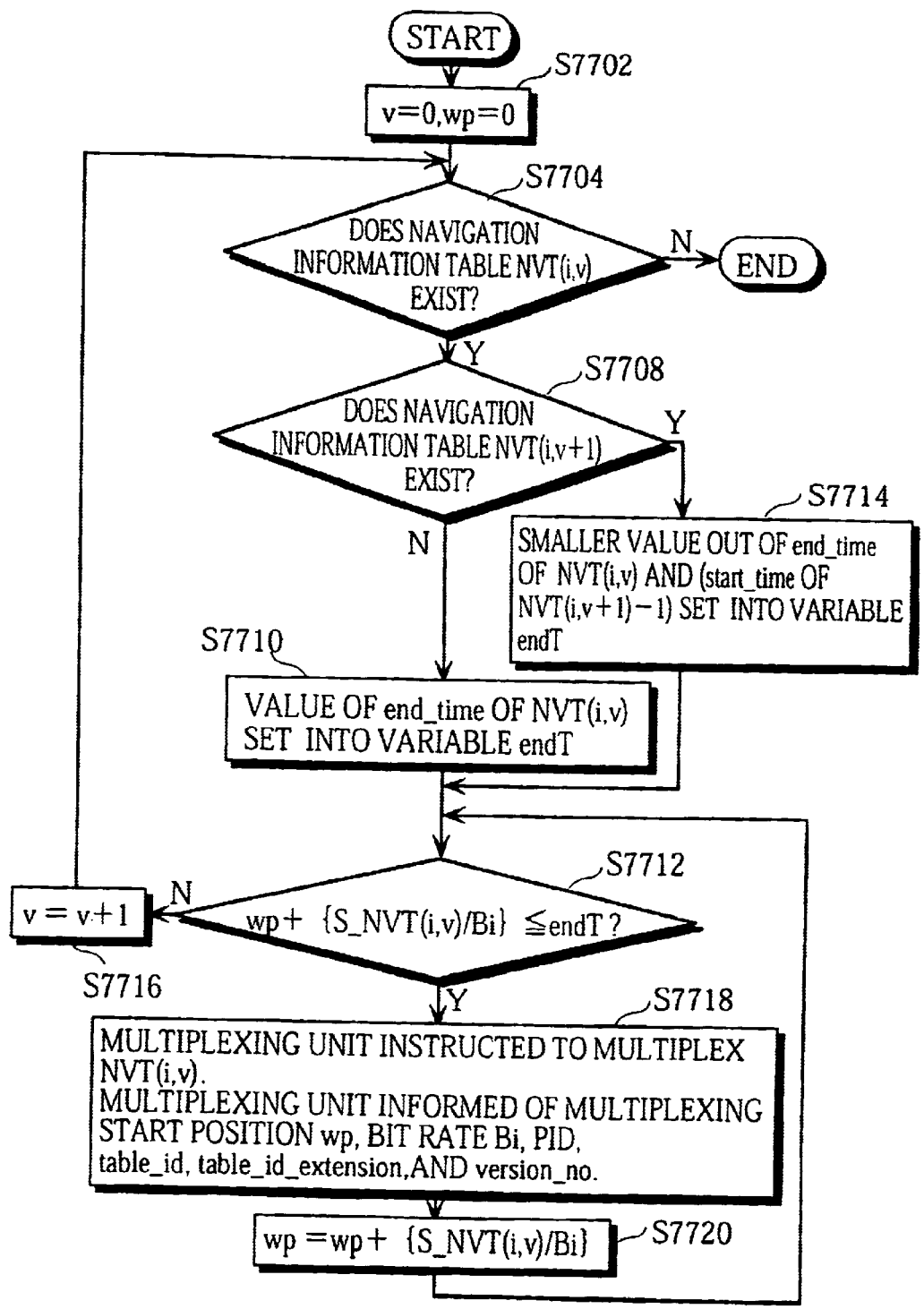

Fig. 33A

| FILTER IDENTIFICATION NUMBER | PID | table_id_ext | version_no | OUTPUT DESTINATION |
|---|---|---|---|---|
| 0 | 0x0096 | | | AV DECODER UNIT |
| 1 | 0x0098 | | | AV DECODER UNIT |
| 2 | 0x0092 | 0x0000 | — | NAVIGATION INFORMATION TABLE STORAGE UNIT |
| ... | ... | ... | ... | ... |

Fig. 33B

| FILTER IDENTIFICATION NUMBER | PID | table_id_ext | version_no | OUTPUT DESTINATION |
|---|---|---|---|---|
| 0 | 0x0096 | | | AV DECODER UNIT |
| 1 | 0x0098 | | | AV DECODER UNIT |
| 2 | 0x0092 | 0x0000 | 0x01 | NAVIGATION INFORMATION TABLE STORAGE UNIT |
| ... | ... | ... | ... | ... |

FIG. 43A
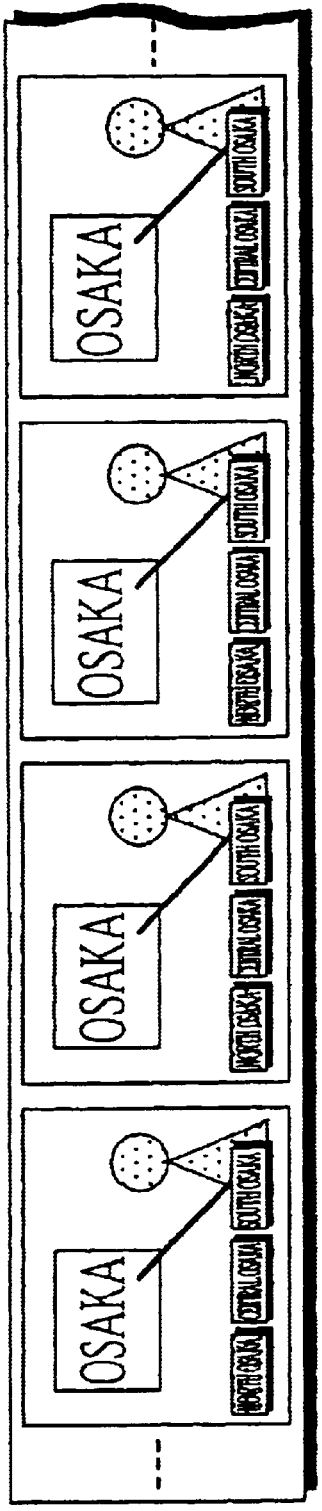
CONTENT 10
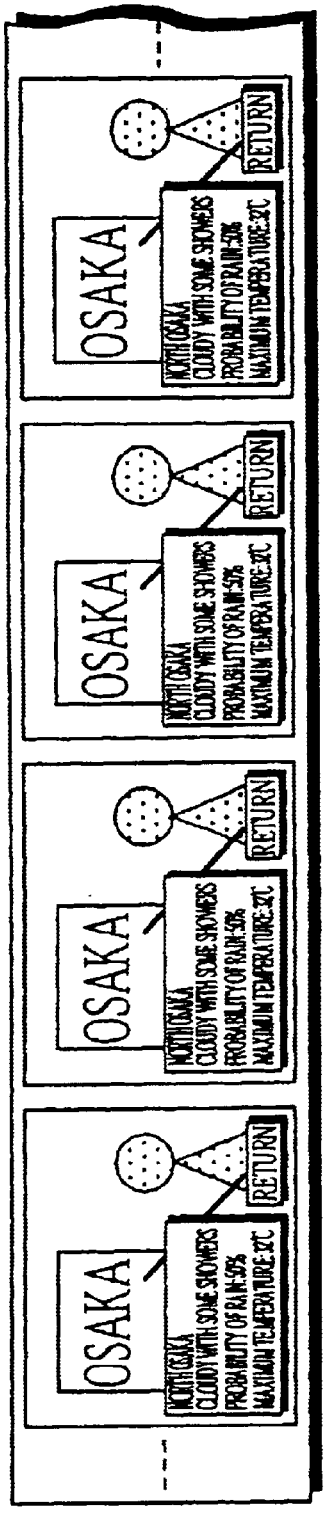
CONTENT 11

FIG. 43B
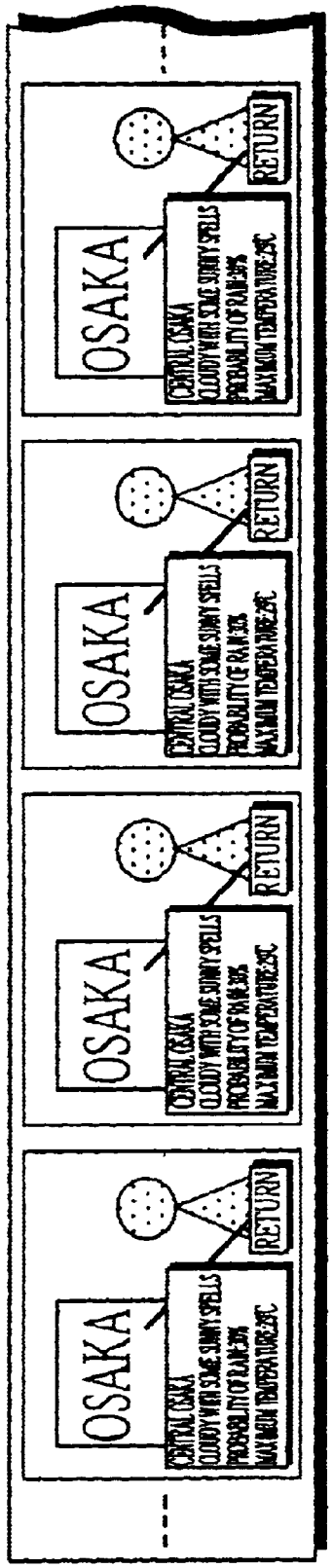
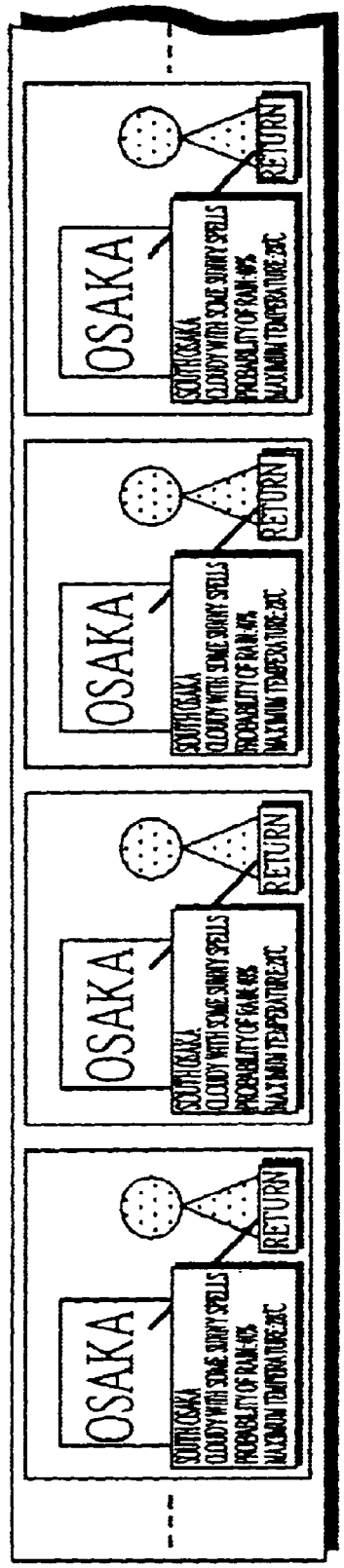

Fig. 44

Navi10-1.nif

Object Definition Table :

| Object Index | type | X | Y | Handler | Normal Bitmap | FocusedBitmap |
|---|---|---|---|---|---|---|
| 0 | Button | 50 | 300 | 0 | 0 | 1 |
| 1 | Button | 200 | 300 | 1 | 2 | 3 |
| 2 | Button | 350 | 300 | 2 | 4 | 5 |

Handler Definition Table :

| Handler Index | Bytecode |
|---|---|
| 0 | goto_content(Hyperlink Index 0) |
| 1 | goto_content(Hyperlink Index 1) |
| 2 | goto_content(Hyperlink Index 2) |

Hyperlink Table :

| Hyperlink Index | Content number |
|---|---|
| 0 | 11 |
| 1 | 12 |
| 2 | 13 |

Bitmap Table :

| Bitmap Index | Bitmap Data |
|---|---|
| 0 | NORTH OSAKA |
| 1 | NORTH OSAKA |
| 2 | CENTRAL OSAKA |
| 3 | CENTRAL OSAKA |
| 4 | SOUTH OSAKA |
| 5 | SOUTH OSAKA |

Time Information Table :

| start_time | 5 |
|---|---|
| end_time | 65 |

Fig. 45

Navi11-1.nif

Object Definition Table :

| Object Index | type | X | Y | Handler | Normal Bitmap | FocusedBitmap |
|---|---|---|---|---|---|---|
| 0 | Button | 400 | 300 | 0 | 0 | 1 |
| 1 | Picture | 50 | 150 | — | 2 | — |

Handler Definition Table :

| Handler Index | Script |
|---|---|
| 0 | goto_content(Hyperlink index 0) |

Hyperlink Table :

| Hyperlink Index | Content number |
|---|---|
| 0 | 10 |

Bitmap Table :

| Bitmap Index | Bitmap Data |
|---|---|
| 0 | RETURN |
| 1 | RETURN |
| 2 | NORTH OSAKA<br>CLOUDY WITH SOME SHOWERS<br>PROBABILITY OF RAIN:50%<br>MAXIMUM TEMPERATURE:32°C |

Time Information Table :

| start_time | 5 |
|---|---|
| end_time | 65 |

Fig. 46

Navi12-1.nif

Object Definition Table :

| Object Index | type | X | Y | Handler | Normal Bitmap | FocusedBitmap |
|---|---|---|---|---|---|---|
| 0 | Button | 400 | 300 | 0 | 0 | 1 |
| 1 | Picture | 50 | 150 | — | 2 | — |

Handler Definition Table :

| Handler Index | Script |
|---|---|
| 0 | goto_content(Hyperlink index 0) |

Hyperlink Table :

| Hyperlink Index | Content number |
|---|---|
| 0 | 0 |

Bitmap Table :

| Bitmap Index | Bitmap Data |
|---|---|
| 0 | RETURN |
| 1 | RETURN |
| 2 | CENTRAL OSAKA<br>CLOUDY WITH SOME SUNNY SPELLS<br>PROBABILITY OF RAIN:30%<br>MAXIMUM TEMPERATURE:29°C |

Time Information Table :

| start_time | 5 |
|---|---|
| end_time | 65 |

Fig. 47

Navi3-1.nif

Object Definition Table :

| Object Index | type | X | Y | Handler | Normal Bitmap | FocusedBitmap |
|---|---|---|---|---|---|---|
| 0 | Button | 400 | 300 | 0 | 0 | 1 |
| 1 | Picture | 50 | 150 | — | 2 | — |

Handler Definition Table :

| Handler Index | Script |
|---|---|
| 0 | goto_content(Hyperlink index 0) |

Hyperlink Table :

| Hyperlink Index | Content number |
|---|---|
| 0 | 0 |

Bitmap Table :

| Bitmap Index | Bitmap Data |
|---|---|
| 0 | RETURN |
| 1 | RETURN |
| 2 | SOUTH OSAKA<br>CLOUDY WITH SOME SUNNY SPELLS<br>PROBABILITY OF RAIN:40%<br>MAXIMUM TEMPERATURE:28°C |

Time Information Table :

| start_time | 5 |
|---|---|
| end_time | 65 |

Fig. 48

Navi10-13-1.nif

Object Definition Table:

| Object Index | type | X | Y | Handler | Normal Bitmap | Focused Bitmap | visibility |
|---|---|---|---|---|---|---|---|
| 0 | Button | 50 | 300 | 0 | 0 | 1 | 1 |
| 1 | Button | 200 | 300 | 1 | 2 | 3 | 1 |
| 2 | Button | 350 | 300 | 2 | 4 | 5 | 1 |
| 3 | Button | 400 | 300 | 3 | 6 | 7 | 0 |
| 4 | Picture | 50 | 150 | — | 8 | — | 0 |
| 5 | Picture | 50 | 150 | — | 9 | — | 0 |
| 6 | Picture | 50 | 150 | — | 10 | — | 0 |

Handler Definition Table:

| Handler Index | Script |
|---|---|
| 0 | for(i=0, i<3, i++){<br>   hide_object(object index i)<br>}<br>show_object(object index 3)<br>show_object(object index 4) |
| 1 | for(i=0, i<3, i++){<br>   hide_object(object index i)<br>}<br>show_object(object index 3)<br>show_object(object index 5) |
| 2 | for(i=0, i<3, i++){<br>   hide_object(object index i)<br>}<br>show_object(object index 3)<br>show_object(object index 6) |
| 3 | for(i=3, i<7, i++){<br>   hide_object(object index i)<br>}<br>for(i=0, i<3, i++){<br>   hide_object(object index i)<br>} |

Bitmap Table:

| Bitmap Index | Bitmap Data |
|---|---|
| 0 | NORTH OSAKA |
| 1 | NORTH OSAKA |
| 2 | CENTRAL OSAKA |
| 3 | CENTRAL OSAKA |
| 4 | SOUTH OSAKA |
| 5 | SOUTH OSAKA |
| 6 | RETURN |
| 7 | RETURN |
| 8 | NORTH OSAKA<br>CLOUDY WITH SOME SHOWERS<br>PROBABILITY OF RAIN:50%<br>MAXIMUM TEMPERATURE:20°C |
| 9 | CENTRAL OSAKA<br>CLOUDY WITH SOME SUNNY SPELLS<br>PROBABILITY OF RAIN:30%<br>MAXIMUM TEMPERATURE:25°C |
| 10 | SOUTH OSAKA<br>CLOUDY WITH SOME SUNNY SPELLS<br>PROBABILITY OF RAIN:40%<br>MAXIMUM TEMPERATURE:23°C |

Time Information Table:

| start_time | 5 |
|---|---|
| end_time | 65 |

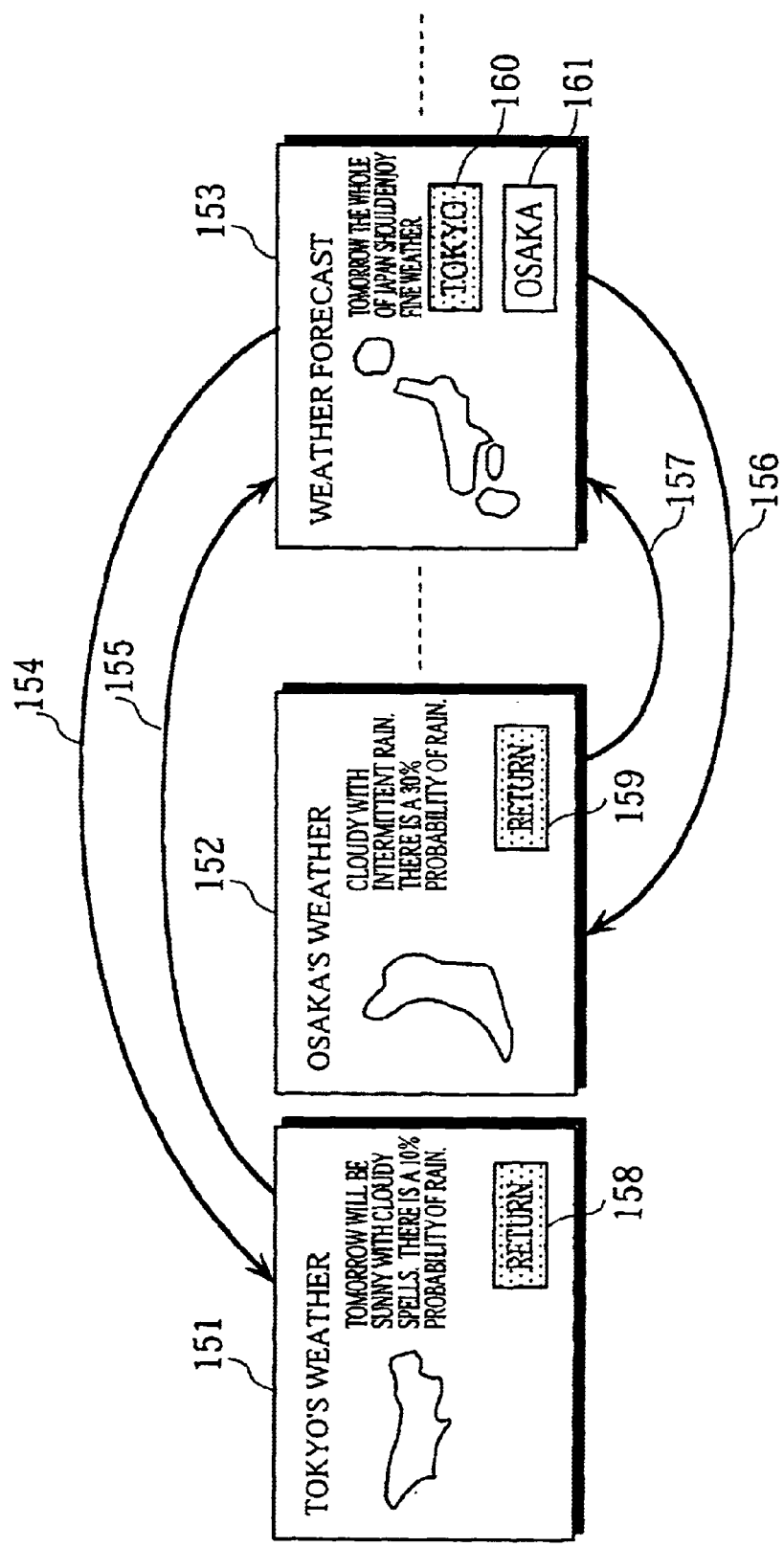

Fig. 54 navi5.nif

Object Definition Table : 302

| Index | type | X | Y | Handler | Normal Bitmap | FocusedBitmap |
|---|---|---|---|---|---|---|
| 0 | Button | 400 | 300 | 2 | 6 | 7 |
| 1 | Button | 400 | 400 | 3 | 8 | 9 |

Handler Definition Table :

| Index | Script |
|---|---|
| 2 | goto_content(index 4) |
| 3 | goto_content(index 5) |

Hyperlink Table :

| Index | Content Number |
|---|---|
| 4 | 1 |
| 5 | 2 |

Bitmap Table :

| Index | Bitmap Data |
|---|---|
| 6 | TOKYO |
| 7 | TOKYO |
| 8 | OSAKA |
| 9 | OSAKA |

Fig. 55 navi1.nif

Object Definition Table : 401, 402

| Index | type | X | Y | Handler | Normal Bitmap | Focused Bitmap |
|---|---|---|---|---|---|---|
| 0 | Button | 400 | 300 | 3 | — | 7 |

Handler Definition Table : 403

| Index | Script |
|---|---|
| 3 | goto_entry |

Bitmap Table :

| Index | Bitmap Data | |
|---|---|---|
| 7 | RETURN | 404 |

Fig. 56

501 CONSTRUCTION INFORMATION TABLE

| CONTENT NUMBER | IMAGE DATA | NAVIGATION INFORMATION |
|---|---|---|
| 0 | still0.m2v | navi0.nif |
| 1 | still1.m2v | navi1.nif |
| 2 | still2.m2v | navi2.nif |
| : | : | : |
| 5 | still5.m2v | navi5.nif |
| : | : | : |

ENTRY INFORMATION 502

| ENTRY CONTENT NUMBER | 5 |
|---|---|

601 MULTIPLEXING INFORMATION TABLE

| Bitrate | 6000000bps |
|---|---|
| original_network_id | 0x0001 |
| transport_stream_id | 0x0001 |
| service_id | 0x0001 |
| event_id | 0x0001 |
| PMT_PID | 0x0080 |
| PCR_PID | 0x0081 |
| NE_component_pid | 0x0082 |
| VE_information_component_pid | 0x0083 |
| VE_component_pid | 0x0084 |

Fig. 58

701 CONTENT IDENTIFIER ASSIGNING TABLE

| CONTENT NUMBER | orig_nw_id | ts_id | VE_svc_id | VE_event_id | VE_id | AE_svc_id | AE_event_id | AE_id | NE_svc_id | NE_event_id | NE_id |
|---|---|---|---|---|---|---|---|---|---|---|---|
| 0 | 0x0001 | 0x0001 | 0x0001 | 0x0001 | 0x0000 | — | — | — | 0x0001 | 0x0001 | 0x0000 |
| 1 | 0x0001 | 0x0001 | 0x0001 | 0x0001 | 0x0001 | — | — | — | 0x0001 | 0x0001 | 0x0001 |
| 2 | 0x0001 | 0x0001 | 0x0001 | 0x0001 | 0x0002 | — | — | — | 0x0001 | 0x0001 | 0x0002 |
| .. | .. | .. | .. | .. | .. | .. | .. | .. | .. | .. | .. |
| 5 | 0x0001 | 0x0001 | 0x0001 | 0x0001 | 0x0005 | — | — | — | 0x0001 | 0x0001 | 0x0005 |
| .. | .. | .. | .. | .. | .. | .. | .. | .. | .. | .. | .. |

801 DISPLAY IMAGE INFORMATION IDENTIFIER ASSIGNING TABLE

| VE_id | component_tag | PID | stream_id | IMAGE DATA FILE |
|---|---|---|---|---|
| 0x0000 | 0x00 | 0x0084 | 0xe0 | still0.m2v |
| 0x0001 | 0x00 | 0x0084 | 0xe1 | still1.m2v |
| 0x0002 | 0x00 | 0x0084 | 0xe2 | still2.m2v |
| ⋮ | ⋮ | ⋮ | ⋮ | ⋮ |
| 0x0005 | 0x00 | 0x0084 | 0xe5 | still5.m2v |
| ⋮ | ⋮ | ⋮ | ⋮ | ⋮ |
| 0x000f | 0x00 | 0x0084 | 0xef | still15.m2v |
| 0x0010 | 0x00 | 0x0084 | 0xe0 | still16.m2v |
| ⋮ | ⋮ | ⋮ | ⋮ | ⋮ |

Fig. 61

NVT(5) 1001

Object Definition Table : 1002

| Index | type | X | Y | Handler | Normal Bitmap | FocusedBitmap |
|---|---|---|---|---|---|---|
| 0 | Button | 400 | 300 | 2 | 6 | 7 |
| 1 | Button | 400 | 400 | 3 | 8 | 9 |

Handler Definition Table : 1003

| Index | Script |
|---|---|
| 2 | goto_content(index 4) |
| 3 | goto_content(index 5) |

Hyperlink Table : 1004

| Index | orig_nw_id | ts_id | VE_service_id | VE_event_id | VE_id | AE_service_id | AE_event_id | AE_id | NE_service_id | NE_event_id | NE_id |
|---|---|---|---|---|---|---|---|---|---|---|---|
| 4 | – | – | – | – | 0x0001 | – | – | – | – | – | 0x0001 |
| 5 | – | – | – | – | 0x0002 | – | – | – | – | – | 0x0002 |

Bitmap Table : 1005

| Index | Bitmap Data |
|---|---|
| 6 | TOKYO |
| 7 | TOKYO |
| 8 | OSAKA |
| 9 | OSAKA |

Fig. 62

NVT(1)      1101

Object Definition Table :

| Index | type | X | Y | Handler | Normal Bitmap | Focused Bitmap |
|---|---|---|---|---|---|---|
| 0 | Button | 400 | 300 | 3 | — | 7 |

Handler Definition Table :

| Index | Script |
|---|---|
| 3 | goto_entry |

Bitmap Table :

| Index | Bitmap Data |
|---|---|
| 7 | RETURN |

Fig. 63A

VET(5) 1201

| first_pts | 112500 |
| last_pts | 112500 |
| stream_id | 0xe5 |
| component_tag | 0x00 |

Fig. 63B

VET(1) 1202

| first_pts | 45000 |
| last_pts | 45000 |
| stream_id | 0xe1 |
| component_tag | 0x00 |

Fig. 63C

VET(15) 1203

| first_pts | 360000 |
| last_pts | 360000 |
| stream_id | 0xef |
| component_tag | 0x00 |

Fig. 66A
Network Information Table 1301

| table_id=0x40 |
| network_id=0x0001 |
| : |

| original_network_id | transport_stream_id | descriptor |
|---|---|---|
| ... | ... | ... |
| 0x0001 | 0x0001 | TRANSFER PREFACE |
| ... | ... | ... |

Fig. 66B
Service Description Table 1302

| table_id=0x42 |
| transport_stream_id=0x0001 |
| : |

| service_id | descriptor |
|---|---|
| ... | ... |
| 0x0001 | SERVICE NAME AND OTHER INFORMATION |
| ... | ... |

Fig. 66C
Event Information Table 1303

| table_id=0x4c |
| service_id=0x0001 |
| : |

| event_id | descriptor |
|---|---|
| ... | ... |
| 0x0001 | EVENT NAME AND OTHER INFORMATION |
| ... | ... |

Fig. 67

Program Association Table  1401

```
table_id=0x00
  ⋮
transport_stream_id=0x0001
  ⋮
```

| program_no | PMT_pid |
|---|---|
| ⋮ | ⋮ |
| 0x0001 | 0x0080 |
| ⋮ | ⋮ |

Fig. 68

Program Map Table  1501

```
table_id=0x02
  ⋮
program_number=0x0001
  ⋮
PCR_PID=0x0081
  ⋮
Entry_Descriptor
  ⋮
```
1502

| PID | stream_type | descriptor |
|---|---|---|
| 0x0082 | 0x05 | NE_Component_Descriptor |
| 0x0083 | 0x05 | VE_Information_Component_Descriptor |
| 0x0084 | 0x02 | stream_identifier_descriptor |

NE_Component_Descriptor

VE_Information_Component_Descriptor

Entry_Descriptor stream_identifier_descriptor

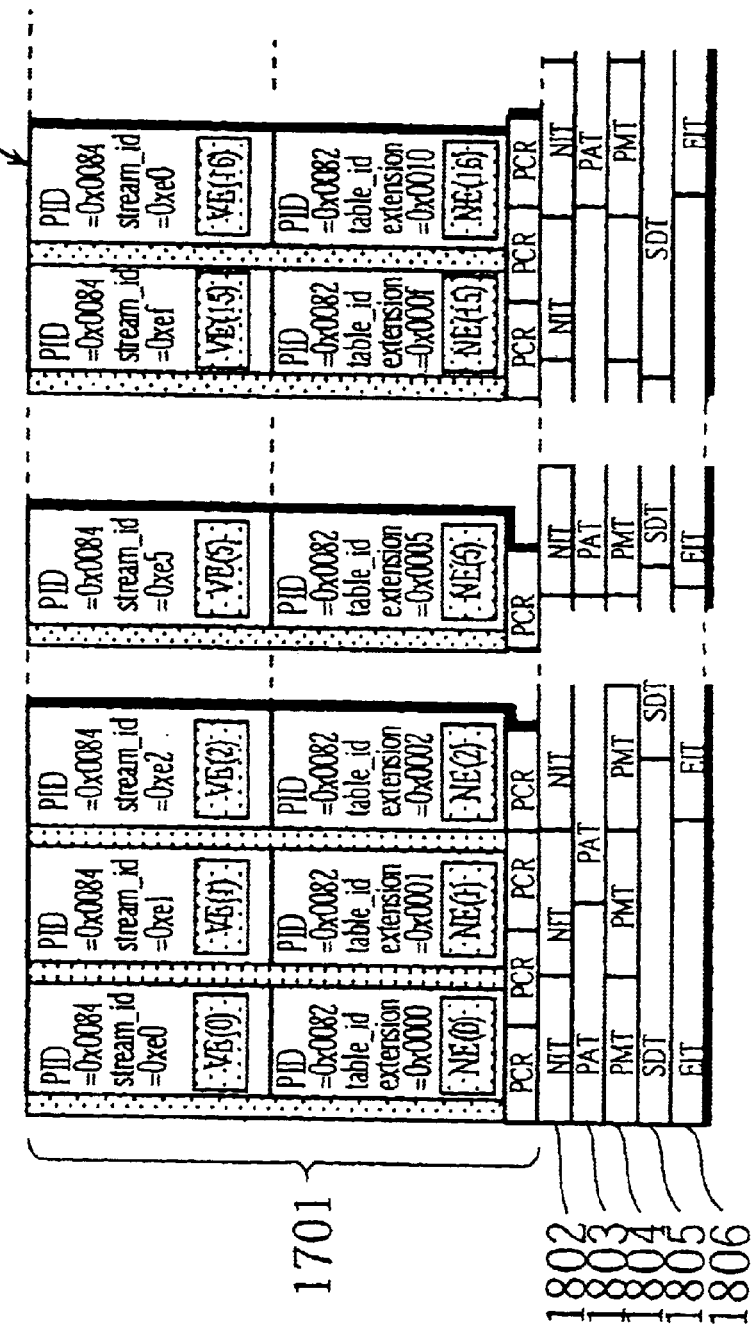

Fig. 74A

| FILTER IDENTIFICATION NUMBER | START/STOP | PID | stream_id | table_id_extension | OUTPUTTED DESTINATION |
|---|---|---|---|---|---|
| 0 | STOP | — | — | | AV DECODER UNIT |
| 1 | STOP | — | — | | AV DECODER UNIT |
| 2 | START | 0x0083 | | 0x0005 | STREAM CORRESPONDENCE INFORMATION TABLE STORAGE UNIT |
| 3 | START | 0x0082 | | 0x0005 | NAVIGATION INFORMATION TABLE STORAGE UNIT |

Fig. 74B

| FILTER IDENTIFICATION NUMBER | START/STOP | PID | stream_id | table_id_extension | OUTPUTTED DESTINATION |
|---|---|---|---|---|---|
| 0 | START | 0x0084 | 0xe5 | | AV DECODER UNIT |
| 1 | STOP | — | — | | AV DECODER UNIT |
| 2 | STOP | — | — | — | STREAM CORRESPONDENCE INFORMATION TABLE STORAGE UNIT |
| 3 | START | 0x0082 | | 0x0005 | NAVIGATION INFORMATION TABLE STORAGE UNIT |

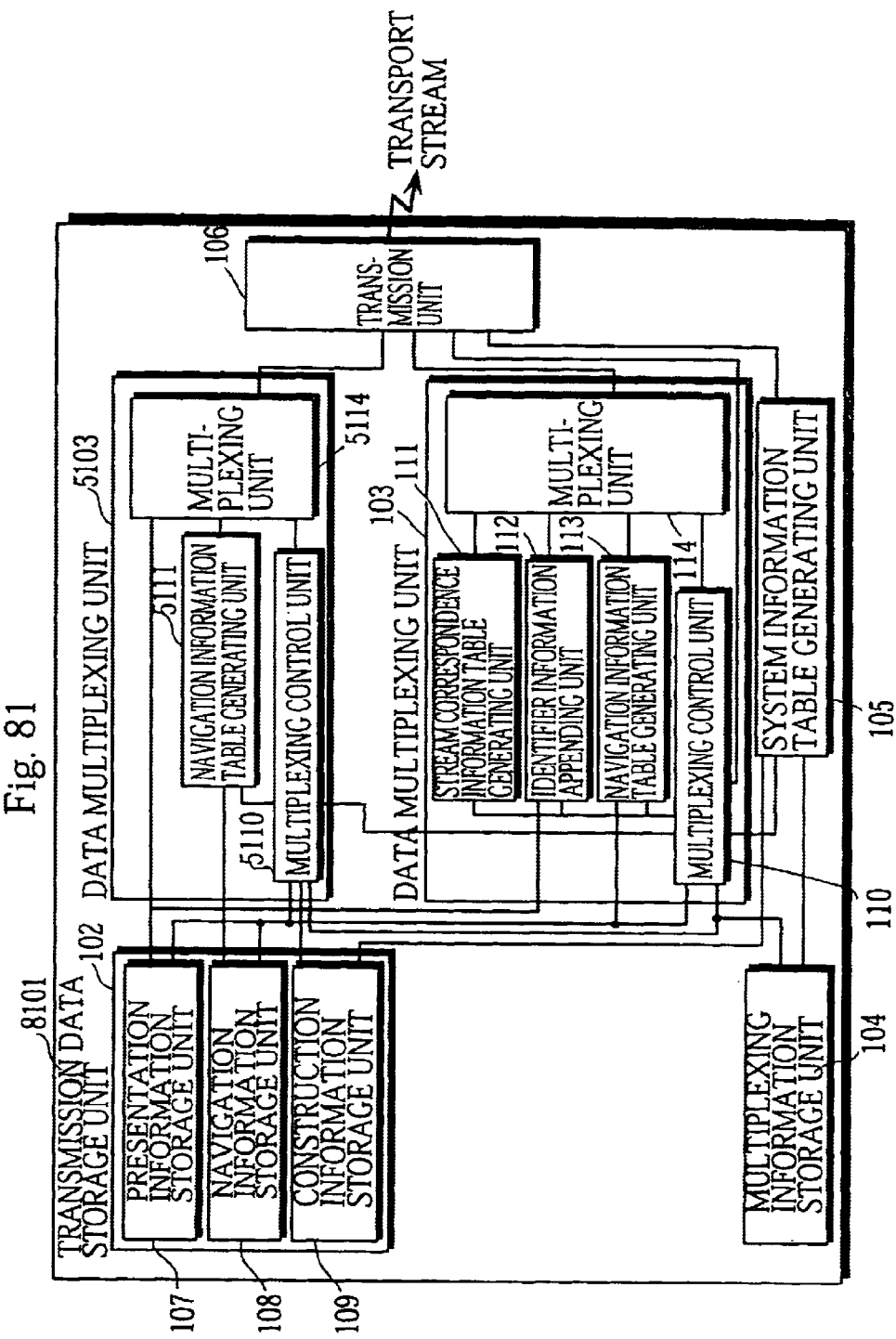

Fig. 82A

| CONTENT NUMBER | IMAGE DATA | AUDIO DATA | NAVIGATION INFORMATION |
|---|---|---|---|
| 100 | Video100.m2v | Audio100.m2v | Navi100-0.nif, Navi100-1.nif, Navi100-2.nif, ⋯ |
| 101 | Video100.m2v | Audio100.m2v | Navi101-0.nif, Navi101-1.nif, Navi101-2.nif, ⋯ |
| 102 | Video100.m2v | Audio100.m2v | Navi102-0.nif, Navi102-1.nif, Navi102-2.nif, ⋯ |
| 103 | Video100.m2v | Audio100.m2v | Navi103-0.nif, Navi103-1.nif, Navi103-2.nif, ⋯ |
| 104 | Video104.m2v | Audio104.m2v | Navi104-0.nif, Navi104-1.nif, Navi104-2.nif, ⋯ |
| 105 | Video104.m2v | Audio104.m2v | Navi105-0.nif, Navi105-1.nif, Navi105-2.nif, ⋯ |
| 106 | Video106.m2v | Audio106.m2v | Navi106-0.nif, Navi106-1.nif, Navi106-2.nif, ⋯ |
| ⋯ | | | ⋯ |

| CONTENT NUMBER | IMAGE DATA | AUDIO DATA | NAVIGATION INFORMATION |
|---|---|---|---|
| 0 | still0.m2v | — | navi0.nif |
| 1 | still1.m2v | — | navi1.nif |
| 2 | still2.m2v | — | navi2.nif |
| 3 | still3.m2v | — | navi3.nif |
| 4 | still4.m2v | — | navi4.nif |
| 5 | still5.m2v | — | navi5.nif |
| 6 | still6.m2v | — | navi6.nif |
| ⋯ | | | ⋯ |

Navi5.nif

Object Definition Table :

| Object Index | type | X | Y | Handler | Normal Bitmap | FocusedBitmap |
|---|---|---|---|---|---|---|
| 0 | Button | 400 | 200 | 3 | 9 | 10 |
| 1 | Button | 400 | 300 | 4 | 11 | 12 |
| 2 | Button | 450 | 400 | 5 | 13 | 14 |

Handler Definition Table :

| Handler Index | Bytecode |
|---|---|
| 3 | goto_content(Hyperlink index 6) |
| 4 | goto_content(Hyperlink index 7) |
| 5 | goto_content(Hyperlink index 8) |

Hyperlink Table :

| Hyperlink Index | Content number |
|---|---|
| 6 | 1 |
| 7 | 2 |
| 8 | 100 |

Bitmap Table :

| Bitmap Index | Bitmap Data |
|---|---|
| 9 | TOKYO |
| 10 | TOKYO |
| 11 | OSAKA |
| 12 | OSAKA |
| 13 | RETURN |
| 14 | RETURN |

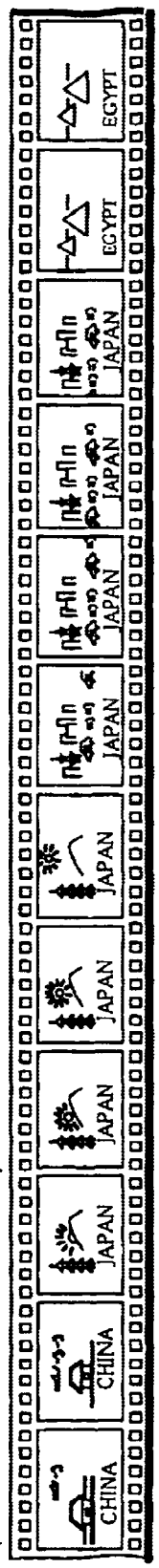
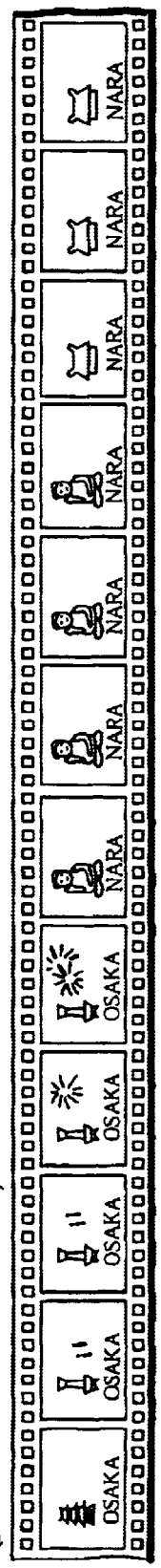
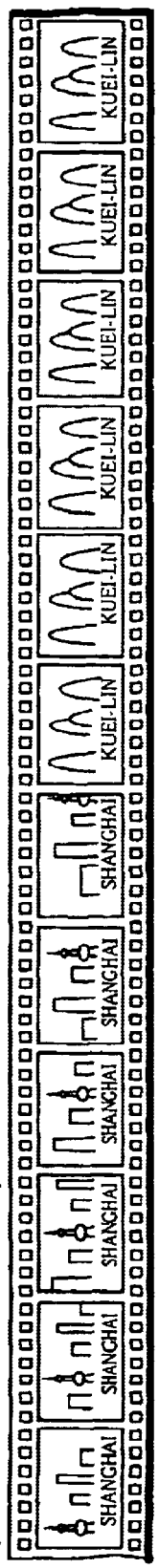
Fig. 84A (WORLD TRAVEL GUIDE) Video 100.m2v
Fig. 84B (JAPAN TRAVEL GUIDE) Video 104.m2v
Fig. 84C (CHINA TRAVEL GUIDE) Video 106.m2v

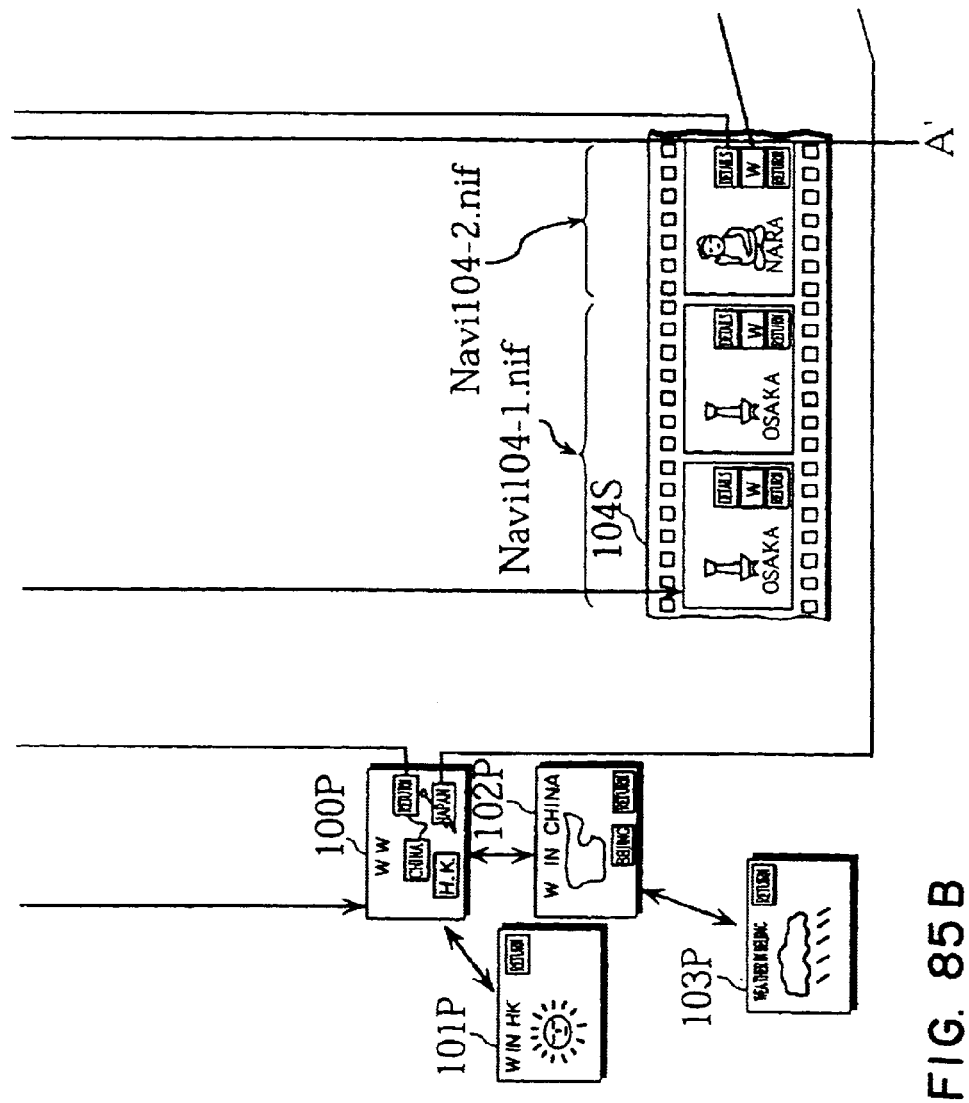

Fig. 87

Navi100-0.nif

Object Definition Table :

| Object Index | type | X | Y | Handler | Normal Bitmap | Focused Bitmap |
|---|---|---|---|---|---|---|
| 0 | Button | 500 | 150 | 0 | 0 | 1 |
| 1 | Button | 500 | 250 | 1 | 2 | 3 |
| 2 | Button | 500 | 350 | 2 | 4 | 5 |

Handler Definition Table :

| Handler Index | Script |
|---|---|
| 0 | goto_content(Hyperlink Index 0) |
| 1 | goto_content(Hyperlink Index 1) |
| 2 | goto_content(Hyperlink Index 2) |

Hyperlink Table :

| Hyperlink Index | Content Number |
|---|---|
| 0 | 101 |
| 1 | 10 |
| 2 | 106 |

Bitmap Table :

| Bitmap Index | Bitmap Data |
|---|---|
| 0 | Details |
| 1 | Details |
| 2 | Weather |
| 3 | Weather |
| 4 | China |
| 5 | China |

Time Information Table :

| start_time | 1 |
|---|---|
| end_time | 300 |

Fig. 88

Navi100-1.nif

Object Definition Table :

| Object Index | type | X | Y | Handler | Normal Bitmap | Focused Bitmap |
|---|---|---|---|---|---|---|
| 0 | Button | 500 | 150 | 0 | 0 | 1 |
| 1 | Button | 500 | 250 | 1 | 2 | 3 |
| 2 | Button | 500 | 350 | 2 | 4 | 5 |

Handler Definition Table :

| Handler Index | Script |
|---|---|
| 0 | goto_content(Hyperlink index 0) |
| 1 | goto_content(Hyperlink index 1) |
| 2 | goto_content(Hyperlink index 2) |

Hyperlink Table :

| Hyperlink Index | Content Number |
|---|---|
| 0 | 101 |
| 1 | 10 |
| 2 | 104 |

Bitmap Table :

| Bitmap Index | Bitmap Data |
|---|---|
| 0 | Details |
| 1 | Details |
| 2 | Weather |
| 3 | Weather |
| 4 | Japan |
| 5 | Japan |

Time Information Table :

| start_time | 301 |
|---|---|
| end_time | 600 |

Fig. 89

Navi100-2.nif

Object Definition Table :

| Object Index | type | X | Y | Handler | Normal Bitmap | Focused Bitmap |
|---|---|---|---|---|---|---|
| 0 | Button | 500 | 150 | 0 | 0 | 1 |
| 1 | Button | 500 | 250 | 1 | 2 | 3 |
| 2 | Button | 500 | 350 | 2 | 4 | 5 |

Handler Definition Table :

| Handler Index | Script |
|---|---|
| 0 | goto_content(Hyperlink index 0) |
| 1 | goto_content(Hyperlink index 1) |
| 2 | goto_content(Hyperlink index 2) |

Hyperlink Table :

| Hyperlink Index | Content Number |
|---|---|
| 0 | 101 |
| 1 | 10 |
| 2 | 120 |

Bitmap Table :

| Bitmap Index | Bitmap Data |
|---|---|
| 0 | Details |
| 1 | Details |
| 2 | Weather |
| 3 | Weather |
| 4 | Egypt |
| 5 | Egypt |

Time Information Table :

| start_time | 601 |
|---|---|
| end_time | 900 |

Fig. 90

Navi101-1.nif

Object Definition Table :

| Object Index | type | X | Y | Handler | Normal Bitmap | Focused Bitmap |
|---|---|---|---|---|---|---|
| 0 | Button | 500 | 120 | 0 | 0 | 1 |
| 1 | Button | 500 | 220 | 1 | 2 | 3 |
| 2 | Button | 500 | 350 | 2 | 4 | 5 |
| 3 | Picture | 200 | 100 | | 6 | |

Handler Definition Table :

| Handler Index | Script |
|---|---|
| 0 | goto_content(Hyperlink Index 0) |
| 1 | goto_content(Hyperlink Index 1) |
| 2 | goto_content(Hyperlink Index 2) |

Hyperlink Table :

| Hyperlink Index | Content Number |
|---|---|
| 0 | 102 |
| 1 | 103 |
| 2 | 100 |

Bitmap Table :

| Bitmap Index | Bitmap Data |
|---|---|
| 0 | TRANSPORT |
| 1 | TRANSPORT |
| 2 | ACCOMODATION |
| 3 | ACCOMODATION |
| 4 | RETURN |
| 5 | RETURN |
| 6 | JAPAN.... |

Time Information Table :

| start_time | 301 |
|---|---|
| end_time | 600 |

Fig. 91

Navi101-2.nif

Object Definition Table :

| Object Index | type | X | Y | Handler | Normal Bitmap | Focused Bitmap |
|---|---|---|---|---|---|---|
| 0 | Button | 500 | 120 | 0 | 0 | 1 |
| 1 | Button | 500 | 220 | 1 | 2 | 3 |
| 2 | Button | 500 | 350 | 2 | 4 | 5 |
| 3 | Picture | 200 | 100 | | 6 | |

Handler Definition Table :

| Handler Index | Script |
|---|---|
| 0 | goto_content(Hyperlink index 0) |
| 1 | goto_content(Hyperlink index 1) |
| 2 | goto_content(Hyperlink index 2) |

Hyperlink Table :

| Hyperlink Index | Content Number |
|---|---|
| 0 | 102 |
| 1 | 103 |
| 2 | 100 |

Bitmap Table :

| Bitmap Index | Bitmap Data |
|---|---|
| 0 | TRANSPORT |
| 1 | TRANSPORT |
| 2 | ACCOMODATION |
| 3 | ACCOMODATION |
| 4 | RETURN |
| 5 | RETURN |
| 6 | EGYPT.... |

Time Information Table :

| start_time | 601 |
|---|---|
| end_time | 900 |

Fig. 92

Navi102-1.nif

Object Definition Table :

| Object Index | type | X | Y | Handler | Normal Bitmap | FocusedBitmap |
|---|---|---|---|---|---|---|
| 0 | Button | 500 | 350 | 0 | 0 | 1 |
| 1 | Picture | 200 | 100 | — | 2 | — |

Handler Definition Table :

| Handler Index | Script |
|---|---|
| 0 | goto_content(Hyperlink index 0) |

Hyperlink Table :

| Hyperlink Index | Content Number |
|---|---|
| 0 | 101 |

Bitmap Table :

| Bitmap Index | Bitmap Data |
|---|---|
| 0 | RETURN |
| 1 | RETURN |
| 2 | GETTING TO JAPAN |

Time Information Table :

| start_time | 301 |
|---|---|
| end_time | 600 |

Fig. 93

Navi103-1.nif

Object Definition Table :

| Object Index | type | X | Y | Handler | Normal Bitmap | FocusedBitmap |
|---|---|---|---|---|---|---|
| 0 | Button | 500 | 350 | 0 | 0 | 1 |
| 1 | Picture | 200 | 100 | — | 2 | — |

Handler Definition Table :

| Handler Index | Script |
|---|---|
| 0 | goto_content(Hyperlink index 0) |

Hyperlink Table :

| Hyperlink Index | Content Number |
|---|---|
| 0 | 101 |

Bitmap Table :

| Bitmap Index | Bitmap Data |
|---|---|
| 0 | RETURN |
| 1 | RETURN |
| 2 | ACCOMMODATION IN JAPAN |

Time Information Table :

| start_time | 301 |
|---|---|
| end_time | 600 |

Fig. 94

Navi104-1.nif

Object Definition Table :

| Object Index | type | X | Y | Handler | Normal Bitmap | FocusedBitmap |
|---|---|---|---|---|---|---|
| 0 | Button | 500 | 150 | 0 | 0 | 1 |
| 1 | Button | 500 | 250 | 1 | 2 | 3 |
| 2 | Button | 500 | 350 | 2 | 4 | 5 |

Handler Definition Table :

| Handler Index | Script |
|---|---|
| 0 | goto_content(Hyperlink index 0) |
| 1 | goto_content(Hyperlink index 1) |
| 2 | goto_content(Hyperlink index 2) |

Hyperlink Table :

| Hyperlink Index | Content Number |
|---|---|
| 0 | 105 |
| 1 | 5 |
| 2 | 100 |

Bitmap Table :

| Bitmap Index | Bitmap Data |
|---|---|
| 0 | DETAILS |
| 1 | DETAILS |
| 2 | WEATHER |
| 3 | WEATHER |
| 4 | RETURN |
| 5 | RETURN |

Time Information Table :

| start_time | 401 |
|---|---|
| end_time | 900 |

Fig. 95

Navi105-1.nif

Object Definition Table :

| Object Index | type | X | Y | Handler | Normal Bitmap | Focused Bitmap | visibility |
|---|---|---|---|---|---|---|---|
| 0 | Button | 500 | 120 | 0 | 0 | 1 | 1 |
| 1 | Button | 500 | 220 | 1 | 2 | 3 | 1 |
| 2 | Button | 500 | 350 | 2 | 4 | 5 | 1 |
| 3 | Picture | 100 | 200 | — | 6 | — | 1 |
| 4 | Picture | 100 | 200 | — | 7 | — | 0 |
| 5 | Button | 500 | 350 | 3 | 4 | 5 | 0 |
| 6 | Picture | 100 | 200 | — | 8 | — | 0 |
| 7 | Button | 500 | 350 | 4 | 4 | 5 | 0 |

Handler Definition Table :

| Handler Index | Script |
|---|---|
| 0 | for(i=0, i<4, i++){<br>   hide_object(object index i)<br>}<br>show_object(object index 4)<br>show_object(object index 5) |
| 1 | for(i=0, i<4, i++){<br>   hide_object(object index i)<br>}<br>show_object(object index 6)<br>show_object(object index 7) |
| 2 | goto_content(hyperlink index 0) |
| 3 | hide_object(object index 4)<br>hide_object(object index 5)<br>for(i=0, i<4, i++){<br>   show object(object index i)<br>} |
| 4 | hide_object(object index 6)<br>hide_object(object index 7)<br>for(i=0, i<4, i++){<br>   show object(object index i)<br>} |

Hyperlink Table :

| Hyperlink Index | Content Number |
|---|---|
| 0 | 104 |

Bitmap Table :

| Bitmap Index | Bitmap Data |
|---|---|
| 0 | TRANSPORTATION |
| 1 | TRANSPORTATION |
| 2 | ACCOMMODATION |
| 3 | ACCOMMODATION |
| 4 | RETURN |
| 5 | RETURN |
| 6 | NARA.... |
| 7 | GETTING TO NARA |
| 8 | ACCOMMODATION IN NARA |

Time Information Table :

| start_time | 401 |
|---|---|
| end_time | 900 |

Fig. 96

NVT(104.1)

Object Definition Table:

| Object Index | type | X | Y | Handler | Normal Bitmap | Focused Bitmap |
|---|---|---|---|---|---|---|
| 0 | Button | 500 | 150 | 0 | 0 | 1 |
| 1 | Button | 500 | 250 | 1 | 2 | 3 |
| 2 | Button | 500 | 350 | 2 | 4 | 5 |

Handler Definition Table:

| Handler Index | Bytecode |
|---|---|
| 0 | goto_content(Hyperlink index 0) |
| 1 | goto_content(Hyperlink index 1) |
| 2 | goto_content(Hyperlink index 2) |

Hyperlink Table:

| Hyperlink Index | orig_nw_id | ts_id | VE_service_id | VE_event_id | VE_comp_tag | VE_id | AE_service_id | AE_event_id | AE_comp_tag | AE_id | NE_service_id | NE_event_id | NE_id |
|---|---|---|---|---|---|---|---|---|---|---|---|---|---|
| 0 | — | — | — | — | 0x15 | — | — | — | — | — | — | — | 0x0069 |
| 1 | — | — | — | — | — | 0x0005 | — | — | — | — | — | — | 0x0005 |
| 2 | — | — | — | — | 0xf0 | — | — | — | 0xf0 | — | — | — | 0x0064 |

Time Information Table:

| start_time | 401 |
|---|---|
| end_time | 900 |

Bitmap Table:

| Bitmap Index | Bitmap Data |
|---|---|
| 0 | DETAILS |
| 1 | DETAILS |
| 2 | WEATHER |
| 3 | WEATHER |
| 4 | RETURN |
| 5 | RETURN |

Fig. 99

| FILTER IDENTIFICATION NUMBER 2202 | START/STOP 2203 | PID 2204 | stream_id 2205 | table_id_extension 2206 / 8804 | version_no 7805 | OUTPUT DESTINATION 2207 |
|---|---|---|---|---|---|---|
| 0 | | | | | | AV DECODER UNIT |
| 1 | | | | | | AV DECODER UNIT |
| 2 | | | | | | |
| 3 | | | | | | NAVIGATION INFORMATION TABLE STORAGE UNIT |

US 6,757,911 B1

DIGITAL BROADCASTING SYSTEM, DIGITAL BROADCASTING APPARATUS, AND A RECEPTION APPARATUS FOR DIGITAL BROADCASTS

BACKGROUND OF THE INVENTION

1. Field of the Invention

The present invention relates to a digital broadcasting system.

2. Description of the Related Art

Since the development of digital satellite broadcasting in recent years, there has been a great increase in the number of programs being provided on an ever greater number of channels. For digital satellite broadcasting, large numbers of channels are possible by multiplexing the channels together into a single frequency band. This multiplexing is performed using what is called a "transport_stream" under MPEG2 (Moving Pictures Experts Group2) standard. This technique is described in detail in the documentation for IS/IEC Standard 13818-1 (MPEG2 system standard).

Digital satellite broadcasting has a drawback in that image information is transmitted one-directionally from a transmitter, so that no interaction between the receiver and the transmitter is possible. However, users would be able to enjoy a greater variety of programs if they were able to make interactive selections of image information in accordance with the content of the image information received by the receiver terminal.

SUMMARY OF THE INVENTION

It is a primary object of the present invention to provide a digital broadcasting apparatus that one-directionally broadcasts a broadcast wave which, when received by a reception apparatus, gives the user the impression of interaction that is achieved through bidirectional communication. Here, it is the object of the present invention to further provide a reception apparatus, a digital broadcasting system, and a recording medium for recording a program to be used by a reception apparatus.

The above object can be achieved by a broadcasting apparatus for broadcasting an interactive program composed of a plurality of contents that are linked to one another, the broadcasting apparatus including: a content storing unit for storing the plurality of contents, each content including a set of video data and a set of control information that indicates another content that is a link destination for a present content, and a transmitting unit for multiplexing a set of video data and a plurality of sets of the same control information included in a same content as the set of video data, and for transmitting the multiplexed sets of video data and control information.

Here, the content storing unit may include: a first storing unit for storing the sets of video data included in the plurality of contents; a second storing unit for storing the sets of control information included in the plurality of contents; and a construction table storing unit for storing a construction table showing correspondence between the sets of video data stored in the first storing unit and the sets of control information stored in the second storing unit.

Here, the transmitting unit may include: a multiplexing unit for reading the plurality of sets of video data stored in the first storing unit and the plurality of sets of control information stored in the second storing unit as respective digital data streams, and multiplexing the digital data streams to generate a multiplexed stream; a multiplexing control unit for referring to the construction table and controlling the multiplexing unit to multiplex the plurality of sets of video data and to repeatedly multiplex a set of control information corresponding to a set of video data; and a broadcasting unit for placing the multiplexed stream generated by the multiplexing unit onto a digital broadcast wave and broadcasting the digital broadcast wave.

Here, the content storing unit may further include: a third storing unit for storing sets of audio data that correspond to the sets of video data, wherein the construction table storing unit stores correspondence between a set of video data, a set of audio data, and a set of control information included in each of the plurality of contents, and wherein the multiplexing unit also multiplexes the sets of audio data stored in the third storing unit into the multiplexed stream.

With the above construction, control information is repeatedly multiplexed with the video data and is transmitted, so that the reception apparatus can perform reproduction while interactively switching between contents in accordance with user operations. This is to say, the present digital broadcasting apparatus can provide interactive programs using a one-directional broadcast.

Here, each content may include a plurality of sets of control information, each set of control information including a set of link information showing contents that are link destinations and a set of time information indicating a valid period for the present control information within the reproduction period of the set of video data corresponding to the present set of control information, and the multiplexing control unit may control the multiplexing unit to repeatedly multiplex each set of control information with the corresponding set of video data during the valid period of the set of control information.

With the stated construction, the digital broadcasting apparatus can repeatedly and freely multiplex different sets of control information for different periods within the reproduction time of sets of video data, so that the link destination contents and number of potential links can be dynamically changed in accordance with the content of the video data. As a result, each content can be linked to appropriate link destination contents for the content of each scene in the video data.

Here, the multiplexing control unit may control the multiplexing unit to repeatedly multiplex each set of control information with the corresponding video data starting from a predetermined time before the valid period of the set of control information, the predetermined time being sufficiently long to enable a reception apparatus to process a set of control information.

With the stated construction, control information is repeatedly multiplexed with the video data starting from a predetermined time before the valid period of the control information, so that when a content is being reproduced by the reception apparatus, the reception apparatus will have enough time to process new control information which has a different valid period.

Here, the multiplexing control unit may append a version number, reflecting the valid period of each set of control information, to each set of control information in a given content.

With the stated construction, the reception apparatus can obtain new control information with a different valid period for a same content using the version numbers.

Here, each set of control information stored by the second storing unit may include a set of link information showing contents that are link destinations and supplementary images representing menu items for each link destination.

With the stated construction, menu items for assisting user operations in the reception apparatus can be freely set in each set of control information.

Here, at least one set of control information may include: a plurality of sets of additional information representing one of text and a graphic image that is to be displayed superimposed onto the corresponding video data; and a set of script information that validates one of the sets of additional information within a reception apparatus, in accordance with a user operation.

With the stated construction, sets of control information can be provided with script information and a plurality of sets of additional information, with the reception apparatus being able to interactively switch between the sets of additional information. As one example, when the video data expresses a weather forecast and the sets of additional information provide a plurality of supplementary explanations (text or graphics) relating to the content of the video data, switching of the display of supplementary explanations can be performed using the script information in accordance with the user operations. By doing so, one pair of a set of video data and a set of control information can be used to express what are effectively a plurality of contents.

Here, at least one set of control information may include: at least two groups of a set of link information and supplementary images; a set of initial information showing a group of a set of link information and supplementary images that is valid at a start of reproduction by a reception apparatus for a content including the present set of control information; and a set of script information that changes a valid setting in the reception apparatus in accordance with a user operation.

With the stated construction, sets of control information are provided with a plurality of groups which may be switched according to the script information, so that an effective increase in the number of link destination contents can be achieved.

Here, each group of a set of link information and supplementary image may further include a set of additional information representing one of text and a graphic image that is to be displayed superimposed onto the corresponding video data.

With the stated construction, the groups are provided with additional information, so that one pair of a set of video data and a set of control information can be used to effectively express a plurality of contents that have different link destination contents according to the additional information.

The object of the present invention can also be achieved by a broadcasting apparatus for broadcasting an interactive program composed of a plurality of contents that are linked to one another, the broadcasting apparatus including an image storing unit storing a plurality of sets of video data and a plurality of sets of still image data; a control information storing unit for storing sets of type 1 control information and sets of type 2 control information, the sets of type 1 control information being elements of contents including video images, the sets of type 2 control information being elements of contents including still images, and the sets of type 1 control information and sets of type 2 control information including sets of link information that indicate contents which are link destinations for a present content; a construction table storing unit storing a first construction table showing correspondence between sets of video data and sets of type 1 control information and a second construction table showing correspondence between sets of still image data and sets of type 2 control information; a first multiplexing unit for generating a first multiplexed stream by multiplexing a set of video data in the first construction table and repeatedly multiplexing a set of type 1 control information corresponding to the set of video data; a second multiplexing unit for generating a second multiplexed stream by repeatedly multiplexing a plurality of sets of still image data in the second construction table with a set of type 2 control information; and a broadcasting unit for placing the multiplexed stream generated by the multiplexing unit onto a digital broadcast wave and broadcasting the digital broadcast wave.

With the stated construction, interactive programs that are made up of two types of contents, which is to say video-based contents and still-based contents, can be broadcasted. Type 1 and type 2 control information can have both kinds of contents as link destination contents, so that a reception apparatus can perform reproduction switching between both kinds of content in accordance with user operations. In this way, very impressive interactive programs can be realized.

The above object can also be achieved by a reception apparatus for receiving a broadcast wave including an interactive program composed of a plurality of contents that are linked to one another, wherein the broadcast wave includes a multiplexed stream into which different sets of video data have been multiplexed with a plurality of sets of control information showing a link to another content, the sets of control information being repeatedly multiplexed, the reception apparatus including: an extracting unit for extracting a set of video data and a set of control information in a same content as the set of video data; a storing unit for storing the extracted set of control information; a reproducing unit for reproducing the extracted set of video data and outputting an image signal; an operation unit for receiving a user operation that indicates a content switching; and a control unit for controlling the extracting unit to extract another content indicated by the set of control information stored in the storing unit, in accordance with the user operation.

With the stated construction, the reception apparatus can behave interactively as if two-way communication were being performed, despite only using a one-directional broadcast of image information, meaning that users can enjoy interactive programs. Since the control information is repeatedly transmitted, the storing unit only requires enough storage capacity to store the control information for one content.

Here, first identification information may be appended to each set of video data and second identification information is appended to each set of control information, and wherein the sets of control information include first identification information and second identification information which express a content of a link destination, the extracting unit may include: a first judging unit for judging the first identification information appended to sets of video data in the broadcast wave; a second judging unit for judging the second identification information appended to sets of control information in the broadcast wave; an obtaining unit for obtaining a set of video data and when the first judging unit judges that the first identification information coincides with specified identification information indicated by the control unit and obtaining a set of control information when the second judging unit judges that the second identification information coincides with specified identification information, the reproducing unit may reproduce the set of video data obtained by the obtaining unit, and the storing unit may store the set of control information obtained by the obtaining unit.

With the stated construction, the reception apparatus judges the sets of video information and control information and obtains the appropriate data, so that the only the data to be reproduced is obtained, thereby improving the reception efficiency.

Here, a set of entry information giving first identification information and second identification information for the content to be reproduced first may be multiplexed into the multiplexed stream, the control unit may send an indication to the extracting unit to extract the set of entry information when the operation unit has received a selection operation for a multiplexed stream from a user, the extracting unit may further include: an entry information extracting unit for receiving the indication from the control unit and extracting the set of entry information from the multiplexed stream; and an entry information storing unit for storing the set of entry information extracted by the entry information extracting unit, wherein the control unit may give the obtaining unit an indication of the first identification information and second identification information included in the entry information as the specified identification information.

With the stated construction, the reception apparatus can extract the content to be reproduced first in accordance with the entry information, so that contents which contain important information, such as a main menu, can definitely be reproduced.

Here, the link information may include an identifier of a set of video data and an identifier of a set of control information which show a content of a link destination, the first identification information and second identification information may be IDs (identifiers) of digital data streams which represent a set of video data and a set of control information in the multiplexed stream, a correspondence table, showing correspondence between the identifiers for sets of video data and the first identification information and correspondence between the identifiers for sets of control information and the second identification information, may be multiplexed into the multiplexed stream and repeatedly transmitted, and the extracting unit may extract the correspondence table and the control unit may refer to the correspondence table, convert an identifier of the set of video data included in the link information into first identification information and an identifier of the set of control information into second identification information and inform the extracting unit of the converted first and second identification information.

With the stated construction, the interactive programs of the present invention are broadcast using a digital satellite broadcast according to MPEG2 standard, so that the present invention can be achieved by modifying a conventional digital satellite broadcast tuner.

Here, at least one set of control information may include link information showing a content of a link destination and supplementary images that include a menu item image for each link destination, the reproducing unit may include: a video data reproducing unit for reproducing the set of video data obtained by the obtaining unit; and an image reproducing unit for reproducing supplementary images stored by the storing unit superimposed onto the video data, wherein the operation unit may receive a user selection of a menu item image, and wherein the control unit may determine the first identification information and the second identification information of a link destination content in accordance with the link information and the menu item image selected by the user.

With the stated construction, menu item images are displayed by the reception apparatus, assisting the interactive operations of the user and enabling the achievement of impressive interactive programs.

Here, at least one set of control information may include additional information which expresses one of a text image and a graphics image, and wherein the reproducing unit may additionally reproduce one of the text image and graphics image stored in the storing unit superimposed onto the video data.

With the stated construction, additional images such as text or graphics are displayed in addition to the video data, making the interactive programs even more impressive.

Here, each set of control information may include valid period information showing a valid period of the set of control information, wherein each content may have a plurality of sets of control information which have different valid periods, and wherein the reproducing unit may reproduce supplementary images stored in the storing unit only during a valid period of the set of control information stored in the storing unit.

With the stated construction, sets of control information with different valid periods within the reproduction time of video data are repeatedly multiplexed, so that the link destination contents and number of potential links can be dynamically changed in accordance with the content of the video data. As a result, each content can be linked to appropriate link destination contents for the content of each scene in the video data. As a result, the user of the reception apparatus can gain greater enjoyment from the interactive programs which have link destinations that correspond to the video scenes.

Here, each of the plurality of sets of control information for a same content has a version number that reflects the valid period, and wherein the control unit controls the extracting unit to extract a set of control information which has a next version number, when one set of control information has been extracted by the extracting unit.

With the above construction, the reception apparatus can use the version numbers for the content presently being reproduced and so obtain following sets of control information with different valid periods.

Here, at least one set of control information may include a plurality of sets of additional information which each express one of a text image and a graphics image to be displayed superimposed onto the video data, and a set of script information that validates one of the sets of additional information within a reception apparatus, in accordance with a user operation, wherein the control unit may determine a valid set of additional information by interpreting and executing the script information stored in the storing unit, and wherein the reproducing unit may reproduce one of the text image and the graphics image included in the valid set of additional information based on a result of interpreting and executing by the control unit.

With the stated construction, the reception apparatus does not need to obtain new control information, and so can perform content switching in accordance with the script information. Such content switching performed entirely by the execution of script information is much more responsive to user operations.

Here, the multiplexed stream may include sets of audio data corresponding to the sets of video data, wherein the extracting unit may extract a set of audio data corresponding to a set of video data from the broadcast wave, and wherein the reproducing unit may additionally reproduce the extracted set of audio data.

With the stated construction, interactive programs composed of contents including video, stills, and audio can be realized.

The stated object can also be achieved by a recording medium used by a reception apparatus that includes a receiving unit for receiving a broadcast wave including an interactive program composed of a plurality of contents that are linked to one another, an extracting unit for extracting one digital data stream from the broadcast wave, and a reproducing unit for reproducing a set of video data and outputting an image signal, the recording medium storing a program that includes the following steps: an extracting step for extracting a set of video data and a set of control information in a same content as the set of video data from the broadcast wave; a storing step for storing the extracted set of control information into a memory in the reception apparatus; a reproducing step for reproducing the extracted set of video data and outputting an image signal; a judging step for judging whether a user operation indicating a switching of content has been made; and a control step for controlling the extracting unit to extract another content indicated by the set of control information stored in the memory, when the judging step judges that a user operation indicating a switching of content has been made.

With the stated recording medium, the program can be installed into a conventional reception apparatus (satellite broadcast tuner), so that the present invention can be easily realized.

BRIEF DESCRIPTION OF THE INVENTION

These and other objects, advantages and features of the invention will become apparent from the following description thereof taken in conjunction with the accompanying drawings which illustrate a specific embodiment of the invention. In the drawings:

FIGS. 3A and 3B are an expansion of the right side of FIG. 1;

FIGS. 6A and 6B show example sets of image data which are stored by the presentation information storage unit in the present embodiment;

FIGS. 6C and 6D show example sets of audio data which are stored by the presentation information storage unit in the present embodiment;

FIG. 7 shows an example of the navigation information which is stored by the navigation information storage unit in the present embodiment;

FIG. 8 shows another example of the navigation information which is stored by the navigation information storage unit in the present embodiment;

FIG. 9 shows another example of the navigation information which is stored by the navigation information storage unit in the present embodiment;

FIG. 10 shows another example of the navigation information which is stored by the navigation information storage unit in the present embodiment;

FIG. 11 shows another example of the navigation information which is stored by the navigation information storage unit in the present embodiment;

FIG. 12 shows an example of the construction information table which is stored by the construction information storage unit in the present embodiment;

FIG. 13 shows an example of the entry information which is stored by the construction information storage unit in the present embodiment;

FIG. 14 shows an example of the multiplexing information table stored by the multiplexing information storage unit in the present embodiment;

FIG. 15 shows an example of the content identifier assigning table generated by the multiplexing control unit in the present embodiment;

FIG. 16 shows an example of the version number assigning table generated by the multiplexing control unit in the present embodiment;

FIG. 17 shows an example of a navigation information table generated by the navigation information table generating unit in the present embodiment;

FIG. 18 shows another example of a navigation information table generated by the navigation information table generating unit in the present embodiment;

FIG. 19 shows another example of a navigation information table generated by the navigation information table generating unit in the present embodiment;

FIG. 20 shows another example of a navigation information table generated by the navigation information table generating unit in the present embodiment;

FIG. 21 shows another example of a navigation information table generated by the navigation information table generating unit in the present embodiment;

FIG. 22A shows an example of the NIT generated by the system information table generating unit in the present embodiment;

FIG. 22B shows an example of the SDT generated by the system information table generating unit in the present embodiment;

FIG. 22C shows an example of the EIT generated by the system information table generating unit in the present embodiment;

FIG. 23 shows an example of the PAT generated by the system information table generating unit in the present embodiment;

FIG. 24 shows an example of the PMT generated by the system information table generating unit in the present embodiment;

FIGS. 26A to 26D show the details of the NE_Component_Descriptor in the PMT generated by the system information table generating unit in the present embodiment;

FIGS. 30 to 32 are flowcharts showing the operation of the data transmission apparatus in the present embodiment;

FIGS. 33A and 33B are examples of filter conditions stored by the filter condition storage unit in the TS decoder unit of the present embodiment;

FIGS. 43A and 43B are examples of other interactive programs which are composed of the four contents 10 to 13;

FIGS. 44 to 47 show four sets of navigation information which correspond to contents 10 to 13;

FIG. 48 shows a set of navigation information which corresponds to all contents 10 to 13;

FIG. 49 shows examples of contents which are each displayed as one frame on the display screen of the reception apparatus;

Figure 51:
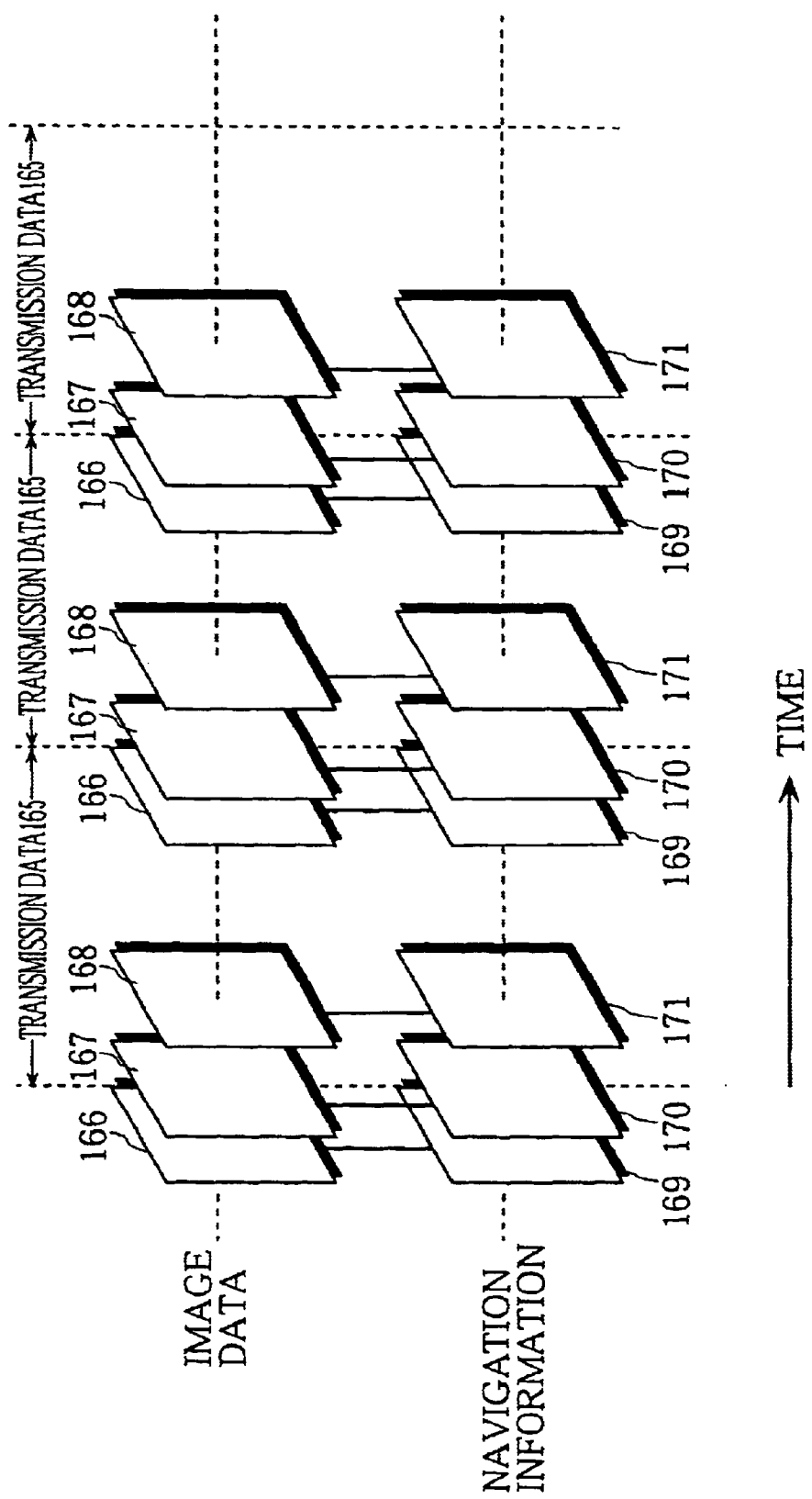
Figure 52:
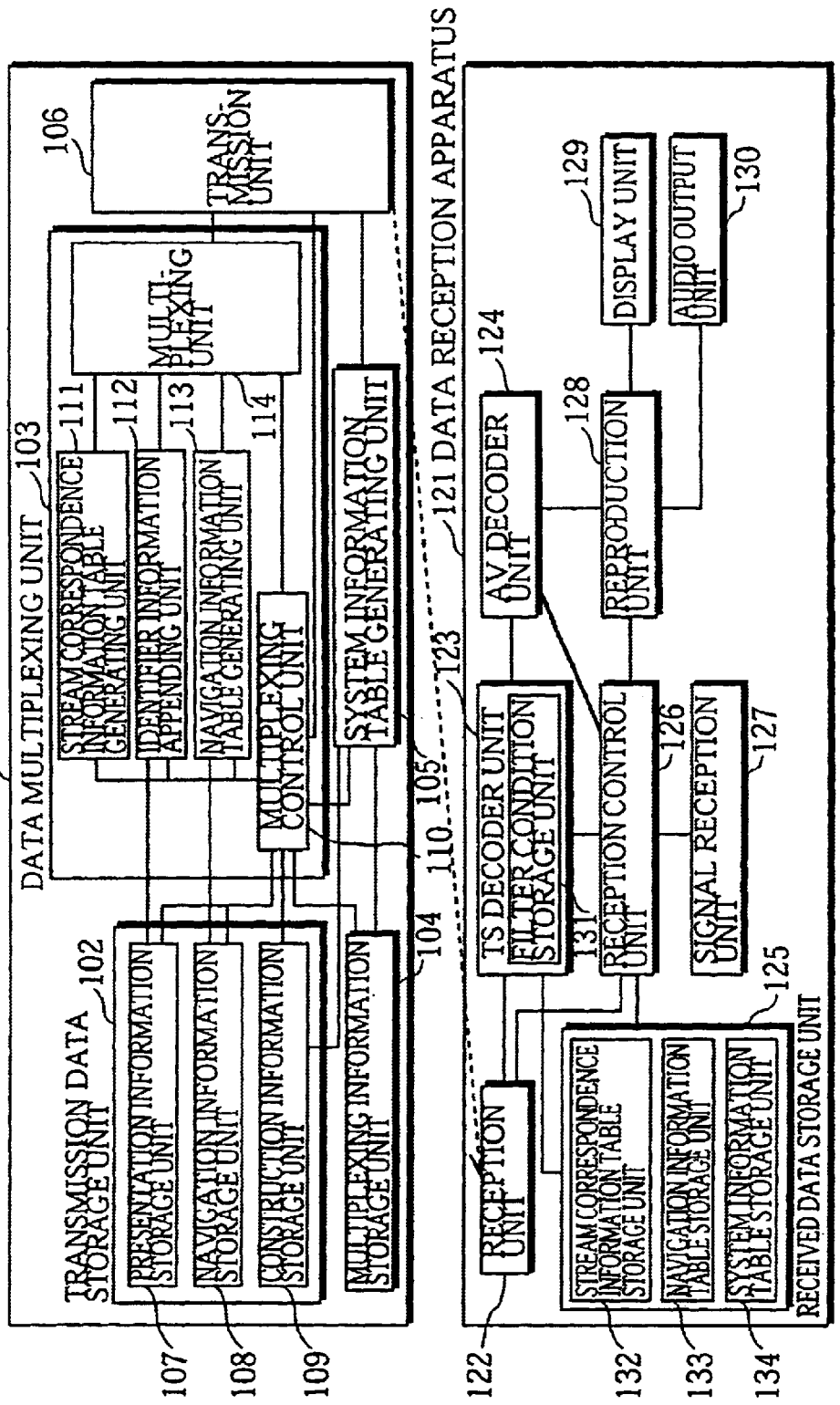
Figure 53A:
Figure 53B:
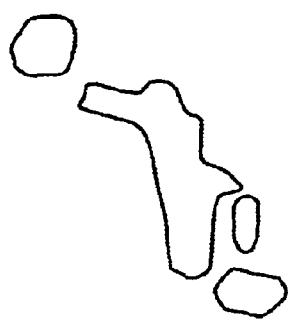
Figure 57:
Figure 60:
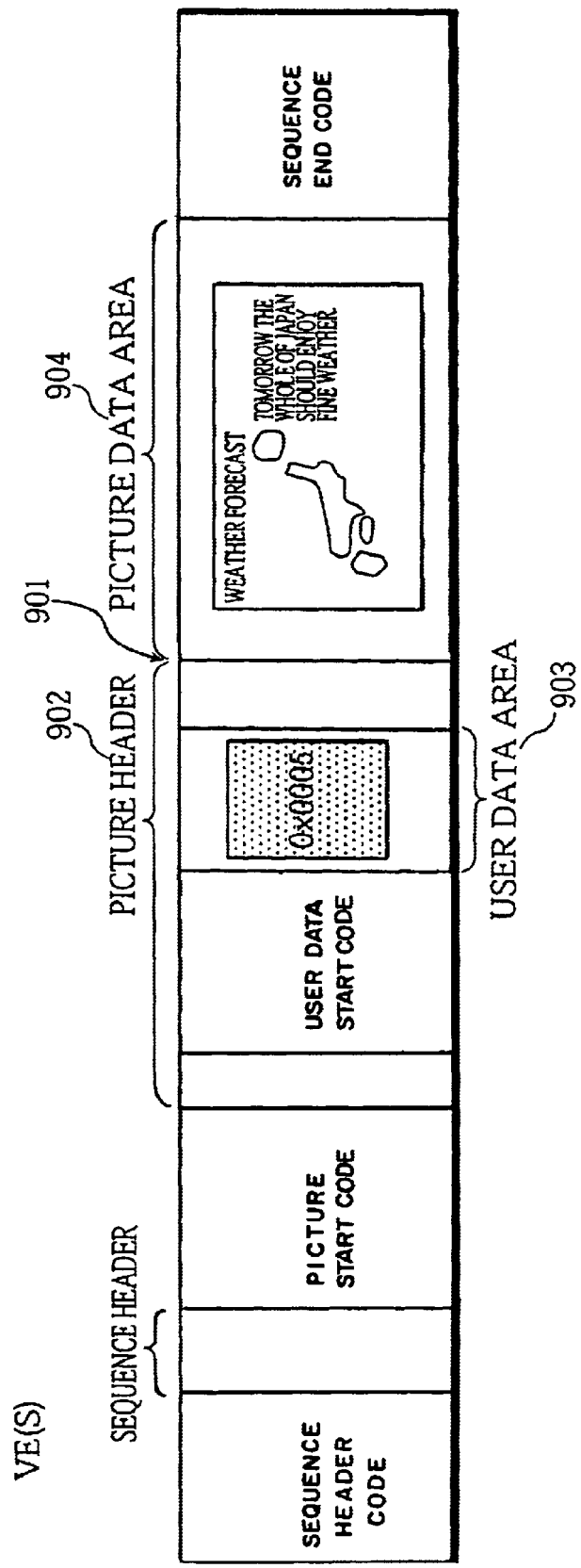
Figure 64A:
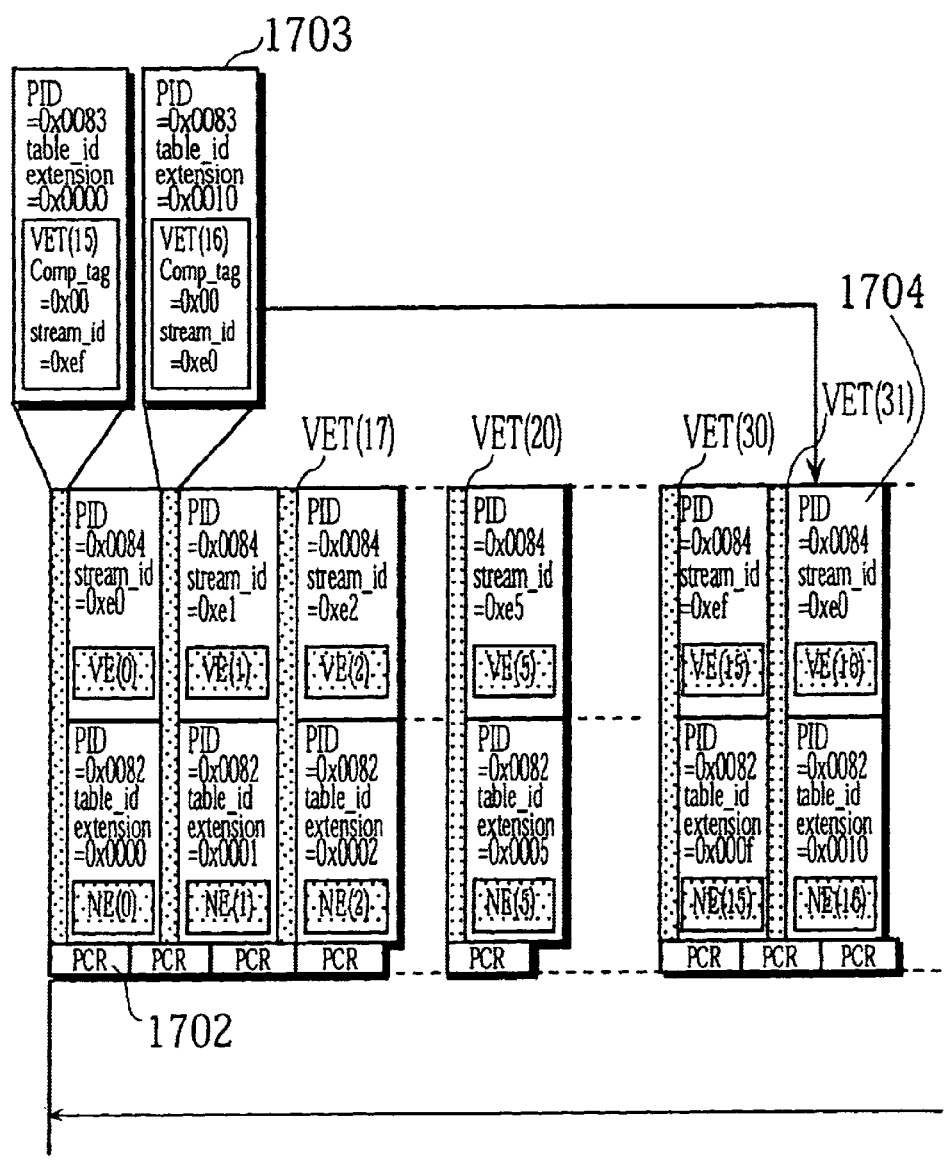
Figure 64B:
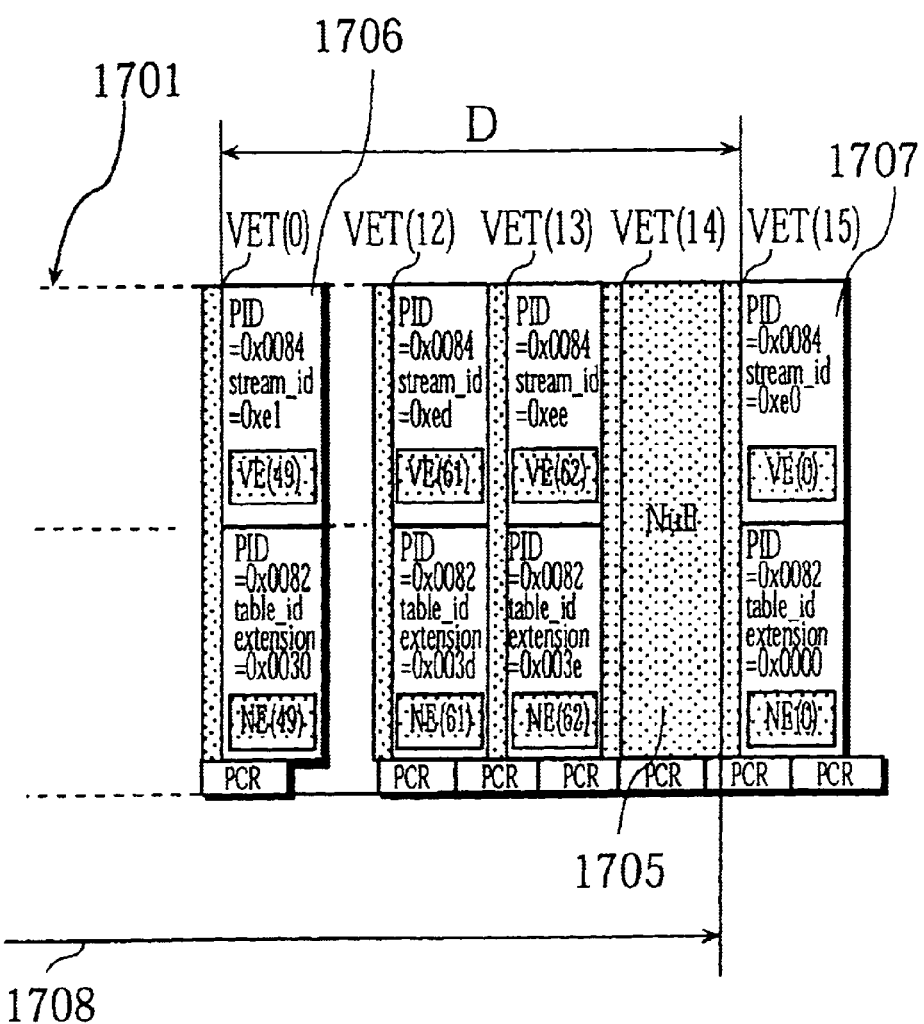
Figure 65A:
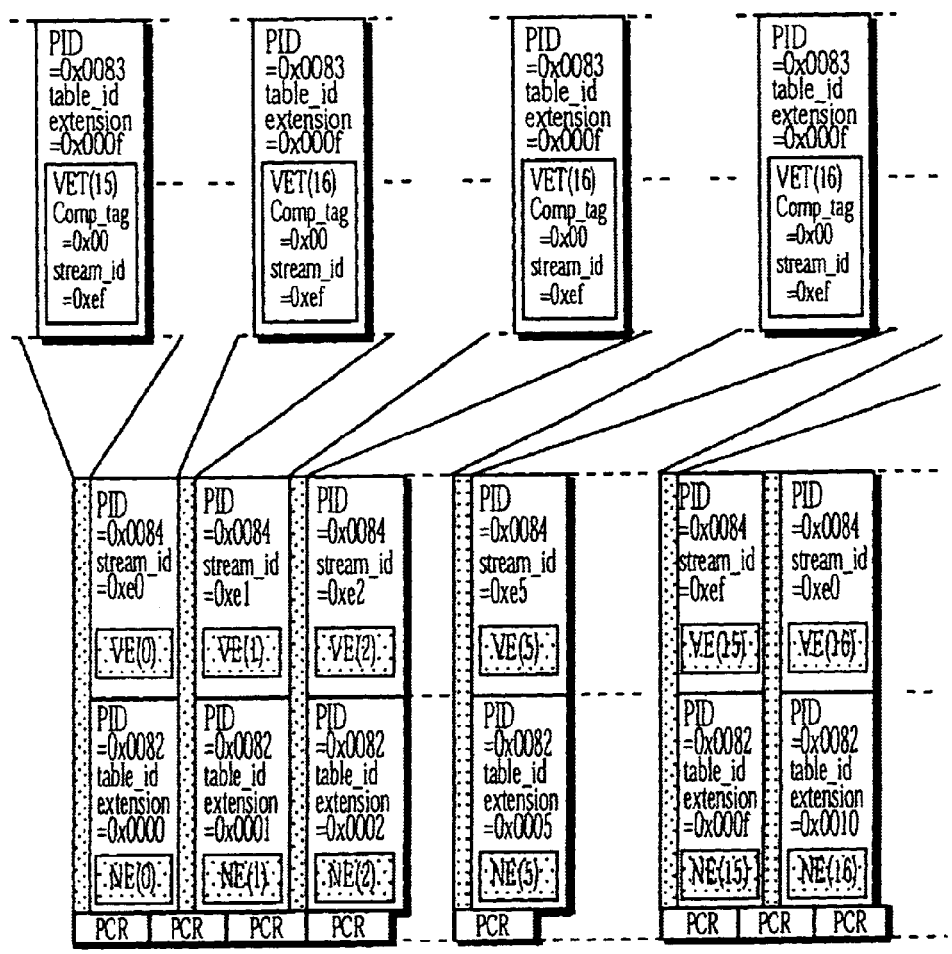
Figure 65B:
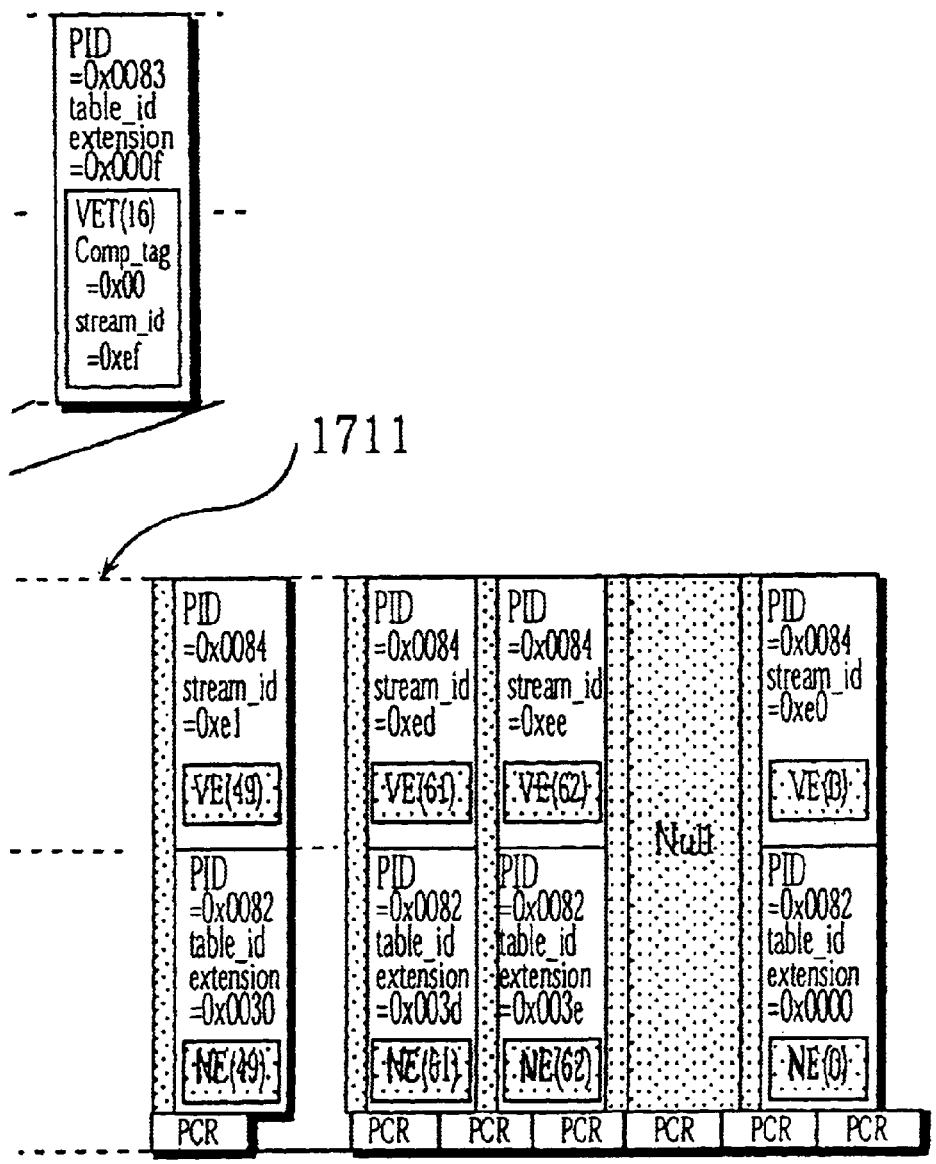
Figure 69B:
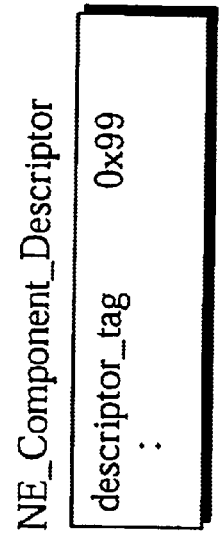
Figure 69C:
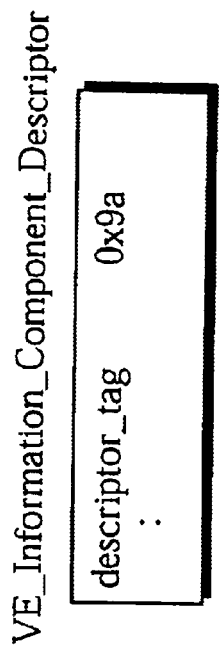
Figure 69A:
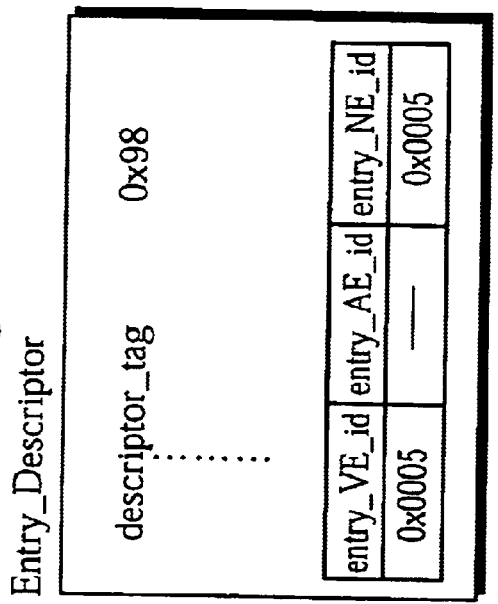
Figure 69D:
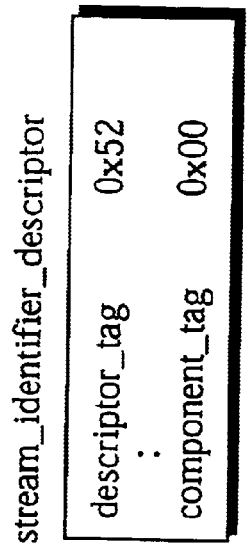
Figure 70B:
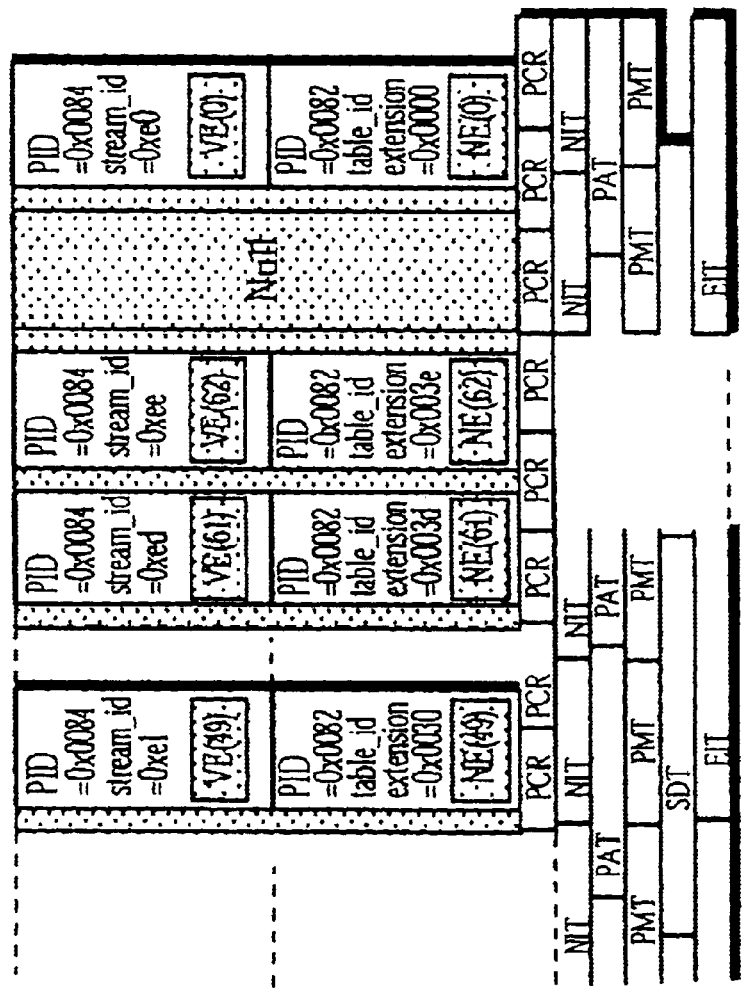
Figure 71:
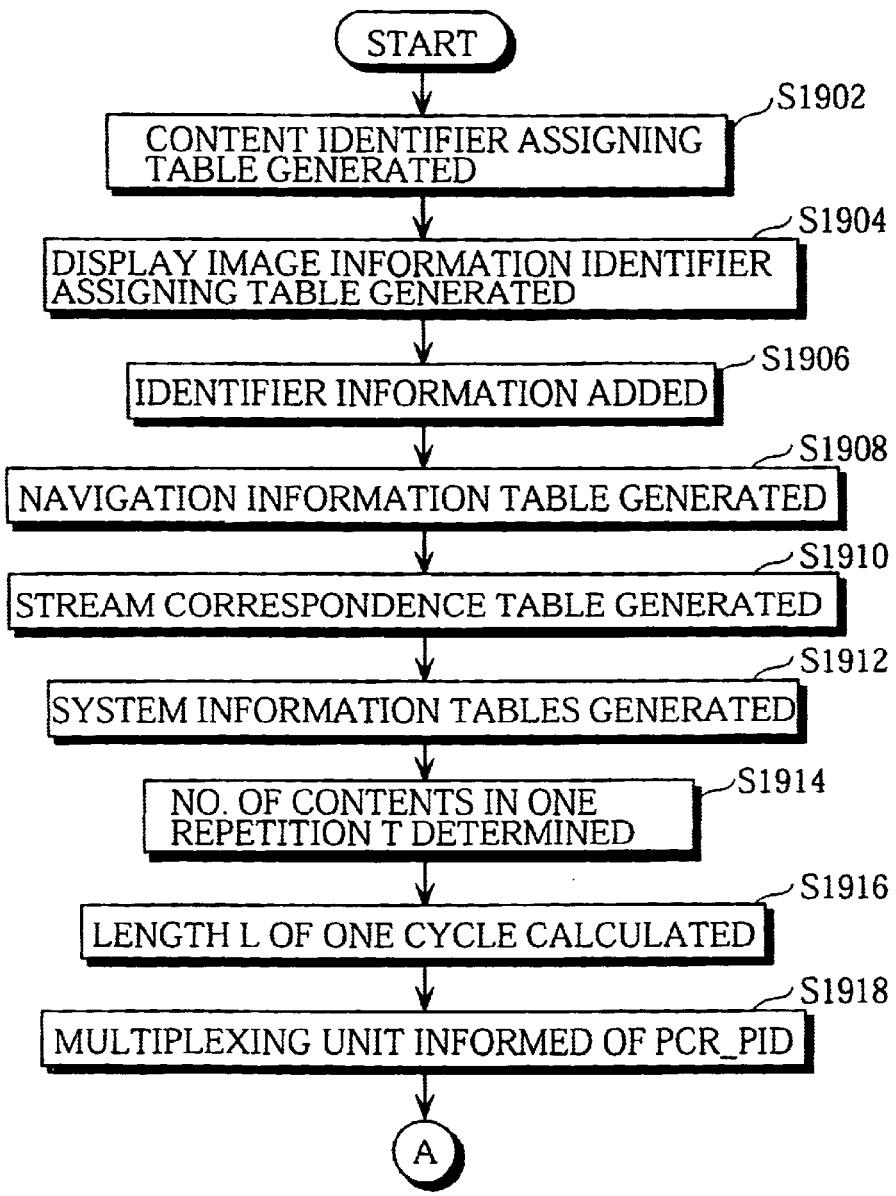
Figure 72:
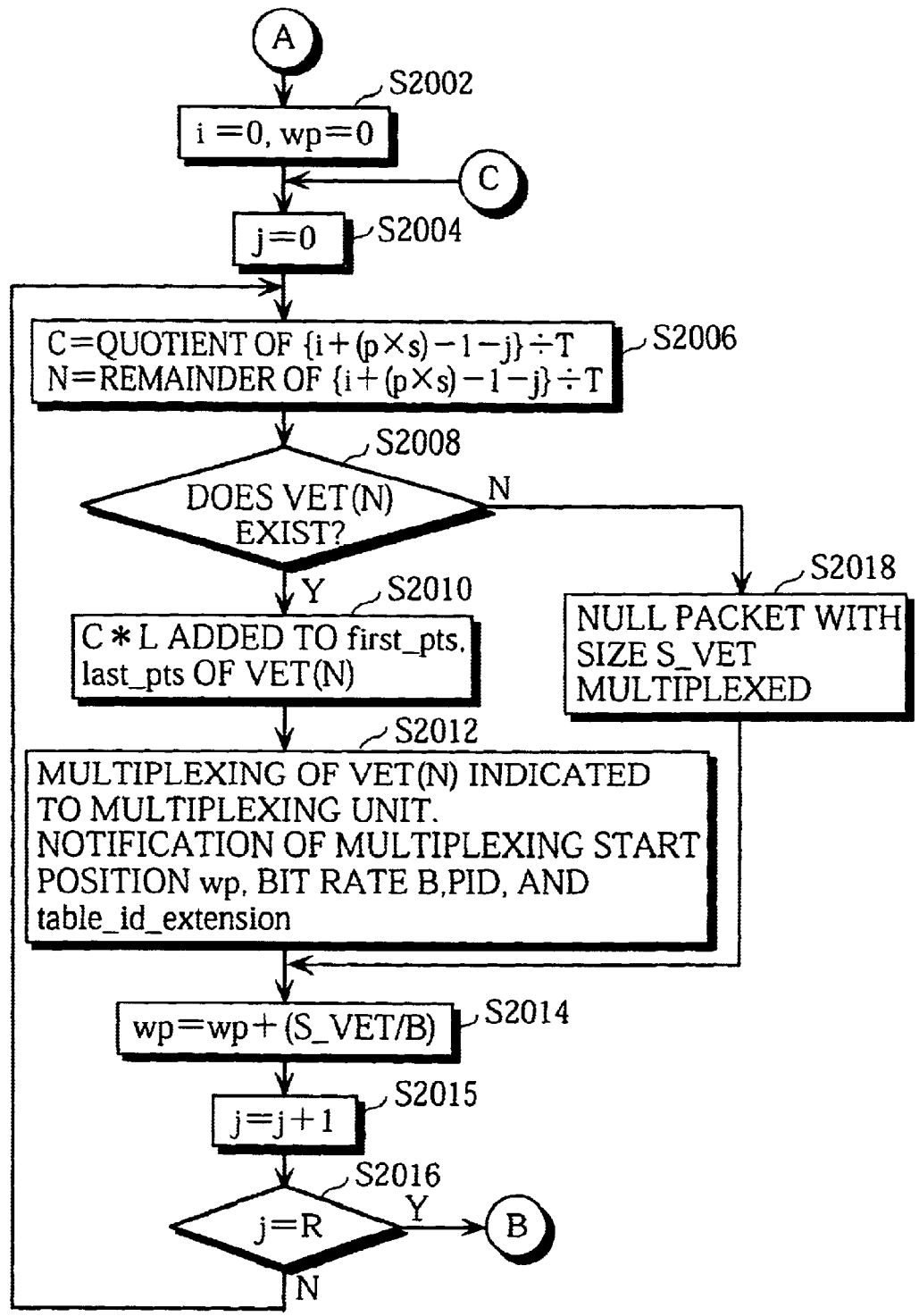
Figure 73:
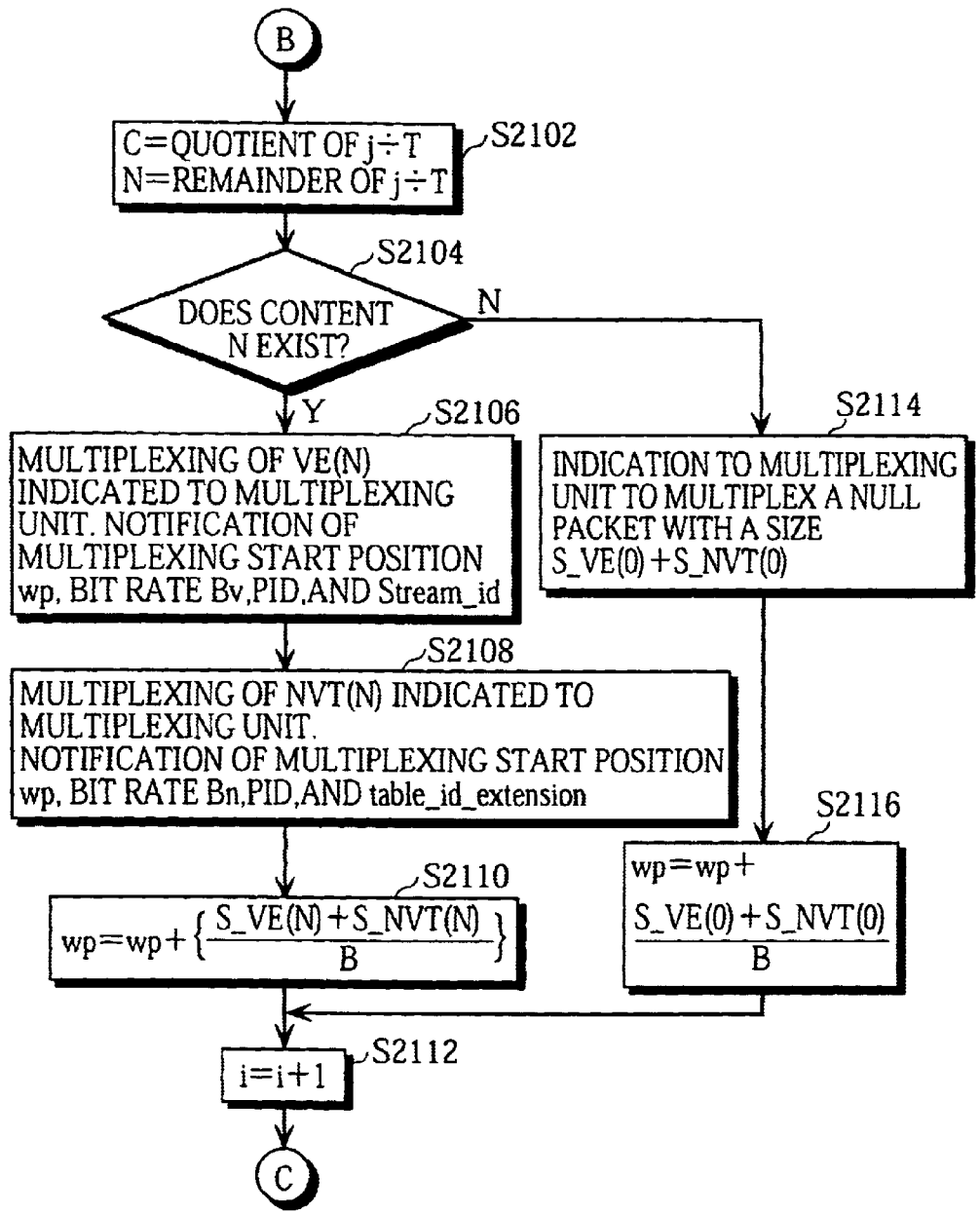
Figure 75A:
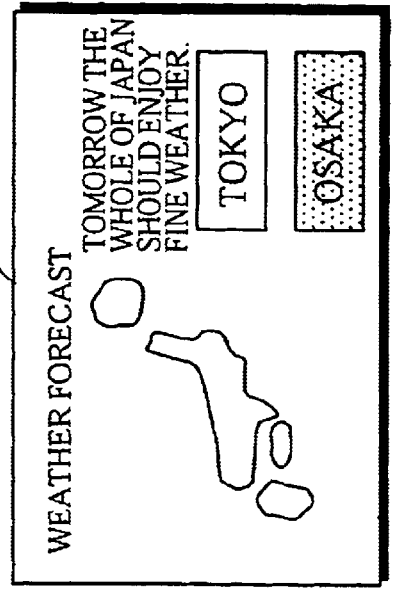
Figure 75B:
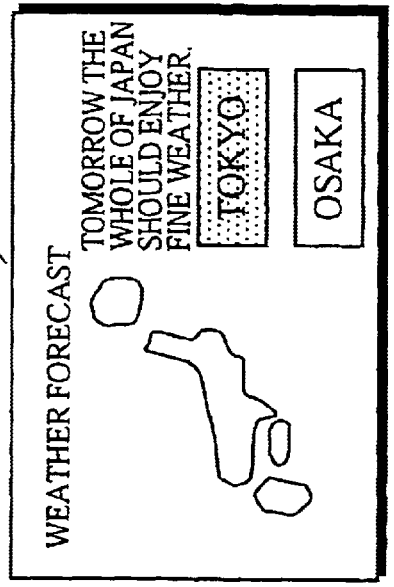
Figure 75C:
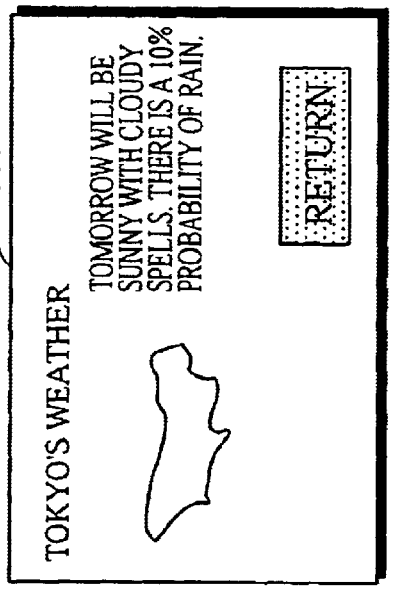
Figure 76:
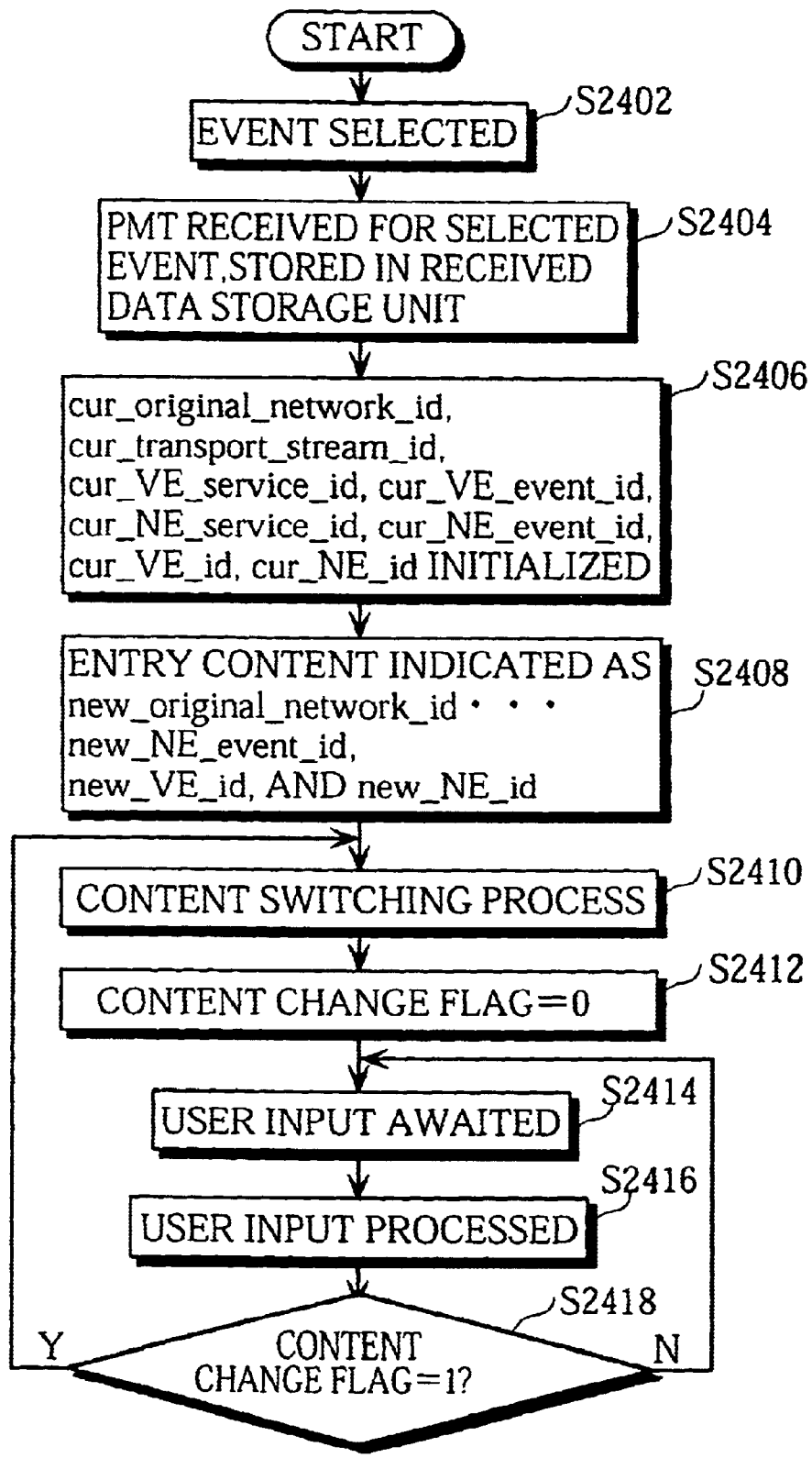
Figure 77:
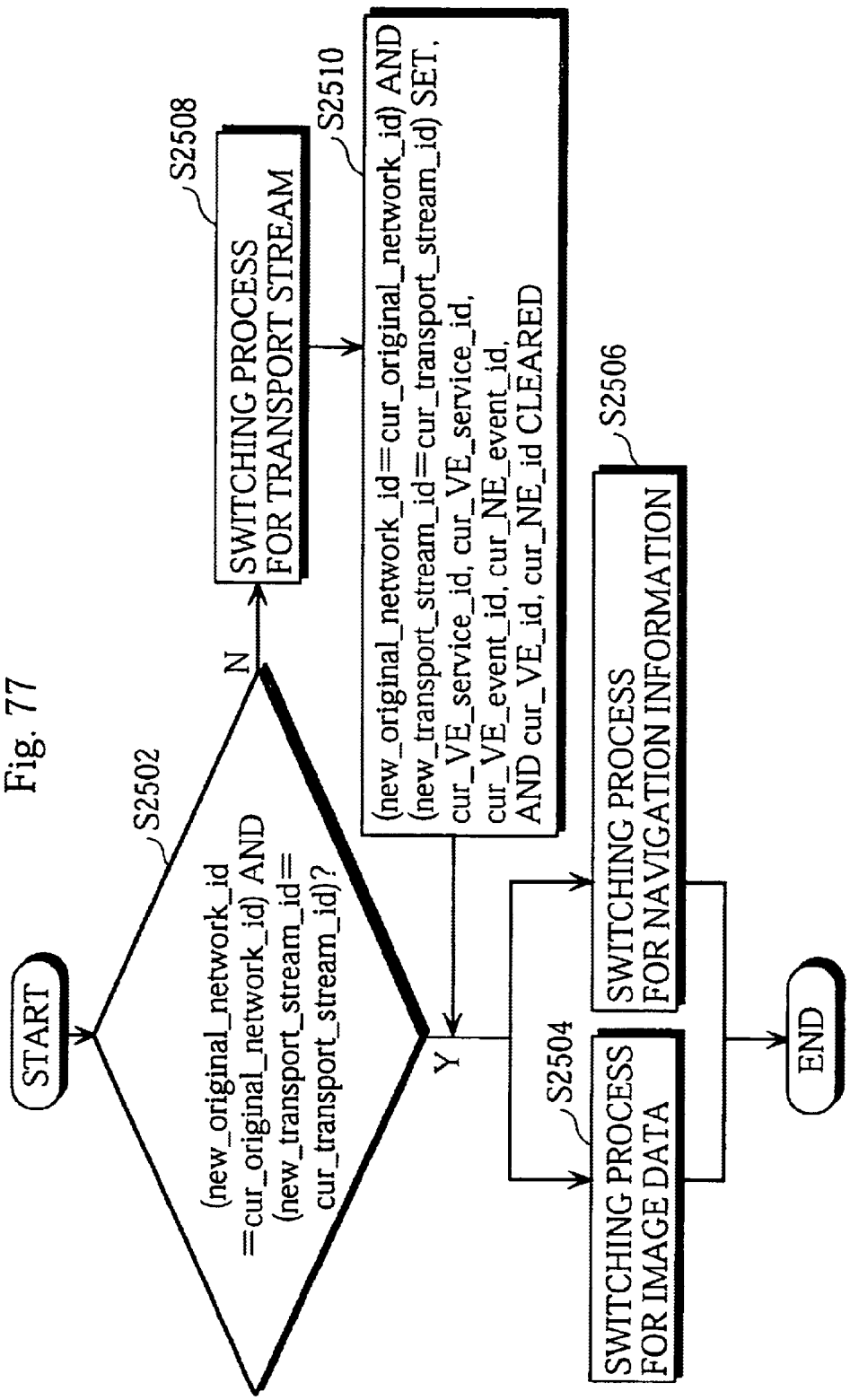
Figure 78:
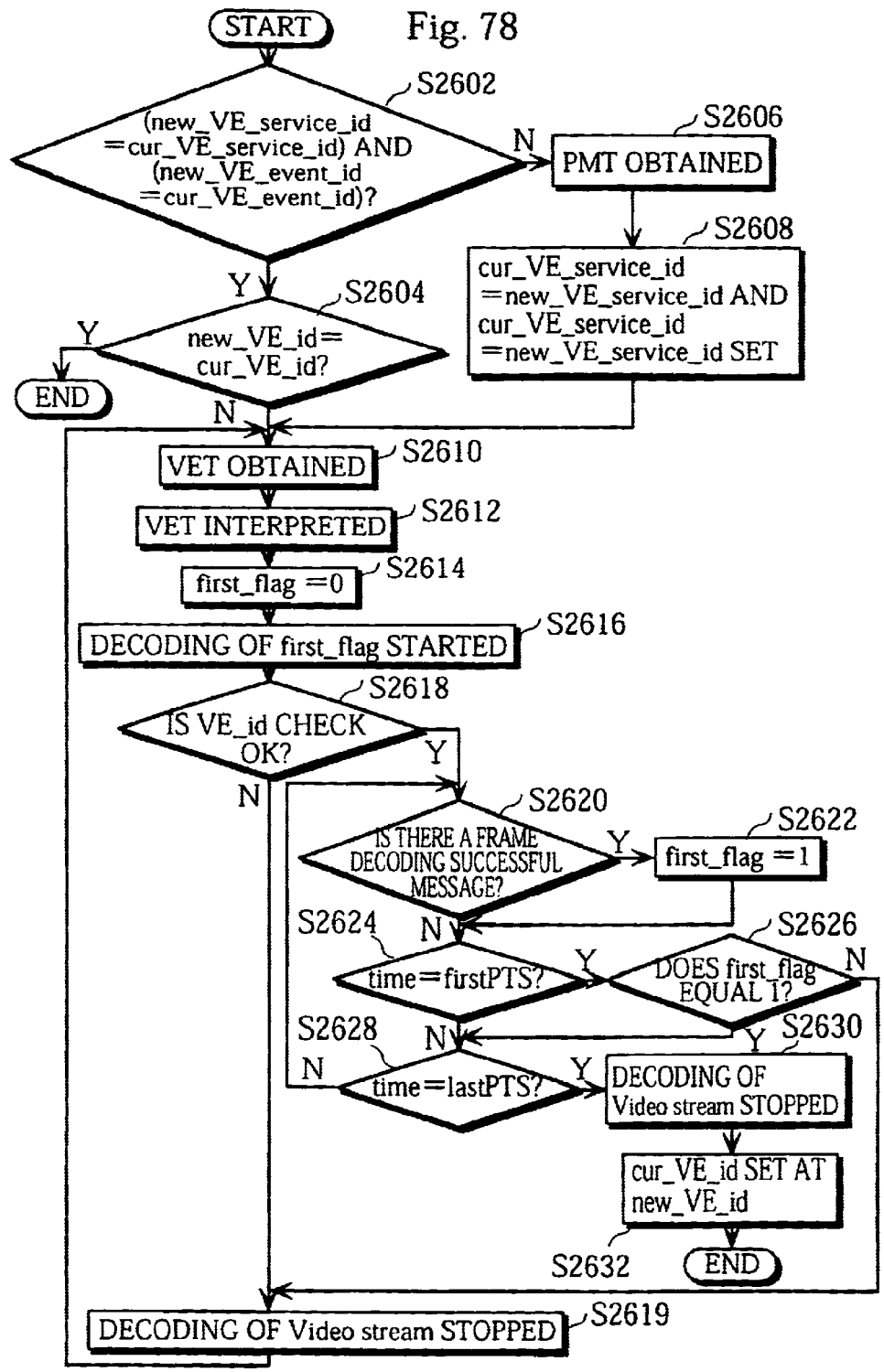
Figure 79:
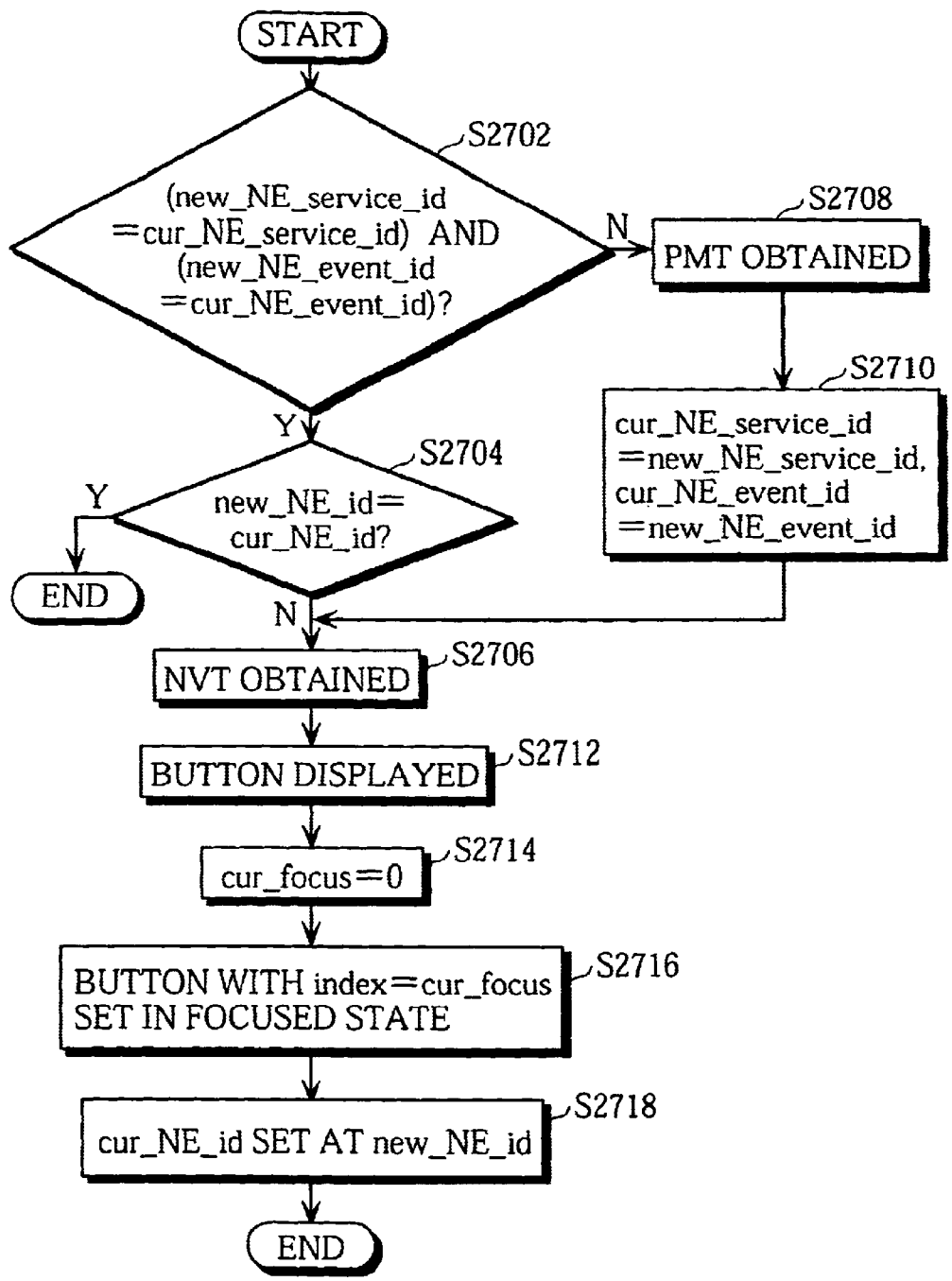
Figure 80:
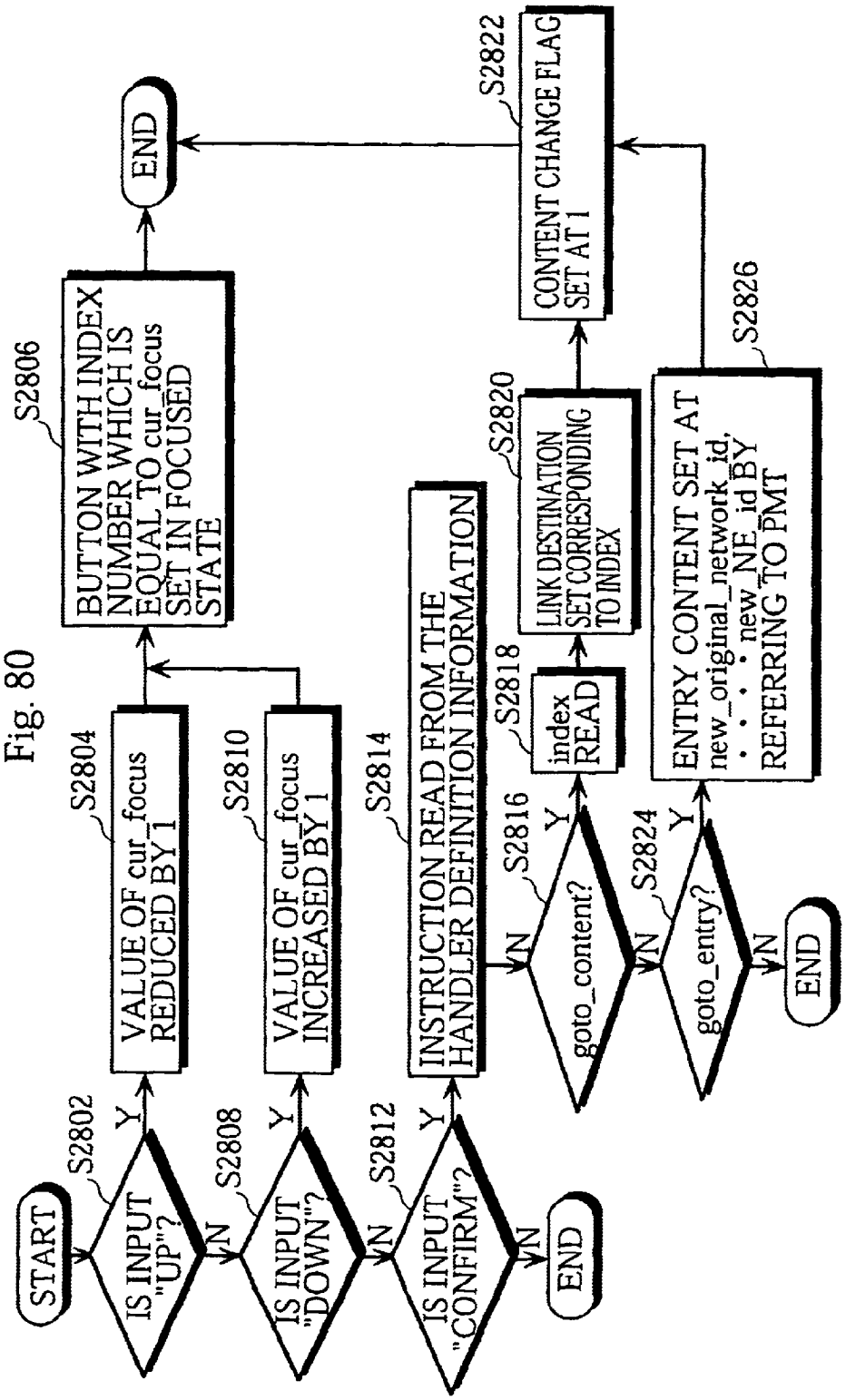
Figure 85A:
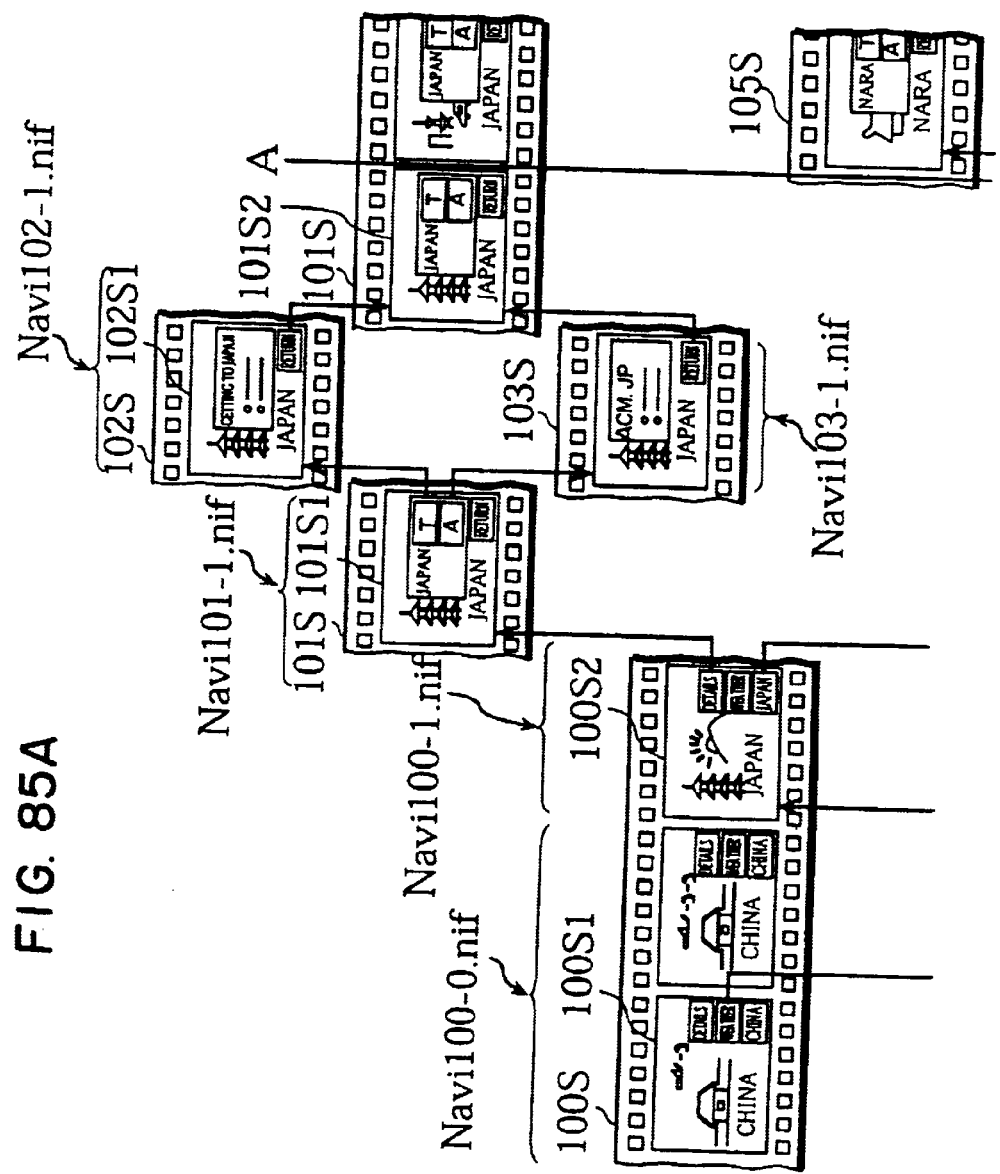
Figure 86A:
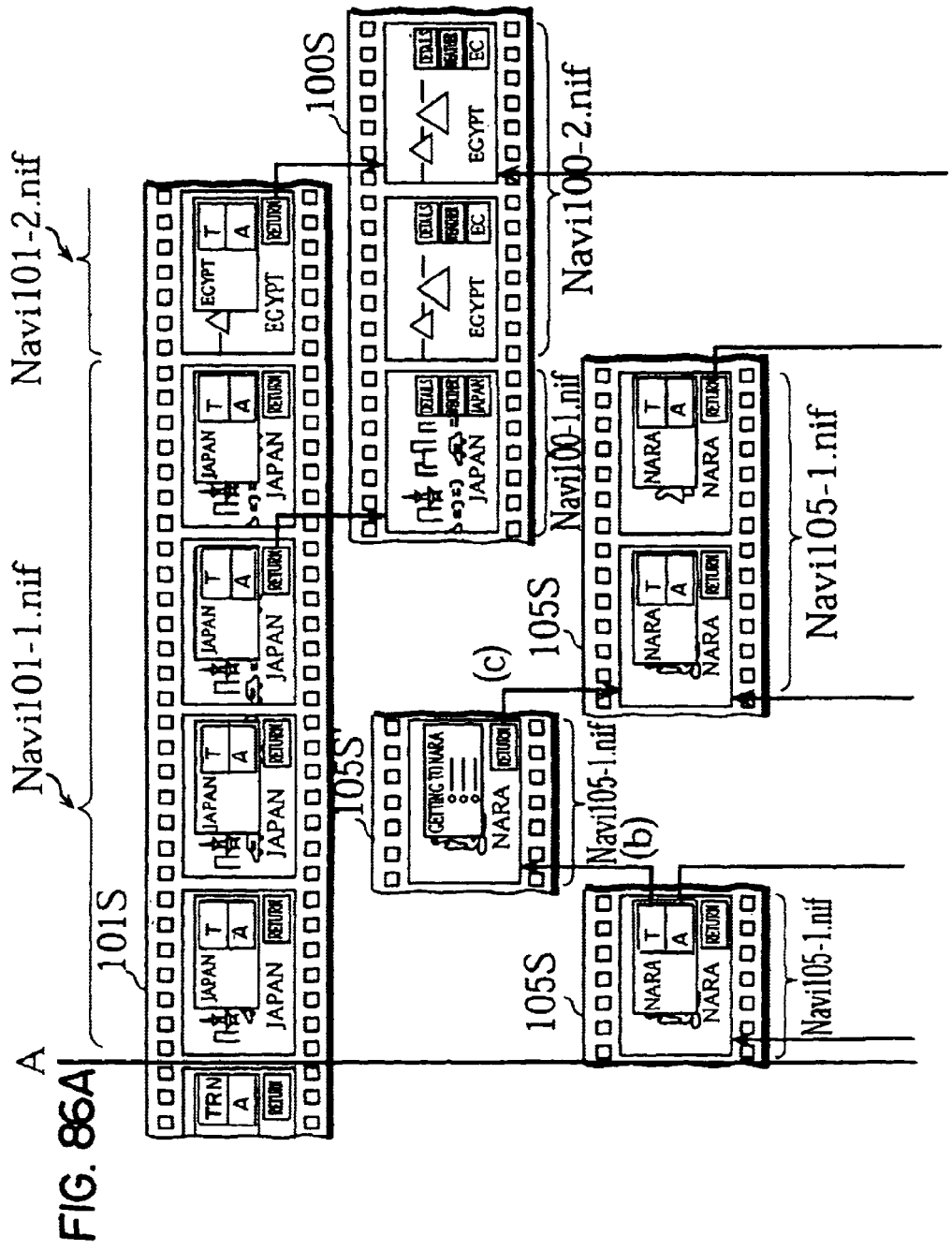
Figure 86B:
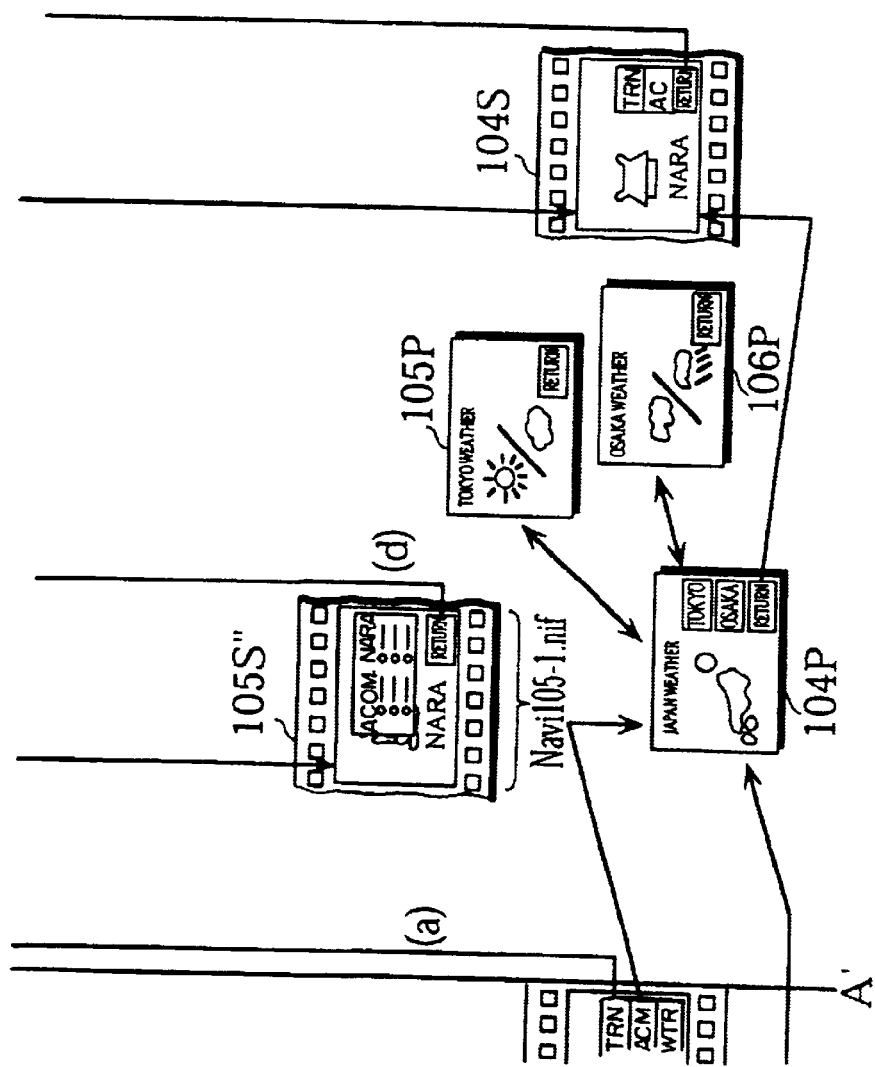
Figure 97A:
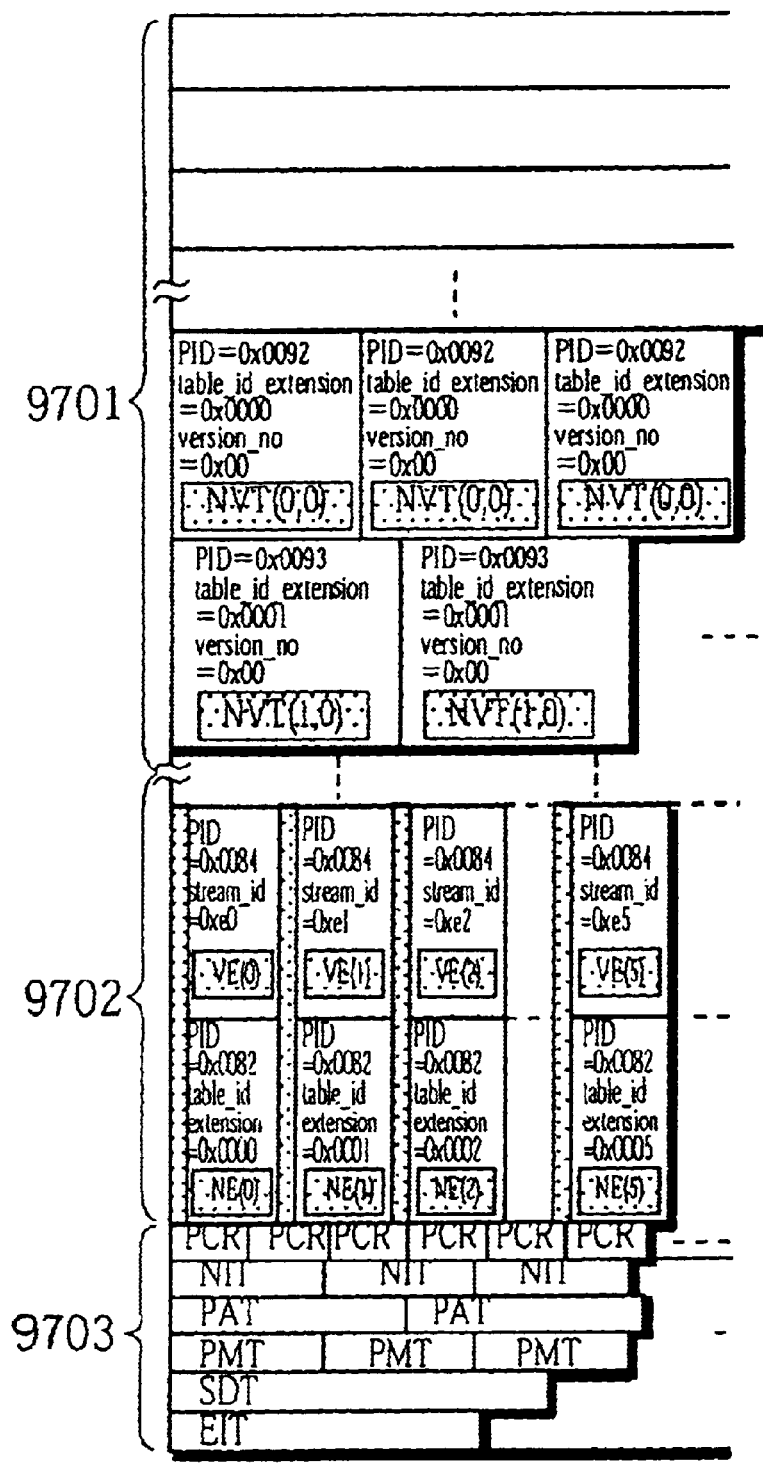
Figure 97B:
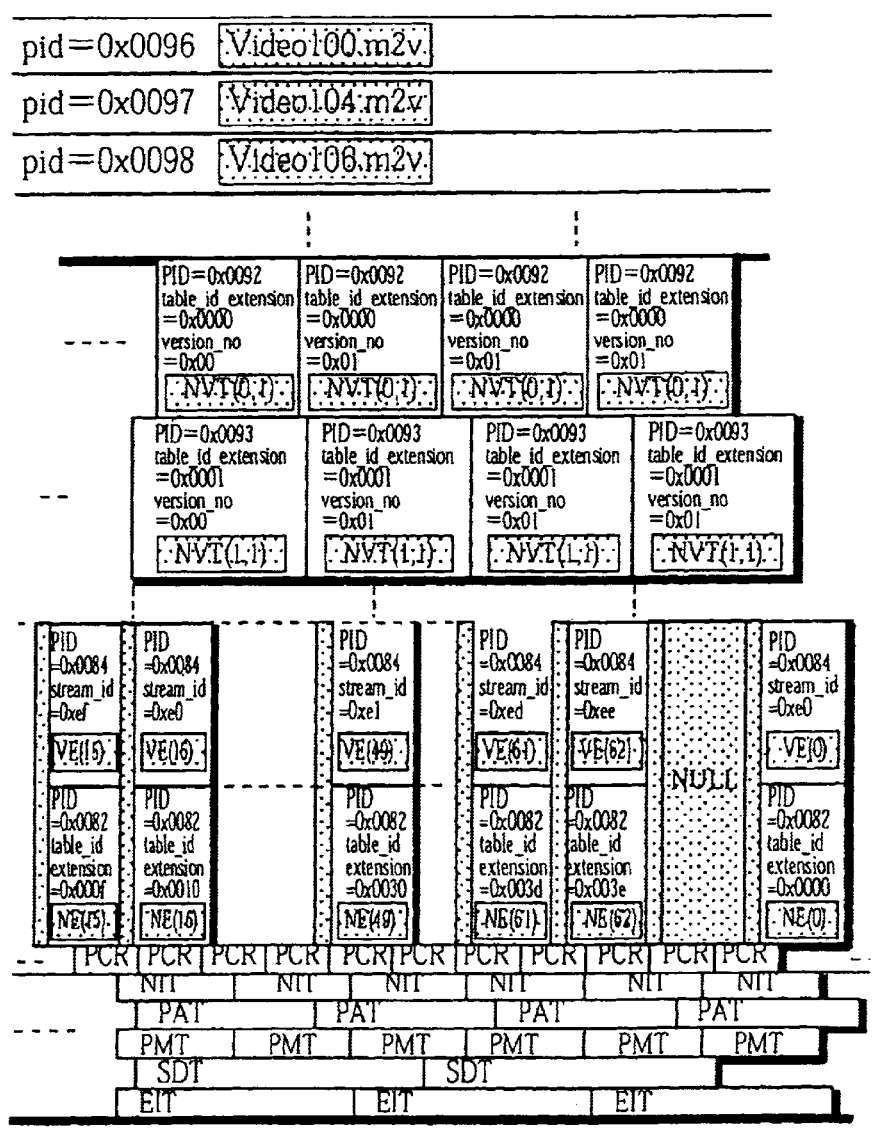
Figure 97C:
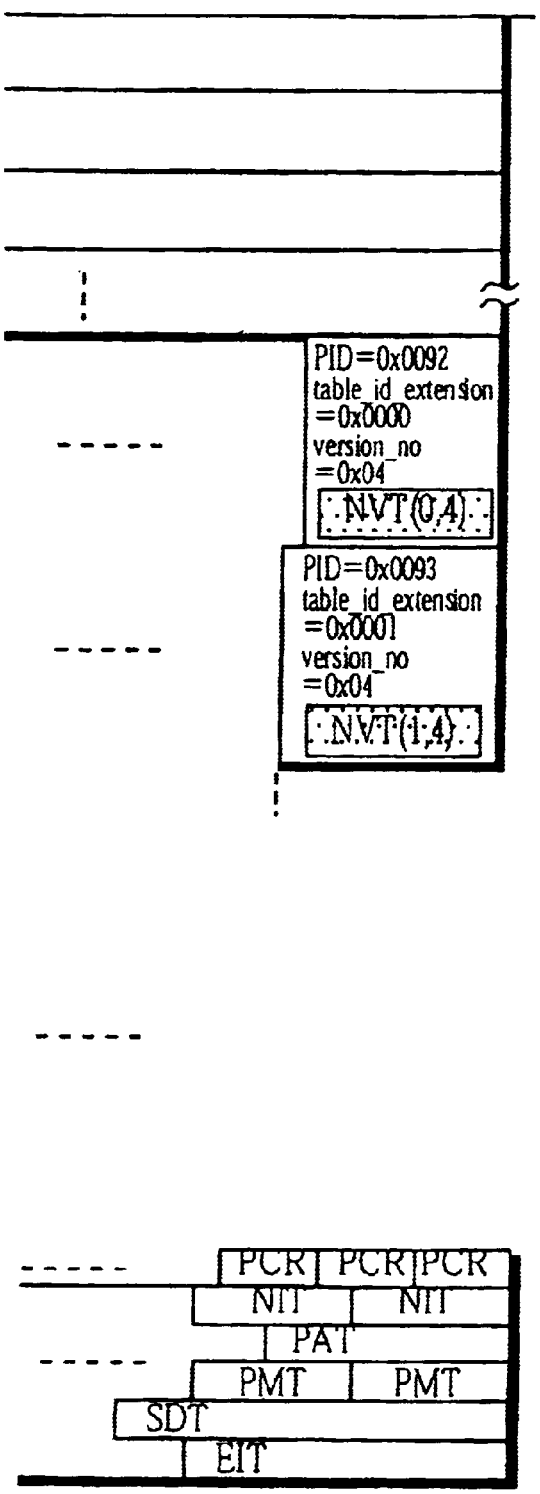
Figure 98:
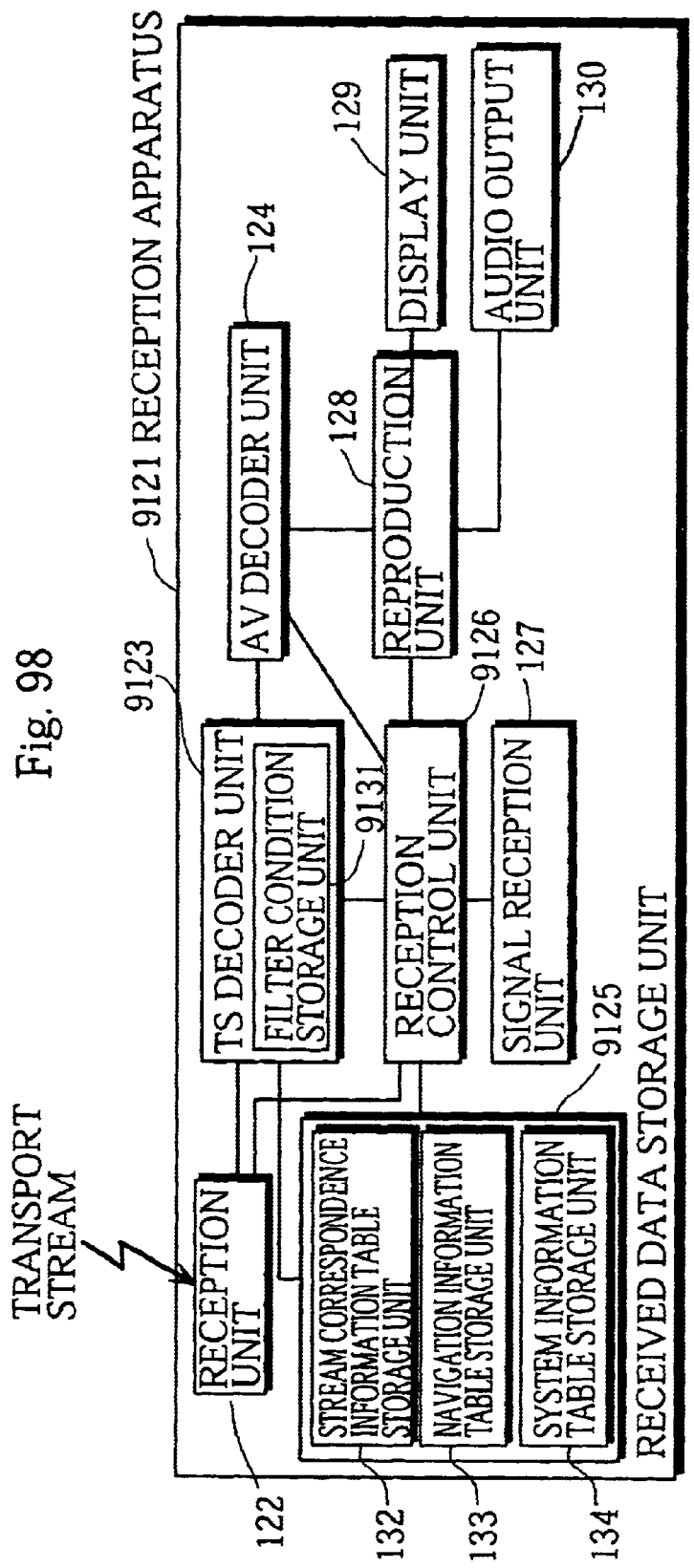
Figure 100:
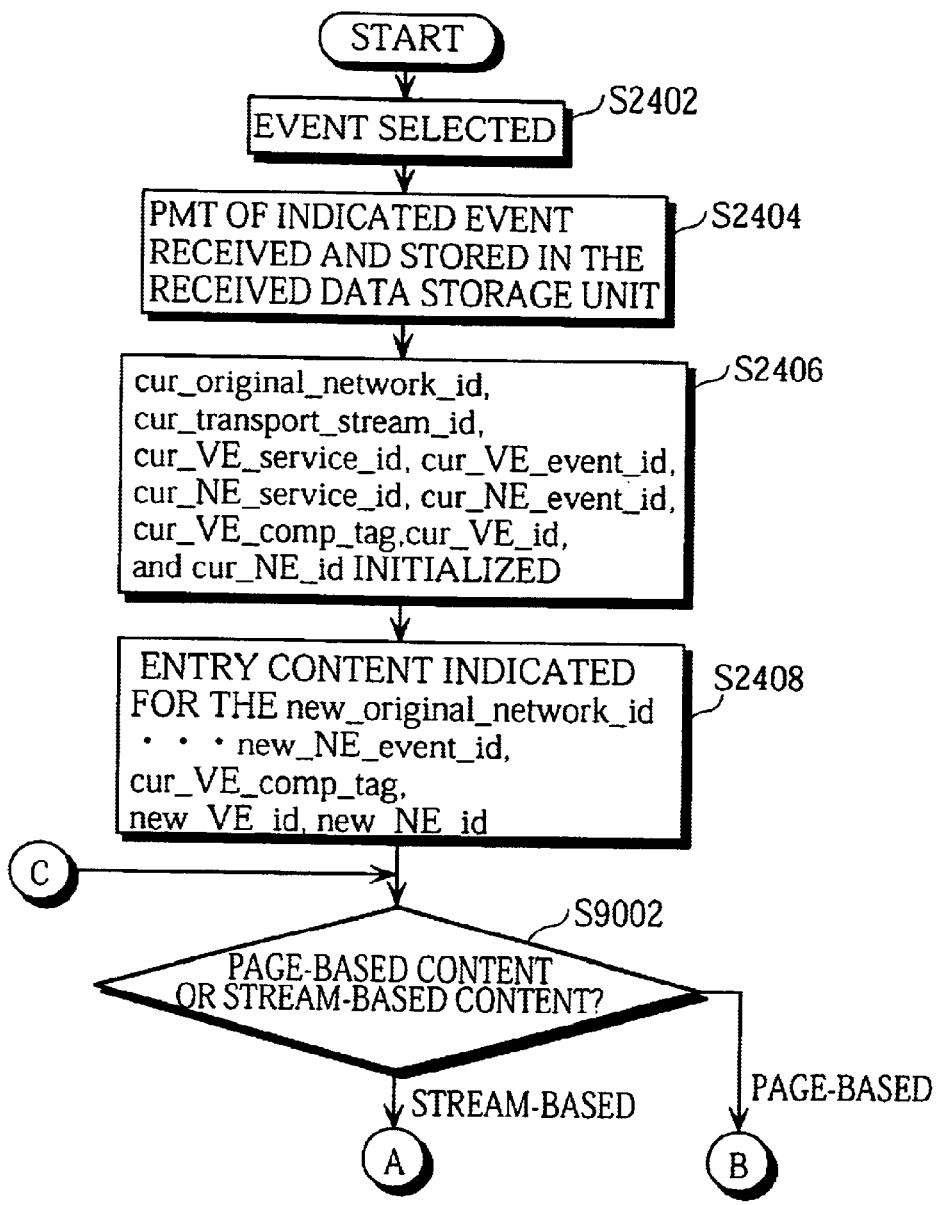
Figure 101:
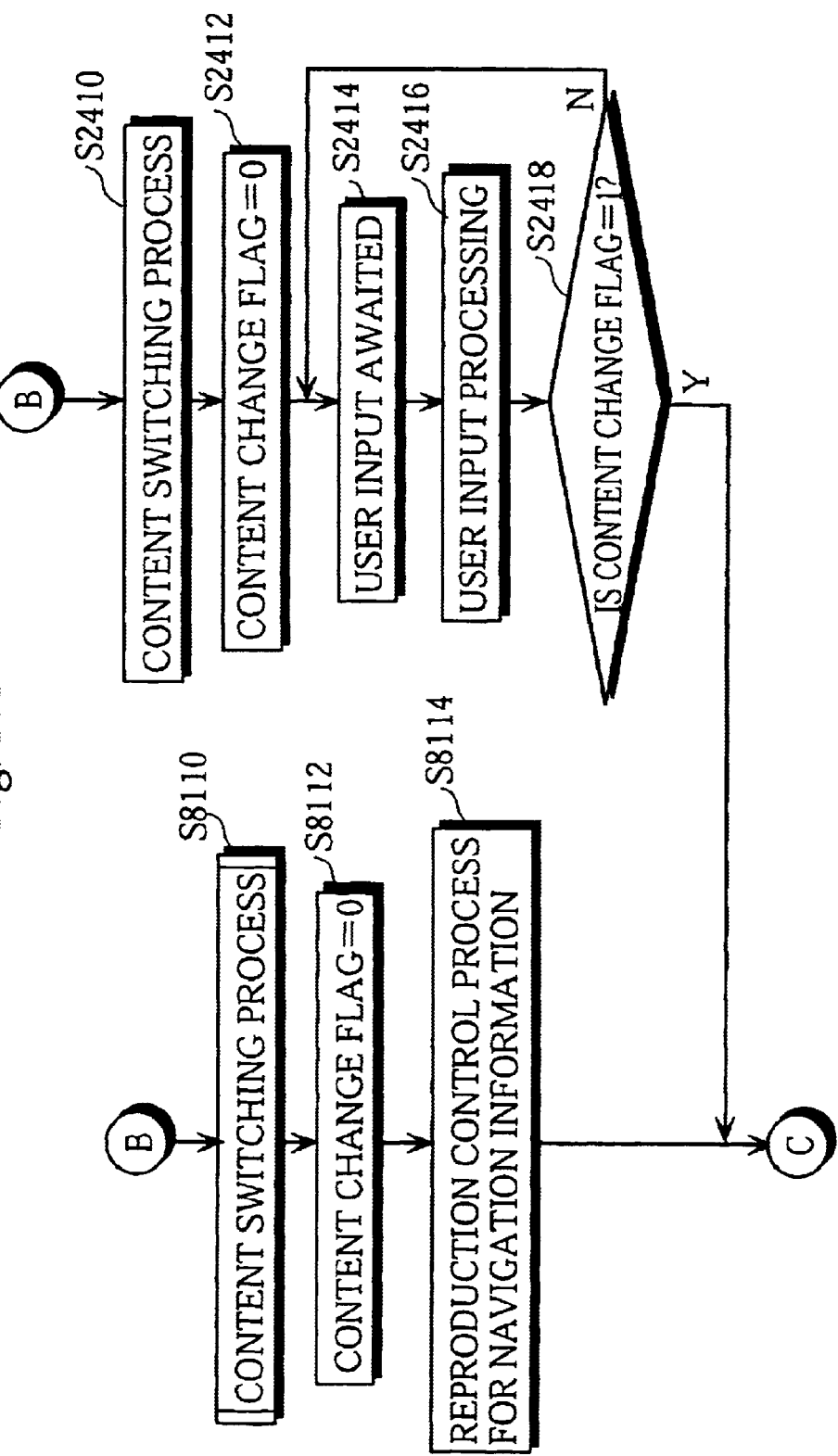

FIG. 51 a model representation of the transmission of the transmission data from the transmission apparatus;

FIG. 52 shows the construction of the data transmission apparatus and the data reception apparatus in the second embodiment of the present invention;

FIG. 53A shows an example of the image data stored by the presentation information storage unit in the present embodiment;

FIG. 53B shows another example of the image data stored by the presentation information storage unit in the present embodiment;

FIG. 54 shows an example of the navigation information which is stored in the navigation information storage unit of the present embodiment;

FIG. 55 shows another example of the navigation information which is stored in the navigation information storage unit of the present embodiment;

FIG. 56 shows an example of the construction information table and the entry information which are stored in the construction information storage unit of the present embodiment;

FIG. 57 shows an example of the multiplexing information table stored in the multiplexing information storage unit of the present embodiment;

FIG. 58 shows an example of the content identifier assigning table generated by the multiplexing control unit of the present embodiment;

FIG. 59 shows an example of the display image information identifier assigning table which is generated by the multiplexing control unit of the present embodiment;

FIG. 60 shows the state when the identifier information appending unit of the present embodiment has appended the identifier VE_id to the private area of the bitstream for the image data;

FIG. 61 shows an example of a navigation information table generated by the navigation information table generating unit of the present embodiment;

FIG. 62 shows another example of a navigation information table generated by the navigation information table generating unit of the present embodiment;

FIG. 63A shows an example of the stream correspondence table generated by the stream correspondence information table generating unit in the present embodiment;

FIG. 63B shows another example of the stream correspondence table generated by the stream correspondence information table generating unit in the present embodiment;

FIG. 63C shows another example of the stream correspondence table generated by the stream correspondence information table generating unit in the present embodiment;

FIGS. 64A and 64B are a model representation of a transport stream which has been multiplexed by the multiplexing unit of the present embodiment;

FIGS. 65A and 65B are a model representation of another transport stream which has been multiplexed by the multiplexing unit of the present embodiment;

FIG. 66A shows an example of the NIT generated by the system information table generating unit of the present embodiment;

FIG. 66B shows an example of the SDT generated by the system information table generating unit of the present embodiment;

FIG. 66C shows an example of the EIT generated by the system information table generating unit of the present embodiment;

FIG. 67 shows an example of the PAT generated by the system information table generating unit of the present embodiment;

FIG. 68 shows an example of the PMT generated by the system information table generating unit of the present embodiment;

FIG. 69A shows the details of the Entry_Descriptor in the PMT generated by the system information table generating unit of the present embodiment;

FIG. 69B shows the details of the NE_Component_Descriptor in the PMT generated by the system information table generating unit of the present embodiment;

FIG. 69C shows the details of the VE_Information Component_Descriptor in the PMT generated by the system information table generating unit of the present embodiment;

FIG. 69D shows the details of the stream_identifier_descriptor in the PMT generated by the system information table generating unit of the present embodiment;

FIGS. 70A and 70B are a a model representation of the transport stream multiplexed by the transmission unit of the present embodiment;

FIG. 71 is a flowchart showing the operation of the data transmission apparatus of the present embodiment;

FIG. 72 is a flowchart showing the operation of the data transmission apparatus of the present embodiment;

FIG. 73 is a flowchart showing the operation of the data transmission apparatus of the present embodiment;

FIG. 74A shows examples of the filter conditions which are stored by the filter condition storage unit of the TS decoder unit of the present embodiment;

FIG. 74B shows other examples of the filter conditions which are stored by the filter condition storage unit of the TS decoder unit of the present embodiment;

FIG. 75A shows an example display screen which is displayed by the display unit in the present embodiment;

FIG. 75B shows another example display screen which is displayed by the display unit in the present embodiment;

FIG. 75C shows another example display screen which is displayed by the display unit in the present embodiment;

FIG. 76 is a flowchart showing the showing the entire operation of the data receiver apparatus of the present embodiment;

FIG. 77 is a flowchart showing the details of the processing in S2410 of the present embodiment;

FIG. 78 is a flowchart showing the details of the processing in S2504 of the present embodiment;

FIG. 79 is a flowchart showing the details of the processing in S2506 of the present embodiment;

FIG. 80 is a flowchart showing the details of the processing in S2416 of the present embodiment;

FIG. 81 shows the construction of the digital broadcasting apparatus of the third embodiment of the present invention;

FIGS. 82A and 82B show examples of the construction information tables stored in the construction information storage unit of the third embodiment;

FIG. 83 shows an example of the navigation information in the third embodiment;

FIGS. 84A to 84C are representations of sets of video data in the third embodiment;

FIGS. 85A and 85B show the relation between scenes in the video data and the sets of navigation information;

FIGS. 86A and 86B also show the relation between scenes in the video data and the sets of navigation information;

FIG. 87 shows a specific example of a set of navigation information;

FIG. 88 shows another specific example of a set of navigation information;

FIG. 89 shows another specific example of a set of navigation information;

FIG. 90 shows another specific example of a set of navigation information;

FIG. 91 shows another specific example of a set of navigation information;

FIG. 92 shows another specific example of a set of navigation information;

FIG. 93 shows another specific example of a set of navigation information;

FIG. 94 shows another specific example of a set of navigation information;

FIG. 95 shows a specific example of a set of navigation information which corresponds to a plurality of contents;

FIG. 96 shows an example of a navigation information table;

FIGS. 97A, 97B and 97C show an example of a transport stream multiplexed by the transmission unit;

FIG. 98 is a block diagram showing the construction of the data reception apparatus in the present embodiment;

FIG. 99 shows an example of the filter condition table stored by the filter condition storage unit;

FIG. 100 is a flowchart for the control executed by the reception control unit; and FIG. 101 is also a flowchart for the control executed by the reception control unit.

DESCRIPTION OF THE PREFERRED EMBODIMENTS

0. Outline Description of the Present Invention

An outline description of the interactive programs achieved by digital broadcasting is given below, prior to the description of the construction of the broadcasting apparatus and reception apparatus in the digital broadcasting system of the present invention.

The broadcasting apparatus in the present digital broadcasting system broadcasts interactive programs composed of contents that feature links to one another. The reception apparatus receives these interactive programs and reproduces them, interactively switching between contents as requested by a user.

The term "content" here refers to information which forms each compositional element of an interactive program and so is the unit of information used when interactive switching operations are made by a user. In the present embodiment, there are two types of contents which are namely stream-based contents and page-based contents. Here, stream-based contents are contents which are mainly used for moving pictures (video), while page-based contents are contents which are mainly used for displaying still images.

Figure 1A:
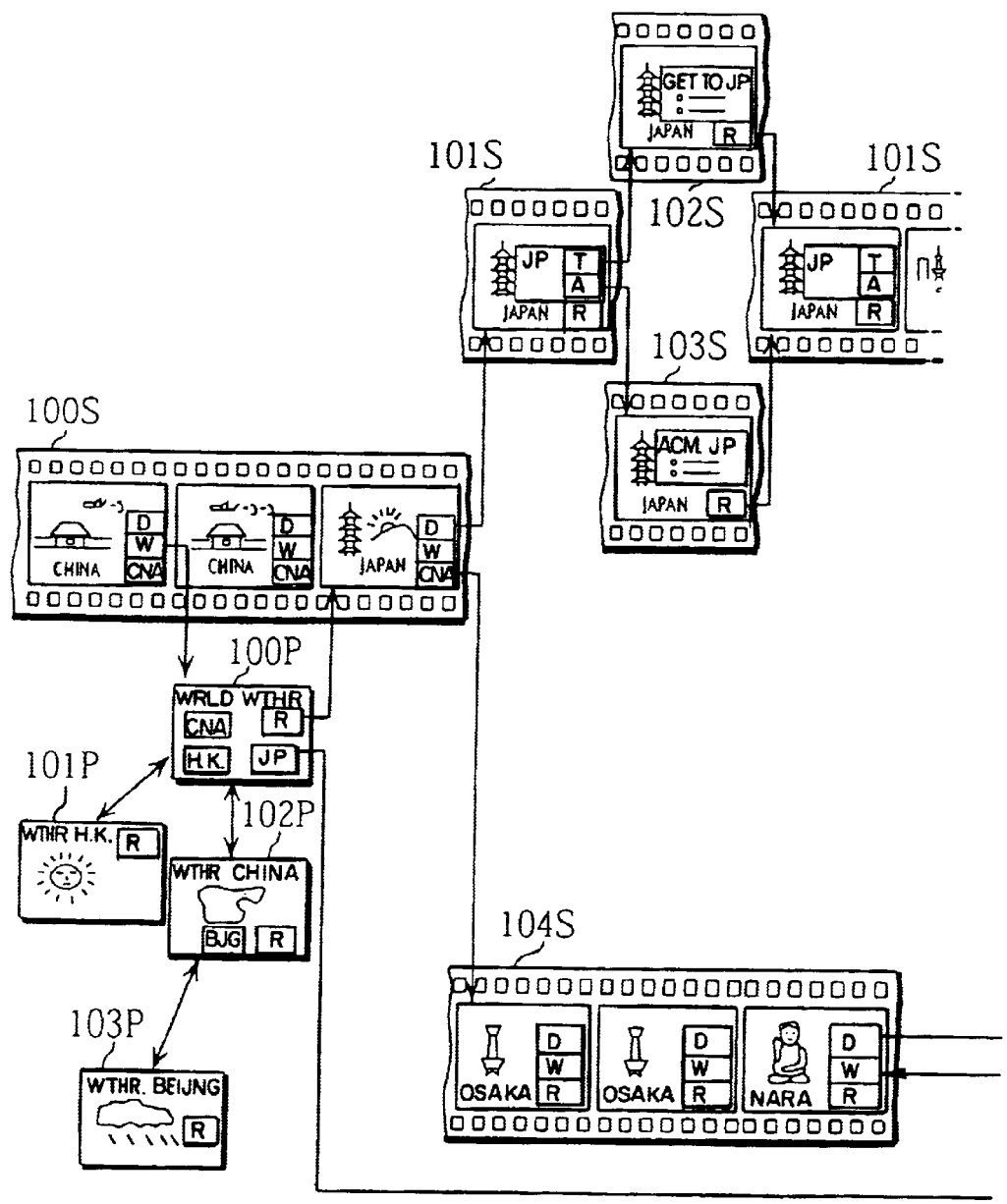
FIGS. 1A and 1B show a plurality of examples of contents which are selectively reproduced by a reception apparatus.
Figure 1B:
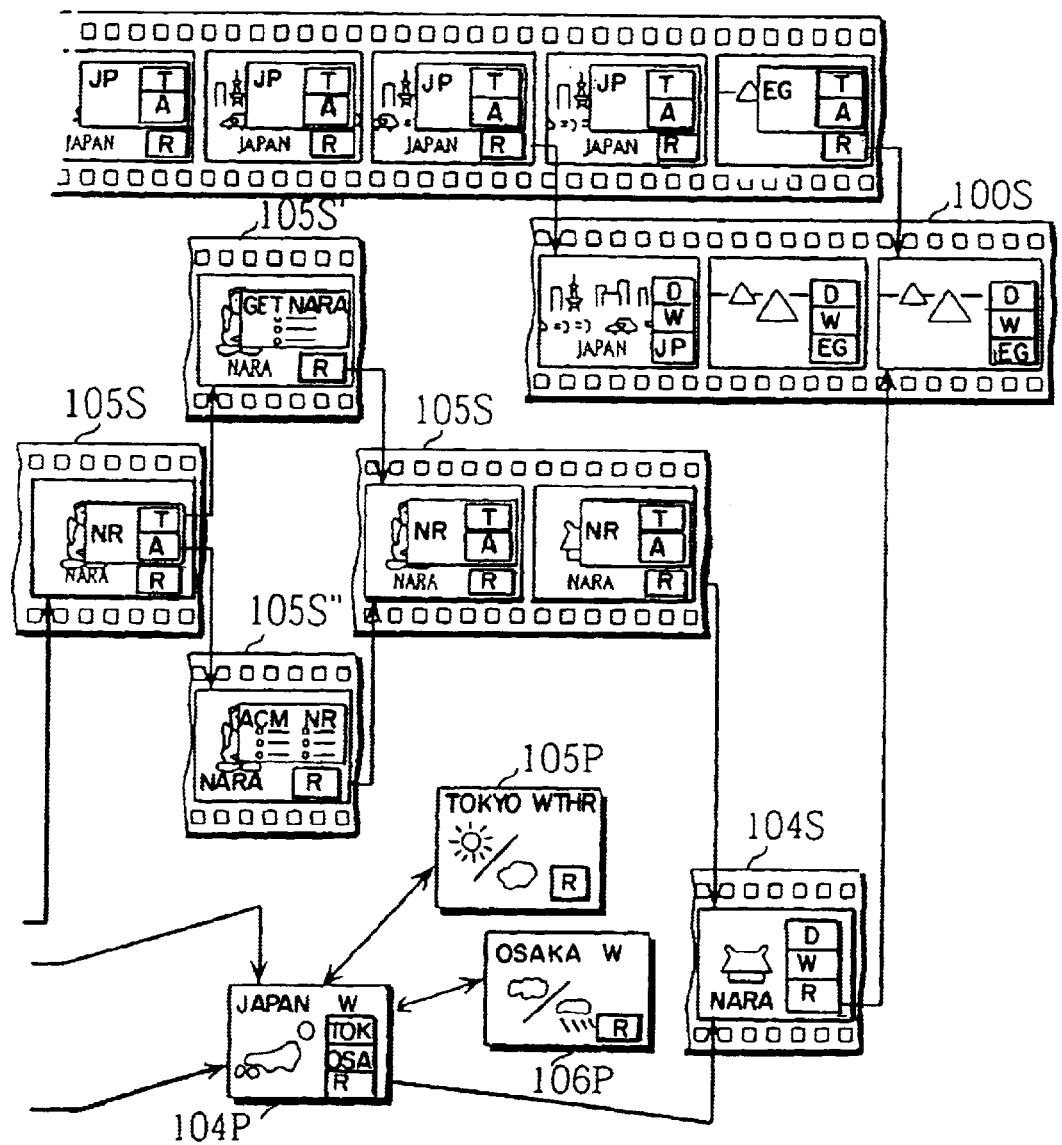
Figure 2A:
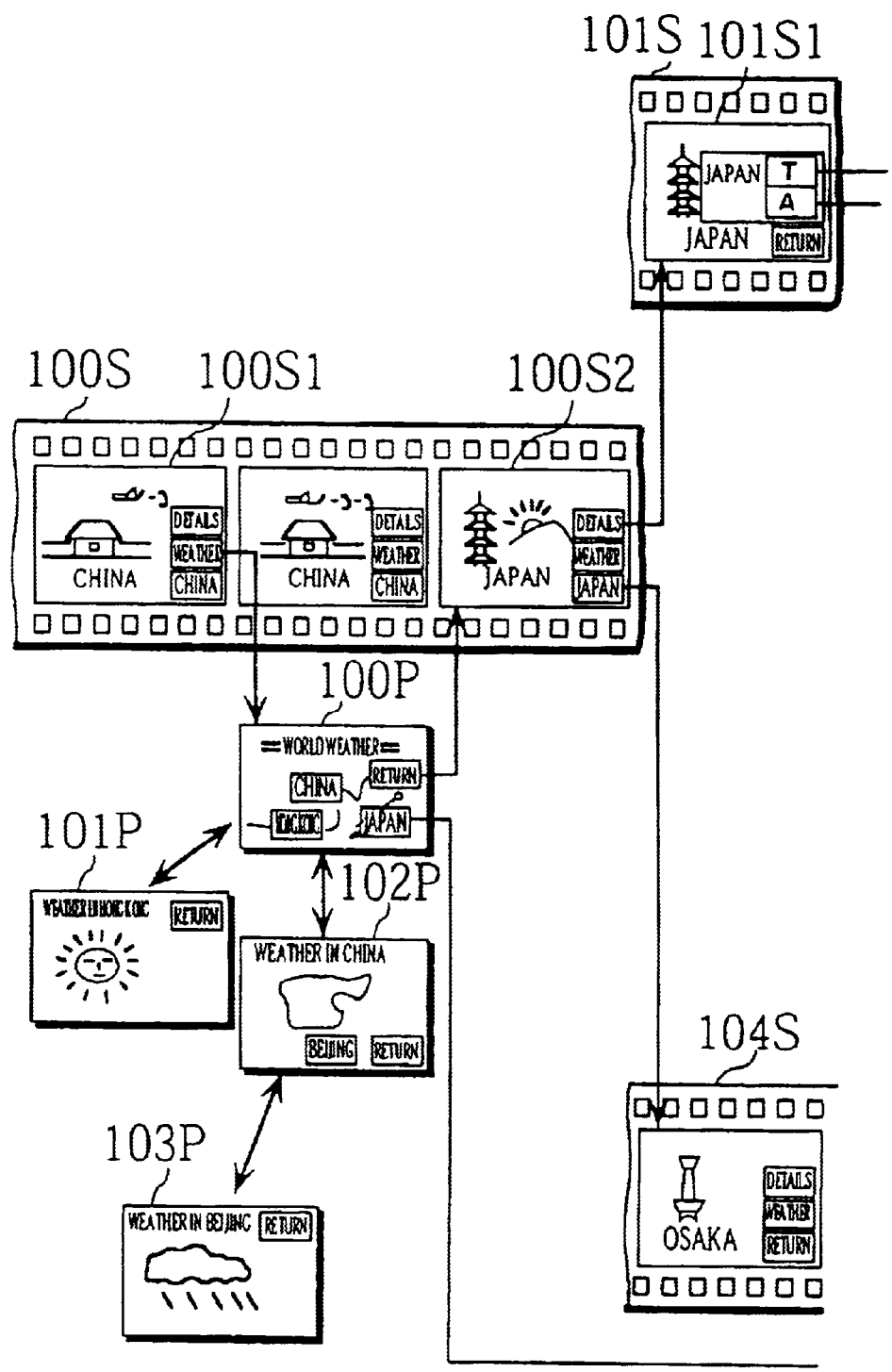
FIGS. 2A and 2B is an expansion of the left side of FIG. 1.
Figure 2B:
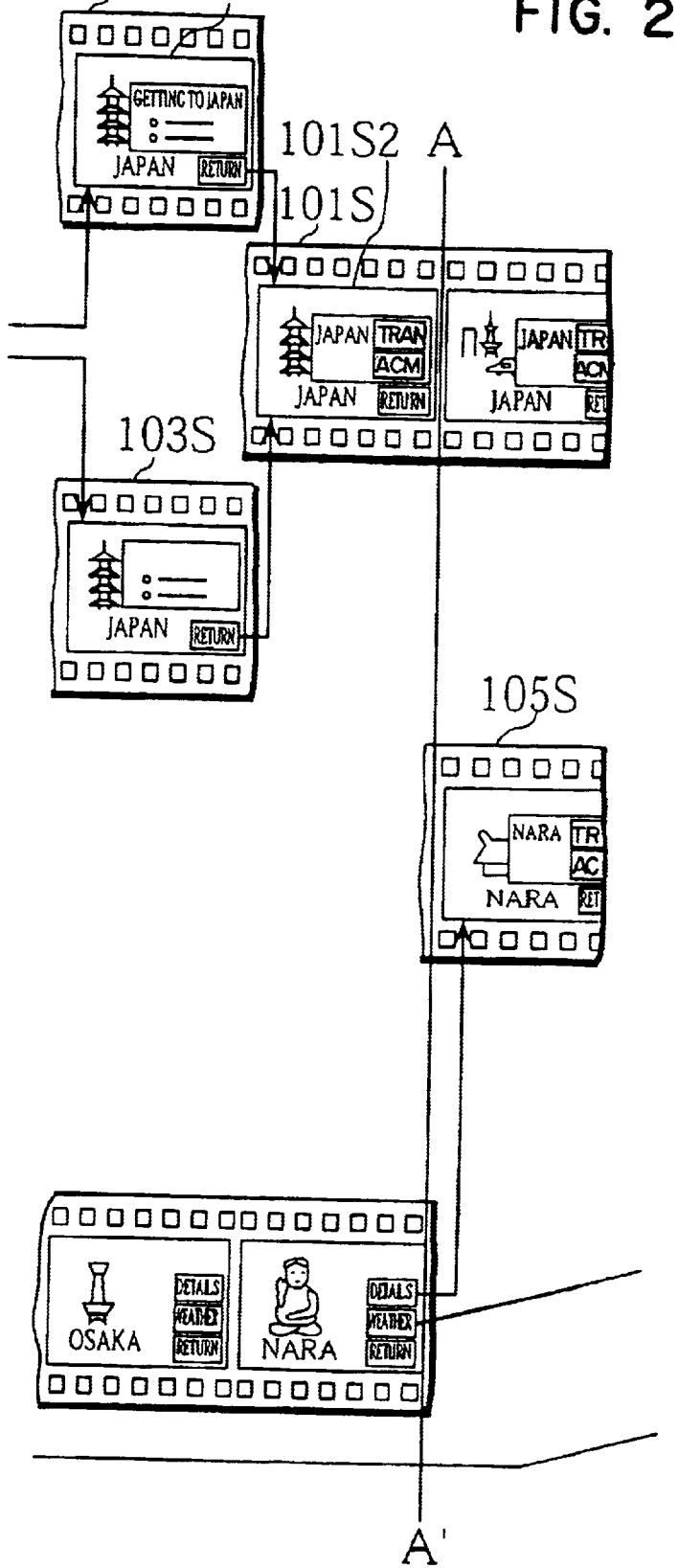
Figure 3A:
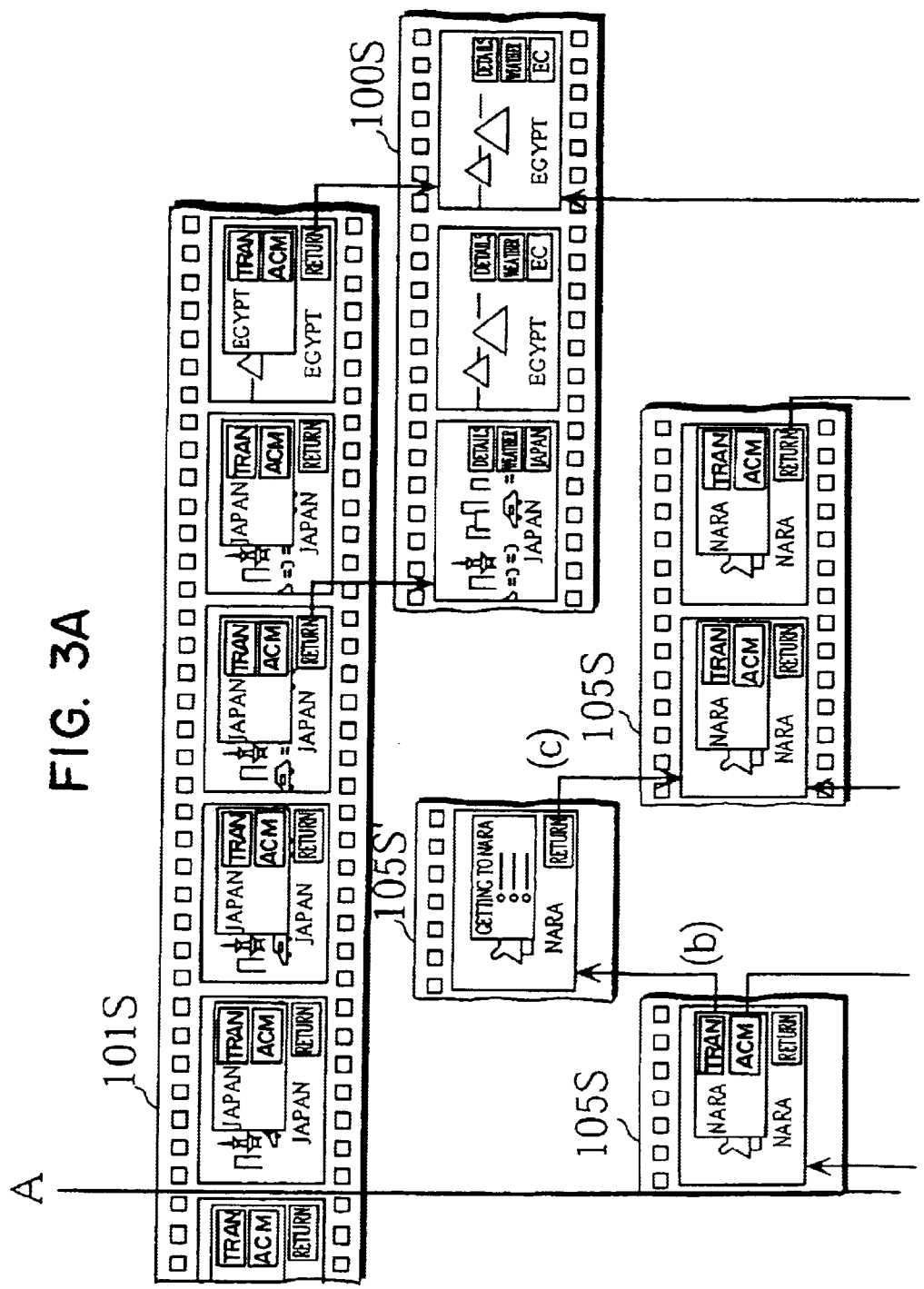

FIG. 1 (collectively 1A and 1B) shows a plurality of examples of contents which are selectively reproduced by a reception apparatus. Expansions of the left and right side of FIG. 1 are shown in FIG. 2 (collectively 2A and 2B) and FIG. 3 (collectively 3A and 3B), respectively. Here, the line "A–A'" in FIGS. 2 and 3 shows the boundary between the two halves of FIG. 1.

In the present figures, numerals 100S-105S, 105S', and 105S" denote stream-based contents, while numerals 100P-106P denote page-based contents.

Content 100S represents video and audio for a world travel guide which gives a succession of introductions of various countries around the world, such as China, Japan, and Egypt, as well as menus composed of a plurality of button images (hereinafter referred to as buttons) which are only displayed during the video display of the corresponding destination. These buttons are used to make user selections of other contents which are linked to the present content. Simplified representations of several scenes (or frames) out of the sets of video introducing different countries are also shown in FIGS. 1 to 3 in order of their reproduction times. As one example, scene 100S1 represents a travel guide for China, while scene 100S2 represents a travel guide for Japan. When switching from scene 100S1 to scene 100S2, the displayed menu also changes from the menu for China to the menu for Japan. The link destinations for the displayed buttons also change from the contents for the travel guide for China to the contents for the travel guide for Japan.

Contents 101S, 102S, and 103S include the same video and audio for introductions of various countries around the world as content 100S, but include different menus for the countries being introduced and text information which may be supplementary information for the country being introduced.

Content 104S is composed of video and audio for a travel guide about Japan which successively introduces different areas of Japan, such as Osaka and Nara, with a menu composed of buttons which correspond to the region currently being displayed.

Contents 105S, 105S', and 105" include the same video and audio as content 104S, but have different menus for the various regions being introduced.

Content 100P represents a still image showing a world weather forecast, as well as buttons for different countries, such as Japan, China, or Taiwan, which are link destination contents.

In the same way, contents 101P to 106P represent still images showing weather forecasts for different regions and countries and the link destinations, as well as buttons for the different link destinations.

The interactive program which contains the contents described above is reproduced by the reception apparatus with interactive switching of contents being performed in accordance with user requests. The arrows in FIGS. 1 to 3 show examples of switching between contents.

As one example, when the user makes an operation to select and activate the "Weather" button during the reproduction of scene 100S1, the reproduction apparatus switches the reproduction to the link destination, content 100P, as shown by the arrow in FIG. 2. As a result, the user is shown a still image for a main menu that informs the user of the weather around the world. Here, if the user makes an operation to select and activate the "Return" button during the reproduction of content 100P, the reproduction apparatus switches the reproduction to scene 100S2 at that point, as shown by the arrow in FIG. 2. In this way, switching is performed between stream-based contents and page-based contents.

As another example, if the user makes an operation to select and activate the "Transport" button during the reproduction of scene 101S1 (a scene with a submenu including items such as transport to Japan and accommodation), the reproduction apparatus switches the reproduction to the link destination, scene 102S1, as shown by the arrow in FIG. 2. As a result, the user is shown text information which gives a supplementary explanation about transport to Japan. Here, if the user makes an operation to select and activate the "Return" button during the reproduction of scene 101S1, the reproduction apparatus switches the reproduction to scene 101S2, as shown by the arrow in FIG. 2. In this way, switching is performed between different stream-based contents.

As another example, if the user makes an operation to select and activate the "Osaka" button during the reproduction of content 104P (a main menu showing the weather in Japan), the reproduction apparatus switches the reproduction to the link destination, content 106P, as shown by the arrow in FIG. 2. As a result, the user is shown a weather forecast for Osaka, Japan. Here, if the user makes an operation to select and activate the "Return" button during the reproduction of content 106P, the reproduction apparatus switches the reproduction to content 104P. In this way, switching is performed between different page-based contents.

This concludes the overview of the present invention. Below, the first embodiment will describe the construction of a digital broadcasting system for realizing an interactive program composed of stream-based contents, while the second embodiment will describe the construction of a digital broadcasting system for realizing an interactive program composed of page-based contents and the third embodiment will describe the construction of a digital broadcasting system for realizing an interactive program composed of both types of contents.

1. First Embodiment

The following explanation will first deal with the interactive programs composed of stream-based contents (in the present embodiment, hereinafter abbreviated to "contents"), before describing the construction of the digital broadcasting system.

The content S100 shown in FIGS. 1 and 2 expresses video data and audio data for video and audio which give a world travel guide, as well as a plurality of sets of navigation information which express supplementary explanations and menus composed of a plurality of buttons corresponding to the countries being displayed.

The sets of navigation information referred to here can be provided so as to correspond to the reproduced content of the video data during given time periods. As one example, one set of navigation information (set as "version 1") may be provided for scene 100S1 which includes a travel guide for China, while another set of navigation information (set as "version 2") may be provided for scene 100S2 which includes a travel guide for Japan and another set of navigation information (set as "version N") may be provided for a scene which includes a travel guide for Egypt.

Contents 101S to 103S share the same video data and audio data for the world travel guide as content 100S, and also include a plurality of sets of navigation information which correspond to the reproduced content of the video data during given time periods.

The reproduction apparatus is able to switch from a content which is currently being displayed to a different stream-based content because navigation information is transmitted by the broadcasting apparatus along with the video data and audio data, according to the method described below.

Navigation information is repeatedly transmitted by the broadcasting apparatus during the reproduction time of the image data. When doing so, the transmitted navigation information corresponds to the reproduced content of the video data for the given time period, so that each set of navigation information is only repeatedly transmitted during the time period to which it corresponds.

As one example, during the reproduction time of the travel guide for China included in scene S100S1, the navigation information for version 1 is repeatedly transmitted. Similarly, during the reproduction time of the travel guide for Japan included in scene S100S2, the navigation information for version 2 is repeatedly transmitted. Also, during the reproduction time of the travel guide for Egypt, the navigation information for version N is repeatedly transmitted.

Here, the reason the same navigation information is repeatedly sent is to enable the reception apparatus to immediately receive the navigation information of a switching destination when content switching is performed or when reception is commenced midway through the broadcast of an interactive program. When the navigation information is dynamically set for different sections of the video data, this means that the latest navigation information can be received at the point where the content switching is made.

By doing so, the user of a reception apparatus in what is a one-directional broadcasting system can make what appear to be interactive operations that switch between stream-based contents.

1-1 Digital Broadcasting System

Figure 4:
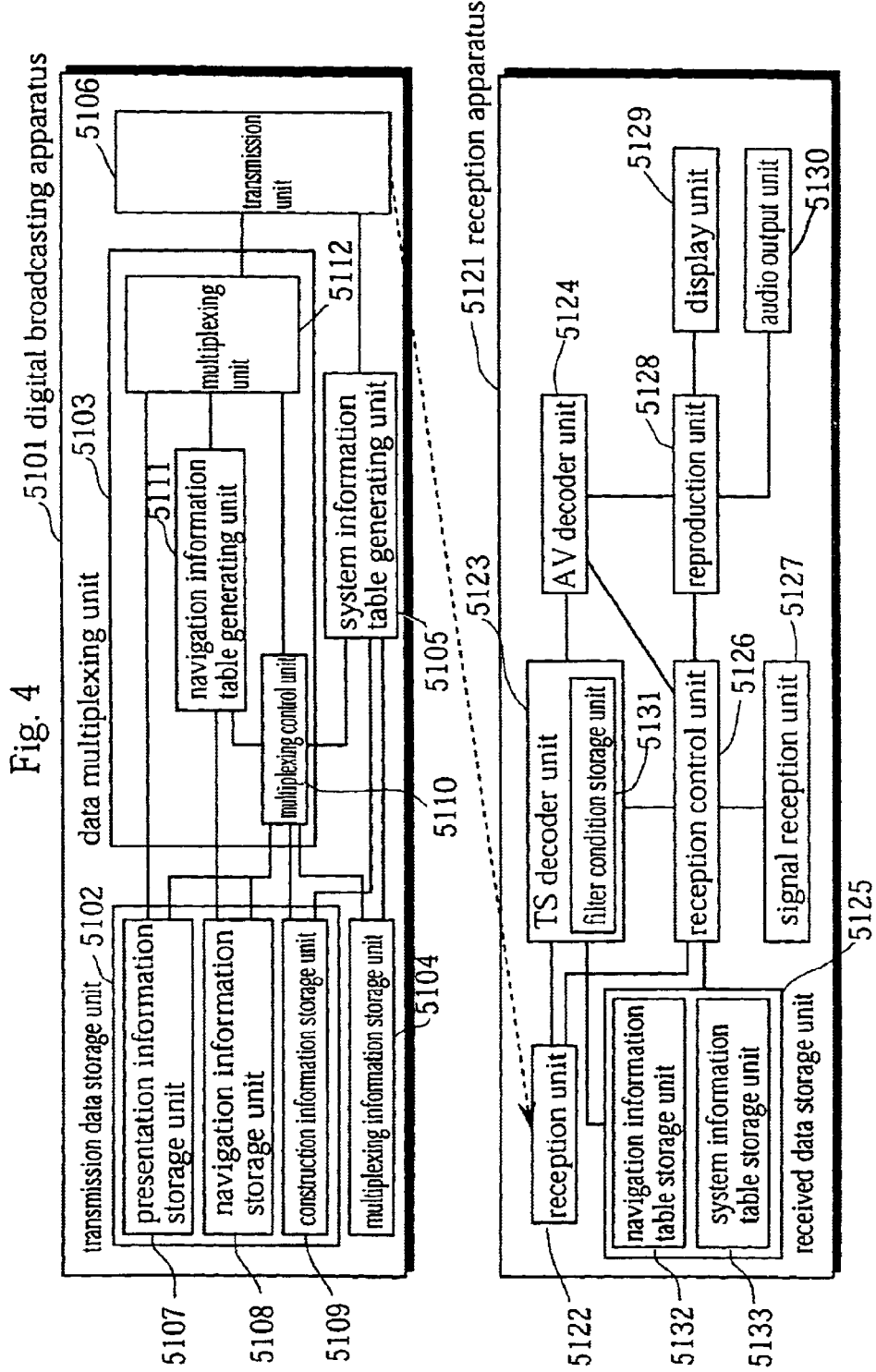
FIG. 4 shows the construction of the digital broadcasting apparatus and reception apparatus in the digital broadcasting system of the first embodiment of the present invention.

FIG. 4 is a block diagram showing the construction of the digital broadcasting system of the first embodiment of the present invention.

The present digital broadcasting system includes a digital broadcasting apparatus 5101 and a plurality of reception apparatuses. In FIG. 4, this plurality of reception apparatuses is represented by only one reception apparatus 5121. In the present digital broadcasting system, interactive programs which are composed of stream-based contents (hereinafter, simply "contents") that are linked to one another are broadcast by the digital broadcasting apparatus 5101 and are reproduced by the reception apparatus 5121 which interactively switches between the different contents.

Figure 5:
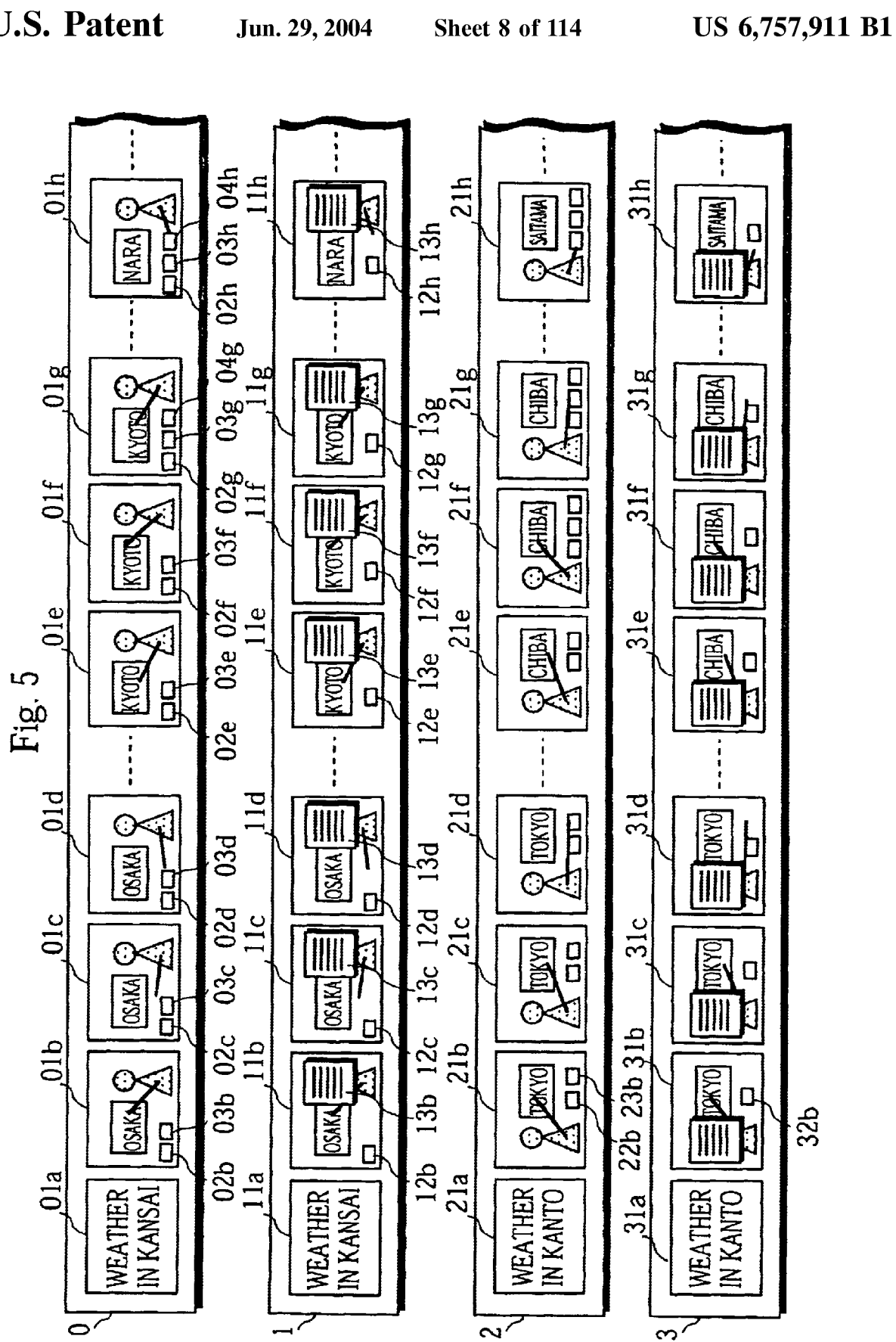
FIG. 5 shows a plurality of examples of contents which compose an interactive program.

To simplify the explanation of the present embodiment, an example of an interactive program which is composed of the four contents numbered 0–3 in FIG. 5 will be used to describe the construction of the digital broadcasting apparatus 5101 and the reception apparatus 5121.

Content 0 is composed of scenes 01a to 01h, and expresses video and audio (not illustrated) which gives the viewer of a weather forecast for the Kansai region of Japan.

Scene 01a is the opening scene.

Scene 01b has two buttons (button images) 02b and 03b superimposed over video image. These buttons 02b and 03b are respectively linked to content 1 and content 2 and are used by the reception apparatus 5121 when the user performs a content switching operation. This is also the case for scenes 01c to 01h.

Content 1 is composed of scenes 11a to 11h and, in addition to the video and audio (not illustrated) for the weather forecast used in content 0, includes the text information 13b to 13h. These sets of text information 13b to 13h express supplementary information such as the estimated maximum temperature, estimated minimum temperature, humidity, and probability of rain.

Scene 11b has a button 12b which features a link to content 0 and a text information 13b displayed on top of the video images. This is also the case for scenes 11c to 11h.

Content 2 and expresses video and audio (not illustrated) which gives the viewer of a weather forecast for the Kanto region of Japan. Scene 21b has a button 22b linked to content 3 and a button 23b which is linked to content 0.

Content 3 includes sets of text information, in addition to the video and audio (not illustrated) for the weather forecast used in content 2. As one example, the button 32b in scene 31b is linked to content 2.

The interactive program composed of the four contents described above is reproduced by the reception apparatus 5121 while switching between contents as desired by the user, according to the method described below.

As one example, when the user makes a select and activate operation for the button 02b during the reproduction by the reception apparatus 5121 of scene 01b in content 0, the reception apparatus 5121 switches the reproduction to content 1 which is the link destination of this button. When doing so, since every content is multiplexed with corresponding reproduction times, content 1 is not reproduced from the start and is instead reproduced starting from a scene whose reproduction time corresponds with the part of content 0 where the switching operation was made. Here, since content 1 contains the same video and audio as content 0, the user will not notice a change in the reproduced video or audio and will merely obtain supplementary information for the weather forecast which is provided as text.

1-2 Digital Broadcasting Apparatus 5101

As shown in FIG. 4, the digital broadcasting apparatus 5101 is composed of a transmission data storage unit 5102, a data multiplexing unit 5103, a multiplexing information storage unit 5104, a system information table generating unit 5105, and a transmission unit 5106. This digital broadcasting apparatus 5101 broadcasts the interactive program described above on a digital broadcast wave.

The transmission data storage unit 5102 includes a recording medium such as a magnetic disc and is used to store the data for each content which composes the interactive program. Here, the data for one content is composed of presentation information, such as video data and audio data, and navigation information which expresses hyperlinks to other contents, buttons, and text information. As one example, the video and audio for each content in FIG. 5 are included in this presentation information, while the buttons and text information to be displayed on top of the video images, and the hyperlinks given to each button are included in the navigation information.

The data multiplexing unit 5103 generates a multiplexed stream by multiplexing the content data stored in the transmission data storage unit 5102. More specifically, the data multiplexing unit 5103 multiplexes the presentation information for each content so that the reproduction times of the presentation information coincide, as well as repeatedly multiplexing the navigation information during the reproduction time of the presentation information in the same content. Here, the navigation information is repeatedly multiplexed so that no matter when content switching is performed by the reception apparatus, the reproduction apparatus will definitely be able to receive the navigation information for the content which is the link destination.

The multiplexed stream described above is generated as a part of a transport stream in accordance with DVB-SI (Digital Video Broadcasting) and MPEG system standards. This transport stream is a collection of a plurality of digital data streams which are multiplexed into the bandwidth of one carrier wave on a digital satellite broadcast, and so has a bandwidth which is equivalent to five or six broadcast channels.

The multiplexing information storage unit 5104 stores a variety of parameters that are needed by the data multiplexing unit 5103 to generate the multiplexed stream.

The system information table generating unit 5105 refers to the multiplexing information storage unit 5104 and generates system information tables (made up of a variety of tables) which are required by the reception apparatus 5121 to select a multiplexed stream.

The transmission unit 5106 multiplexes the multiplexed stream generated by the data multiplexing unit 5103 and the system information tables generated by the system information table generating unit 5105 into a transport stream which it then transmits. The system information tables referred to here are composed of a variety of tables which store information used to identify the multiplexed streams that express the interactive programs of the present invention in the transport stream.

1-2-1 Transmission Data Storage Unit 5102

As shown in FIG. 4, the transmission data storage unit 5102 includes a presentation information storage unit 5107, a navigation information storage unit 5108, and a construction information storage unit 5109. This transmission data storage unit 5102 stores the data for a plurality of contents which compose one interactive program (application) classified into presentation information and navigation information. The transmission data storage unit 5102 also stores a construction information table which shows the correspondence between sets of presentation information and sets of navigation information.

1-2-1-1 Presentation Information Storage Unit 5107

The presentation information storage unit 5107 stores the presentation information which is the video data and audio data included in each content.

FIGS. 6A and 6B show the scenes (frames) in the sets of video data used as the presentation information of the contents shown in FIG. 5.

The video data 5201 shown in FIG. 6A has the filename "Video0.m2v" and expresses video which gives a weather forecast for the Kansai region of Japan. This video data is presentation information which is used by both content 0 and content 1 shown in FIG. 5.

The video data 5202 shown in FIG. 6B has the filename "Video1.m2v" and expresses video which gives a weather forecast for the Kanto region of Japan. This video data is presentation information which is used by both content 2 and content 3 shown in FIG. 5.

These sets of video data 5201 and 5202 are stored in the presentation information storage unit 5107 having been compressed according to IS/IEC 13818-2 (MPEG2 Video) standard. However, other video data formats are also possible.

FIGS. 6C and 6D show examples of sets of audio data which are used as presentation information.

Audio data 5203 shown in FIG. 6C has the filename "Audio0.m2a" and is the audio data that is to be reproduced with the video data 5201 shown in FIG. 6A. This audio data is presentation information which is used by both content 0 and content 1 shown in FIG. 5.

Audio data 5204 shown in FIG. 6D has the filename "Audio1.m2a" and is the audio data that is to be reproduced with the video data 5202 shown in FIG. 6B. This audio data 5is presentation information which is used by both content 2 and content 3 shown in FIG. 5.

These sets of audio data are stored in the presentation information storage unit 5107 having been compressed according to IS/IEC 13818-3 (MPEG2 Audio) standard. However, other video data formats are also possible.

1-2-1-2 Navigation Information Storage Unit 5108

The navigation information storage unit 5108 stores the navigation information for each content. These sets of navigation information include hyperlink information for links to other contents and valid time information for the valid time of the present set of navigation information. The hyperlink information is given as objects to be used by the reception apparatus to enable the user to make interactive operations. The valid time information, meanwhile, is added to enable the content of the valid navigation information to be updated (expressed using the concept of a "version up") in accordance with changes in the content of the video data or other presentation information.

FIG. 7 shows an example of the navigation information corresponding to the scene 01*b* (or, more correctly, scenes 01*b* to 01*d*) shown in FIG. 5. This navigation information has the filename "Navi0-0.nif" and includes the navigation information 5301, the object definition table 5302, the handler definition table 5303, the hyperlink table 5304, the bitmap table 5305, and the time information table 5306.

The object definition table 5302 is a list of information which shows the types and attributes of the objects which are to be displayed superimposed onto the video data included in the presentation information. More specifically, the object definition table includes the following columns.

The "object index" column shows the numbers used to identify each of the objects.

The "type" column shows the type of each object. As examples of types of objects, "button" denotes a button object which used to display a button which has an attached hyperlink, while "picture" denotes a picture object which is used to display a still image or text information. In the present example, the buttons 02*b* and 03*b* shown in FIG. 5 have been recorded as button objects with the object index numbers "0" and "1". On the other hand, the text information 13*b* shown in FIG. 5 has been recorded as a picture object.

The "X" column and "Y" column are used to record the X and Y coordinates of the standard display position of each object, such as buttons or pictures, on the display screen. The values in these columns are used, for example, to determine the display positions of the buttons 02*b* and 03*b* shown in FIG. 5.

The "handler" column is used to show the handler index which indicates the handler, out of the handlers stored in the handler definition table 5303, that corresponds to each object. These handlers are scripts, which is to say programs or instruction words which are written in a programming language that is executable by the reception apparatus 5121. In particular, handlers for button objects include content switching instructions that are executed by the reception apparatus 5121 when the corresponding button object is activated by a user operation.

The "normal bitmap" column is used to show the bitmap index number that is used to indicate the bitmap image (button image or picture representing still image information), out of the bitmap images in the bitmap table 5305, which is to be displayed at the standard display position given by the X and Y coordinates described above during the normal (non-selected state) display state. Here, the non-selected state is the state of a given button when it has not been selected by the reproduction apparatus.

The "focused bitmap" column is used to show the bitmap index number that is used to indicate the bitmap image (button image or picture representing still image information), out of the bitmap images in the bitmap table 5305, which is to be displayed at the standard display position given by the X and Y coordinates described above during the selected state. Here, the selected state is the state of a given button when it has been selected by the reproduction apparatus.

The handler definition table 5303 stores the handlers (scripts) which are indicated for each object in the object definition table 5302. More specifically, the handler definition table 5303 includes the following columns. The "handler index" column stores numbers (handler indexes) for identifying each handler. The "script" column shows the handler (script) corresponding to each handler index. In particular, the handlers corresponding to button objects include content switching instructions such as "goto_content (Hyperlink Index 0)" given in FIG. 7.

The hyperlink table 5304 stores the arguments for the content switching instructions in the handler definition table 5303. More specifically, the hyperlink table includes the following columns. The "hyperlink index" column stores values (hyperlink indexes) for identifying each hyperlink. The "content number" column stores hyperlink information which is the content number of the link destination used as the argument in a content switching instruction. As one example, the content switching instruction "goto_content (Hyperlink Index 0)" is effectively the same as the instruction "goto_content (content 1)", with this being the instruction which is executed by the reception apparatus 5121 when the corresponding button object is activated.

The bitmap table 5305 stores bitmap data for bitmap images indicated in the "normal bitmap" and "focused bitmap" columns of the object definition table 5302. More specifically, the bitmap table includes the following columns. The "bitmap index" column is used to store the values ("bitmap numbers") which are used to identify the bitmaps. The "bitmap data" column is used to store the bitmap data used to express buttons and text information which are displayed superimposed onto the presentation information. As one example, the button 02*b* in scene 01*b* of FIG. 5 is displayed using the "Details for Osaka" bitmap with the bitmap index 0 in the normal state and using the "Details for Osaka" bitmap (which has a different color density to make it stand out) with the bitmap index 1 in the selected state. In the same way, button 03*b* is displayed using the "See Kanto" bitmap with the bitmap index 2 in the normal state and using the "See Kanto" bitmap with the bitmap index 3 in the selected state.

The time information table 5306 stores the start_time which denotes the time at which the present navigation information becomes valid and the end_time which denotes the time at which the present navigation information ceases to be valid. These times are expressed as relative times (in units of one second) where the broadcasting start_time of the interactive program is set at "0".

FIG. 8 shows an example of the navigation information which corresponds to scene 11b in FIG. 5. This navigation information 5401 has the filename "Navi1-0.nif" and includes the object definition table 5402, the handler definition table 5403, the bitmap table 5404, and the time information table 5405.

On the line of the object definition table 5402 with the object index number "0", the type of the object is "button", and the display coordinates of the top-left corner of the display of the object on the display screen are X=20, Y=400. When this button is activated, the handler with the handler index number "0" is activated. During the non-selected state, this button is displayed using the bitmap with the bitmap index number "0", while during the selected state, the button is display using the bitmap with the bitmap index number "1".

On the line of the object definition table 5402 with the object index number "1", the type of the object is "picture", and the display coordinates of the top-left corner of the display of the object on the display screen are X=300, Y=20. This object is displayed using the bitmap with the bitmap index number "2".

The handler definition table 5403 shows that when the handler with the handler index number "0" is activated, the script "goto_entry" will be executed. This script is an instruction which indicates a switching to a default content for the start of reproduction, which is to say the content which is to be reproduced first by the reproduction apparatus.

The bitmap table 5404 stores the bitmap data for the bitmaps with the bitmap index numbers "0", "1", and "2". Of these, the bitmap with the bitmap index number "2" is the text information 13b shown in FIG. 5.

The time information table 5405 shows that the navigation information 5401 becomes valid five seconds after the start of reproduction and ceases to be valid sixty-five seconds after the start of the reproduction. This is to say, navigation information 5401 will stop being used sixty-five seconds after the start of reproduction.

Other examples of navigation information stored in the navigation information storage unit 5108 are shown in FIG. 9 (navigation information 5501), FIG. 10 (navigation information 5601), and FIG. 11 (navigation information 5701). These sets of navigation information respectively correspond to scene 01e in content 0, to scene 1ie in content 1, and to scene 21b in content 2.

1-2-1-3 Construction Information Storage Unit 5109

The construction information storage unit 5109 stores a construction information table, which is a list of pairings of presentation information and navigation information which compose each content, and entry information. This entry information shows an entry content number of an entry content that is the content to be reproduced first when the reproduction of the interactive program is commenced by the reception apparatus 5121.

FIG. 12 shows an example of the construction information table stored by the construction information storage unit 5109. This construction information table 5801 shows a combination of video data, audio data, and navigation information for each content identified using content numbers. These content numbers are the numbers which are exclusively assigned for identification purposes to each of the contents stored in the transmission data storage unit 5102. Here, while content numbers are one-to-one assigned to contents, it is also possible in exceptional circumstances for them to correspond to a plurality of contents.

The content number "0" line of the construction information table 5801 shows that the content with the content number "0" is composed of the video data with the filename "Video0.m2v" and the audio data with the filename "Audio0.m2a" stored in the presentation information storage unit 5107, and the sets of navigation information identified by the filenames "Navi0-0.nif", "Navi0-1.nif", "Navi0-2.nif", "Navi0-3.nif", and "Navi0-4.nif" stored in the navigation information storage unit 5108. Here, each set of navigation information stored in the "navigation information" column is given in ascending order of valid start time. This is also the case for the other lines in the construction information table 5801.

FIG. 13 shows an example of the entry information stored in the construction information storage unit 5109. This entry information 5901 shows that the content number of the entry content of the application stored in the transmission data storage unit 5102 is "0".

1-2-2 Multiplexing Information Storage Unit 5104

The multiplexing information storage unit 5104 stores the multiplexing information table for the resource assigning information for identifiers and areas used when multiplexing the interactive program into an MPEG2 transport stream for broadcasting.

FIG. 14 shows an example of the multiplexing information table stored by the multiplexing information storage unit 5104. The multiplexing information table 6001 in this figure is a table which shows the various identifiers for the interactive program and its composite elements, as well as the various bit rates used in transmission.

In FIG. 14, the rows 6002 to 6005 for the "original_network_id", "transport_stream_id", "service_id", and "event_id" show the values of the identifiers assigned to the interactive programs when multiplexing the program into the MPEG2 transport stream used for broadcasting the interactive program. In a standard satellite digital broadcasting system, transmission of one or more MPEG2 transport streams is performed from a single satellite (network) using carrier waves on separate frequency bands. Here, each broadcast program is multiplexed into the MPEG2 transport stream having been assigned its own "original_network_id", "transport_stream_id", "service_id", and "event_id" in accordance with ETS 300 468 Standard (hereinafter, referred to as "DVB-SI Standard").

The original_network_id is a unique identifier which identifies the network.

The transport_stream_ID is a unique identifier which identifies the transport stream in a network.

The event_ID is a unique identifier which identifies one event on a transport stream. Here, an event is a collection of a number of components, and is the equivalent of the concept of a "program" which is used in conventional analog broadcasting.

A component is a stream (program element) identified by a PID (packet identifier) under IS/IEC 13818-1 Standard (MPEG2 system standard), and represents one compositional element of a program, such as video or audio. As one example, each set of video data shown in FIG. 12, each set of audio data, and each collection of sets of navigation information in each content is a separate component.

In the present embodiment, a service is a collection of sequences of events, which is the equivalent of one channel in conventional analog broadcasting. The interactive program described above is one time segment on such a service.

A transport stream is a collection of a plurality of services. Here, bandwidth can be assigned to transport streams and services in a variety of ways, with, for example, each transport stream being assigned around 30 Mbps and each service being assigned around 5 Mbps. In such a case, each transport stream is the equivalent of six channels. The transfer rates used for the interactive programs transmitted as events, meanwhile, will greatly differ since different numbers of contents and differing amounts of video data are included.

Each program (event) transmitted using a digital broadcasting system in accordance with DVB-SI standard can be uniquely specified in every digital broadcasting system using a combination of the "original_network_id", "transport_stream_id", "service_id", and "event_id". The details of the "original_network_id", "transport_stream_id", "service_id", and "event_id" are given in the documentation for DVB-SI standard.

The "PMT_PID" column 6006 and "PCR_PID" column 6007 express the values of the PID which are assigned to the PMT (Program Map Table) and the PCR (Program Clock Reference). The PMT referred to here is one of the system information tables multiplexed into the transport stream and is a table that shows the correspondence between the various streams which express the video data and audio data (components) included in an event and the identifiers (packet identifiers: PIDs) of the packets used to transfer these components. The PCR is also one of the system information tables and is time information that is used as a standard in the digital broadcasting apparatus 5101 when data for each content is multiplexed into the multiplexed stream, as well as being used as the standard time information when each event is reproduced by the reception apparatus 5121.

The "NE_component(0)_Bitrate" column 6008 and the "NE_component(0)_pid" column 6009 show the values of the transfer rate and PID which are assigned to each component for transferring navigation information tables which are included in content 0. This is also the case for "NE_component(1)_Bitrate" onwards. Here, "NE" is an abbreviation for "Navigation Element".

The "VE_component(0)_Bitrate" column 6010 and the "VE_component(0)_pid" column 6011 show the values of the transfer rate and PID which are assigned to each component for transferring the video data corresponding to the component_tag number "0x00". This is also the case for "VE_component(1)_Bitrate" onwards. Here, VE is an abbreviation for "Video Element".

The "AE_component(0)_Bitrate" column 6012 and the "AE_component(0)_pid" column 6013 show the values of the transfer rate and PID which are assigned to each component for transferring the audio data corresponding to the component_tag number "0x00". This is also the case for "AE_component(1)_Bitrate" onwards. Here, AE is an abbreviation for "Audio Element".

It should be noted that in the present embodiment, the number of PIDs for transferring navigation information is kept equal to the number of contents so that the PIDs may be used to identify each set of navigation information, although the number of PIDs for transferring navigation information may be less than the number of contents, and may for example be "1". In such a case, a combination of a PID and another parameter (such as a "table_id_extension" under MPEG2 standards) may be used as the information for identifying each set of navigation information. This is also the case for the video data and audio data included in the presentation information which may each be identified by a combination of a PID and another parameter, such as the stream_id under MPEG2 standard. By doing so, even if the number of PIDs that may be used in each transport stream is limited to a given number, a number of contents which exceeds this given number may still be transmitted.

1-2-3 Data Multiplexing Unit 5103

The data multiplexing unit 5103 shown in FIG. 4 first (a) assigns a variety of identifiers to each of the contents stored in the transmission data storage unit 5102 (or in other words, generates a content identifier assigning table), (b) assigns version numbers to each set of navigation information (or in other words, generates a version number assigning table), (c) instructs the navigation information table generating unit 5111 to generate a navigation information table, (d) instructs the system information table generating unit 5105 to generate the system information tables, and (e) multiplexes the presentation information in accordance with these tables so that the reproduction times of the presentation information are aligned, as well as repeatedly multiplexing each set of navigation information corresponding to the presentation information for the period that the navigation information is valid. To do so, the data multiplexing unit 5103 includes a multiplexing control unit 5110, a navigation information table generating unit 5111, and a multiplexing unit 5112.

The process (c) described above is performed by the navigation information table generating unit 5111, while the processes (a), (b), and (e) are performed by the multiplexing control unit 5110. Process (d) meanwhile, is performed by the system information table generating unit 5105.

1-2-3-1 Multiplexing Control Unit 5110

The multiplexing control unit 5110 can be composed of a CPU (Central Processing Unit), a ROM (Read Only Memory) storing a program, and a RAM (Random Access Memory) used as a work area, and generates the content identifier assigning table and the version number assigning table (processes (a) and (b) above), as well as generating a multiplexing instruction for each set of presentation information and each set of navigation information in accordance with these tables, and informing the multiplexing unit 5112 of these multiplexing instructions (process (e) above). These multiplexing instructions include the various identifiers needed for multiplexing, the multiplexing start position in the transport stream, and the transfer rate, for each set of video data and audio data in the presentation information and for each set of navigation information.

In more detail, the process (e) involves the multiplexing control unit 5110 generating multiplexing instructions so that the reproduction times of each set of video data and audio data in the presentation information overlap. As one example, it may generate multiplexing instructions which set the multiplexing start positions of video data and audio data at the same time. For sets of navigation information, the multiplexing control unit 5110 may generate multiplexing instructions so that the sets of navigation information are repeatedly multiplexed during the reproduction period of the presentation information in the same content. This is to say, a plurality of multiplexing start positions are set for each set of navigation information, with multiplexing instructions being generated for each of these multiplexing start positions.

1-2-3-2 Multiplexing Control Unit 5110: (a) Generation of the Content Identifier Assigning Table On being activated by the transmission unit 5106, the multiplexing control unit 5110 reads the construction information table and multiplexing information table stored in the construction information storage unit 5109 and in the multiplexing information storage unit 5104, and generates the content identifier assigning table.

FIG. 15 shows an example of a content identifier assigning table generated from the construction information table 5801 shown in FIG. 12 and the multiplexing information table 6001 shown in FIG. 14.

This content identifier assigning table 6101 is composed so that the values in the "original_network_id" column 6002, the "transport_stream_id" column 6003, the "service_id" column 6004, and the "event_id" column 6005 of the multiplexing information table 6001 are written into the "orig_nw_id" column 6103, the "ts_id" column 6104, the "VE_svc_id" column 6105, and the "VE_event_id" column 6106. In the same way, the values in the "service_id" column 6003 and the "event_id" column 6005 are written into the "AE_svc_id" column 6108 and the "AE_event_id" column 6109. This is also the case for the "NE_svc id" column 6111 and the "NE_event_id" column 6112.

Each set of video data is assigned a two-digit hexadecimal component tag in order starting from "0x00", with these values being written into the "VE_comp_tag" column 6107. As examples, video data "Video0.m2v" is assigned the component tag "0x00" and video data "Video1.m2v" is assigned the component tag "0x01", with these values being written into the "VE_comp_tag" column 6107.

These component tags are values which are freely one-to-one assigned to each PID, and are used to indirectly refer to each PID. In the present embodiment, the component tags with the value "N" correspond to the PIDs given by the "VE_component(N)_pid" in the multiplexing information storage unit 5104. This correspondence between PIDs and component tags is given in the PMT which is described later in this specification. By doing so, the reception apparatus 5121 is able to refer to the component tags written in the "descriptor" column of the PMT and so determine the PID, before using this PID to obtain the desired video or other data. Here, even if different values for the PIDs are written in the system information tables when the interactive program is multiplexed with other programs by the transmission unit 5106, the reception apparatus 5121 will still definitely be able to obtain the desired video data.

It should be noted here that if a component tag is not used, the values of the PIDs may be directly written into the "VE_comp_tag" and "AE_comp_tag" columns. When doing so, if the PIDs are rewritten using different values in the system information tables during the multiplexing into the transport stream by the transmission unit 5106, the values of the PIDs in these columns in the navigation information table may also be appropriately rewritten.

In the same way, each set of audio data is assigned a component tag which is written into the "AE_comp_tag" column 6110. As examples, audio data "Audio0.m2a" is assigned the component tag "0x00" and audio data "Audio1.m2a" is assigned the component tag "0x01", with these values being written into the "AE_comp_tag" column 6110.

A four-digit hexadecimal value is written into the "NE_id" (navigation information identifier) column 6113 of the content identifier assigning table 6101, with this value being incremented by one for each content number 6102.

It should be noted that the "VE_id" and "AE_id" in FIG. 15 are information which is used to identify page-based contents. In this first embodiment, the interactive program is assumed to be entirely composed of stream-based contents, so that the "VE_id" and "AE_id" columns are not used.

The details of these columns are given in the second and following embodiments.

1-2-3-3 Multiplexing Control Unit 5110: (b) Generation of the Version Number Assigning Table On completing the generation of the content identifier assigning table 6101, the multiplexing control unit 5110 generates the version number assigning table.

More specifically, the multiplexing control unit 5110 refers to the construction information table 5801 and assigns version numbers, which start at "0" and are incremented by one each time, to each set of navigation information with the same content number, starting from the in order from the first set of navigation information. It should be noted here that when the version number exceeds "31", the next assigned version number will be "0", with numbers incremented by "1" being used thereafter.

FIG. 16 shows an example of the version number assigning table. In this example, the sets of navigation information "Navi0-0.nif", "Navi0-1.nif", "Navi0-2. nif" . . . are assigned the version numbers "0x00", "0x01", "0x02" . . . This is also the case for the navigation information in contents 1–3.

On completing the generation of the version number assigning table 6201, the multiplexing control unit 5110 instructs the navigation information table generating unit 5111 to generate the navigation information table.

1-2-3-4 Navigation Information Table Generating Unit 5111: (c)

On being instructed by the multiplexing control unit 5110 to generate the navigation information table, the navigation information table generating unit 5111 generates a navigation information table by replacing the content numbers of the link destinations in the hyperlink table with various identifiers which express each component that includes the contents which are the link destinations.

More specifically, the navigation information table generating unit 5111 reads the navigation information stored in the navigation information storage unit 5108, and, when a hyperlink table is included in the navigation information, refers to the content identifier assigning table generated by the multiplexing control unit 5110 using the information for the link destination given as a content number, changes the content numbers into various identifiers, and by doing so generates the navigation information table.

The navigation information table generating unit 5111 also stores the generated navigation information table in a storage area (not illustrated) as the navigation information table with the filename NVT (content number, version number). The navigation information table generating unit 5111 obtains this content number and version number by referring to the construction information table in the construction information storage unit 5109 and the version number assigning table in the multiplexing control unit 5110. When the read navigation information does not include a hyperlink table, the navigation information table generating unit 5111 stores the navigation information as it is in the storage area, changing only the filename.

FIG. 17 shows the generated navigation information table 6301 with the filename "NVT(0,0)". This navigation information table 6301 has been generated from the navigation information 5301 with the filename "Navi0.nif" shown in FIG. 7, and so corresponds to scene 01*b* shown in FIG. 5.

The navigation information table 6301 includes the object definition table 6302, the handler definition table 6303, the hyperlink table 6304, the bitmap table 6305, and the time information table 6306. With the exception of the filenames and the hyperlink table 6304, the content is the same as the navigation information 5301 shown in FIG. 7.

The hyperlink table 6304 is such that each content number in the hyperlink table 5304 of FIG. 7 has been converted to the various identifiers given in the content identifier assigning table 6101 shown in FIG. 15. The columns such as "orig_nw_id" in the hyperlink table 6304 are given as "-", with no identifiers having been entered. This shows that the contents belonging to the navigation information table 6301 have the same identifiers as the contents given as the link destinations, so that these do not need to be recorded in the table.

In the present example, the "Hyperlink Index 0" row shows that there is a link between scene 01b of content 0 shown in FIG. 5 to scene 11b of content 1. With the exception of the "NE_id" column, all of the entries in the "Hyperlink Index 0" row of the hyperlink table 6304 are "-", showing that the link destination, content 1, has the same images and audio as content 0, with only the navigation information table (NE_id) being different.

In the present example, the "Hyperlink Index 1" row shows that there is a link between scene 01b of content 0 shown in FIG. 5 to scene 21b of content 2. With the exception of the "VE_comp_tag", the "AE_comp_tag" and the "NE_id" columns, all of the entries in the "Hyperlink Index 1" row of the hyperlink table 6304 are "-", showing that the link destination, content 2, has different images (VE_comp_tag), audio (AE_comp_tag) and a different navigation information table (NE_id) to content 0.

Supposing here that the content which is the link destination belongs to a different service, the appropriate identifiers will be given in the "VE_service_id", the "AE_service_id", and the "NE_service_id". However, by omitting these identifiers when the values for the link destination are the same as those for the current content as in the example above, a reduction in the size of the navigation information table can be achieved.

It should be noted that the "VE_id" and "AE_id" columns in the hyperlink table in FIG. 17 include information used for identifying page-based contents. For the navigation information table NVT (0,0), all of the link destinations are stream-based contents, so that no entries are made into the "VE_id" and "AE_id" columns. The case where page-based columns are included as link destinations is explained in the second and following embodiments.

FIG. 18 shows the navigation information table 6401 with the filename NVT (1,0). This navigation information table 6401 has been generated from the navigation information 5401 with the filename "navi1-0.nif" shown in FIG. 8, and so corresponds to scene 11b in content 1 shown in FIG. 5.

Since navigation information 5401 does not include a hyperlink table, the content of navigation information table 6401 is the same as navigation information 5401. However, the link from scene 11b of content 1 to content 0 is expressed by the handler definition table 6403 in FIG. 18 and the entry information shown in FIG. 13.

In the same way, the navigation information table 6501 with the filename NVT (0,1) is shown in FIG. 19, the navigation information table 6601 with the filename NVT (1,1) is shown in FIG. 20, and the navigation information table 6701 with the filename NVT (2,0) is shown in FIG. 21. These have been respectively generated from the navigation information 5501 with the filename "navi0-1.nif" shown in FIG. 9, from the navigation information 5601 with the filename "navi1-1.nif" shown in FIG. 10, from the navigation information 5701 with the filename "navi2-0.nif" shown in FIG. 11.

On completing the generation of the navigation information table, the navigation information table generating unit 5111 informs the multiplexing control unit 5110. On receiving notification of the completion of the generation of the navigation information table, the multiplexing control unit 5110 instructs the system information table generating unit 5105 to generate the system information tables. The generation of the system information tables (d) is described later in this specification.

1-2-3-5 Multiplexing Control Unit 5110: Generation of Multiplexing Instructions On receiving notification of the completion of the generation of the system information tables, the multiplexing control unit 5110 first reads the value of "PCR_PID" from the multiplexing information storage unit 5104 and notifies the multiplexing unit 5112. This action is performed so that the multiplexing unit 5112 can multiplex the time information (PCR), which is set as a standard when multiplexing each set of content data into the multiplexed stream.

Next, the multiplexing control unit 5110 generates multiplexing instructions for the presentation information and sends these instructions to the multiplexing unit 5112.

More specifically, the multiplexing control unit 5110 generates multiplexing instructions for the video data and the audio data included in all of the contents with a multiplexing start position of "0", so that the presentation information in all of the contents will be multiplexed with overlapping reproduction times. This reproduction start time is a relative time with the transmission start time being set at "0".

Each multiplexing instruction for video data and audio data includes a multiplexing start position, a PID, and a bit rate. As one example, for the video data "Video0.m2v" of content 0 in the construction information table 5801, the multiplexing control unit 5110 refers to the content identifier assigning table 6101 and reads the value "0x00" of the "VE_comp_tag" 6107 of this video data. The multiplexing control unit 5110 then refers to the multiplexing information table 6001 and reads the value "0x0096" of the "VE_component(0)_pid" 6011 to obtain the PID of this video data and reads the value "4 Mbps" as the "VE_component(0)_Bitrate" 6010. The multiplexing control unit 5110 then informs the multiplexing unit 5112 of this PID and this bit rate in addition to the multiplexing start position.

The multiplexing control unit 5110 next generates multiplexing instructions for navigation information according to the process described below, before notifying the multiplexing unit 5112 of these instructions.

The multiplexing control unit 5110 generates multiplexing instructions for each content so that the navigation information tables included in each content will be repeatedly multiplexed during their valid time periods. As one example, the multiplexing control unit 5110 repeatedly generates multiplexing instructions for the navigation information table 6301 (NVT(0,0)) shown in FIG. 17 during its valid period which, as shown by the time information table 6306 is from the start_time (5 seconds) to the end_time (65 seconds). In the present embodiment, however, the navigation information tables are multiplexed at a predetermined time (such as one second) before their valid start_times. Navigation information tables are multiplexed this predetermined time before their valid start_times to give the reception apparatus 5121 enough of a margin to process the navigation information tables.

The multiplexing instructions for navigation information tables each include a multiplexing start position, a PID, a transfer amount (bit rate), a version number, and a table_id_extension.

As one example, when multiplexing the navigation information table with the filename "NVT(0,0)" shown in FIG.

17, the multiplexing control unit 5110 sets the multiplexing start position the predetermined time before the valid start_time (resulting here in a time of four seconds), reads the value "0x0092" of the "NE_component(0)_pid" 6009 and the value "1 Mbps" of the "NE_component(0)_Bitrate" 6008 from the multiplexing information table 6001, and informs the multiplexing unit 5112 of these values as the PID and the bit rate. Also, the multiplexing control unit 5110 reads the value "0x0000" of the "NE_id" 6113 corresponding to content number 0 from the content identifier assigning table 6101 and informs the multiplexing unit 5112 of this value as the table_id_extension.

The multiplexing control unit 5110 then calculates the next multiplexing start position by dividing the transfer rate (bit rate) used for transferring the present navigation information by the size of present navigation information table, and generates the next multiplexing instruction as described above.

The multiplexing control unit 5110 repeats the above process, successively finding the next multiplexing start positions, generating multiplexing instructions, and informing the multiplexing unit 5112 of the multiplexing instructions, until the valid end_time is reached. By doing so, the navigation information table NVT (0,0) is repeatedly multiplexed into the multiplexed stream between the four-second mark and the sixty-five-second mark.

By repeating the processing described above, the multiplexing control unit 5110 generates multiplexing instructions for the other navigation information tables NVT(0,1), NVT(0,2) . . . included in content 0, the navigation information tables NVT(1,0), NVT(1,1) . . . included in content 1, and so on, and informs the multiplexing unit 5112 of these multiplexing instructions.

1-2-4 System Information Table Generating Unit 5105: (d)

On being instructed by the multiplexing control unit 5110, the system information table generating unit 5105 generates the system information tables. These system information tables are made up of a variety of tables which store information that is used to identify multiplexed streams in the transport stream, which is to say various kinds of information used by the reception apparatus 5121 to select events.

More specifically, the system information table generating unit 5105 refers to the multiplexing information storage unit 5104 and generates the NIT (Network Information Table), the EIT (Event Information Table), the SDT (Service Description Table), and the PAT (Program Association Table), in accordance with ETS 300 468 (DVB-SI) standard and IS/IEC 13818-1 (MPEG2 system) standard.

The NIT referred to here is used to record physical information related to the transfer path for each transport stream transferred on a specified network. FIG. 22A shows an example of an NIT, NIT 6801, which is generated by the system information table generating unit 5105. In this example, the transport stream identified by the transport_stream_id "0x0001" for the original_network_id "0x0001" is transmitted on the network identified by the network_id "0x0001", with the "transfer preface" expressing the frequency and modulation method of the transmission.

The SDT stores information, such as service names, for each service included in a specified transport stream. An example, SDT 6802, of the SDT generated by the system information table generating unit 5105 is shown in FIG. 22B. In this example, the service identified by the service_id value "0x0002" is included in the transport stream with the transport_stream_id "0x0001", with information such as the service names being written into the column headed "Service name and other information".

The EIT stores information, such as event names, start times, and end times, for each of the events on a specified service. An example, EIT 6803, of the EIT generated by the system information table generating unit 5105 is shown in FIG. 22C. In this example, the event identified by the event_id "0x0002" on the service identified by the service_id "0x0002" is included, with information such as the event name being written into the column headed "Event name and other information".

The PAT includes information for the PIDs of the PMT (Program Map Table) for each program included in a specified transport stream. An example, PAT 6901, of the PAT generated by the system information table generating unit 5105 is shown in FIG. 23. In this example, the program identified by the program_no "0x0002" is included in the transport stream with the transport_stream_id "0x0001", with the PID of this PMT being given as "0x0090". Here, the program_no matches the service_id, and a "program" is equivalent to an "event".

The system information table generating unit 5105 refers to the multiplexing information storage unit 5104, the multiplexing control unit 5110, and the construction information storage unit 5109 and generates, in accordance with MPEG2 system standards, the PMTs corresponding to the multiplexed programs which use the transmission data stored in the transmission data storage unit 5102. An example of a PMT generated by the system information table generating unit 5105 from the multiplexing information table 6001 shown in FIG. 14, the content identifier assigning table 6101 shown in FIG. 15, and the entry information 5901 shown in FIG. 13, is shown in FIG. 24.

During the generation of PMT 7001, "program_number" is a value showing the program number of a program (or in other words, event) in which transmission data is multiplexed, with the value "0x0002" of the "service_id" 6004 in the multiplexing information table 6001 being extracted and written in as this "program number".

The "PCR_PID" 20 is a value showing the PID of the packet which includes the clock information (PCR) which is used as the standard for decoding the present program. In the present example, the value "0x0091" of the "PCR_PID" in multiplexing information table 6001 is extracted and is written in as this "PCR PID".

Figure 25:
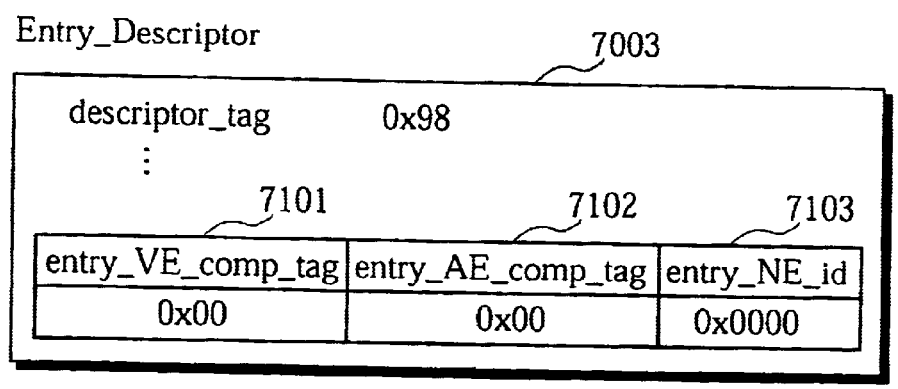
FIG. 25 shows the detailed content of the Entry_Descriptor in the PMT generated by the system information table generating unit in the present embodiment.

The "Entry_Descriptor" 7003 is the descriptor which includes information for the identifier of an entry content which is the first content to be reproduced when the present program is selected. FIG. 25 shows the details of the "Entry_Descriptor" included in PMT 7001. Here, the descriptor_tag of "Entry_Descriptor" 7003 is an identifier showing the type of descriptor and is set a value such as "0x98" that is predetermined for an entry_descriptor. The "entry VE_comp_tag", the "entry_AE_comp_tag" and the "entry_NE_id" columns are used to show the values of the identifiers which are used for the image data, audio data, and navigation information which compose the entry content.

In generating the PMT, the system information table generating unit 5105 refers to the construction information storage unit 5109 and obtains the content number "0" of the entry content. The system information table generating unit 5105 then obtains the value "0x00" of the "VE_comp_tag" 6107, the value "0x00" of the "AE_comp_tag" 6110, and the value "0x0000" of the "NE_id" 6113 of the content whose content number is "0", and writes these values into the "entry_VE_comp_tag", the "entry AE_comp_tag", and the "entry NE_id" columns.

The table 7004 in the PMT 7001 shows the "stream_type" 7006 indicating the type of data which is transmitted in each component and a "descriptor" 7007 which expresses additional information, for each value of the "PID" 7005 of the components which compose the present program. The first row of table 7004 is used to record the value "0x0092" of the "NE_component(0)_pid" read from the multiplexing information table 6001, the value "0x05" showing that the data type of the transferred data is section data, and the "NE_Component_Descriptor(0)" 7201 shown in FIG. 26A. This "NE_Component_Descriptor(0)" shows that navigation information which has a value of NE_id which is equal to or above the "min_NE_id" and equal to or less than the "max_NE_id" is transferred using the component to which this descriptor is attached. In the present embodiment, the component identified by the "NE_component(0)_pid" 6009 is used to multiplex the navigation information for the content with the content number 0, so that the value "0x0000" of the "NE_id" 6113 read from the content identifier assigning table 6101 corresponding to the content number 0 is written into the "min_NE_id" and into the "max_NE_id". A value showing the type of descriptor (in this case "0x99"), is written into the "descriptor_tag".

On the second to fourth rows of table 7004, values of the "NE_component(1)_pid", "NE_component(2)_pid", and "NE_component(3)_pid" read from the multiplexing information table 6001 are written into the "PID" column, with the "stream_type" being set at "0x05" and the NE_Component_Descriptor(1) 7202 shown in FIG. 26B, the NE_Component_Descriptor(2) 7203 shown in FIG. 26C, and the NE_Component_Descriptor(3) 7204 shown in FIG. 26D being set in the "descriptor" column.

Figure 27A:
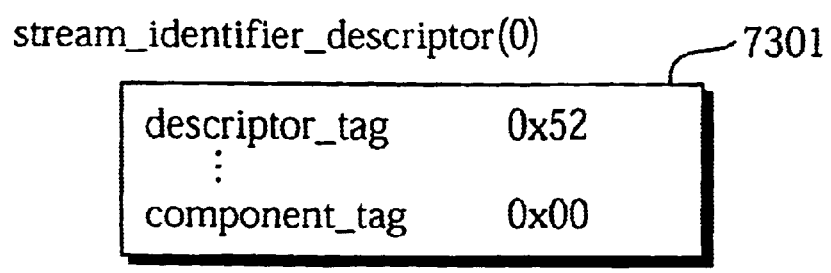
FIGS. 27A and 27B show the details of the stream_identifier_descriptor in the PMT generated by the system information table generating unit in the present embodiment.

On the fifth row of table 7004, the value "0x0096" of the "VE_component(0)_pid" 6011 read from the multiplexing information table 6001, the value "0x02" showing that the data type of the transferred data is image data, and the "stream_identifier_descriptor(0)" 7301 shown in FIG. 27A are recorded. The "stream_identifier_descriptor(0)" 7301 shows that the component tag of the component for this PID is "0x00". The value of the "descriptor_tag" is set a value, such as "0x52", showing the type of descriptor.

Figure 27B:
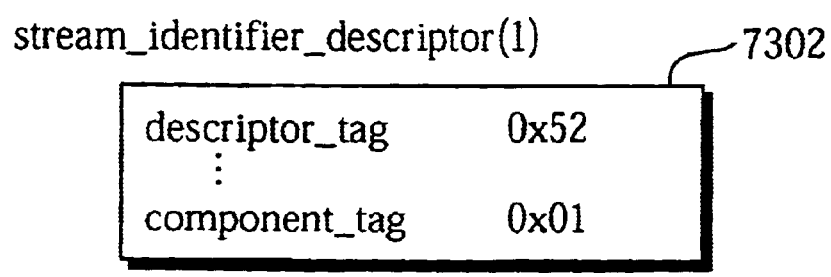

On the sixth row of table 7004, the value of the "VE_component(1)_pid" read from the multiplexing information table 6001, the value "0x02" for the "stream type", and the "stream identifier descriptor(1)" 7301 shown in FIG. 27B are recorded.

On the seventh and eighth rows of table 7004, the values of the "AE_component(0)_pid" and the "AE_component(1)_pid" read from the multiplexing information table 6001, the value "0x03" for the "stream type" showing that the data is audio data, and the "stream_identifier_descriptor(0)" and "stream identifier descriptor(1)" are recorded.

1-2-5 Multiplexing Unit 5112

Based on the multiplexing instructions sent from the multiplexing control unit 5110, the multiplexing unit 5112 multiplexes the content data into an MPEG2 transport stream according to a method which is standardized for MPEG2 system standard. The multiplexing unit 5112 then successively outputs the generated transport stream data to the transmission unit 5106.

In more detail, on receiving a multiplexing instruction for image data from the multiplexing control unit 5110, the multiplexing unit 5112 reads the image data from the presentation information storage unit 5107 and converts it into a data stream, before multiplexing this data stream into the transport stream starting from the indicated start position using the indicated PID and bit rate. Similarly, on receiving a multiplexing instruction for audio data from the multiplexing control unit 5110, the multiplexing unit 5112 reads the audio data from the presentation information storage unit 5107 and converts it into a data stream, before multiplexing this data stream into the transport stream starting from the indicated start position using the indicated PID and bit rate.

On receiving a multiplexing instruction for a navigation information table from the multiplexing control unit 5110, the multiplexing unit 5112 reads the navigation information table from the navigation information table generating unit 5111 and converts it into a data stream, before multiplexing this data stream into the transport stream starting from the indicated start position using the indicated PID, table_id_extension, version_no, and bit rate.

As for the PCR, the multiplexing unit 5112 sets the initial value at the start of the generated transport stream at "0", and multiplexes the PCR using the PCR_PID sent from the multiplexing control unit 5110.

Figure 28A:
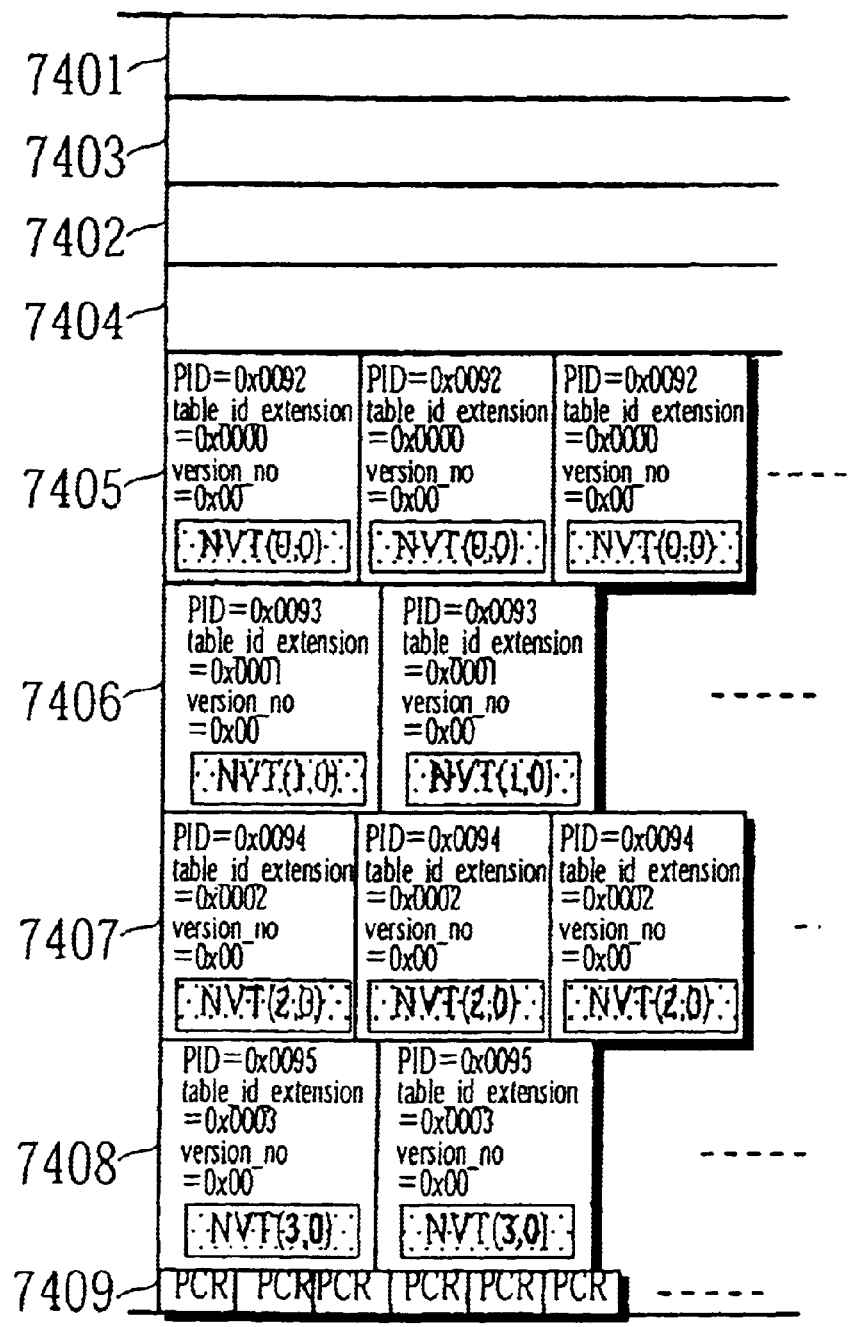
FIGS. 28A, 28B and 28C are a graphic representation of a transport stream multiplexed by the multiplexing unit in the present embodiment.
Figure 28B:
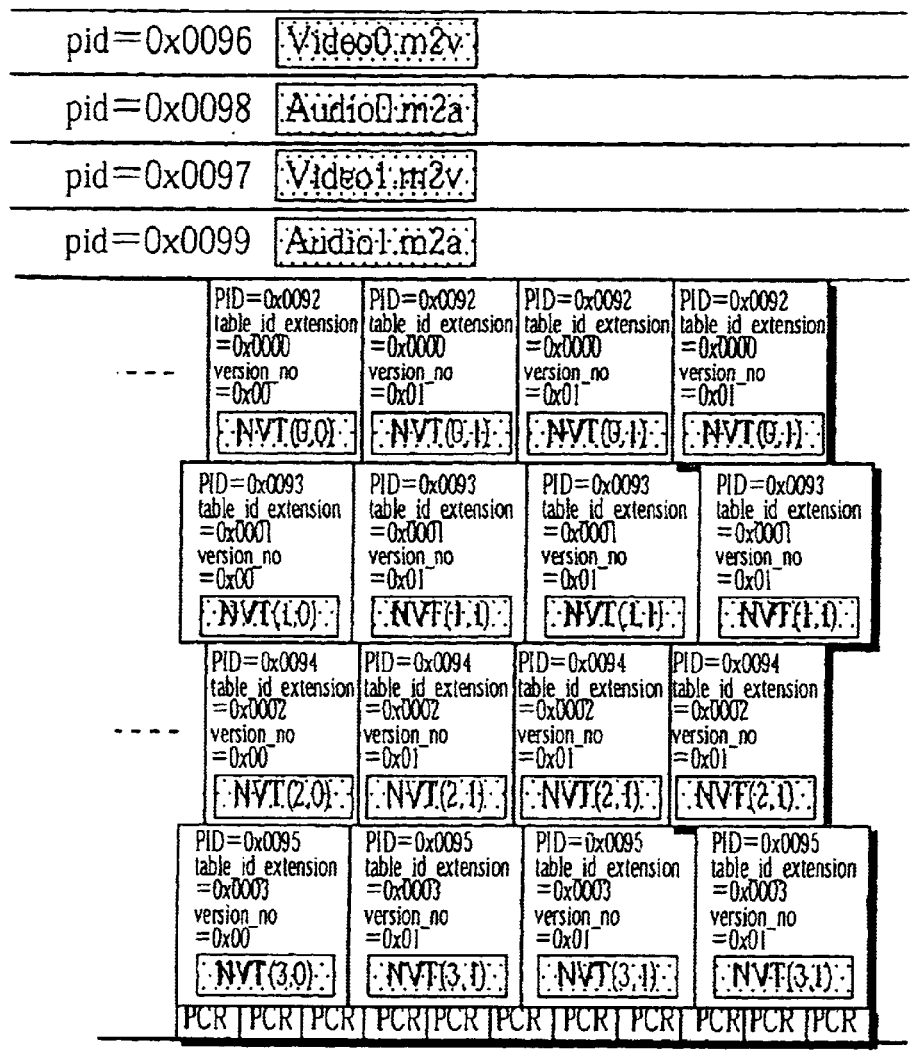
Figure 28C:
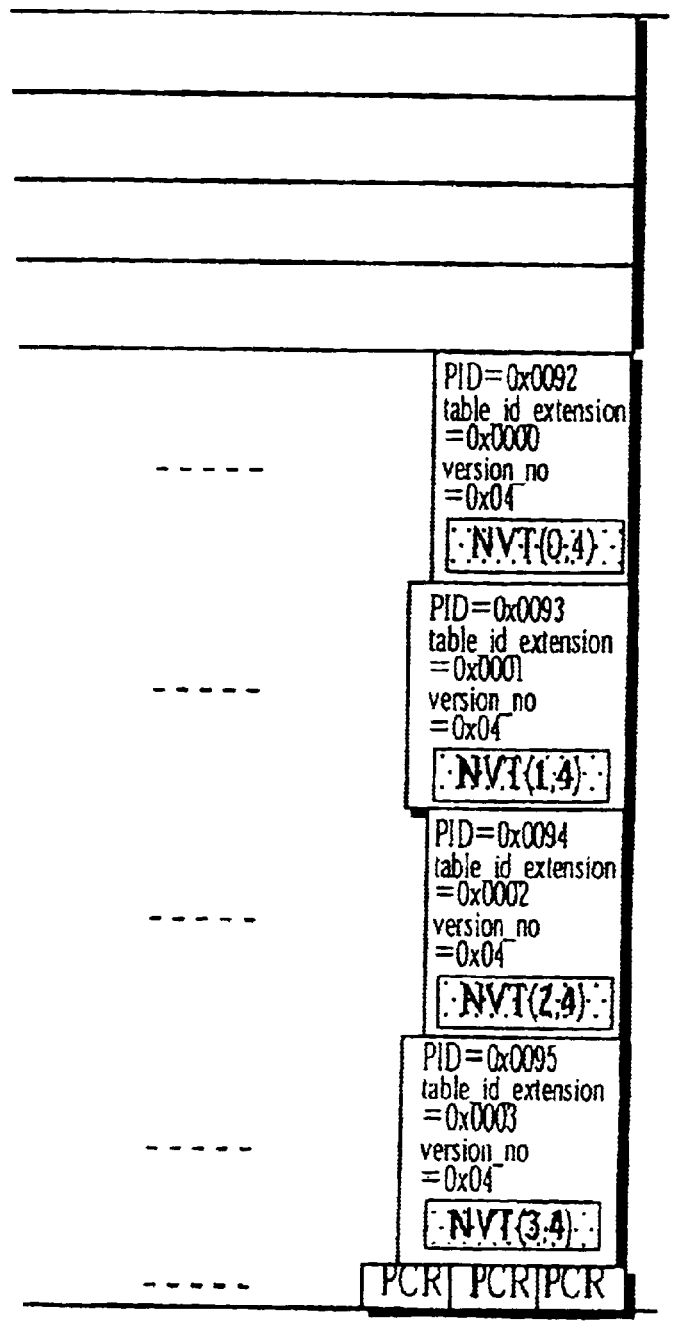

FIG. 28 (collectively FIGS. 28A, 28B and 28C) shows an example of the multiplexed stream generated by the multiplexing unit 5112. The horizontal axis in this figure represents elapsed time, while the vertical axis represents the content data and PCR which are multiplexed at the same time.

The element 7401 in FIG. 28 shows the video data stream that is the result of the conversion by the multiplexing unit 5112 of the video data "Video0.m2v" which is common to both content 0 and content 1 into a data stream. This video data stream has been given the PID "0x0096". This video data stream 7401 is shown as one consecutive data stream in FIG. 28, although in reality this data stream is divided into packets of a predetermined length (these packets being called 188-byte transport packets) by the multiplexing unit 5112 and being multiplexed with the allocated bit rate of 4 Mbps. In the same way, element 7402 is the video data stream which is shared by content 2 and content 3.

Element 7403 in FIG. 28 shows the audio data stream that is the result of the conversion of the audio data "Audio0.m2a" which is shared by content 0 and content 1 into a data stream by the multiplexing unit 5112. This audio data stream has been additionally assigned the PID "0x0098". This audio data stream is multiplexed using the assigned bit rate (0.5 Mbps). In the same way, element 7404 is the audio data stream which is commonly used by the content 2 and content 3.

Element 7405 is a data stream which is used for transmitting the navigation information tables included in content 0. This data has been multiplexed by the multiplexing unit 5112 using the assigned bit rate (1 Mbps). Each navigation information table in the data stream 7405 is assigned the PID "0x0092", the table_id_extension " 0x0000", and a version number from "0x00" to "0x04". These navigation information tables are multiplexed so that navigation information tables with the same version number are multiplexed a plurality of times, with the version number being progressively incremented as the reproduction time elapses. Here, the PID, table_id_extension, and version_no are used by the reception apparatus 5121 to identify each navigation information table in the data stream 7405. In the same way, elements 7406 to 7408 are data streams used to transfer the navigation information included in contents 1 to 3.

Element 7409 in FIG. 28 is the time information (PCR) used as the standard for setting the reproduction time, which is also multiplexed into the transport stream.

It should be noted here that every time the multiplexing unit 5112 receives a multiplexing instruction from the multiplexing control unit 5110, it may perform a multiplexing operation and generate a multiplexed stream in an intermediate state which is then stored in a storage unit (not illustrated). After completing the processing of all of the multiplexing instructions, the multiplexing unit 5112 may output the completed multiplexed stream to the transmission unit 5106. Alternatively, instead of immediately processing the multiplexing instructions, the multiplexing unit 5112 may store these instructions in a storage unit (not illustrated), before sorting the necessary multiplexing instructions and performing multiplexing in order of reproduction time to generate a multiplexed stream, which it may then successively output to the transmission unit 5106.

1-2-6 Transmission Unit 5106

The transmission unit 5106 includes a scheduler, and is activated by the multiplexing control unit 5110 at a predetermined time before the transmission start time of an event, such as five minutes before the start of the transmission. When the transmission start time is reached, the transmission unit 5106 repeatedly multiplexes information such as the NIT, PAT, PMT, SDT, and EIT generated by the system information table generating unit 5105 into the transport stream outputted by the multiplexing unit 5112 at a predetermined interval using predetermined PIDs in accordance with DVB-SI standard and MPEG2 system standard. The transmission unit 5106 then performs modulation and other processes, before transmitting the data to a plurality of data reception apparatuses 5121.

Figure 29A:
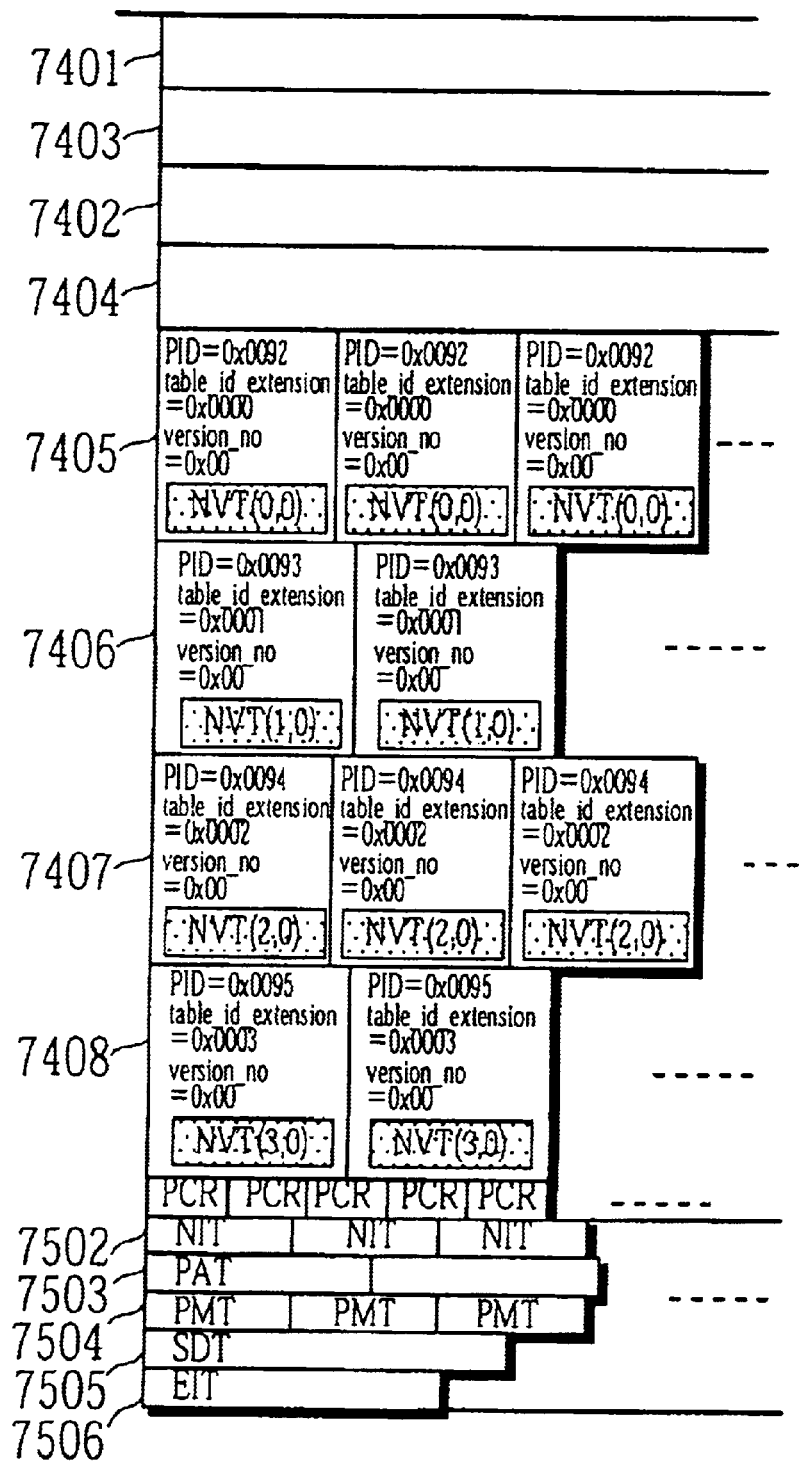
FIGS. 29a, 29b and 29c are a graphic representation of a transport stream multiplexed by the transmission unit in the present embodiment.
Figure 29B:
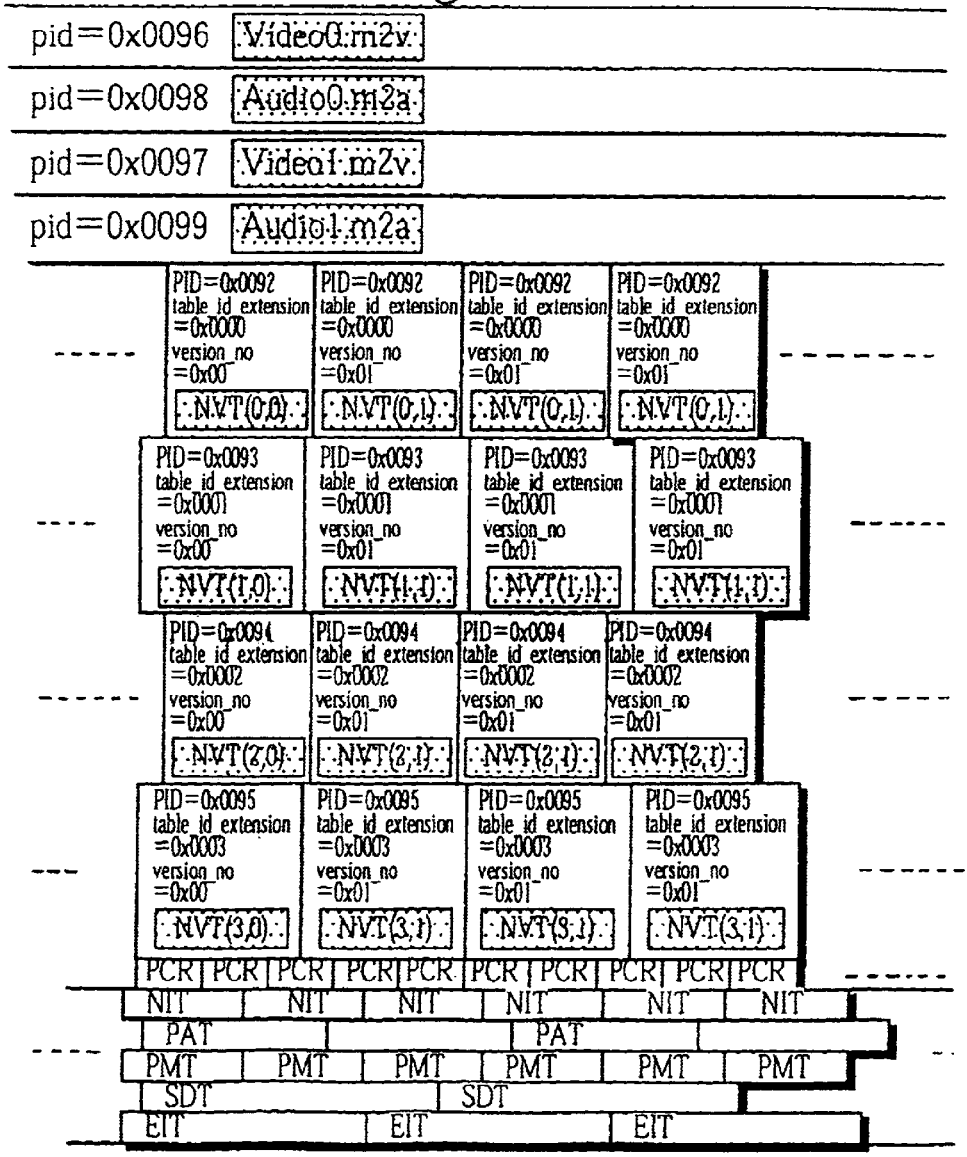
Figure 29C:
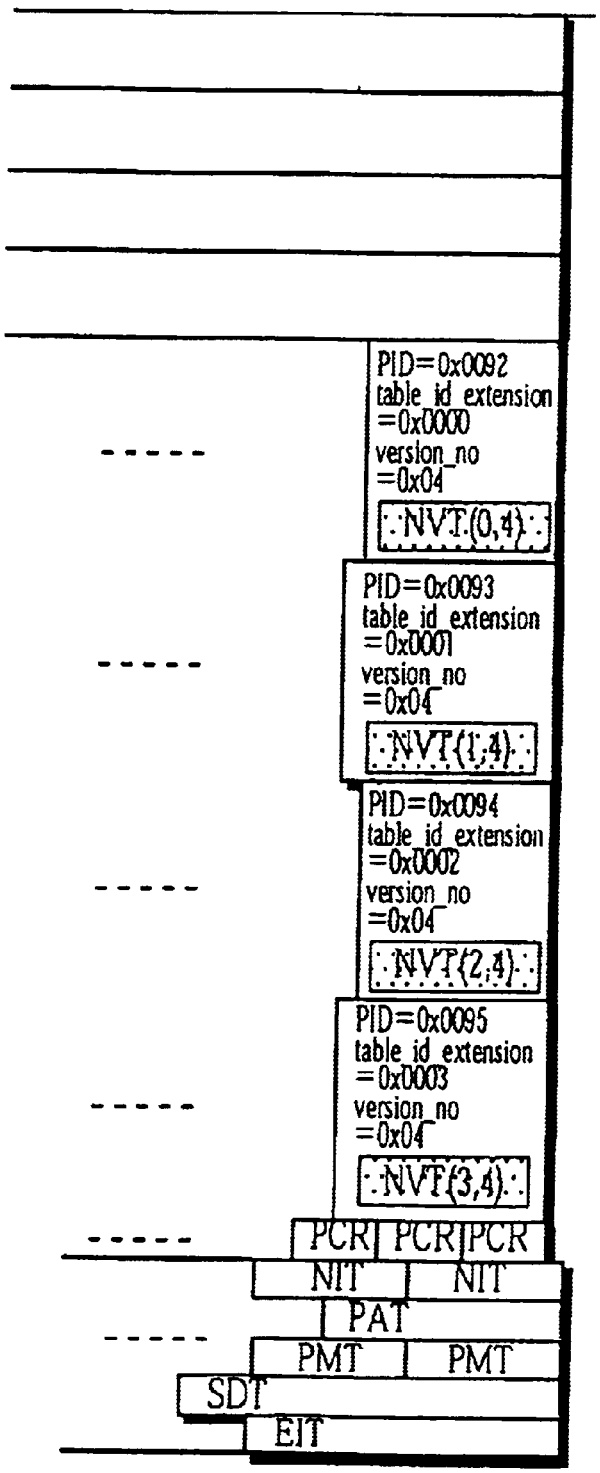

FIG. 29 (collectively FIGS. 29a, 29b and 29C) gives a model representation of a transport stream multiplexed by the transmission unit 5106. In this example, the NIT, the PAT, the PMT, the SDT, and the EIT have been additionally multiplexed into the transport stream multiplexed by the multiplexing unit 5112. In reality, a plurality of events have also been multiplexed into this transport stream by the transmission unit 5106, although only the event (interactive program) shown in FIG. 5 has been shown in FIG. 29.

1-2-7 Operation of the Data Broadcasting Apparatus 5101

The following is a description of the operation of the data transmission apparatus 5101 in the present embodiment, which is constructed as described above.

Figure 30:
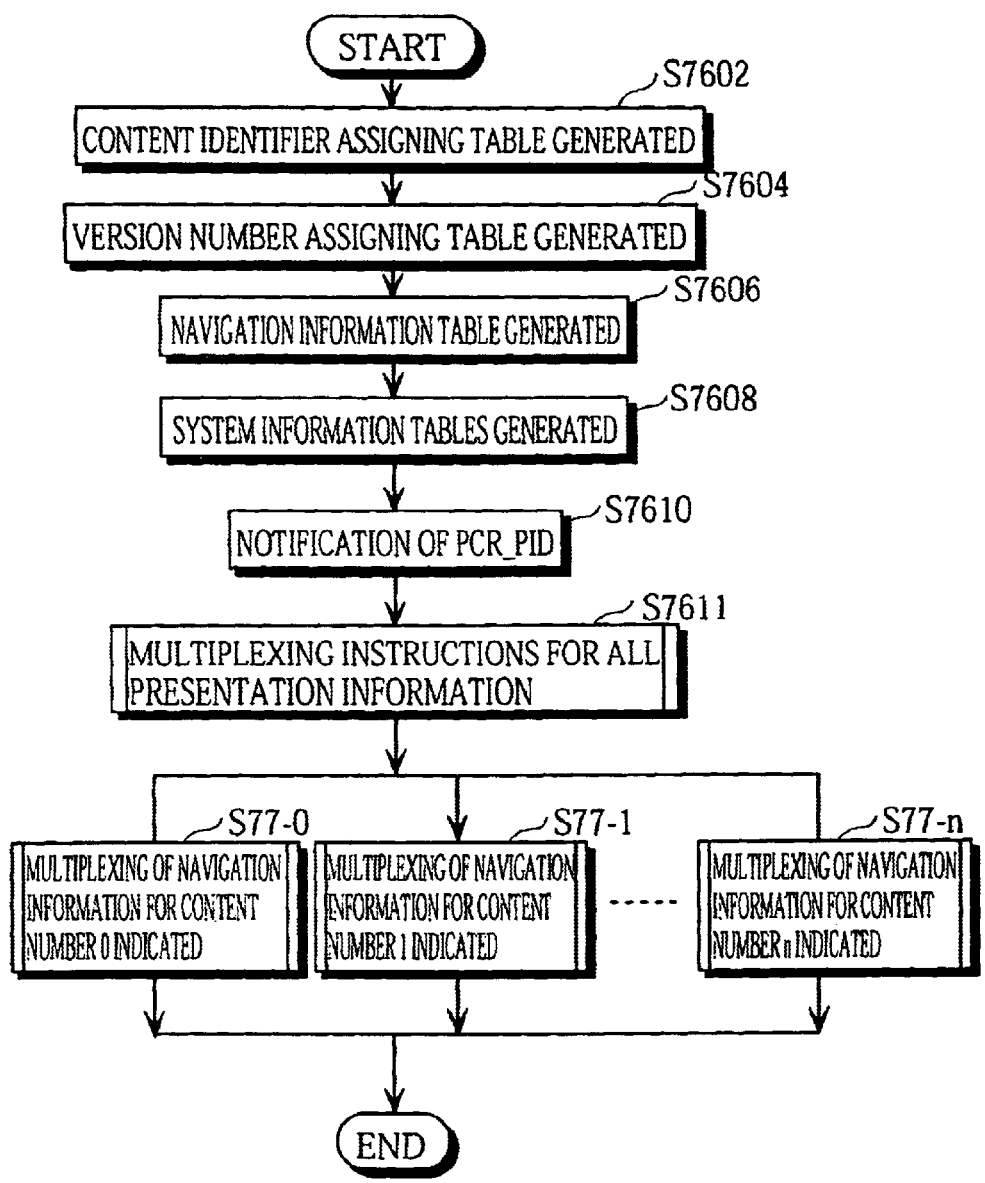

FIG. 30 is a flowchart showing the entire operation of the digital broadcasting apparatus 5101.

The multiplexing control unit 5110 first generates the (a) content identifier assigning table (S7602) and then generates the (b) version number assigning table (S7604). After this, the multiplexing control unit 5110 gives an indication for the generation of the (c) navigation information tables (S7606) and the generation of the (d) system information tables (S7608). Once the system information tables have been generated by the system information table generating unit 5105, the multiplexing control unit 5110 reads the value of the "PCR_PID" from the multiplexing information storage unit 5104 and notifies the multiplexing unit 5112 of this value (S7610).

After this, the multiplexing control unit 5110 instructs the multiplexing unit 5112 to multiplex the presentation information (S7611), and instructs the multiplexing unit 5112 to multiplex the navigation information (S77-0, S77-1, . . . S77-n). In doing so, the multiplexing control unit 5110 performs the processes in S77-0, S77-1, . . . S77-n in parallel for the n+1 contents from content 0 to content n, such as by generating n+1 tasks and performing multitask processing.

Figure 31:
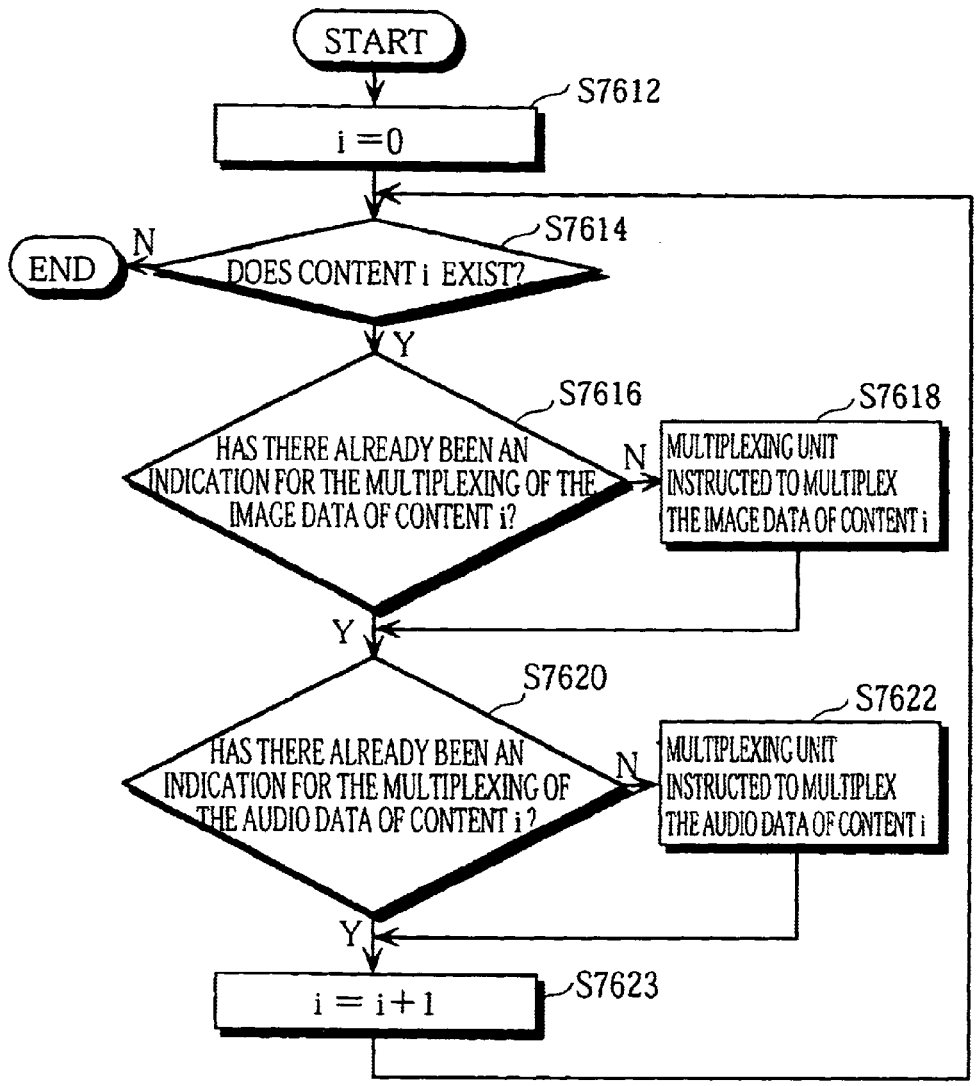

FIG. 31 is a flowchart showing the details of the generation of multiplexing instructions for the presentation information. In this figure, the variable i is the variable used for successively counting content numbers.

The multiplexing control unit 5110 initializes the variable i to "0" (S7612), and then refers to the construction information storage unit 5109 to determine whether the image data for the content whose content number is i has already been multiplexed (S7614, S7616).

The above determination is performed by the multiplexing control unit 5110 checking whether there are any contents with lower content numbers than i which include the same image data as content i. As one example, when this determination is performed using the construction information table 5801 shown in FIG. 12, when the content counter i is "0", the image data "Video0.m2v" is judged as not having been multiplexed, while when the content counter is "1", the present content has the same image data "Video0.m2v" as content 0, so that the multiplexing control unit 5110 judges that this image data has already been multiplexed.

When the image data has already been multiplexed, the multiplexing control unit 5110 does not have the data multiplexed again. When the image data has not been multiplexed, the multiplexing control unit 5110 instructs the multiplexing unit 5112 to multiplex the image data of the content with the content number i (S7618). In doing so, the multiplexing control unit 5110 informs the multiplexing unit 5112 of the multiplexing start position, the PID, and the bit rate. In this case, it informs the multiplexing unit 5112 of the value "0" (the start of the transport stream) as the multiplexing start position.

The multiplexing control unit 5110 also refers to the multiplexing information storage unit 5104 and reads the value of the PID of the component corresponding to the component tag assigned to the image data to be multiplexed, before informing the multiplexing unit 5112 of this value as the PID. In the same way, the multiplexing control unit 5110 refers to the multiplexing information storage unit 5104 and reads the bit rate corresponding to the component tag assigned to the image data to be multiplexed, before informing the multiplexing unit 5112 of this value as the bit rate.

As one example, when multiplexing the image data "Video0.m2v" of the content with the content number "0" in the construction information table 5801, the multiplexing control unit 5110 first refers to the content identifier assigning table 6101 and reads the value "0x00" of the "VE_comp_tag" 6107 for the image data of content 0. After this, the multiplexing control unit 5110 reads the value "0x0096" of the "VE_component(0)_pid" 6011 and the value "4 Mbps" of the "VE_component(0)_Bitrate" 6010 from the multiplexing information table 6001 and informs the multiplexing unit 5112 of these values.

In the same way as for image data, the multiplexing control unit 5110 then determines whether the audio data for the content whose content number is i has already been multiplexed (S7620). When the audio data has not been multiplexed, the multiplexing control unit 5110 instructs the multiplexing unit 5112 to multiplex the audio data, while when the audio data has already been multiplexed, the multiplexing control unit 5110 does not have a multiplexing operation performed.

The processes described above are performed for all of the contents. As a result, the multiplexing control unit 5110 issues multiplexing instructions for all sets of image data and audio data with the multiplexing start positions being set at "0".

FIG. 32 is a more detailed flowchart for the generation process of multiplexing instructions for navigation information shown as S77-0, S77-1, . . . S77-n in FIG. 30. This flowchart shows the multiplexing instructions for navigation information for the content i, out of the contents from content 0 to content n. As with other contents, these processes are executed in parallel. Here, the variable wp shows the time (seconds) of the multiplexing start position of each navigation information table where the starting point of the transport stream is set at "0". The variable endT, conversely, shows the end time for the repeated multiplexing of the navigation information table with a given version number.

The multiplexing control unit 5110 first initializes the version number v and the multiplexing start position wp to "0" (S7702). The multiplexing control unit 5110 then refers to the storage region of the navigation information table generating unit 5111 and investigates whether there is a navigation information table with the filename "NVT (i,v)" for the content number i, and the version number v (S7704). When no "NVT(i,v)" is present, the multiplexing control unit 5110 terminates the processing. When "NVT(i,v)" is present, the multiplexing control unit 5110 investigates whether a navigation information table with the filename "NVT(i,v+1)" is present (S7708).

When no "NVT(i,v+1)" is present, the multiplexing control unit 5110 reads the value of the valid end time "end time" from the navigation information table with the filename "NVT(i,v)" and sets it into the variable endT (S7710).

When a navigation information table "NVT(i,v+1)" is present, the multiplexing control unit 5110 compares the value of the valid end time "end_time" of the navigation information table with the filename "NVT1,v)" given by subtracting "1" from the valid start time "start_time" of the navigation information table with the filename "NVT(i,v+1), before setting the smaller of these values in the variable endT (S7714). As one example, when i=0 and v=0, the navigation information table "NVT(0,0)" is as shown in FIG. 17 and the navigation information table "NVT(0,1)" is as shown in FIG. 19, with the value of the end_time of navigation information table "NVT(0,0)" being "65" and the value of the start_time of navigation information table "NVT(0,1)" being "70". As a result, the multiplexing control unit 5110 compares the start time "65" of NVT(0,0) with the end time of NVT(0,1) minus 1 "69" and sets the smaller of these values, "65", into the variable endT. By doing so, the time period during which the navigation information table "NVT(0,0)" becomes the time period between wp=0 and endT=65.

The multiplexing control unit 5110 next calculates the multiplexing end position wp when multiplexing NVT(i,v) according to the equation wp=wp+{S_NVT(i,v)/Bi} and compares this value with the value of the variable endT (S7712). Here, S_NVT(i,v) is the size of the navigation information table NVT(i,v) when converted to a transport stream in accordance with MPEG2 system standards. The variable Bi, meanwhile, is the bit rate assigned to the component used for multiplexing the navigation information table "NVT(i,v), with the value of the bit rate assigned to this component being read from the multiplexing information storage unit 5104.

When the multiplexing end position wp is greater than the variable endT, the multiplexing control unit 5110 adds "1" to the version number v (S7716) and returns to the process in S7704.

When the multiplexing end position wp is equal to or less than the variable endT, the multiplexing control unit 5110 generates a multiplexing instruction for the navigation information table "NVT(i,v)" and sends it to the multiplexing unit 5112. In doing so, the multiplexing control unit 5110 informs the multiplexing unit 5112 of the value of the multiplexing start position wp, the value of the bit rate Bi, the value of the PID, the value of the table_id, the value of the table_extension_id, and the value of the version_no as the multiplexing instruction.

Here, to find the value of the PID, the multiplexing control unit 5110 reads the PID assigned to the component used for multiplexing the navigation information table of the content with the content number i from the multiplexing information storage unit 5104.

The multiplexing control unit 5110 finds the value of the table_id as a value (for example "0x90") which is predetermined for a navigation information table.

The multiplexing control unit 5110 obtains the table_id_extension by reading the value assigned to the "NE_id" of the content with the content number i in the content number assigning table 6101.

The multiplexing control unit 5110 obtains the version_no by reading it from the version number assigning table 6201 shown in FIG. 16.

As one example, for the navigation information table "NVT(0,0)" shown in FIG. 17, the first multiplexing instruction is composed of the multiplexing start position wp=0, PID=0x0092 (="NE_component(0)_pid"), Bi=1 Mbps, table_id=0x90, table_id_extension=0x0000 (=NE_id), and version_no=0x00.

After sending a multiplexing instruction to the multiplexing unit 5112, the multiplexing control unit 5110 resets the value of the multiplexing start position wp according to the equation wp=wp+{S_NVT(i,v)/Bi} (S7720), and repeats the processing starting from the determination of the multiplexing end position when the navigation information table with the filename NVT(i,v) has been multiplexed once again (S7712).

On receiving the multiplexing instructions generated as described above, the multiplexing unit 5112 generates a multiplexed stream. After this, the transmission unit 5106 multiplexes this multiplexed stream into a transport stream which it then transmits.

1-3 Overall Construction of the Reception Apparatus 5121

As shown in FIG. 4, the reception apparatus 5121 is composed of a reception unit 5122, a TS (Transport Stream) decoder unit 5123, an AV decoder unit 5124, a received data storage unit 5125, a reception control unit 5126, a signal reception unit 5127, a reproduction unit 5128, a display unit 5129, and an audio output unit 5130. This reception apparatus 5121 is constructed so as to interactively extract a content from the transport stream transmitted by the digital broadcasting apparatus 5101 in accordance with a user operation and to reproduce the extracted content. Here, the received data storage unit 5125 includes a navigation information table storage unit 5132 and a system information table storage unit 5133.

1-3-1 Reception Unit 5122

The reception unit 5122 receives the transport stream indicated by the reception control unit 5126 and outputs it to the TS decoder unit 5123.

1-3-2 TS Decoder Unit 5123

The TS decoder unit 5123 includes a filter condition storage unit 5131 for storing filter conditions that are set by the reception control unit 5126, and operates in accordance with the filter conditions to separate image data and audio data from the transport stream outputted by the reception unit 5122 and output them to the AV decoder unit 5124, as well as separating navigation information tables and writing them into the received data storage unit 5125. The TS decoder unit 5123 also separates system information tables, such as the PCR (standard clock information) which it outputs to the AV decoder unit 5124.

The filter condition storage unit 5131 stores a plurality of filter conditions. Here, the TS decoder unit 5123 is able to simultaneously perform a plurality of separation operations in accordance with these filter conditions.

FIGS. 33A and 33B show examples of the filter conditions stored in the filter condition storage unit 5131. Each line in the filter condition tables 7801, 7807 in these drawings shows a separate filter condition which includes a filter identification number, a PID, a table_id_extension, a version_no, and an output destination.

The "filter identification number" column 7802 is used to store numbers which identify the respective filter conditions. In the present figures, the filter identification number "0" shows the filter condition for separating image data, the filter identification number "1" shows the filter condition for separating audio data, and the filter identification number "2" shows the filter condition for separating navigation information, with the filter conditions with the filter identification numbers "3" onwards being used to separate system information such as the PMT.

The "PID" column 7803 shows the PIDs of the data to be separated.

The "table_id_extension" column 7804 shows the values of the "table_id_extension" identifiers for separating the navigation information and system information.

The "version_no" column 7805 shows the value of the "version_no" which is used when separating navigation information. The entry "–" in this "version no" column shows that this value is not set for a filter condition, so that separation according to the corresponding filter condition is performed regardless of the value of the "version_no" identifier.

The "output destination" column 7806 shows the output destination to which the separated data is to be outputted.

As one example, the image data separated by the filter condition with the filter identification number "0" shown in FIG. 33A has its output destination given in the "output destination" column 7806 as the AV decoder unit 5124, but has no values set in the "table_id_extension" column 7804 or the "version no" column 7805. Here, since no "table_id_extension" or "version no" is set for image data, neither of these values may be set in the filter condition for image data. Conversely, the value "0x0096" for the image data to be separated is set in the "PID" column 7803. As a result, when the reception unit 5122 receives the transport stream shown in FIG. 29, the TS decoder unit 5123 separates the image data "Video0.m2v" and outputs it to the AV decoder unit 5124.

As another example, the audio data separated by the filter condition with the filter identification number "1" shown in FIG. 33A has its output destination given in the "output destination" column 7806 as the AV decoder unit 5124, but has no values set in the "table_id_extension" column 7804 or the "version no" column 7805. Here, since no "table_id_extension" or "version no" is set for audio data, neither of these values may be set in the filter condition for audio data. Conversely, the value "0x0098" for the audio data to be separated is set in the "PID" column 7803. As a result, when the reception unit 5122 receives the transport stream shown in FIG. 29, the TS decoder unit 5123 separates the audio data "Audio0.m2a" and outputs it to the AV decoder unit 5124.

The navigation information table separated by the filter condition with the filter identification number "2" shown in FIG. 33A has its output destination given in the "output destination" column 7806 as the navigation information table storage unit 5132. Accordingly, the TS decoder unit 5123 writes the separated navigation information table into the navigation information table storage unit 5132. In FIG. 33A, this filter condition of the navigation information table to be separated has the value "0x0092" in the PID column 7803 and the value "0x0000" set in the "table_id_extension" column 7804. However, no value is set for this filter condition in the "version no" column 7805. As a result, when the reception unit 5122 receives the transport stream shown in FIG. 29, the TS decoder unit 5123 separates, depending on the timing of the separation, one of the navigation information tables "NVT(0,0)", "NVT(0,1)", "NVT(0,2)", "NVT(0,3)", and "NVT(0,4)" and writes the separated navigation information table into the navigation information table storage unit 5132, in addition to informing the reception control unit 5126.

The filter condition table 7801 in FIG. 33A shows the filter conditions which are stored in the filter condition storage unit 5131 immediately after an event has been selected by a user, and so stores the filter conditions for the entry content.

The filter condition table 7807 is the same as the filter condition table 7801 described above, with the exception that the value "0x01" has been set in the "version_no" column of the filter condition for navigation information, so that when the reception unit 5122 receives the transport stream shown in FIG. 29, the TS decoder unit 5123 separates only the navigation information table "NVT(0,1)" and writes it into the navigation information table storage unit 5132, in addition to informing the reception control unit 5126. This is to say, the filter condition table 7807 shows filter conditions once the entry content has already been separated.

1-3-3 AV Decoder Unit 5124

The AV decoder unit 5124 has a clock unit (not illustrated) and, in accordance with MPEG2 standard, decodes the video data and audio data outputted by the TS decoder unit 5123 in synchronization and outputs the decoded data to the reproduction unit 5128. This clock unit has a standard clock which is set at the correct value by the PCR (standard clock information) outputted by the TS decoder unit 5123, and measures the time which is used to ensure that the image data and audio data are decoded with proper synchronization.

1-3-4 Received Data Storage Unit 5125

The received data storage unit 5125 can be composed of RAM (Random Access Memory), for example, and is provided with a navigation information table storage unit 5132, and a system information table storage unit 5133.

The navigation information table storage unit 5132 stores navigation information tables which have been separated by the TS decoder unit 5123. The system information table storage unit 5133 stores the system information tables, such as the NIT, the SDT, the EIT, the PAT, and the PMT which have been separated by the TS decoder unit 5123. It should be noted here that the contents of the system information tables are the same as those shown in FIGS. 17 to 27, so that no further explanation will be given.

1-3-5 Signal Reception Unit 5127

The signal reception unit 127 receives signals, such as remote controller operations made by a user, and informs the reception control unit 126 of the received signals. As one example, when a selection signal is received for an event that represents an interactive program out of the transport stream received from the digital broadcasting apparatus 5101, the signal reception unit 5127 outputs the received selection signal to the reception control unit 5126. Also, when an activation signal (described later in this specification) is received from the user, this signal is also outputted to the reception control unit 5126. It should be noted here that these operations may be made using, for example, a "left", "right" and "enter" key on an operation panel provided on the reception apparatus 5121 or on a remote controller. In the latter case, the remote controller sends an appropriate signal to the signal reception unit 5127 when one of the keys is pressed by the user. Of these keys, the "left" and "right" keys may be used to move the selection state in the display of the display unit 5129 to the next displayed button on the left or on the right, with the "enter" key being used to activate the button currently in the selected state.

1-3-6 Reproduction Unit 5128

In accordance with the instructions received from the reception control unit 5126, the reproduction unit 5128 generates an image signal for the image data decoded by the AV decoder unit 5124 and the graphics information outputted by the reception control unit 5126 and outputs the generated image signal to the display unit 5129, as well as outputting audio data decoded by the AV decoder unit 5124 to the audio output unit 130. In generating the image signal, the reproduction unit 5128 superimposes the graphics information outputted by the reception control unit 5126 onto the video data decoded by the AV decoder unit 5124.

1-3-7 Display Unit 5129

The display unit 5129 can be realized by a television monitor and is used to display the images outputted by the reproduction unit 5128.

1-3-8 Audio Output Unit 130

The audio output unit 130 can be realized by a speaker and is used to output the audio signal outputted by the reproduction unit 5128.

1-3-9 Reception Control Unit 5126

The reception control unit 5126 is composed of a CPU, a ROM for storing a program, and a RAM used as a work area. This reception control unit 5126 controls the reception of interactive programs, in addition to controlling the operation of the reception apparatus 5121 as a whole.

Figure 36:
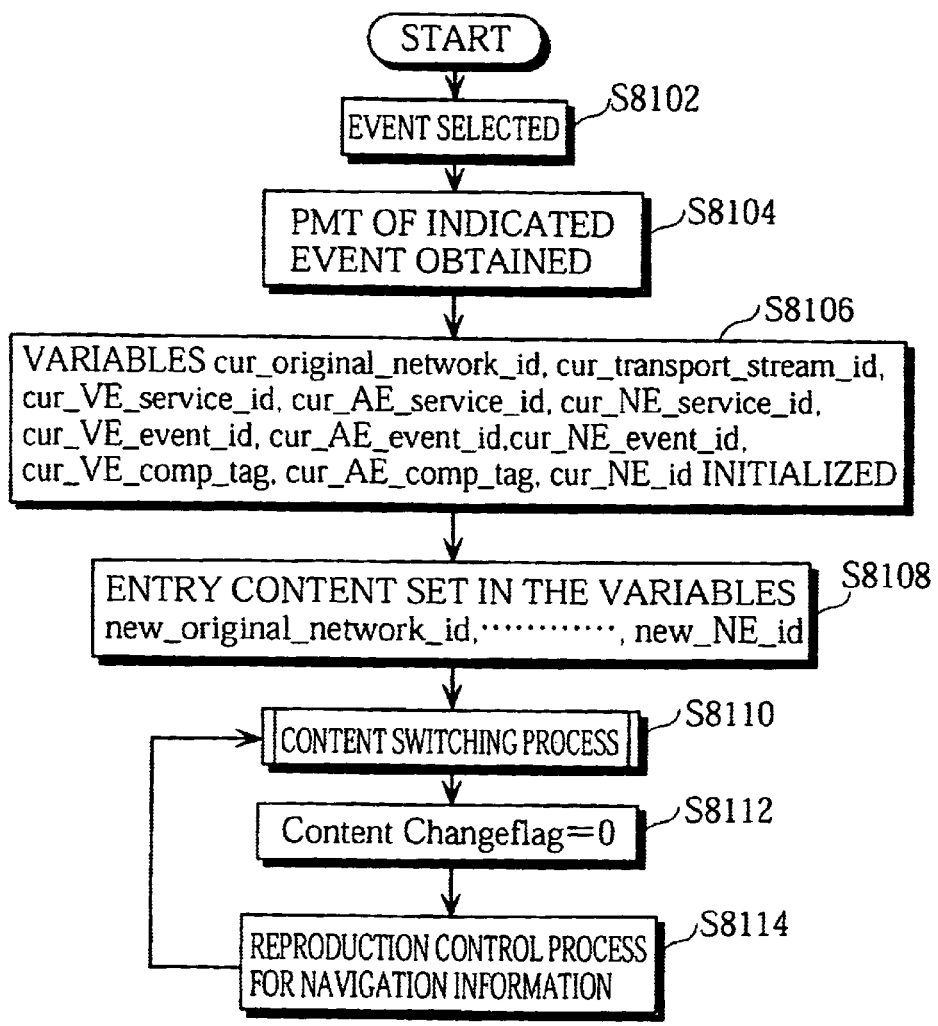
FIG. 36 is a flowchart showing an overview of the reception processing for an interactive program.

1-3-9-1 Reception Control Unit 5126: Outline of the Reception Processing for Interactive Programs FIG. 36 is a flowchart for the reception processing of interactive programs by the reception control unit 5126.

When the reception apparatus 5121 is switched on, the reception control unit 5126 controls the reception unit 5122 and the TS decoder unit 5123 in accordance with an appropriate procedure for MPEG2 system standard and DVB-SI standard and has the system information tables included in the transport stream written into the system information table storage unit 5133. At this point, a list of programs may be displayed.

When the user selects an event corresponding to an interactive program in the transport stream using a remote controller or the like, the reception control unit 5126 receives this selection signal via the reception control unit 5126 and refers to the system information tables in the system information table storage unit 5133 to obtain the identifiers of the event, which are namely the original_network_id, the transport_stream_id, the service_id, and the event_id (S8102).

The reception control unit 5126 then refers to the system information tables in the system information table storage unit 5133 and instructs the reception unit 5122 to receive the appropriate transport stream received from the transmission unit 5106, and instructs the TS decoder unit 5123 to separate the PMT corresponding to the selected event. The reception unit 5122 receives the transport stream from the transmission unit 5106 and outputs it to the TS decoder unit 5123.

The TS decoder unit 5123 separates the PMT corresponding to the selected event and writes it into the system information table storage unit 5133 in the received data storage unit 5125, as well as notifying the reception control unit 5126. On being notified of the reception of the PMT by the TS decoder unit 5123, the reception control unit 5126 refers to the PMT stored in the system information table storage unit 5133 and obtains the PID of the PCR which it then writes into the filter condition storage unit 5131 (S8104).

The reception control unit 5126 sets the variables of the selected service and event into the variables cur_ . . . as shown below, and clears the values of the cur_VE_comp_tag, the cur_AE_comp_tag, and the cur_NE_id (S8106). These variables (cur_ . . . ) are used to store identifiers for the content currently being reproduced.

| (Variable cur__ . . . __id) | ← (value of __id of selected event) |
|---|---|
| cur_original_network_id | ← original_network_id |
| cur_transport_stream_id | ← transport_stream_id |
| cur_VE_service_id | ← service_id |
| cur_AE_service_id | ← service_id |
| cur_NE_service_id | ← service_id |
| cur_VE_event_id | ← event_id |
| cur_AE_event_id | ← event_id |
| cur_NE_event_id | ← event_id |
| cur_VE_comp_tag_id | ← 0 (cleared) |
| cur_AE_comp_tag_id | ← 0 (cleared) |
| cur_NE_id | ← 0 (cleared) |

Following this, the reception control unit 5126 sets the variables of the selected service and event into the variables new_ . . . _id as shown below (S8108). In doing so, the reception control unit 5126 reads the values of the entry_VE_comp_tag, entry_AE_comp_tag, and the entry_NE_id from the PMT stored in the system information table storage unit 5133.

| (Variable new__ . . . __id) | ← (value of __id of selected event) |
|---|---|
| new_original_network_id | ← original_network_id |
| new_transport_stream_id | ← transport_stream_id |
| new_VE_service_id | ← service_id |
| new_AE service_id | ← service_id |
| new_NE_service_id | ← service_id |
| new_VE_event_id | ← event_id |
| new_AE_event_id | ← event_id |
| new_NE_event_id | ← event_id |
| new_VE_comp_tag_id | ← entry_VE_comp_tag |
| new_AE_comp_tag_id | ← entry_AE_comp_tag |
| new_NE_id | ← entry_NE_id |

Following this, the reception control unit 5126 performs the content switching process (S8110), clears the value of the content change flag, which shows that content switching is necessary, to "0" (S8112), performs the reproduction control process (S8114) for navigation information (S8114), and repeats these processes to control the reproduction of the interactive program.

1-3-9-2 Reception Control Unit 5126: Content Switching Process

Figure 37:
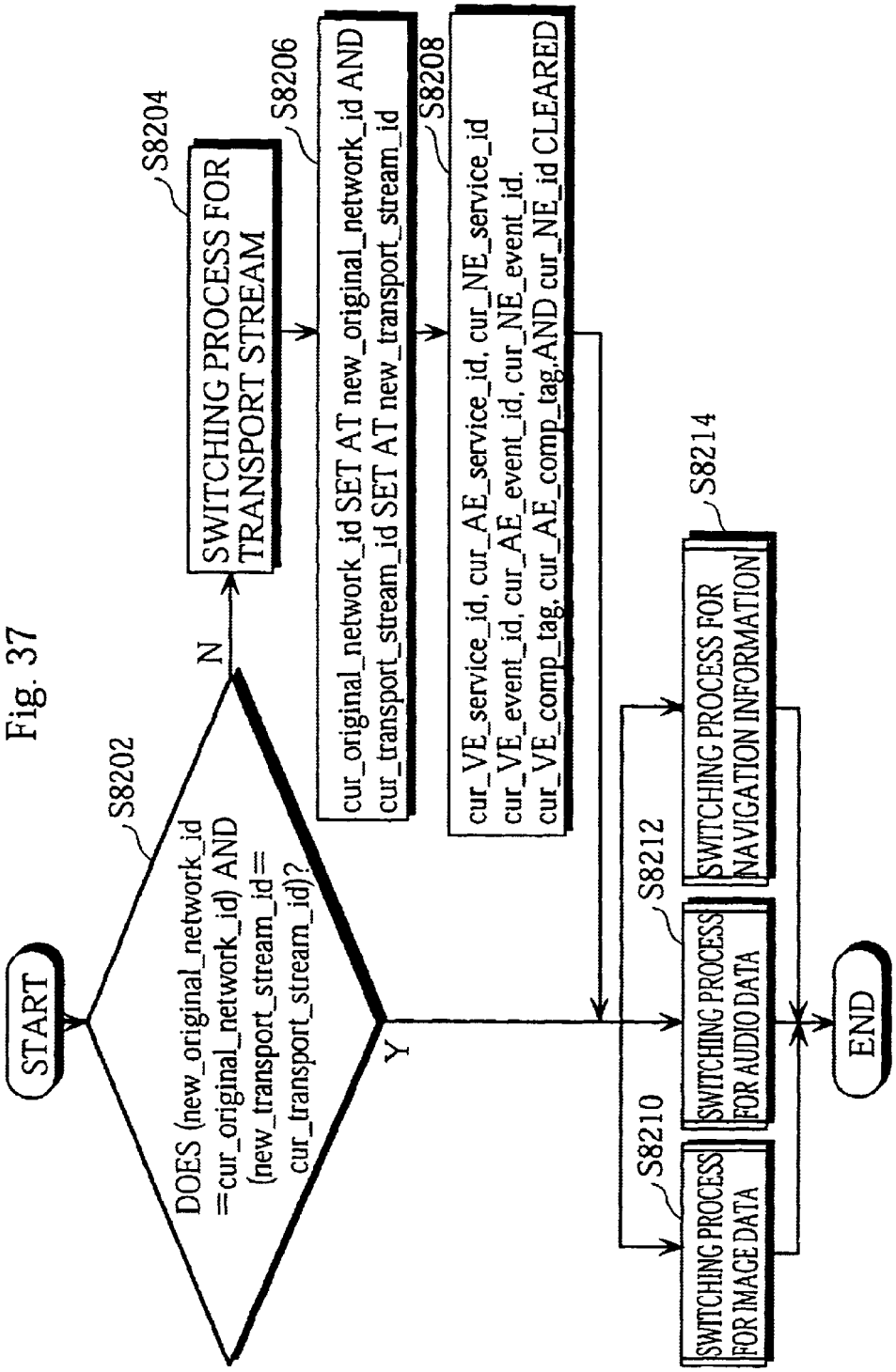
FIG. 37 is a flowchart showing the details of the content switching process shown in FIG. 36.

FIG. 37 is a flowchart showing the details of the content switching process (S8110) in FIG. 36.

First, the reception control unit 5126 judges whether the value of the variable new_original_network_id stored by the reception control unit 5126 is the same as cur_original_network_id and whether the value of the variable new_transport_stream_id is the same as the cur_transport_stream_id (S8202). When both are affirmative, the reception control unit 5126 performs the switching process for image data (S8210), the switching process for audio data (S8212), and the switching process for navigation information (S8214) in parallel before terminating the procedure. The details of the switching process for image data, the switching process for audio data, and the switching process for navigation information are given later in this specification.

When the variables are not equal, the reception control unit 5126 refers to the system information tables and performs a switching process for the transport stream identified by the variable new_original_network_stream_id and the variable new_transport_stream_id, in accordance with MPEG2 system standard and DVB-SI standard (S8204). The reception control unit 5126 then sets the value of the variable cur_original_network_id at the variable new_original_network_id, and sets the value of the variable cur_transport_stream_id at the variable new_transport_stream_id (S8206). After this, the reception control unit 5126 clears the values of the variables, cur_VE_service_id, cur_AE_service_id, cur_NE_service_id, cur_VE_event_id, cur_AE_event_id, cur_NE_event_id, cur_VE_comp_tag, cur_AE_comp_tag, and cur_NE_id (S8208), and performs the switching process for image data (S8210), the switching process for audio data (S8212) and the switching process for navigation information (S8214) in parallel before terminating the procedure.

1-3-9-3 Reception Control Unit 5126: Switching Process for Image Data

Figure 38:
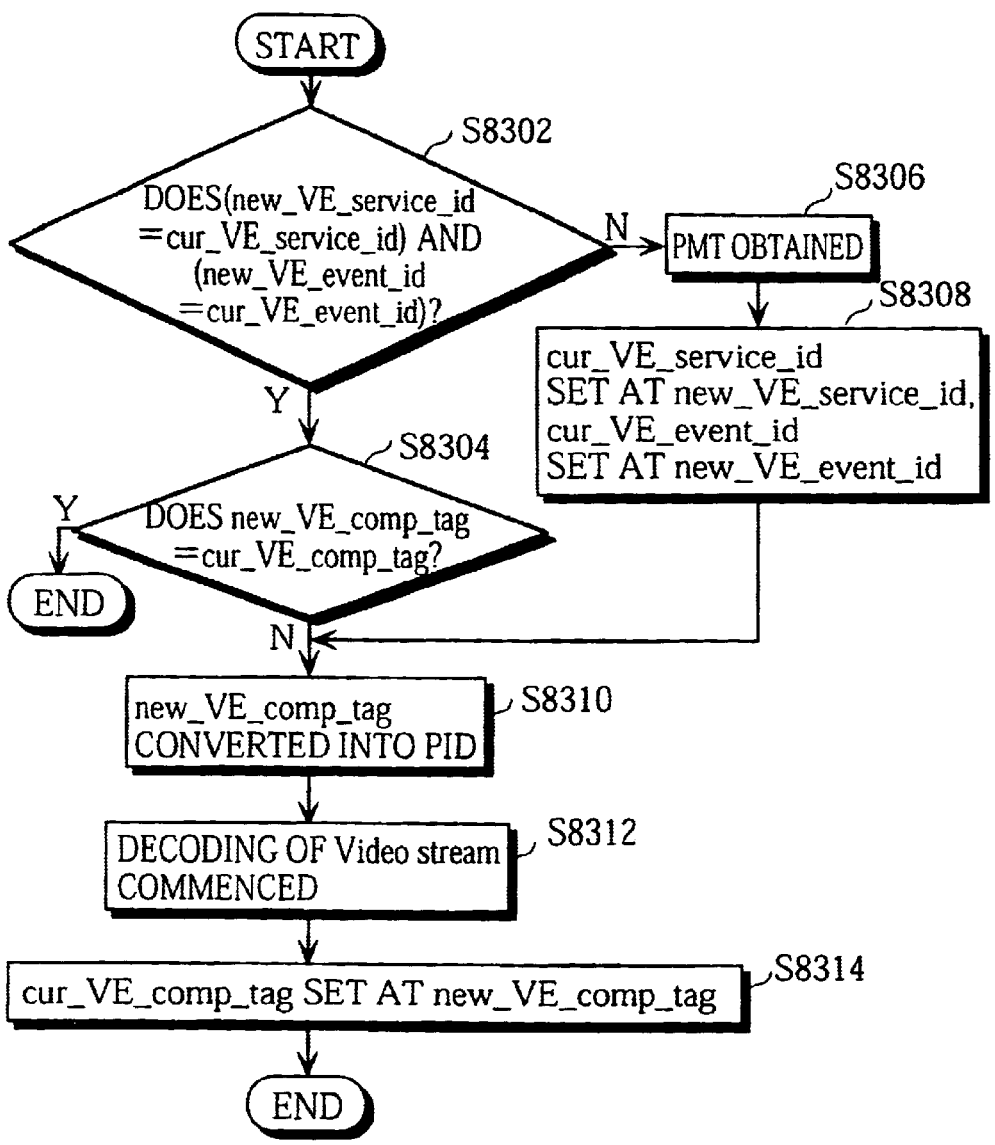
FIG. 38 is a flowchart showing the details of the image data switching process shown in FIG. 37.

The following is an explanation of the details of the image data switching processing in S8210 of FIG. 37, with reference to the flowchart in FIG. 38.

First, the reception control unit 5126 judges whether the value of the variable new_VE_service_id stored by the reception control unit 5126 is the same as cur_VE_service_id and whether the value of the variable new_VE_event_id is the same as the cur_VE_event_id (S8302). When both are affirmative, the reception control unit 5126 judges whether the variable new_VE_comp_tag is equal to the cur_VE_comp_tag (S8304). If so, the reception control unit 5126 terminates the processing, or if not, the reception control unit 5126 advances to S8310 in FIG. 38. When the judgement in S8302 is negative, the reception control unit 5126 sets the filter condition for the PMT corresponding to the variables new_VE_service_id and new_VE_event_id in the filter condition storage unit 5131. The TS decoder unit 5123 then separates the desired PMT and stores it in the system information table storage unit 5133, in addition to notifying the reception control unit 5126. On receiving notification of the separation of the PMT, the reception control unit 5126 refers to the received PMT and obtains the PID of the PCR which it sets in the filter condition storage unit 5131 (S8306).

The reception control unit 5126 then sets the value of the variable new_VE_service_id into the variable cur_VE_service_id and the value of the variable new_VE_event_id into the cur_VE_event_id (S8308).

In S8310, the reception control unit 5126 refers to the PMT corresponding to the event identified by the variables cur_VE_service_id and cur_VE_event_id in the system information table storage unit 5133 and obtains the PID of the component used for transferring image data that has a component tag equal to the value of the variable new_VE_comp_tag. The reception control unit 5126 then sets this PID into the filter condition for image data in the filter condition storage unit 5131. The TS decoder unit 5123 then separates the image data that corresponds to the value of the new_VE_comp_tag from the transport stream in accordance with this filter condition and outputs the image data to the AV decoder unit 5124. The AV decoder unit 5124 decodes this image data, and the decoded image data is displayed by the display unit 5129 via the reproduction unit 5128 (S8312). The reception control unit 5126 then sets the value of the variable new_VE_comp_tag into the variable cur_VE_comp_tag (S8314) and terminates the process.

1-3-9-4 Reception Control Unit 5126: Switching Process for Audio Data

Figure 39:
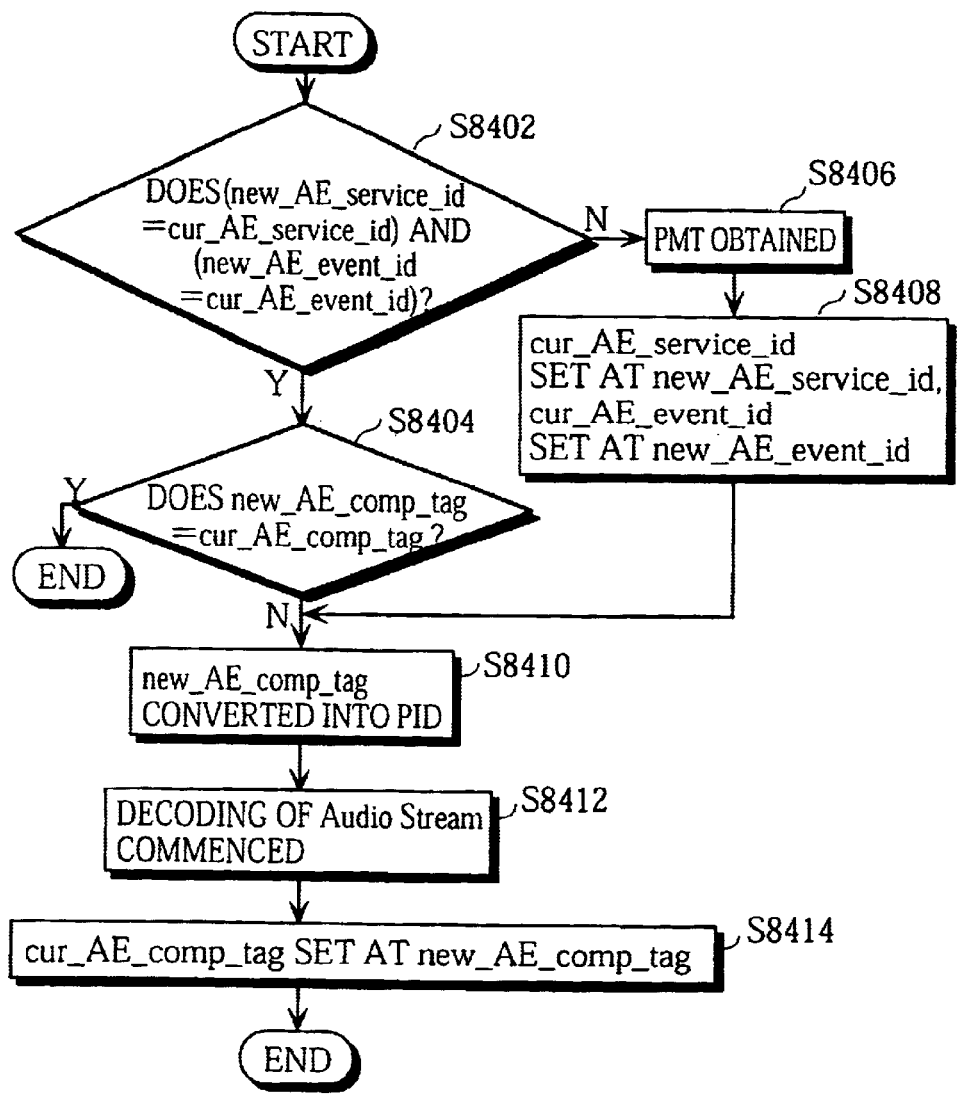
FIG. 39 is a flowchart showing the details of the audio data switching process shown in FIG. 37.

The following is an explanation of the details of the audio data switching processing in S8212 of FIG. 37, with reference to the flowchart in FIG. 39.

First, the reception control unit 5126 judges whether the value of the variable new_AE_service_id stored by the reception control unit 5126 is the same as cur_AE_service_id and whether the value of the variable new_AE_event_id is the same as the cur_AE_event_id (S8402). When both are affirmative, the reception control unit 5126 judges whether the variable new_AE_comp_tag is equal to the cur_AE_comp_tag (S8404). If so, the reception control unit 5126 terminates the process, or if not, the reception control unit 5126 advances to S8410. When the judgement in S8402 is negative, the reception control unit 5126 sets the filter condition for the PMT corresponding to the variables new_AE_service_id and new_AE_event_id in the filter condition storage unit 5131. The TS decoder unit 5123 then separates the desired PMT and stores it in the system information table storage unit 5133, in addition to notifying the reception control unit 5126 (S8406). The reception control unit 5126 then sets the value of the variable new_AE_service_id into the variable cur_AE_service_id and the value of the variable new_AE_event_id into the cur_AE_event_id (S8408). The reception control unit 5126 then refers to the PMT corresponding to the event identified by the variables cur_AE_service_id and cur_AE_event_id in the system information table storage unit 5133 and obtains the PID of the component used for transferring image data that has a component tag equal to the value of the variable new_AE_comp_tag (S8410). The reception control unit 5126 sets this PID into the filter condition for audio data in the filter condition storage unit 5131. The TS decoder unit 5123 then separates the audio data that corresponds to the value of the new_AE_comp_tag from the transport stream in accordance with this filter condition and outputs the audio data to the AV decoder unit 5124. The AV decoder unit 5124 decodes this audio data, and the decoded audio data is outputted by the audio output unit 5130 via the reproduction unit 5128 (S8412). The reception control unit 5126 then sets the value of the variable new_AE_comp_tag into the variable cur_AE_comp_tag (S8314) and terminates the process.

Figure 40:
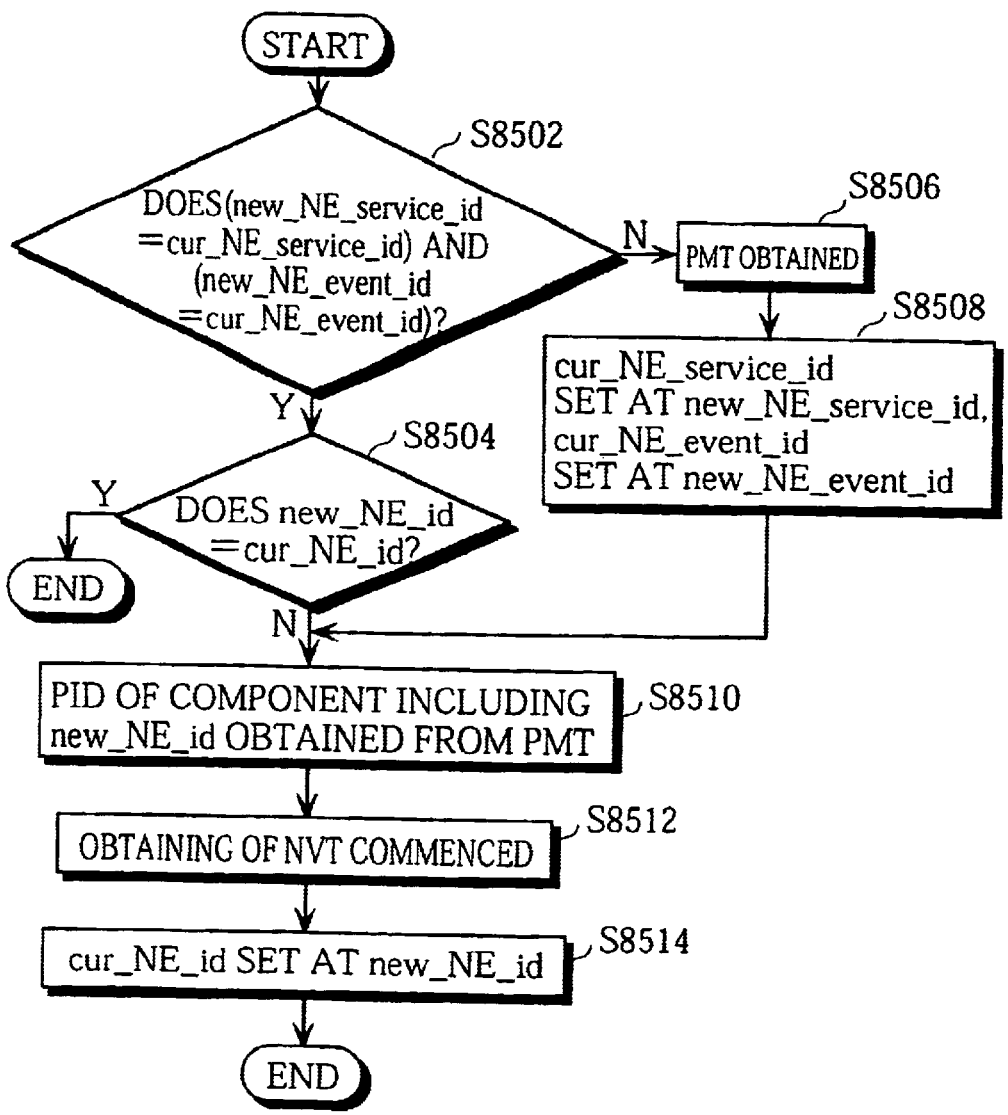
FIG. 40 is a flowchart showing the details of the navigation information switching process shown in FIG. 37.

1-3-9-5 Reception Control Unit 5126: Switching Process for Navigation Information The following is an explanation of the details of the navigation information switching processing in S8214 of FIG. 37, with reference to the flowchart in FIG. 40.

First, the reception control unit 5126 judges whether the value of the variable new_NE_service_id stored by the reception control unit 5126 is the same as cur_NE_service_id and whether the value of the variable new_NE_event_id is the same as the cur_NE_event_id (S8502). When both are affirmative, the reception control unit 5126 judges whether the variable new_NE_id is equal to the cur_NE_id (S8504). If so, the reception control unit 5126 terminates the processing, or if not, the reception control unit 5126 advances to S8510. When the judgement in S8502 is negative, the reception control unit 5126 sets the filter condition for the PMT corresponding to the variables new_

NE_service_id and new_NE_event_id in the filter condition storage unit 5131. The TS decoder unit 5123 then separates the desired PMT and stores it in the system information table storage unit 5133, in addition to notifying the reception control unit 5126 (S8506).

The reception control unit 5126 sets the value of the variable new_NE_service_id into the variable cur_NE_service_id and the value of the variable new_NE_event_id into the cur_NE_event_id (S8508). The reception control unit 5126 then refers to the PMT corresponding to the event identified by the variables cur_NE_service_id and cur_NE_event_id in the system information table storage unit 5133 and obtains the PID of the component used for transferring navigation information that has a component tag equal to the value of the variable new_NE_id (S8510). The reception control unit 5126 sets this PID into the "PID" of the filter condition for navigation information and the value of the variable new_NE_id into the "table_id_extension" of this filter condition in the filter condition storage unit 5131, with the "version_no" being set at unconditional. The TS decoder unit 5123 then separates the navigation information table that corresponds to the value of the new_NE_id from the transport stream in accordance with this filter condition and has this navigation information table stored in the navigation information table storage unit 5132, in addition to notifying the reception control unit 5126. This is to say, the first time a navigation information table is obtained, a navigation information table transferred at that time which is identified by only the PID and the table_id_extension is separated from the transport stream, regardless of the version_no of the navigation information table (S8512). The reception control unit 5126 then sets the value of the variable new_NE_id into the variable cur_NE_id (S8514) and terminates the process.

Figure 41:
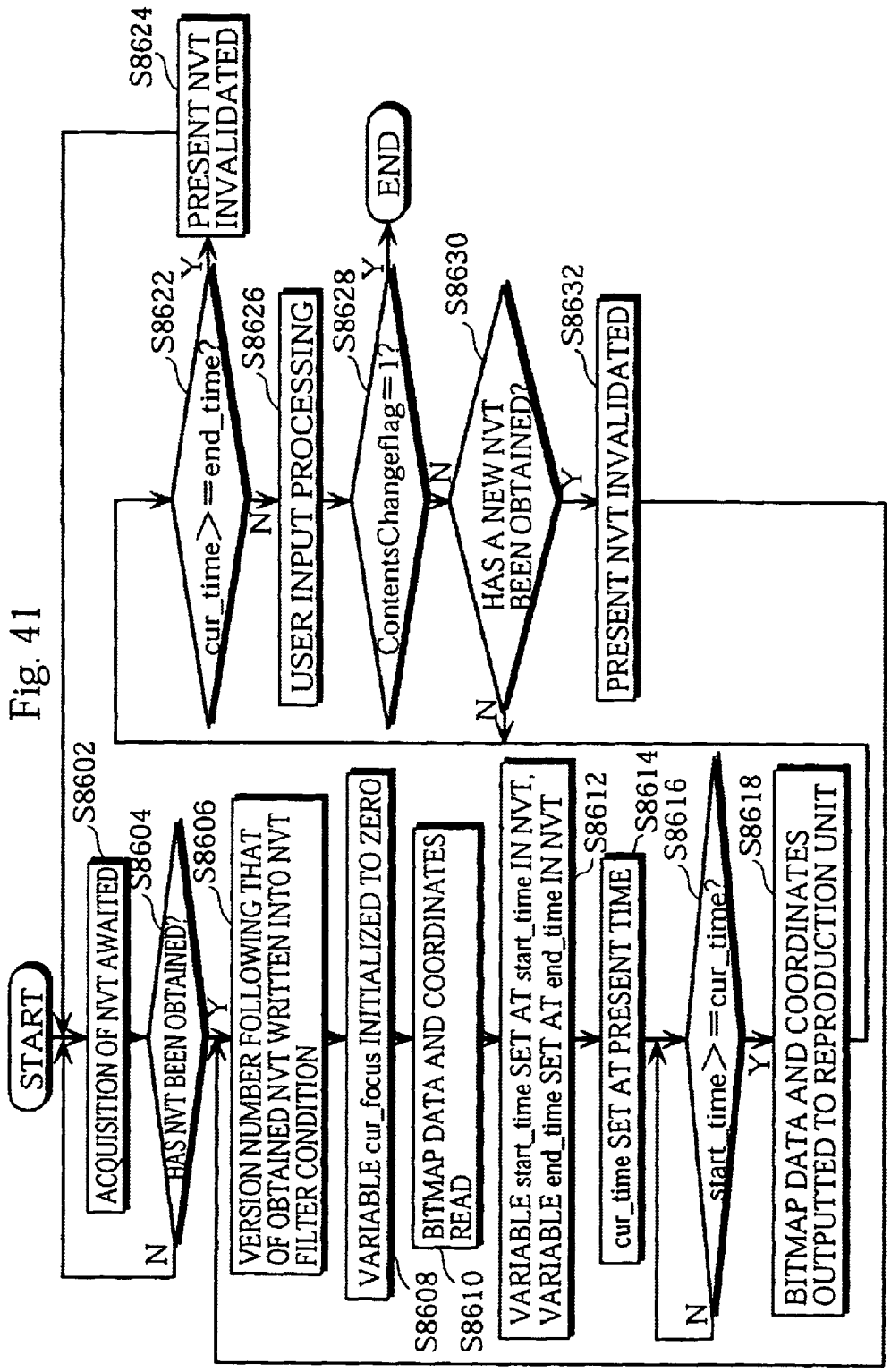
FIG. 41 is a flowchart for the interactive control processing performed according to the navigation information.

1-3-9-6 Reception Control Unit 5126: Interactive Control in Accordance with the Navigation Information FIG. 41 is a flowchart showing the interactive control process performed in accordance with the navigation information.

The reception control unit 5126 waits for notification of the separation of a navigation information table from the TS decoder unit 5123 (S8602) and judges whether such notification has been received. When the notification has been received, the processing advances to S8606 or otherwise returns to S8602 (S8604). The reception control unit 5126 reads the version number of the navigation information table stored in the navigation information table storage unit 5132, adds "1" to it, and sets the "version_no" in the filter condition for a navigation information table stored in the filter condition storage unit 5131 (S8606). After this, the reception control unit 5126 resets the variable cur_focus to "0" (S8608). The reception control unit 5126 then reads the navigation information table stored in the navigation information table storage unit 5132 and refers to the object definition table and bitmap table, as well as reading the bitmap data for displaying an image and its display coordinates. In doing so, the reception control unit 5126 reads the bitmap data corresponding to the bitmap index number given in the "focused bitmap" column for the object whose object index number is equal to the value of the variable cur_focus, as well as reading the bitmap data corresponding to the bitmap index number given in the "normal bitmap" column for objects with other values of the object index number (S8610). Next, the reception control unit 5126 sets the value of the start_time into the variable start_time and the value of the end_time into the variable end_time (S8612)

The reception control unit 5126 then refers to the clock unit of the AV decoder unit 5124 and sets the present time into the variable cur_time (S8614). The reception control unit 5126 then waits until the value of the variable start_time is equal to or greater than the value of the variable cur_time (S8616), while outputting the bitmap data and coordinate values read in S8610 to the reproduction unit 5128. The reproduction unit 5128 superimposes the bitmap data outputted by the reception control unit 5126 onto the image data decoded by the AV decoder unit 5124 at the indicated coordinate position and has the combined image displayed by the display unit 5129 (S8618).

The reception control unit 5126 next determines whether the value of the variable cur_time is equal to or greater than the variable end_time (S8622) and if so, gives the reproduction unit 5128 an indication to stop displaying the current bitmap data (S8624), before returning to S8602. If the judgement in S8622 is negative, the reception control unit 5126 performs a user input process (S8626), the details of which are given later in this specification.

The reception control unit 5126 next judges whether the value of the variable ContentChangeFlag is "1" (S8628). When this is the case, the reception control unit 5126 terminates the reproduction control process for the navigation information. When this is not the case, the reception control unit 5126 judges whether notification of the separation of a new navigation information table has been received from the TS decoder unit 5123 (S8630). When such notification has arrived, the reception control unit 5126 instructs the reproduction unit 5128 to stop displaying the current bitmap data (S8632) and returns to the process in S8606. When the reception control unit 5126 judges that no notification has arrived in S8630, the processing returns to S8622.

Figure 42:
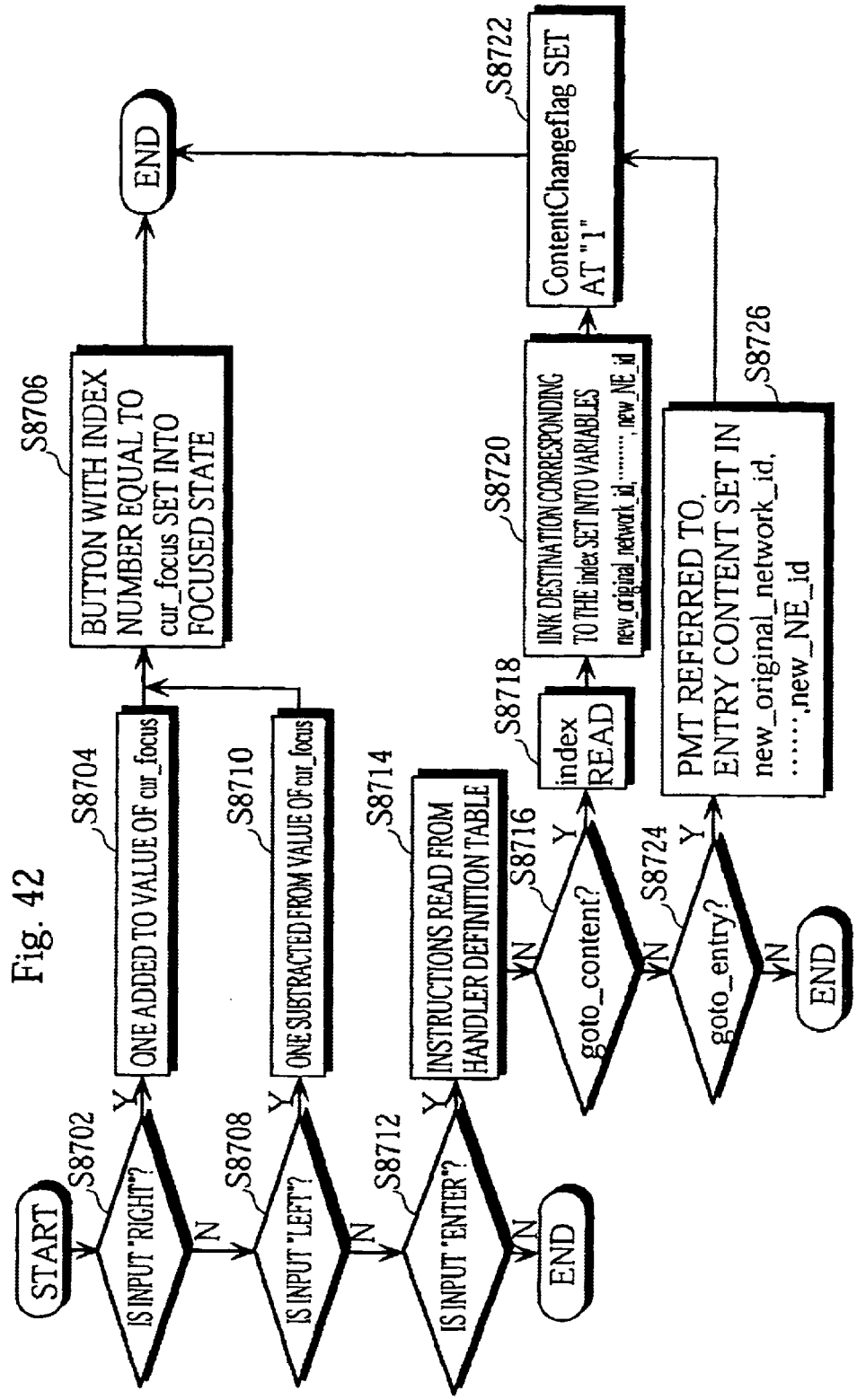
FIG. 42 is a flowchart showing the user I/F processing performed according to the navigation information.

1-3-9-7 Reception Control Unit 5126: User I/F Processing According to the Navigation Information FIG. 42 is a flowchart showing the user I/F processing according to the navigation information.

The reception control unit 5126 first judges whether the user input received from the signal reception unit 5127 is for the "right" key (S8702). When the input is not for the "right" key, the processing advances to S8708. When the input is for the "right" key, the reception control unit 5126 adds "1" to the value of the variable cur_focus. It should be noted here that when the value of the variable cur_focus is equal to the highest value of the object index number in the navigation information table in the navigation information table storage unit 5132, the variable cur_focus is not increased further (S8704). The processing then advances to S8706. The reception control unit 5126 refers to the object definition table and bitmap table in the navigation information table in the navigation information table storage unit 5132 and reads the bitmap data to be displayed on the screen and the coordinates of the display position(s) on the display screen, before outputting these to the reproduction unit 5128. In doing so, the reception control unit 5126 reads the bitmap data corresponding to the bitmap index number given in the "Focused Bitmap" column for the button object whose object index number is equal to the variable cur_focus, and the bitmap data corresponding to bitmap index numbers given in the "Normal Bitmap" column for button objects with other object index numbers. The reproduction unit 5128 superimposes these sets of bitmap data onto the image data decoded by the AV decoder unit 5124 at the indicated coordinate positions and has the combined image displayed by the display unit 5129, thereby completing the user input processing (S8706).

In S8708, the reception control unit 5126 judges whether the user input received from the signal reception unit 5127 is for the "left" key (S8708). When the input is not for the "left" key, the processing advances to S8712. When the input is for the "left" key, the reception control unit 5126 subtracts "1" from the value of the variable cur_focus. It should be noted here that when the value of the variable cur_focus is "0", it is not decreased further (S8710). The processing then advances to step S8706.

In S8712, the reception control unit 5126 judges whether the user input received from the signal reception unit 5127 is for the "enter" key. When the input is for the "enter" key, the processing advances to S8714. When the input is not for the "enter" key, the reception control unit 5126 terminates the user input processing.

In step S8714, the reception control unit 5126 refers to the object definition table in the navigation information table stored in the navigation information table storage unit 5132 to obtain the handler index number of the button object whose object index number is equal to the variable cur_focus. The reception control unit 5126 then refers to the handler definition table and reads the script of the handler corresponding to the obtained handler index number. The reception control unit 5126 judges whether the script is "goto_content" (S8716) and, if not, advances to S8724. When the script is "goto_content", the reception control unit 5126 reads the hyperlink index number of the argument (S8718).

The reception control unit 5126 refers to the hyperlink table in the navigation information table and sets the original_network_id, the transport_stream_id, the VE_service_id, the VE_event_id, the VE_comp_tag, the AE_service_id, the AE_event_id, the AE_comp_tag, the NE_service_id, the NE_event_id, and the NE_id which are the identifiers of the content corresponding to the hyperlink index number read in S8718 into the variables new_original_network_id, new_transport_stream_id, new_VE_service_id, new_VE_event_id, new_VE_comp_tag, new_AE_service_id, new_AE_event_id, new_AE_comp_tag, new_NE_service_id, new_NE_event_id, and new_NE_id. However, when no value is set in the hyperlink table, which is to say when the identifiers are given as "–", the values of the corresponding variables are left unchanged (S8720). The reception control unit 5126 sets the value of the variable ContentChangeFlag at "1" (S8722) and terminates the user input processing.

In S8724, the reception control unit 5126 judges whether the script is "goto_entry" (S8724), and if not, terminates the user I/F processing. When the script is "goto_entry", the reception control unit 5126 refers to the PMT stored in the system information table storage unit 5133 corresponding to the variables "cur_NE_service_id" and "cur_NE_event_id" and sets the values of the "entry_VE_comp_tag", the "entry_AE_comp_tag", and the "entry_NE_id" into the variables new_VE_comp_tag, new_AE_comp_tag, and new_NE_id, in addition to setting the value of the variable cur_NE_service_id into the variables new_VE_service_id and new_AE_service_id, and the value of the variable new_NE_event_id into the variables new_VE_event_id and new_AE_event_id (S8726), before the processing returns to S8722.

1-3-10 Operation of the Reception Apparatus 5121

The operation of the reception apparatus 5121 described above is described below having been divided into a (1) Selection reception operation for an interactive program, (2) Display operation according to the navigation operation, (3) User I/F processing according to the navigation information, and (4) Content switching processing.

1-3-10-1 (1) Selection Reception Operation for an Interactive Program

When the reception apparatus 5121 is switched on, the reception apparatus 5121 receives the various system information tables included in the transport stream and writes them into the system information table storage unit 5133.

When an interactive program, which is to say an event that has been multiplexed into a transport stream in FIG. 29, has been selected by the user, the reception control unit 5126 obtains the information in the transfer preface, such as the frequency of the transport stream identified by the original_network_id "0x0001" and the transport_stream_id "0x0001", from the NIT (see FIG. 22) stored in the system information table storage unit 5133, and instructs the reception unit 5122 to receive the transport stream.

The reception control unit 5126 then obtains the PID "0x0090" of the PMT of the program whose "program_no" is equal to the service_id "0x0002" from the PAT (see FIG. 23), and sets this in the filter condition for the PMT in the filter condition storage unit 5131. As a result, the TS decoder unit 5123 separates the PMT 7001 shown in FIG. 24 and writes it into the system information table storage unit 5133.

The reception control unit 5126 reads the PID "0x0091" of the PCR stored in the system information table storage unit 5133 and sets it in the filter condition of the PCR in the filter condition storage unit 5131.

The reception control unit 5126 reads the identifiers of the image data, audio data, and navigation information for the entry content and sets these in the filter condition in the filter condition storage unit 5131.

In more detail, the reception control unit 5126 refers to the Entry_Descriptor 7003 shown in FIG. 25 of PMT 7001, and reads the value "0x00" of the "entry_VE_comp_tag". The reception control unit 5126 also reads the value "0x0096" of the PID of the component whose data type is "image data" and which has been assigned the stream_identifier_descriptor whose "component_tag" is "0x00", and sets this PID in the filter condition for image data in the filter condition storage unit 5131.

In the same way, the reception control unit 5126 reads the value "0x00" of the "entry_AE_comp_tag". The reception control unit 5126 also reads the value "0x0098" of the PID of the component whose data type is "audio data" and which has been assigned the stream_identifier_descriptor whose "component_tag" is "0x00", and sets this PID in the filter condition for audio data in the filter condition storage unit 5131.

The reception control unit 5126 also reads the value "0x0000" of the "entry_NE_id" and sets it in the "table_id_extension" of the filter condition for the navigation information table in the filter condition storage unit 5131. After this, the reception control unit 5126 refers to the table 7004 in the PMT 7001 and reads the value "0x0092" of the PID of the component which has been assigned the "NE_Component_Descriptor(0)" 7201 which includes the value "0x0000" between the values of the "min_NE_id" and the "max_NE_id", before setting this value in the "PID" of the filter condition for the navigation information table. Here, the "version_no" in the filter condition is set as unconditional. At this point, the filter condition table stored in filter condition storage unit 5131 is the filter condition table 7801 shown in FIG. 33A.

By doing so, the TS decoder unit 5123 separates the image data "Video0.m2v" and audio data "Audio0.m2a" from the transport stream and outputs them to the AV decoder unit 5124. Here, since the "version_no" of the filter condition is unconditional, one of the navigation information tables "NVT(0,0)", "NVT(0,1)", "NVT(0,2)", "NVT(0,3)", and "NVT(0,4)" is separated and is written into the navigation information table storage unit 5132.

The reception control unit 5126 reads the separated navigation information table in the navigation information table storage unit 5132, adds one to the version number assigned to the separated navigation information table, and writes the resulting value into the "version_no" of the filter condition for the navigation information table in the filter condition storage unit 5131. When this addition of "1" results in the value exceeding 31, the resulting value is reset to "0".

As one example, when the navigation information table 6301 with the filename "NVT(0,0)" shown in FIG. 17 is separated by the TS decoder unit 5123 based on the filter condition table 7801 shown in FIG. 33A, the reception control unit 5126 receives notification of the separation of this navigation information table and reads this navigation information table 6301 from the navigation information table storage unit 5132. The reception control unit 5126 then adds "1" to the value "0" of the version number and sets the value "0x01" into the "version_no" of the filter condition of the navigation information table in the filter condition storage unit 5131. At this point, the filter condition table stored by the filter condition storage unit 5131 is the same as the filter condition table 7807 shown in FIG. 33B.

Here, since the TS decoder unit 5123 only separates the navigation information with the version number following the version number of the navigation information table currently being reproduced, the reception control unit 5126 does not need to confirm whether the content has changed every time new navigation information is received, thereby reducing the load of the reception control unit 5126.

1-3-10-2 (2) Display Operation According to the Navigation Operation

The reception control unit 5126 controls the display for objects (buttons and pictures) included in a navigation information table in accordance with the navigation information table separated by the process described above.

Based on the separated navigation information, the reception control unit 5126 initializes the variable cur_focus to "0" and refers to the object definition table 6302 of the navigation information table NVT (0,0) shown in FIG. 17 and the bitmap table 6305 and reads the X coordinate "20" and the Y coordinate "400" shown in the row for the object index number "0" and bitmap data corresponding to the bitmap index number "1" shown in the "Focused Bitmap" column. The reception control unit 5126 also reads the X coordinate "200" and the Y coordinate "400" shown in the row for the object index number "1" and bitmap data corresponding to the bitmap index number "2" shown in the "Normal Bitmap" column.

Following this, the reception control unit 5126 outputs the bitmap data and coordinates it has read to the reproduction unit 5128 when the present time reaches the value "5" of the "start_time" in the time information table 6306.

Meanwhile, the image data 5201 ("Video0.m2v") and the audio data 5203 ("Audio0.m2a") separated by the TS decoder unit 5123 are decoded by the AV decoder unit 5124 and are outputted to the reproduction unit 5128.

The reproduction unit 5128 superimposes' the bitmap data outputted by the reception control unit 5126 onto the image data 5201 outputted by the AV decoder unit 5124 and outputs a combined image signal.

Figure 34C:
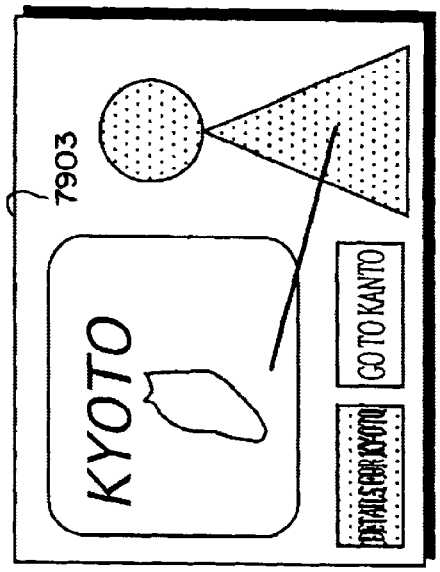
FIGS. 34A to 34D are examples of display images displayed by the display unit in the present embodiment.
Figure 34D:
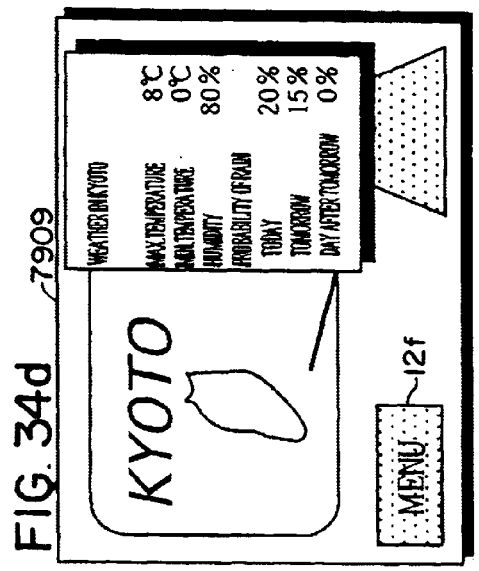
Figure 34A:
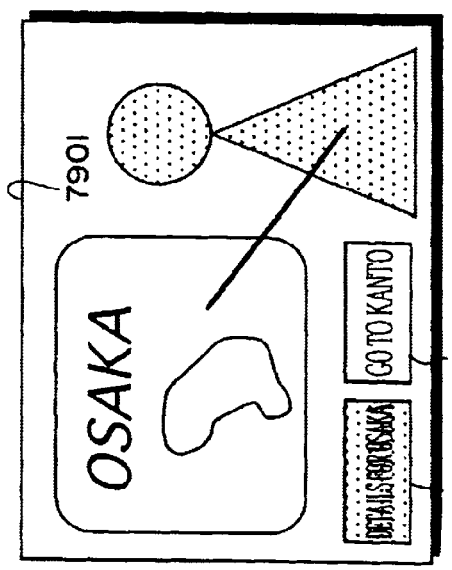

The display image for this case is shown in FIG. 34A. This display image 7901 in FIG. 34A corresponds to the scene 01b in FIG. 5, with the "Details for Osaka" button and "Go to Kanto" button being displayed as bitmap images which are superimposed on the image. Of these, the button "Details for Osaka" is displayed in the selected state in accordance with the variable cur_focus.

This display continues until the user makes a content switching operation, or until the value "65" of the "end_time" in the time information table 6306 of the navigation information table NVT (0,0) is reached. When the present time reaches the value of "end_time", the same display operation as described above is performed when the start time for the navigation information table NVT (0,1) of the next version is reached.

1-3-10-3 (3) User I/F Processing According to the Navigation Information

The following example starts with scene 01b, which is to say the display image shown in FIG. 34A, being displayed.

On receiving a signal for a user operation from the signal reception unit 5127 and judging that the signal is for the "right" key, the reception control unit 5126 updates the value of the variable cur_focus to "1". The reception control unit 5126 then refers to the navigation information table storage unit 5132 and reads the bitmap data corresponding to the bitmap index number "3" given in the "Focused Bitmap" column for the button object with the object index number "1" in the navigation information table NVT (0,0) shown in FIG. 17. The reception control unit 5126 outputs this bitmap data together with the X coordinate "200" and the Y coordinate "400" to the reproduction unit 5128. The reception control unit 5126 also obtains the bitmap data for the button objects whose object index numbers do not agree with the value "1" of the variable cur_focus, and outputs this data in the same way to the reproduction unit 5128.

As a result, the "Details for Osaka" button 02b is displayed in the non-selected state, with the "Go to Kanto" button 03b changing to the selected state.

Here, if the user presses the "left" button, the value of the variable cur_focus is updated back to "0" and the display returns to the state shown in FIG. 34A.

When the user operation signal is for the "enter" key, the reception control unit 5126 refers to the navigation information table storage unit 5132 and reads the script in the handler of the button object whose object index number is equal to the variable cur_focus "0" in the navigation information table NVT (0,0) shown in FIG. 17. In the present case, the script is "goto_content(Hyperlink Index0) so that the reception control unit 5126 reads the identifiers of the content for the link destination corresponding to the hyperlink index number given as the argument of the script, and performs the content switching process described below.

1-3-10-4 (4) Content Switching Process

The following is an explanation of when the user operation signal is for the "enter" key during a display of the display image shown in FIG. 34A, which is to say the case when switching between scene 01b in content 0 of FIG. 5 and scene 11b of content 1.

In the present case, the reception control unit 5126 reads the various identifiers for the link destination content corresponding to the hyperlink index number "0" in the navigation information table NVT (0,0). Here, apart from "NE_id", all of these identifiers are "–", so that the transport stream identifier, the service identifiers and event identifiers for the image data, audio data and navigation information, and the identifiers for the image data, and audio data for the link destination are all the same as those for the content currently being displayed. This is to say, the image data and audio data for the link destination content are the same as those for the currently displayed content, so that only the navigation information is different.

The reception control unit 5126 reads the value "0x0001" of the identifier "NE_id" of the navigation information and sets it into the "table_id_extension" of the filter condition for the navigation information table in the filter condition storage unit 5131. After this, the reception control unit 5126 refers to the table 7004 in the PMT 7001 in the system information table storage unit 5133 and reads the value "0x0093" of the PID of the component which has been assigned the "NE_Component_Descriptor(1)" 7201 which includes the value "0x0001" between the values of the "min_NE_id" and the "max_NE_id", before setting this value in the "PID" of the filter condition for the navigation information table. Here, the "version_no" in the filter condition is set as unconditional.

The TS decoder unit 5123 then separates the navigation information table "NVT(0,1)" shown in FIG. 18 in accordance with the filter condition set above and writes it into the navigation information table storage unit 5132, in addition to notifying the reception control unit 5126.

The reception control unit 5126 adds "1" to the version number "0" assigned to the separated navigation information table NVT(0,1) and sets this value in the "version_no" column of the filter condition. This is in readiness for an updating of the version number of the navigation information.

Figure 34B:
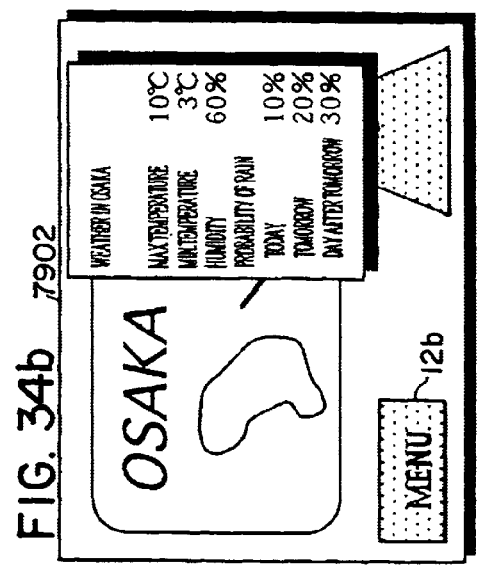

In accordance with the navigation information table NVT (1,0) stored in the navigation information table storage unit 5132, the reception control unit 5126 performs (2) the display operation and (3) the user I/F processing. The display screen displayed in accordance with "NVT(1,0)" is shown in FIG. 34B. Here, the image data and audio data are the same as those shown in FIG. 34A, although different button text information is displayed due to the difference in navigation information.

The following is a description of the case when, during a display of the display screen 7903 shown in FIG. 34C by the display unit 5129, the user presses the "enter" key on the remote controller, so the content switching is performed between scene 01e of content 0 and scene 1ie of content 1.

In this case, the filter condition in the filter condition storage unit 5131 is set by the reception control unit 5126 so that the "PID" is "0x0093", the "table_id_extension" is "0x0001", and the "version_no" is unconditional. As a result, the TS decoder unit 5123 separates the navigation information table "NVT(1,1)" shown in FIG. 20 from the transport stream shown in FIG. 29 and writes it into the navigation information table storage unit 5132. In accordance with the navigation information table NVT(1,1), the reception control unit 5126 performs (2) the display operation and (3) the user I/F processing so that the display screen 7904 shown in FIG. 34D is displayed.

Figure 35B:
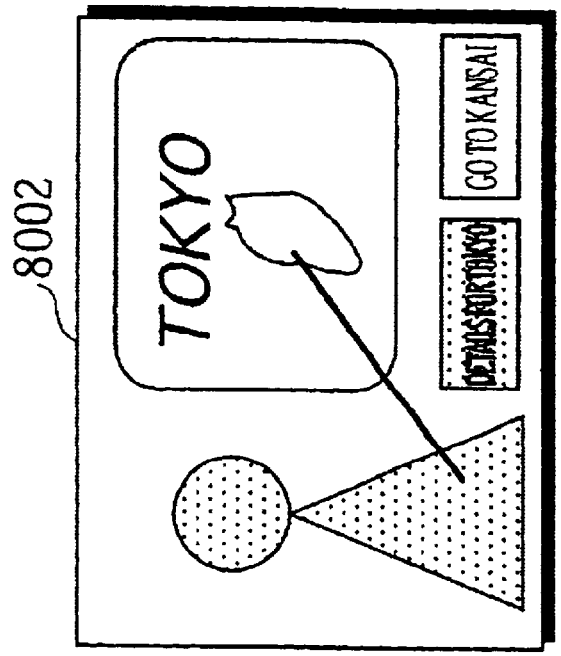
FIGS. 35A and 35B are examples of display images displayed by the display unit in the present embodiment.
Figure 35A:
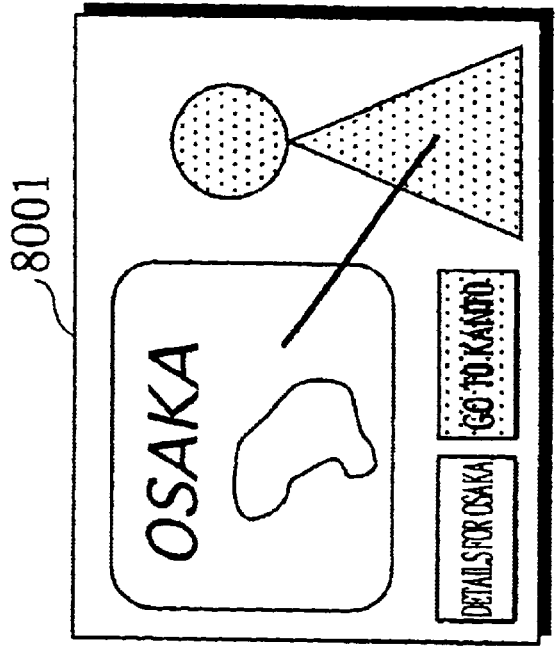

The following is a description of the case when, during a display of the display screen 8001 shown in FIG. 35A by the display unit 5129, the user presses the "enter" key on the remote controller, so the content switching is performed between scene 01a of content 0 and scene 21a of content2.

The reception control unit 5126 refers to the object definition table 6302 and the handler definition table 6303 in the navigation information table 6301 in the navigation information table storage unit 5132 and reads the script "goto_content" and the index number "1" of the argument of the script.

The reception control unit 5126 then reads the identifier of the content which is the link destination corresponding to this index number "1" from the hyperlink table 6304. The reception control unit 5126 judges that the identifier of the transport stream to which the link destination content belongs, and the service and event identifiers of the image data, audio data, and navigation information of the link destination content are the same as the present content, and so does not perform the processing for obtaining a PMT. Since the identifiers for the image data, audio data, and navigation information are different, the reception control unit 5126 performs the appropriate processing for switching the reception of these.

The reception control unit 5126 reads the value "0x01" of the "VE_comp_tag" identifier of the image data and refers to the table 7004 in the PMT 7001 in the system information table storage unit 5133 to find the value "0x0097" of the PID of the component whose data type is "image data" and which has been given the stream_identifier_descriptor whose "component_tag" is "0x01". The reception control unit 5126 then sets this value "0x0097" in the "PID" column of the filter condition for image data in the filter condition storage unit 5131.

The reception control unit 5126 reads the value "0x01" of the "AE_comp_tag" identifier of the audio data and refers to the table 7004 in the PMT 7001 in the system information table storage unit 5133 to find the value "0x0099" of the PID of the component whose data type is "audio data— and which has been given the stream_identifier_descriptor whose "component_tag" is "0x01". The reception control unit 5126 then sets this value "0x0099" in the "PID" column of the filter condition for audio data in the filter condition storage unit 5131.

The reception control unit 5126 reads the value "0x01" of the "NE_id" identifier of the navigation information and, in addition to setting this in the "table_id_extension" of the filter condition for navigation information in the filter condition storage unit 5131, refers to the table 7004 in the PMT 7001 to find the value "0x0094" of the PID of the component which has been given the "NE_Component_Descriptor(2)" which includes the value "0x0002" between the "min_NE_id" and the "max_NE_id", and sets this value in the "PID" column of the filter condition for the navigation information table. In doing so, the reception control unit 5126 sets the "version_no" of the filter condition for the navigation information table as "unconditional".

The TS decoder unit 5123 separates the navigation information table 6701 with the filename "NVT(2,0)" shown in FIG. 21 from the transport stream shown in FIG. 29 and stores it in the navigation information table storage unit 5132, in addition to informing the reception control unit 5126. As a result, the display unit 5129 displays an image identical to that shown as display image 8002 in FIG. 35B.

1-3-11 Example of Content Construction using Scripts

In the interactive program shown in FIG. 5, each of contents 0–3 has one navigation information table. Putting this into other words, there is a one-to-one relationship between navigation information tables and contents. The following are examples of a content construction where a one-to-many relationship is established between the navigation information tables and the contents using the scripts in each navigation information table and a content construction where a one-to-one relationship is established.

FIG. 43 (collectively FIGS. 43A and 43B) shows a different example of an interactive program which is composed of the four contents 10 to 13.

The presentation information which forms the compositional elements of contents 10 to 13 are the video data "Video1.m2v" and the audio data "Audio1.m2a" shown in FIGS. 6A and 6B. This is to say, the four contents 10 to 13 share the same video data "Video1.m2v" and audio data "Audio1.m2a".

The sets of navigation information which are compositional elements of contents 10 to 13 have the following two data constructions.

The first data construction is where the sets of navigation information correspond one-to-one with the contents, which is shown in FIGS. 44 to 47.

The navigation information "Navi10-1.nif" shown in FIG. 44 corresponds to each scene in content 10 shown in FIG. 43. Each of the buttons "North Osaka", "Central Osaka", and "South Osaka" in each scene in content 10 is expressed by the button objects with the object index numbers 0, 1, 2 in the object definition table in the navigation information "Navi10-1.nif". These buttons "North Osaka", "Central Osaka", and "South Osaka" are also linked to contents 11, 12, and 13, respectively, as shown in the handler definition table and hyperlink table.

The navigation information "Navi11-1.nif" shown in FIG. 45 corresponds to each scene in content 11 shown in FIG. 43. The text information "Weather Information for North Osaka" in each scene in content 11 is expressed by the picture object for object index number 1 in the object definition table. The "return" button is expressed by a button object with the object index number 0, and is linked to content 10. This is also the case for the navigation information "Navi12-1.nif" shown in FIG. 46 and the navigation information "Navi13-1.nif" shown in FIG. 47.

In this first data construction, the buttons, the sets of text information, and links between contents for contents 10–13 are expressed by a data construction composed of four sets of navigation information "Navi10-1.nif", "Navi11-1.nif", "Navi12-1.nif", and "Navi13-1.nif".

FIG. 48 shows an example set of navigation information in the second data construction where a single set of navigation information corresponds to many contents.

The navigation information "Navi10_13-1.nif" shown in FIG. 48 corresponds to each of the scenes in the four contents 10 to 13 shown in FIG. 43, and expresses all of the objects which are expressed by the four sets of navigation information in FIGS. 44 to 47.

The object definition table in FIG. 48 has seven objects with the object index numbers 0–6 that correspond to the button objects and picture objects shown in FIGS. 44 to 47, with the present object definition table also including a "visibility" column. This "visibility" column in the object definition table is used to show whether an object is to be displayed, which is to say whether the object in question is valid, when switching to content 10 from another content. Here, the valid objects are buttons and text information expressed as bitmaps, with a handler (script) being executed when a button is activated by a user operation. Invalid objects are not displayed and their handlers are ignored.

As a result of this object definition table, when reproduction of the contents is commenced, only the objects with the object index numbers 0–2 are valid, so that the buttons for "North Osaka", "Central Osaka", and "South Osaka" given by the bitmap index numbers 0–5 are displayed, with one button being in the selected state and the other two being in the normal (non-selected) state. In this way, content 10 shown in FIG. 43 is reproduced.

The scripts in the handler definition table are programs for performing content switching between the four contents. These scripts are composed of "hide_object( )" instructions for preventing the display of objects (invalidating), and "show_object( )" instructions for having objects displayed (validating).

As one example, when the "North Osaka" button in content 10 is selected and activated by the user, the handler (with handler index number 0) corresponding to the "North Osaka" button object (object index 0) is activated. The script in this handler invalidates the button objects with the object index numbers 0, 1, and 2, which is to say the buttons for "North Osaka", "Central Osaka", and "South Osaka". On the other hand, the button object with the object index number "3", which is to say the "return" button is validated, as is the picture object with the object index number "4", which is to say the text information "Weather Information for North Osaka".

As a result, the display switches from content 10 in FIG. 43 to content 11. Similar switching processes are also performed when the buttons "Central Osaka" and "South Osaka" are selected and activated by the user during the reproduction of content 10.

As another example, when the user selects and activates the "return" button during the reproduction of content 11, 12 or 13, the handler (with handler index number 3" for the "return" button object (with the object index number 3) is activated. By executing the script in this handler, the three button objects with the object index numbers 0–2, which is to say the buttons for "North Osaka", "Central Osaka", and "South Osaka", are validated, with the other objects (button object 3, picture objects 4–6) being invalidated. As a result, the display switches to content 10 shown in FIG. 43.

As described above, a plurality of objects can be written into one set of navigation information, with the programs being given as scripts for giving the combinations of objects to be displayed (which is to say the valid objects). Putting this into other words, a plurality of contents can be achieved by a single set of navigation information. When doing so, the reception apparatus 5121 no longer needs to receive a new set of navigation information when switching between contents, so that the system can respond more quickly to user operations.

1-3-12 Modifications

As shown by the multiplexing information table 6001 in FIG. 14 of the present embodiment, the bit rate (NE_component_(x)_bitrate) of a navigation information table was set at 1 Mbps for each content, although it is also possible for different values to be set depending on the data included in each content. As one example, contents which are expected to be heavily used by viewers, such as a content used as a main menu, may be set a higher bit rate. As a specific example, in the interactive program shown in FIG. 5, contents 0 and 1 may be set a higher bit rate than contents 2 and 3.

It is also possible for bit rates to dynamically change across the reproduction period of a content. As one example, for link destination contents whose reference probability increases or decreases with time, the assigned bit rate may dynamically change as the version number changes for the present content.

As one example, the bit rate in the multiplexing information table 6001 may dynamically change. When this is the case, the multiplexing instructions sent from the multiplexing control unit 5110 to the multiplexing unit 5112 will include the bit rates given in this multiplexing information table 6001, so that the multiplexing frequency of the navigation information can also be dynamically changed.

Here, if every set of navigation information is assigned the same bit rate (which is when each set of navigation information is assigned one PID), the multiplexing control unit 5110 may count the number of times multiplexing instructions are generated for the navigation information tables, with, for example, multiplexing instructions being generated for the navigation information of contents 0–3 at a ratio of 2:1:1:1.

The present embodiment also describes the case when the image data is displayed using the full screen of the display unit 5129 of the reception apparatus 5121, although a smaller size may alternatively be used. As one example, when the image data is reduced to ¼ of the size of the screen, the bit rate required for transferring image data can be reduced to one quarter, so that the total number of contents can still be increased when there is an upper limit for the bit rate which may be assigned to the interactive program. When doing so, the image data may be still be combined with objects described in the navigation information to give the reproduced image. It is also possible for contents to be composed of a simultaneous display of between two and four quarter-screen sets of video data.

In the present embodiment, interactive programs are described as being broadcast using digital satellite broadcasting, although they may instead be broadcast from a cable TV (CATV-Cable Television Service) broadcasting station.

In the present embodiment, each navigation information table was described as having a time information table where the valid start time "start_time" showing when the navigation information becomes valid and the valid end time "end_time" showing when it ceases to be valid are defined as relative times where the start time of the broadcasting into which the applications stored in the transmission data storage unit 102 are multiplexed is set as "0". The reception control unit 5126 of the reception apparatus 5121 is also described as referring to the clock unit of the AV decoder unit 5124 which measures time in synchronization with the information in the PCR multiplexed into the transport stream (where the multiplexing unit 5112 of the digital broadcasting apparatus 5101 sets the initial value of the transport stream at "0") and judging whether the valid start time or valid end time of each set of navigation information has been reached. However, it is also possible, for example, for the reception apparatus 5121 to be provided with a clock unit which measures absolute time, with the reception control unit 5126 referring to this clock unit to obtain the present absolute time, before reading the start time (absolute time) of an event from the event information in the EIT stored in the system information table generating unit 5105 and subtracting the event start time from the present absolute time to obtain a relative broadcasting start time (given as "0") for the event, which it then uses to judge the valid start time and valid end time of each set of navigation information.

When the valid start time and valid end time in the time information table are given as absolute times, and the reception control unit 5126 is provided with a clock unit for measuring absolute time, it should be obvious that the reception control unit 5126 may refer to this clock unit which measures absolute time and judge the valid start time and valid end time of each set of navigation information.

When the management of the valid time periods of each set of navigation information does not need to be especially precise, the reception control unit 5126 of the reception apparatus 5121 need not judge the valid start time and valid end time of each set of navigation information, so that when notification of the separation of a new navigation information table is received from the TS decoder unit 5123, the reception control unit 5126 may invalidate the present navigation information table and validate this new navigation information table.

Navigation information which does not include a time information table may alternatively be transmitted. In such a case, the time information table of each set of navigation information may be stored separately to the navigation information, such as in the construction information storage unit, with the multiplexing control unit being constructed to refer to the time information tables when generating multiplexing instructions.

Finally, while the present embodiment describes the case where the image data and audio data to be broadcast are stored beforehand in the presentation information storage unit 5107 of the digital broadcasting apparatus 5101, it is also possible for a video camera and an encoder for real-time compressing the images shot by the camera to be provided, so that the output of the encoder may then be stored in the presentation information storage unit 107 in real-time.

Second Embodiment

In the present embodiment, a digital broadcasting apparatus for achieving interactive programs composed of page-based contents is described.

The fundamental principles for the realization of interactive programs composed of page-based contents are explained below with reference to FIGS. 49 to 51, prior to the description of the construction of the digital broadcasting system of the present embodiment.

FIG. 49 shows several examples of "contents" which are displayed by the display screen of a receiver apparatus, with these example contents representing weather forecasts. Here, the example contents 151 to 153 show weather forecasts for the whole of Japan (153) and for different regions (151, 152). The arrows 154 to 157 which have been drawn between pairs of these contents 151 to 153 show the switching of display which can be performed in response to user operations.

When the content 153 which gives the weather forecast for the whole of Japan is being displayed on the display screen, if the user makes a selection and confirmation operation for the button 161 which represents "Tokyo", the display on the display screen will switch as shown by the arrow 154 to content 151 which shows the weather forecast for Tokyo. Should the user then select and confirm the "Return" button 158, the display screen will switch from the content 151 to the content 153, as shown by the arrow 155.

In the same way, if the user selects and confirms the button 161 representing "Osaka" in the content 153, the display screen will switch from the content 153 to the content 152, as shown by the arrow 156. Once again, should the user then select and confirm the "Return" button 159, the display screen will switch from the content 152 to the content 153, as shown by the arrow 157. In order to perform these display switching operations, the contents 151 to 153 are provided with the buttons 158 to 161. Here, in addition to these buttons, each content may also include buttons for switching to the stream-based contents which were described in the first embodiment.

In order to allow the user to make display switching operations which switch the display between contents, the transmission apparatus transmits each content according to the procedure described below.

Figure 50:
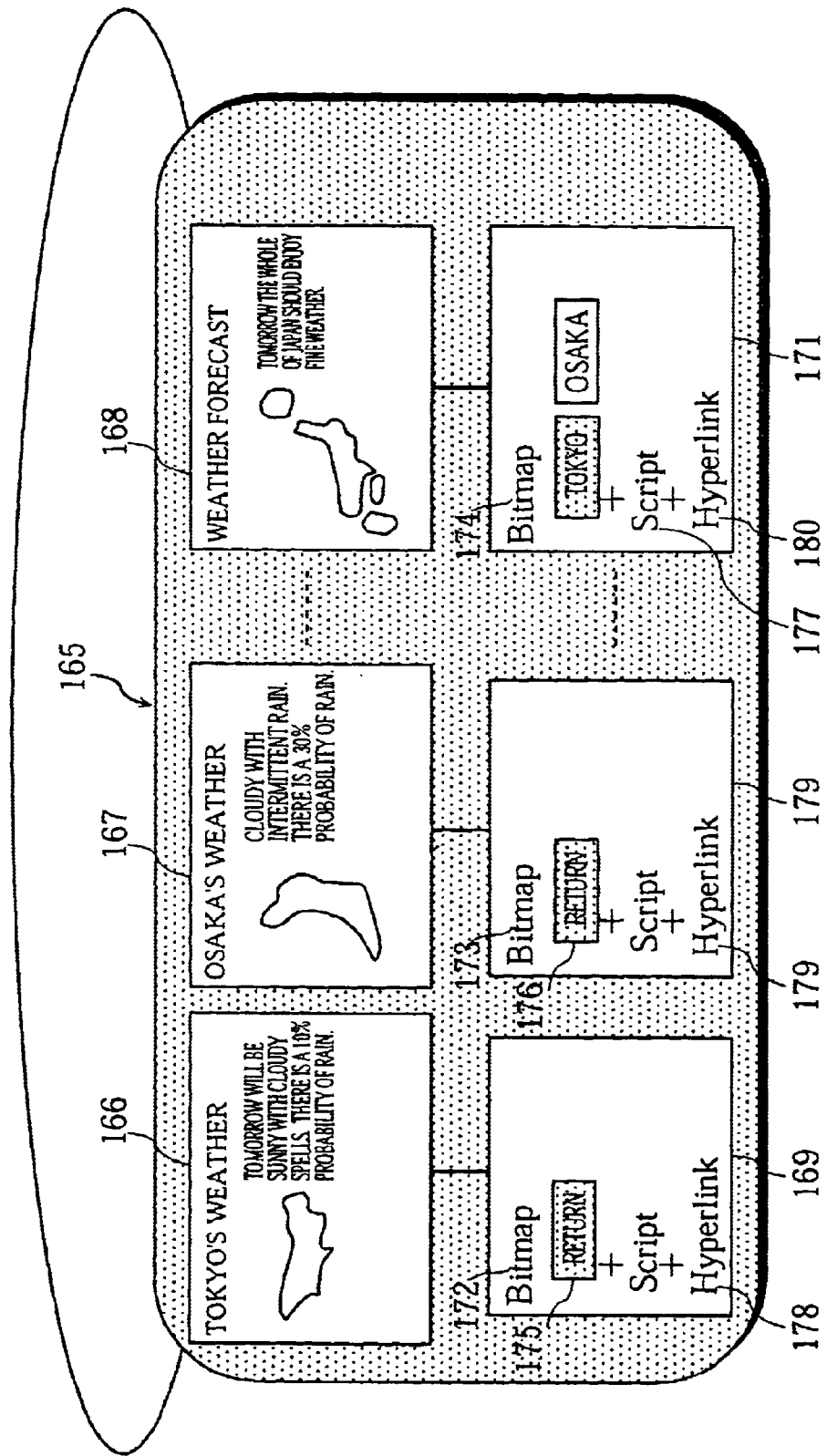
FIG. 50 is a model representation of the transmission data transmitted by the transmission apparatus.

FIG. 50 is a pictorial representation of the transmission data which is transmitted by the transmission apparatus. The transmission data 165 is made up of data representing a plurality of contents, and is repeatedly transmitted in its entirety. This transmission data 165 is composed of a plurality of sets of image data 166, 167, 168 . . . and a plurality of sets of navigation information 169, 170, 171 . . . corresponding to the sets of image data.

Each set of image data (166 onwards) is composed of a main image of one of the contents (151 onwards) which is to be displayed on the display screen of the reception apparatus. Here, the same example weather forecasts are shown in the drawings.

Each set of navigation information is 169 to 171 includes a set of bitmap data 172 to 174 such as a button which is superimposed on the corresponding image 166 to 168, a set of script information 175 to 177 which describes the operations to be executed in accordance with user operations, and a set of hyperlink information 178 to 180 which shows the contents which can be switched to as a result of a display switching operation made by the user.

As examples, the content 151 shown in FIG. 49 is composed of the image data 166 and the navigation information 169. In the same way, the content 152 shown in FIG. 49 is composed of the image data 167 and the navigation information 170, while the content 153 is composed of the image data 168 and the navigation information 171. Putting this into other words, each set of image data (such as 166) has a corresponding set of navigation information (such as 169).

FIG. 51 is a pictorial representation of the transmission of the transmission data 165 by the transmission apparatus. As shown in FIG. 51, the transmission apparatus repeatedly transmits the transmission data. From this it can be seen that the transmission data 165 is cyclically transmitted.

It should be noted here that while the image data and navigation information have been illustrated in frame format, the image data and corresponding navigation information are in fact digitized and multiplexed together, before being transmitted as an MPEG2 transport stream. FIGS. 50 and 51 are therefore somewhat different from the actual transmission data which is transmitted by the present system.

Also, while not illustrated in the drawings, each of the transmitted sets of image data 166 onwards is assigned identification information to distinguish the image data from the other sets of image data. In the same way, each set of navigation information 169 onwards is also assigned identification information to distinguish the navigation information from the other navigation information.

The receiver apparatus refers to these sets of identification information in the transmission data 165 and obtains the image data and navigation information which include the appropriate identification information. The obtained information is then reproduced and displayed as one content, such as the content 151 shown in FIG. 49. Here, the obtained navigation information, such as the navigation information 171, is stored in readiness for user operations.

The following is a description of the digital broadcasting system to which the present embodiment relates, with reference to the drawings.

2-1 Outline of the Construction

FIG. 52 shows the construction of the digital broadcasting system of the second embodiment of the present invention. This digital broadcasting system is composed of a data transmission apparatus 101 and a plurality of data reception apparatuses 121.

The data transmission apparatus 101 is constructed to multiplex data for a plurality of paged-based contents, which feature hyperlinks to one another, into an MPEG2 transport stream and repeatedly transmit the multiplexed data. This data transmission apparatus 101 is composed of a transmission data storage unit 102, a data multiplexing unit 103, a multiplexing information storage unit 104, a system information table generating unit 105, and a transmission unit 106.

The data reception apparatus 121 is constructed to selectively obtain and reproduce a content from the MPEG2 transport stream transmitted by the data transmission apparatus 101, in accordance with an interactive operation made by the user. This data reception apparatus 121 is composed of a reception unit 122, a TS decoder unit 123, an AV decoder unit 124, a received data storage unit 125, a reception control unit 126, a signal reception unit 127, a reproduction unit 128, a display unit 129, and an audio output unit 130.

2-2 Data Transmission Apparatus 101

2-2-1 Construction of Transmission Data Storage Unit 102

The transmission data storage unit 102 is composed of a recording medium such as a magnetic disc, and stores data for a plurality of contents which compose one interactive program and construction information. This transmission data storage unit 102 includes a presentation information storage unit 107, a navigation information storage unit 108, and a construction information storage unit 109. Here, an "interactive program" refers to an "event" or "program" which is included in the MPEG2 transport stream used as the transmission data.

The transmission data storage unit 102 separately stores the image data (presentation information) and the navigation information in the transmission data 165 shown in FIG. 50. The transmission data storage unit 102 further stores a composition correspondence table which shows the correspondence between sets of image data and navigation information.

2-2-1-1 Presentation Information Storage Unit 107

The presentation information storage unit 107 stores presentation information, such as image data and audio data, which is included in each content. FIGS. 53A and 53B show sets of still image data which are examples of the presentation information for contents 153 and 151. FIG. 53A shows the still image data 201 which is given the filename "still5.m2v", while FIG. 53B shows the still image data 202 which is given the filename "still1.m2v". These sets of still image data 201, 202 are stored having been digitally encoded according to IS/IEC 13818-2 (MPEG2 video) standard. However, other encoding methods for image data may be used.

2-2-1-2 Navigation Information Storage Unit 108

The navigation information storage unit 108 stores the navigation information which is included in the transmitted contents. This navigation information can include hyperlink information for links to other contents, and describes objects which allow the user to interactively select link destinations. An example of this navigation information is shown in FIG. 54, with the figure showing the navigation information 301 of content 153 which has been given the filename "navi5.nif".

It should be noted that information showing that the still image data 201 shown in FIG. 53A and the navigation information 301 shown in FIG. 54 form one content 153 is given in the construction correspondence table 501 shown in FIG. 56. This is described in more detail later in this text.

The navigation information 301 includes an object definition table 302, a handler definition table 303, a hyperlink table 304, and a bitmap table 305 which are each given in table format. This navigation information 301 differs from the navigation information 5301 shown in FIG. 7 in that it does not include a time information table, but is otherwise effectively the same and so will not be described in detail. Also, in FIG. 54, the "object index", the "handler index" the "hyperlink index", and the "bitmap index" have each been abbreviated to "index".

2-2-1-3 Construction Information Storage Unit 109

The construction information storage unit 109 stores the construction information table and the entry information.

The construction information table is information showing a combination of the presentation information and navigation information for each content. The entry information is information showing an entry content.

The construction information table 501 shown in FIG. 56 stores information which shows a combination of the presentation information and navigation information for each content, with each corresponding content number. These content numbers are used to identify each content among the plurality of contents stored in the transmission data storage unit 102. As shown in FIG. 56, the first line of construction information table 501 is for the content with the content number "0", which is composed of a combination of the still image data with the filename "still0.m2v" which is stored in the presentation information storage unit 107 and the navigation information with the filename "navi0.nif" which is stored in the navigation information storage unit 108. This is also the case for the other lines in the construction information table 501.

The entry information 502 shown in FIG. 56 shows that the entry content representing the first content to be displayed in the application stored in the transmission data storage unit 102 is the content with the content number "5".

2-2-2 Multiplexing Information Storage Unit 104

The multiplexing information storage unit 104 stores assigning information for resources, such as identifiers and areas when multiplexing the transmission data stored in the transmission data storage unit 102 into an MPEG2 transport stream for broadcasting, in the form of a multiplexing information table. An example of this multiplexing information table 601 is shown in FIG. 57.

The item "Bit_Rate" stored on line 1 of multiplexing information table 601 shows the assigned transfer rate when multiplexing the transmission data stored in the transmission data storage unit 102 into an MPEG2 transport stream. Here, 6 Mbps is assigned as the transfer rate.

The "original_network_id", the "transport_stream_id", the "service_id", and the "event_id" on lines 2 through 5 of the multiplexing information table 601 are the same as those in FIG. 14, and so will not be described.

Lines 6 through 10 of the multiplexing information table 601 show the values of the PIDs assigned to each of the components which compose the event when the application stored in the transmission data storage unit 102 is multiplexed into a broadcast MPEG2 transport stream as an event. It should be noted here that PMT_PID and PCR_PID represent the values of the PIDs which are assigned to the PMT (Program Map Table) and PCR (Program Clock Reference), respectively. These are explained later in this text.

The NE_component_pid (navigation information component packet identifier) shows the value of the PID assigned to the component into which the navigation information stored in the navigation information storage unit 108 of the transmission data storage unit 102 is multiplexed.

The VE_information_component_pid (stream correspondence information component packet identifier) shows the value of PID assigned to the components into which the stream correspondence table generated by the stream correspondence information table generating unit 111 (described later in this text) is multiplexed.

The VE_component_pid (image data component identifier) shows the value of the PID assigned to the component into which the image data stored in the presentation information storage unit 107 is multiplexed.

It should be noted that in the present embodiment, the NE_component_pid, the VE_information_component_ pid and the VE_component_pid are each assigned only one PID, although it is also possible for each to be assigned a plurality of PIDs. This is to say, while FIG. 54 shows the case when the NE_component_pid is "0x0082", the VE_information_component_pid is "0x0083", and the VE_component_pid is "0x0084", the NE_component_ pid can be additionally assigned the value "0x0085", the VE_information_component_pid the value "0x0086", and the VE_component_pid the value "0x0087".

Also, while not present in the present embodiment, when audio information is included in the transmission data, an AE_information_component_pid and an AE_component_pid will also be assigned.

2-2-3 Construction of the Data Multiplexing Unit 103

The data multiplexing unit 103 is composed of a multiplexing control unit 110, a stream correspondence information table generating unit 111, an identifier information appending unit 112, a navigation information table generating unit 113, and a multiplexing unit 114.

The data multiplexing unit 103 performs the processing described below to generate the transmission data 165 shown in FIG. 51.

2-2-3-1 Multiplexing Control Unit 110 (Part 1)

On being activated by the transmission unit 106, the multiplexing control unit 110 first reads the construction information table 501 and the multiplexing information table 601 stored in the construction information storage unit 109 and the multiplexing information storage unit 104, before generating an identifier assigning table which assigns an image data identifier VE_id and a navigation information identifier NE_id to each content number of contents in the digital broadcast.

FIG. 58 shows content identifier assigning table 701 which is an example of this content identifier assigning table. Here, each column in the content identifier assigning table 701 is the same as those in FIG. 15 of the first embodiment, with these identifiers being mainly used in the present embodiment for page-based contents. The "VE_id" 709 is the identifier for uniquely identifying a set of image data in a page-based content in one of the events. The "AE_id" 713 is the identifier for uniquely identifying a set of audio data. The "NE_id" 710 is the identifier for uniquely identifying a set of navigation information in one of the events.

In the present embodiment, "VE_id", "AE_id", and "NE_id" are used for identifying each page-based content. In the first embodiment, meanwhile, a "VE_comp_tag", an "AE_comp_tag", and an "NE_id" are used for identifying each stream-based content. As a result, the "VE_comp_ tag" and "AE_comp_tag" columns in the present table are set at "−"

In the present embodiment, the "VE_id" 709 and "NE_ id" 710 are assigned the same value as the content number 702.

However, the values of "VE_id" 709 and "NE_id" 710 do not need to match the value of the content number 702, so long as each they are assigned different values for each pairing of a set of image data and set of navigation information.

In the present embodiment, no audio data is present, so that no identifiers are assigned to "AE_svc_id" 711, "AE_ event_id" 712, "AE_id" 713 and "−" is written into the table. When audio data is present, these values are assigned in the same way as for the image data and navigation information.

On completing the generation of the content identifier assigning table 701, the multiplexing control unit 110 generates the display image information identifier assigning table which assigns values to "PID", "component tag", and "stream__ID". An example of this display image information identifier assigning table, display image information identifier assigning table 801, is shown in FIG. 59. In the display image information identifier assigning table 801, the "VE__id" 709 is the same as that assigned in the content identifier assigning table 701, while the "PID" 803 is assigned the same value (here, the value "0x0084") as the "VE__component_pid" 607 in the multiplexing information table 601. Each "component_tag" 802 is assigned the same value for each value of the "PID" 803 (so that in the present example "0x00" is assigned to the "component_tag" 802 for each value "0x0084" of the "PID" 803). Each entry in the "stream__id" 804 column is assigned a hexadecimal value which is cyclically incremented by "1" between "e0" and "ef". Finally, the filename of the image data which is identified by this value of "VE__id" 709 and which is stored in the presentation information storage unit 107 is written into the image data file column 805.

It should be noted here that when a plurality of identifiers are assigned to the VE__component_pid of FIG. 57, the "PID" and "stream__id" can be assigned in the manner described below. First, each value of "PID" is set by extracting one value from the VE__Component_pid, while the "stream__id" is set a hexadecimal value which is incremented between "e0" and "ef". After each set of stream ids, a new VE__component_pid is extracted from the multiplexing information table and is set in the "PID" 803. When there are no more new values of VE__component_pid, the process returns to the value of the VE__component_pid that was assigned first. Here, a different value is set in the "component tag" 802 for each PID 803.

In the present embodiment, all sixteen of the possible values between "e0" and "ef" are used as values of the stream__id for image data, although it is equally possible for only some of such possible values to be used. For audio data, thirty-two hexadecimal values between "c0" and "df" may be used for stream ids in accordance with MPEG2 standard.

It should be noted that the value of the "component_tag" 802 is used to indirectly refer to the "PID". As described above, the "component tag" 802 may be set any values which one-to-one correspond to values of the PID, with the correspondence between component tags and PIDs being written into the PMT which is described later in this text. Here, if the value of the PID is not found directly from the navigation information or stream correspondence information, but is instead indirectly found using the "component_tag", it becomes no longer necessary to change the navigation information or stream correspondence information when multiplexing the data with other programs, even when the value of the PID is changed by the transmission unit 106 (described later).

On completing the generation of the display image information identifier assigning table 801, the multiplexing control unit 110 gives an indication to the stream correspondence information table generating unit 111 to generate the stream correspondence table, an indication to the identifier information appending unit 112 to add the identifier VE__id to private area of the image data, and an indication to the navigation information table generating unit 113 to generate a navigation information table.

2-2-3-2 Identifier Information Appending Unit 112

On receiving an indication from the multiplexing control unit 110 to add identifier information, the identifier information appending unit 112 retrieves the image data stored in the presentation information storage unit 107. The identifier information appending unit 112 then writes the image data identifier VE__id into the private area of the retrieved image data bitstream. It should be noted here that the identifier information appending unit 112 obtains this identifier VE__id by referring to the display image information identifier assigning table 801 generated by the multiplexing control unit 110. The identifier information appending unit 112 then adds a filename to the image data bitstream with the appended VE__id and stores it in a storage region (not illustrated).

FIG. 60 shows a bitstream 901 which is an example of he image data with the filename "VE(5)" to which identifier information has been appended. This bitstream 901 is encoded according to MPEG2 standard, with the value "0x0005" of the VE__id being recorded in the user data area 903 of the picture header 902. The still image data 201 shown in FIG. 53A, meanwhile, is recorded in the picture data area 904. Once identifier information has been appended to every set of image data, the identifier information appending unit 112 gives the multiplexing control unit 110 an indication showing that the appending process has been completed.

It should be noted here that while the present embodiment describes the case when the VE-id is written into the user data area, it may instead be written into any area which may be used for recording private data.

2-2-3-3 Navigation Information Table Generating Unit 113

On receiving an indication to generate the navigation information table, the navigation information table generating unit 113 reads the navigation information stored in the navigation information storage unit 108. When the read navigation information includes a hyperlink table, the navigation information table generating unit 113 refers to the content identifier assigning table 701 for the information regarding link destinations which are expressed using content numbers. The navigation information table generating unit 113 then converts all of the identifiers to generate the navigation information table. When no hyperlink table is included, the navigation information table generating unit 113 generates the navigation information table using the original navigation information as it is, changing only the filenames. The generated navigation information is then stored in a storage area (not-illustrated).

FIG. 61 shows the generated navigation information table 1001 which has the filename "NVT(5)". This navigation information table 1001 has been generated from the navigation information with the filename "navi5.nif" which was shown in FIG. 54. The navigation information table 1001 includes the object definition table 1002, the handler definition table 1003, the hyperlink table 1004, and the bitmap table 1005.

FIG. 62 shows the navigation information table 1101 for the filename "NVT(1)". This navigation information table 1101 has been generated from the navigation information "navi1.nif" shown in FIG. 55, and does not include a hyperlink table, so none has been shown.

On completing the generation of the navigation information table, the navigation information table generating unit 113 gives the multiplexing control unit 110 notification of such.

2-2-3-4 Stream Correspondence Information Table Generating Unit 111

On receiving an indication from the multiplexing control unit 110 to generate a stream correspondence table, the stream correspondence information table generating unit 111 refers to the display image information identifier assigning table 801 and generates a stream correspondence table for each set of image data. These stream correspondence tables are used to extract sets of image data from the stream transmitted to the data reception apparatus 121 from the data transmission apparatus 101.

FIG. 63A shows the stream correspondence table [VET (5)] 1201 which is used by the data reception apparatus 121 to extract the image data "VE(5)". The item "first_pts" in this stream correspondence table 1201 represents the reproduction starting time information in units of one ninety-thousandth of one second for the time at which the first frame in the corresponding image data is to be reproduced. This "first_pts" can be obtained, as one example, using the formula given below as Formula 1.

$$\text{first\_pts}(N) = \left[ \sum_{x=0}^{N} \{S\_VE(x) + S\_NVT(x) + S\_VET*R\}/B \right] * 90000 \quad \text{Formula 1}$$

Here, S_VE(x) is the size when the image data VE(x) stored in a storage area of the identifier information appending unit 112 has been converted into a transport stream packet in accordance with MPEG2 system standards. S_NVT(x) is the size when the navigation information table NVT(x) stored in a storage area of the navigation information table generating unit 113 has been converted into a transport stream packet. S_VET is the size when one stream correspondence table stored in a storage area of the stream correspondence information table generating unit 111 has been converted into a transport stream packet. Here, these sizes are expressed as numbers of bits. Here, the variable "R" represents the number of times a stream correspondence table has been multiplexed, and is an integer in the range from "1" to "(P*S)". The variable "P" is the number of PIDs which have been assigned to each component which has been allocated by the multiplexing information storage unit 104 for transferring the image data, the value of P being "1" in the present embodiment. The variable "S" represents the number of different stream_id values which are used in the display image information identifier assigning table 801, with this being "16" in the present embodiment. Finally, the variable "B" represents the bit rate, which is "6 Mbps" in the present embodiment.

It should be noted here that the S_VE(x) is found by the adding the sizes of the PES packet header and the trailer information which are required by each PES packet, and the sizes of the transport packet header and trailer information part which are required by each transport packet to the size of VE(x). S_NVT(x) is found by adding the sizes of the section header and trailer header required by each section and the sizes of the transport packet header and trailer information part which are required by each transport packet to the size of NVT(x). S_VET, meanwhile, is found by adding the sizes of the section headers and the like to the size of the VET, in the same way as S_NVT(x). It should be noted here that in the present embodiment, all of the VETs are of the same size. A detailed description of the PES packet, the transport packet, and the sections is given in the documentation for MPEG2 system standard.

The "last_pts" in the stream correspondence table 1201 gives information for the time at which the final frame in the corresponding image data is to be reproduced as the reproduction end time. This "last_pts" is expressed in units of 1/90000 of one second. In the present embodiment, the image data is composed of still images, so that the "last_pts" (reproduction end time information) is the same as the "first_pts".

The "component_tag" and "stream_id" in stream correspondence table 1201 are set at the values of the component_tag and the stream_id assigned to the corresponding image data by referring to the display image information identifier assigning table 801.

FIG. 63B shows the first stream correspondence table 1202 for the image data, while FIG. 63C shows the fifteenth stream correspondence table 1203 for the image data.

It should be noted here that the time "0" which is the standard for the "first_pts" and the "last_pts" in the stream correspondence tables 1201, 1202, and 1203 is the time at which the data stored in the transmission data storage unit 102 is first multiplexed into the transport stream and transmitted.

In the present embodiment, the stream correspondence information table generating unit 111 is described as referring to the display image information identifier assigning table 801 and writing the value of the assigned component_tag into the stream correspondence table, although the value of the assigned VE_component_pid in the multiplexing information table 601 may be directly written in place of the value of the VE_component_pid.

2-2-3-5 Multiplexing Control Unit 110 (Part 2)

On receiving notification from the identifier information appending unit 112, the navigation information table generating unit 113, and the stream correspondence information table generating unit 111 indicating that they have completed their respective processes, the multiplexing control unit 110 determines the number of contents "T" to be used as the unit for repetition. Here, put simply the number of contents used as the unit for repetition T is a total given by adding the number M of contents included in the transmission data 165 to the number of dummy contents, or more precisely is set at T where M≦P*S*n=T with M as the total number of contents stored in the construction information storage unit 109. As described above with reference to Formula 1, "P" is the number of PIDs which are assigned to a component for transferring the image data by the multiplexing information storage unit 104, while "S" is the number of stream_ids. Also, "n" is the smallest integer which enables the condition M≦T to be satisfied. In the =present embodiment, P=1, S=16, and M=63, so that T=64. Note here that when the number of contents T in each repetition is greater than the total number of contents M, the multiplexing control unit 110 multiplexes T−M null packets of a size which is at least equal to the smallest content after first multiplexing all of the contents into the transport stream. By doing so, it is possible to maintain at least a predetermined interval D (at least (P*S−1) times the size of the smallest content) between the multiplexing positions of the image data and the stream correspondence table corresponding to the image data.

The multiplexing control unit 110 uses Formula 2 below to find the length L of one cycle of the number of contents T in each repetition. The value L is expressed in units of 1/90000 of one second and is the length of the transport stream when multiplexing all of the contents and null packets of a size equivalent to (T−M) contents into the transport stream at the bit rate B stored in the multiplexing information storage unit 104.

$$L = \left[ \left[ \sum_{x=0}^{M-1} \{S\_VE(x) + S\_NVT(x) + S\_VET*R\} + \{S\_VE(0) + S\_NVT(0) + S\_VET*R\} * (T-M) \right]/B \right] * 90000 \quad \text{Formula 2}$$

As described above, M and T are the total number of contents and the number of contents in one repetition, with S_VE(x), S_NVT(x), S_VET, R, and B being the same as defined in Formula 1.

The multiplexing control unit 110 sets the content counter i at "0" and sets the multiplexing start position pointer wp at "0". This value of "wp" shows the time from the first information position of the contents multiplexed into the transport stream.

The multiplexing control unit 110 next sets the value of the VET counter j at "0". The value of this VET counter j is then used to find the cycle number C and the content number N. The cycle number C is the integer of the quotient given by {i+(P*S)−1−j}÷T, while the content number is the remainder of {i+(P*S)−1−j}÷T. Following this, the multiplexing control unit 110 judges whether an Nth stream correspondence table VET(N) is stored in the stream correspondence information table generating unit 111, and if so, adds a value, which is a multiple of length L of one cycle of the number of contents T in one repetition and a number of cycles C, to the "first_pts" and "last_pts" of VET (N).

The multiplexing control unit 110 then instructs the multiplexing unit 114 to multiplex VET(N) into the transport stream. In doing so, the multiplexing control unit 110 informs the multiplexing unit 114 of the multiplexing start position wp and the bit rate B, as well as the value of the "VE_information_component_pid" in the multiplexing information table 601 as the PID value and the value of the "VE_id" corresponding to the content number N in the content identifier assigning table 701 as the table_id_extension.

When VET(N) is not stored in the stream correspondence information table generating unit 111, the multiplexing control unit 110 instructs the multiplexing unit 114 to multiplex a null packet with the same size as S VET, and informs the multiplexing unit 114 of the multiplexing start position wp and the bit rate B.

After instructing the multiplexing unit 114 to perform multiplexing, the multiplexing control unit 110 calculates the multiplexing start position wp using the equation wp=wp+S_VET/B. After this, the multiplexing control unit 110 adds "1" to the value of the VET counter j and judges whether the VET counter j coincides with the value of the number of repeated multiplexing R in the stream correspondence table. When the values match, the multiplexing control unit 110 recalculates the number of cycles C and the contents number N, before continuing with the multiplexing process for VET (N).

On judging that the values do not match, the multiplexing control unit 110 calculates the number of cycles C and the contents number N according to the method described above and judges whether there is a content with the content number N stored in the identifier information appending unit 112 or in the navigation information table generating unit 113. On judging that such a content is being stored, the multiplexing control unit 110 instructs the multiplexing unit 114 to multiplex VE (N). At this point, the multiplexing control unit 110 informs the multiplexing unit 114 of the values of the multiplexing start position wp, the bit rate Bv(N), the PID, and the stream_id. Here, to find the values of the PID and the stream_id, the multiplexing control unit 110 fetches the values of the PID and of the stream_id from "PID" and the "stream_id" assigned to the image data whose "VE_id" is "N" from the display image information identifier assigning table 801. On the other hand, the multiplexing control unit 110 calculates the bit rate Bv(N) according to Formula 3 below.

$$\text{bit rate } Bv(N)=\{S\_VE(N)*B\}/\{S\_VE(N)+S\_NVT(N)\} \quad \text{Formula 3}$$

The symbols in the above Formula 3 are the same as those in Formula 1.

The multiplexing control unit 110 also instructs the multiplexing unit 114 to multiplex NVT(N). In doing so, the multiplexing control unit 110 informs the multiplexing unit 114 of the values of the multiplexing start position wp, the bit rate Bn(N), the PID, and the table_id_extension. Here, to find the value of the PID, the multiplexing control unit 110 refers to the multiplexing information storage unit 104 and extracts the PID which has been assigned to the component assigned to the transfer of the navigation information. To find the value of the table_id_extension, the multiplexing control unit 110 extracts the value of "NE_id" assigned to the contents identifier N from the content identifier assigning table 701. The multiplexing control unit 110, calculates the bit rate Bn(N) according to Formula 4 given below.

$$\text{Bit rate } Bn(N)=\{S\_NVT(N)*B\}/\{S\_VE(N)+S\_NVT(N)\} \quad \text{Formula 4}$$

The symbols in the above Formula 3 are the same as those in Formula 3.

The multiplexing control unit 110 next finds the multiplexing start position wp according to the formula [wp=wp+{S_VE(N)+S_NVT(N)}/B].

When content N is not stored, the multiplexing control unit 110 instructs the multiplexing unit 114 to multiplex a null packet of a size given as S_VE(0)+S_NVT(0). In doing so, the multiplexing control unit 110 informs the multiplexing unit 114 of the multiplexing start position wp.

While the above explanation gives the size of a null packet to be multiplexed as the combined size of S_VE(0) and S_NVT(0) for content number "0", the size of the null packet may instead be set at a size S_VE(k)+S_NVT(k) where this represents the smallest combined size out of all of the contents.

The multiplexing control unit 110 next finds the multiplexing start position wp according to the formula [wp=wp+{S_VE(0)+S_NVT(0)}/B].

The multiplexing control unit 110 next adds "1" to the value of the content counter i, recalculates the value of the VET counter j, and repeats the processing from the multiplexing of VET(N) onwards.

2-2-3-6 Multiplexing Unit 114

The multiplexing unit 114 multiplexes the transmission data 165 shown in FIG. 51 into an MPEG2 transport stream. FIGS. 64 (collectively FIGS. 64A and 64B) and 65 (collectively FIGS. 65A and 65B) show model representations of multiplexed streams where identification information has been added to the data shown in FIG. 51. This is described in detail below.

When instructed by the multiplexing control unit 110, the multiplexing unit 114 multiplexes data into an MPEG2 transport stream using a method which has been standardized according to MPEG2 system standards. On receiving instructions from the multiplexing control unit 110 to multiplex a stream correspondence table VET(N), the multiplexing unit 114 reads the stream correspondence table VET(N) from the stream correspondence information table generating unit 111 and multiplexes it into the transport stream at a position starting from the indicated multiplexing start position wp, using the indicated PID, table_id_extension, and bit rate B. On receiving an indication from the multiplexing control unit 110 to multiplex the image data VE(N), the multiplexing unit 114 reads the image data which has been appended with the corresponding identifier from the identifier information appending unit 112 and multiplexes the image data into the transport stream at a position starting from the indicated multiplexing start position wp, using the indicated PID, stream_id, and bit rate Bv(N). On receiving an indication from the multiplexing control unit 110 to multiplex the navigation information NVT(N), the multiplexing unit 114 reads the navigation information table from the navigation information table generating unit 113 and multiplexes it into the transport stream at a position starting from the indicated multiplexing start position wp, using the indicated PID, table_id_extension, and bit rate Bn(N). Also, on receiving an indication from the multiplexing control unit 110 to multiplex a null packet, the multiplexing unit 114 multiplexes a null packet of the indicated size at a position starting from the multiplexing start position wp at the indicated bit rate.

The multiplexing unit 114 multiplexes the PCR at the front of the generated transport stream with the initial value "0", using the PCR_PID indicated by the multiplexing control unit 110.

FIG. 64 shows an example of a transport stream generated by the multiplexing unit 114. Here, the 63 contents stored in the transmission data storage unit 102 have been multiplexed into this transport stream 1701. These 63 sets of image data have been assigned the values "0x0084" shown in the multiplexing information table 601 as their PID, with each set of image data having been assigned a value which has been cyclically incremented between "0xe0" and "0xef".

Each stream correspondence table VET(N) has been assigned the value "0x0083" given in the multiplexing information table 601 as its PID, and a value each to the image data identifier "VE_id" as its table_id_extension. As shown in FIG. 64, one stream correspondence table VET(N) is multiplexed for each set of image data VE (N). Accordingly, the number of repeated multiplexing R for the stream correspondence table is "1".

The sixty-three navigation information tables NE(0) to NE(62) are multiplexed by the multiplexing unit 114 having been each assigned the value "0x0082" given in multiplexing information table 601 as their PID, and the value of the navigation information identifier "NE_id" as their table_id_extension. PCRs 1702, which include standard information for time, are also multiplexed into the transport stream.

As one example, the transmission data 165 shown in FIG. 51 extends between the stream correspondence table VET (15) to the null packet 1705.

Each stream correspondence table VET(N) in the transport stream 1701 is multiplexed at a position at the equivalent of fifteen sets of image data ahead of the corresponding image data VE (N). Since each set of image data is cyclically assigned one of sixteen stream_ids, no image data which has the same PID and stream_id as image data VE(N) will be multiplexed between the stream correspondence table VET(N) and the corresponding image data VE (N). As a result, the data reception apparatus 121 is able to extract the desired image data VE(N) from the transport stream by first obtaining the stream correspondence table VET(N) and then separating the first set of image data in the transport stream which has been assigned the indicated PID and stream_id, out of the many sets of image data with this PID and stream_id.

As one example, there is no image data with the PID "0x0084" and the stream_id "0xe0" between the stream correspondence table VET(16) 1703 and the image data VE(16) 1704. Accordingly, despite there being four sets of image data VE(0), VE(16), VE(32), and VE(48) with the same PID "0x0084" and stream_id "0xe0", the data reception apparatus 121 will separate only the first set of image data with the indicated PID and stream_id which appears after the stream correspondence table VET(16) 1703, which means that the desired image data VE(16) will be obtained.

The transport stream 1701 is also composed so that data equivalent to fifteen contents is multiplexed between each stream correspondence table VET(N) and its corresponding image data VE(N). Accordingly, it can be ensured that the time D taken from the appearance of the stream correspondence table VET(N) to the appearance of the corresponding image data VE(N) is at least the time taken by the transmission of fifteen contents of the smallest size. Accordingly, if the data reception apparatus 121 can perform the necessary processes for the interpretation of the stream correspondence table and the preparation for separating the image data within this time period D, proper reproduction of the desired image data can be ensured. In the present example, a null packet 1705 whose size is equivalent to one content has been multiplexed into the transport stream 1701 to ensure that time D is maintained at a value equivalent at least the transmission time of fifteen contents, even at a part of the transport stream near the end of a transmission cycle. By doing so, it can be ensured that a time interval which is equivalent to the transmission of a least fifteen of the smallest contents is present, even when a stream correspondence table VET(N) and its corresponding image data VE(N) are in different transmission cycles, such as VET(0) 1706 and VE(0) 1707 in FIG. 64.

FIG. 65 shows an example of the transport stream generated by the multiplexing unit 114 when the number of repeated multiplexing R for the stream correspondence tables is "16".

The transport stream 1711 is constructed so that each stream correspondence table VET(N) is multiplexed sixteen times between a position which is the equivalent of fifteen contents ahead of the corresponding image data VE(N) and the multiplexing start position of this image data VE(N). As a result, the data reception apparatus 121 first obtains the stream correspondence table and, in reproducing the corresponding image data VE(N), can reproduce the desired image data faster the shorter the time D between the stream correspondence table VET(N) and the corresponding image data. However, if the time D is reduced, the data reception apparatus 121 has to interpret the stream correspondence table and perform the necessary preparations for the separation of the image data faster. Here, if each stream correspondence table is repeatedly multiplexed, as shown in the transport stream 1711, the data reception apparatus 121 will be able to obtain the stream correspondence table from a position which is close to the image data when the load of the data reception apparatus 121 is light, allowing high-speed reproduction, or from a position which is further from the image data when the load of the data reception apparatus 121 is great. By performing such control, proper reproduction of the image data can be maintained.

On generating a transport stream, such as transport stream 1701 shown in FIG. 64, the multiplexing unit 114 outputs the stream in order to the transmission unit 106.

2-2-4 System Information Table Generating Unit 105

The system information table generating unit 105 refers to the multiplexing information storage unit 104 and generates the NIT (Network Information Table), the EIT (Event Information Table), the SDT (Service Description Table), the PAT (Program Association Table), and the PMT (Program Map Table). These tables compose the program specification information which is used by the data reception apparatus 121 in selecting a program. These tables are the same as those generated by the system information table generating unit 5105 in the first embodiment, so that the following explanation will instead focus on the generated results (which is to say the system information tables) in the present embodiment.

FIGS. 66A to 66C show examples of the NIT, SDT, and EIT generated by the system information table generating unit 105.

FIGS. 67 and 68 show examples of the PAT and PMT generated by the system information table generating unit 105.

FIGS. 69A to 69D show the details of the Entry_descriptor, the NE_Component_Descriptor, the VE_Component_Descriptor, and the stream identifier descriptor generated by the system information table generating unit 105.

FIGS. 69A to 69D show the details of the Entry_descriptor, the NE_Component_descriptor, the VE_Information_descriptor, and the stream_identifier descriptor generated by the system information table generating unit 105.

The "Entry_descriptor" in FIG. 69A is used to record the values of the "entry_VE_id", "entry_AE_id", and the "entry_NE_id". These show that the entry content is a page-based content. This differs from the "Entry_Descriptor" shown in FIG. 73 of the first embodiment which indicates an entry content which is a stream-based content. This to say, the "Entry_Descriptor" shown in FIG. 73 is used to record values of the "entry_VE_comp_tag", "entry_AE_comp_tag", and the "entry_NE_id" which show that the entry content is a stream-based content.

2-2-5 Transmission Unit 106

The transmission unit 106 includes a scheduler, and is activated by the multiplexing control unit 110 at a predetermined time before the transmission start time of an event, such as five minutes before transmission. When the transmission start time is reached, the transmission unit 106 repeatedly multiplexes information such as the NIT, PAT, PMT, SDT, and EIT generated by the system information table generating unit 105 into the transport stream outputted by the multiplexing unit 114 at a predetermined interval using predetermined PIDs in accordance with DVB-SI standard and MPEG2 system standard. The transmission unit 106 then performs modulation and other processes, before transmitting the data to a plurality of data reception apparatuses 121.

FIG. 70 (collectively FIGS. 70A and 70B) gives a model representation of a multiplexed transport stream 1801. In this example, the NIT 1802, the PAT 1803, the PMT 1804, the SDT 1805, and the EIT 1806 have been additionally multiplexed into the transport stream 1706 multiplexed by the multiplexing unit 114.

2-2-6 Operation of the Data Transmission Apparatus 101

The following is a description of the operation of the data transmission apparatus 101 in the present embodiment, with reference to FIGS. 71 through 73.

The multiplexing control unit 110 first generates the identifier assigning table which assigns a VE_id and an NE_id for each content number (S1902). Next, the multiplexing control unit 110 generates the display image information identifier assigning table 801 (S1904), before instructing the identifier information appending unit 112 to append the identifier information, instructing the navigation information table generating unit 113 to generate the navigation information table, and instructing the stream correspondence information table generating unit 111 to generate the stream correspondence table.

The identifier information appending unit 112 appends image data identifiers to the private area of the bit stream of image data stored in the presentation information storage unit 107 and stores the appended data. After appending identifiers to every set of image data, the identifier information appending unit 112 notifies the multiplexing control unit 110 of the completion of its processing (S1906).

The navigation information table generating unit 113 generates navigation information tables from the navigation information stored in the navigation information storage unit 108. After completing the generation of all navigation information tables, the navigation information table generating unit 113 notifies the multiplexing control unit 110 of the completion of its processing (S1908).

The stream correspondence information table generating unit 111 refers to the display image information identifier assigning table 801 generated by the multiplexing control unit 110 and generates the stream correspondence tables. On completing the generation of all of the stream correspondence tables, the stream correspondence information table generating unit 111 notifies the multiplexing control unit 110 of the completion of its processing (S1910).

The system information table generating unit 105 then generates the various system information tables, such as the NIT, the SDT, the EIT, the PAT, and the PMT (S1912).

The multiplexing control unit 110 determines the number of contents T in one repetition when the contents are multiplexed into a transport stream (S1914). Here, the multiplexing control unit 110 calculates the length L of one cycle composed of T contents in units of one ninety-thousandth of one second (this being the length of the transport stream when all contents plus a null packet of a size equivalent to (M−T contents) is multiplexed at the bit rate B stored in the multiplexing information storage unit 104) (S1916). The multiplexing control unit 110 then informs the multiplexing unit 114 of the PCR_PID and instructs the multiplexing unit 114 to multiplex the PCR (S1918). Following this, the multiplexing control unit 110 sets both the content counter i and the multiplexing start position pointer wp at "0" (S2002).

The multiplexing control unit 110 then sets the VET counter j at "0" (S2004). The multiplexing control unit 110 also finds the number of cycles C and content number N. Here, the number of cycles is given as the quotient (integer part) of the sum {i+(P*S)−1−j}, while the content N is given as the remainder (integer) (S2006).

The multiplexing control unit 110 then judges whether the stream correspondence table VET(N) is stored in the storage area of the stream correspondence information table generating unit 111 (S2008), and if so, adds a value given as C*L to the values of first_pts and last_pts of VET(N) (S2010)

The multiplexing control unit 110 instructs the multiplexing unit 114 to multiplex the stream correspondence table VET(N) into the transport stream, and informs the multiplexing unit 114 of the multiplexing start position wp, the bit rate B, the PID, and the table_id_extension (S2018), before proceeding to step S2014.

When the multiplexing control unit 110 judges in step S2008 that the stream correspondence table VET(N) is not stored in the stream correspondence information table generating unit 111, the multiplexing control unit 110 instructs the multiplexing unit 114 to multiplex a null packet which is the same size as S_VET, at the same time informing the multiplexing unit 114 of the multiplexing start position wp and the bit rate B. The multiplexing unit 114 then multiplexes a null packet into the transport stream (S2108) and the processing proceeds to step S2014.

In step S2014, the multiplexing control unit 110 calculates the multiplexing start position wp as wp=wp+{S_VET/B} and adds "1" to the value of the VET counter "1" (S2015). The multiplexing control unit 110 then compares the value of the VET counter j with the value of the number of repeated multiplexing R of the stream correspondence table VET(N) (S2016). Here, when j=R, the processing proceeds to S2120, while when j<R the processing returns to step S2006.

In step S2102, the multiplexing control unit 110 sets the number of cycles C at the quotient (integer part) of i/T, and sets the content number N at the remainder (integer). Following this, the multiplexing control unit 110 refers to the content identifier assigning table in the construction information storage unit 109 and judges whether a content with this content number N is present (S2104). If so, the multiplexing control unit 110 instructs the multiplexing unit 114 to multiplex the bit stream of the image data VE(N). At this point, the multiplexing control unit 110 calculates the bit rate Bv(N) and informs the multiplexing unit 114 of this bit rate Bv(N), together with the multiplexing start position wp and the values of the "PID" and the "stream_id" which are written in the display image information identifier assigning table 801. The multiplexing unit 114 then multiplexes this image data VE(N) into the transport stream (S2106).

The multiplexing control unit 110 then instructs the multiplexing unit 114 to multiplex the navigation information table NVT(N). In doing so, the multiplexing control unit 110 calculates the bit rate Bn(N) and informs the multiplexing unit 114 of this bit rate Bn(N), the multiplexing start position wp, the PID, and the table_id_extension. The multiplexing unit 114 then multiplexes the navigation information table NVT(N) into the transport stream (S2108).

The multiplexing control unit 110 then recalculates the multiplexing start position according to the formula wp=wp+{S_VE(N)+S_NVT(N)}/B (S2110). The multiplexing control unit 110 then adds "1" to the content counter i (S2112), and the processing returns to S2004.

When the multiplexing control unit 110 judges in step S2104 that there is no content with the content number N, the multiplexing control unit 110 instructs the multiplexing unit 114 to multiplex a null packet of a size given as S_VE(N) +S_NVT(N), while informing the multiplexing unit 114 of the multiplexing start position wp and the bit rate B. The multiplexing unit 114 then multiplexes a null packet of the indicated size into the transport stream (S2114).

The multiplexing control unit 110 recalculates the multiplexing start position wp according to the formula wp=wp+{S_VE(0)+S_NVT(N)}/B (S2116) and the processing returns to S2112.

When executing the above processing, the NIT, the RAT, and other tables will be multiplexed into the multiplexed stream shown in FIG. 64 for an example where the number of repeated multiplexing R for each stream correspondence table VET(N) is "1", or into the multiplexed stream shown in FIG. 65 for an example where the number of repeated multiplexing R is "16", so that a transport stream such as that shown in FIG. 70 will be transmitted.

2-2-7 Summary

As described above, the data transmission apparatus 101 of the present embodiment assigns identifiers to the image data and navigation information which compose each content and multiplexes them into a transport stream which it transmits repeatedly.

Here, identifiers for image data and navigation information of contents connected by hyperlinks, supplementary image information for displaying menus and the like, and script for performing switches of display are included in the navigation information. As a result, the data reception apparatus 121 can selectively extract and reproduced contents, thereby realizing an interactive display which uses only a one-directional communication path.

2-2-8 Additional Information 2-2-8-1

It should be noted here that while the above embodiment has described the case where the image data is composed of still images, it is also possible for the image data to be moving pictures (video). When the image data is video, Formula 1 used for calculating the "first_pts" and "last_pts", Formula 2 used for calculating the length L of the stream, Formula 3 used for calculating the bit rate Bv(N) assigned to the image data Bv(N), Formula 4 used for calculating the bit rate Bn(N) assigned to the navigation information table NVT(N), and the formula used by the multiplexing control unit 110 to recalculate the multiplexing start position wp after the multiplexing of the image data VE(N) and the navigation information table NVT(N) are changed to the formulas given below.

When the image data is video, the bit rate Bv(N) assigned to the image data VE(N) is decided by estimating the increase when converting the bit rate which is predetermined for a video elementary stream to a transport stream. Here, the navigation information table NVT(N) is assigned a remaining bit rate given by subtracting the bit rate Bv(N) assigned to the video data VE(N) from the overall bit rate.

When doing so, the "first_pts" of the image data VE(N) is calculated according to Formula 5 below.

$$\text{first\_pts}(N) = \left[\sum_{x=0}^{N-1} \{\text{MAX}(S\_VE(x)/Bv(x),\\ S\_NE(x)/(B-Bv(x))+(S\_VET*R/B)\} +\\ S\_VE\_FIRST(N)/Bv(x)+(S\_VET*R/B)\}\right]*90000$$
Formula 5

Here, Bv(x) is the bit rate assigned to the image data VE(x), S_VE_FIRST(N) is the size of the first frame of the image data VE(x) when converted into the transport stream in accordance with MPEG2 system standard, and MAX{A, B} represents the largest values of A and B, respectively.

For video, the "last_pts" does not match the "first_pts". Here, the "last_pts" can be found according to Formula 6 below.

$$\text{last\_pts}(N)=\text{first\_pts}(N)+\{(N\_FRAME(x)/\text{Frame\_per\_sec})*90000\}$$
Formula 6

Here, N_FRAME(x) is the number of frames in video data VE(x), while Frame_per_sec is the number of frames reproduced in one second (which can be 29.97 for NTSC standard, for example).

When doing so for a video image, the multiplexing control unit 110 informs the multiplexing unit 114 of VE(x) and NE(x), before recalculating the multiplexing start position wp according to Formula 7 below.

$$wp=wp+\text{MAX}(S\_VE(x)/Bv(x), S\_NE(x)/(B-Bv(x)))$$
Formula 7

2-2-8-2

It should be noted here that the data transmission apparatus 101 is constructed so that the multiplexing unit 114 successively generates the transport stream 1701 during the transmission of an event, although the multiplexing unit 114 may generate a transport stream of one cycle length L and store it beforehand, so that when the transmission unit 106 transmits to the data reception apparatus 121, this transport stream is repeatedly read and repeatedly transmitted having been subjected to predetermined processing.

2-2-8-3

In the present embodiment, the corresponding sets of image data and navigation information are multiplexed at the same time, although this need not be the case. As described above, the navigation information table and the corresponding image data are separated from each other, so that they may be multiplexed at different times.

2-3 Data Reception Apparatus 121

As described above with reference to FIG. 49, the data reception apparatus 121 interactively selects contents from the MPEG2 transport stream transmitted by the data transmission apparatus 101 in accordance with user operations and reproduces them.

2-3-1 Reception Unit 122

The reception unit 122 receives the MPEG2 transport stream which corresponds to the transport stream identifier indicated by the reception control unit 126, and outputs it to the TS decoder unit 123.

2-3-2 TS Decoder Unit 123

The TS decoder 123 includes a filter condition storage unit 131 for storing the filter conditions set by the reception control unit 126, and operates in accordance with these filter conditions so as to only separate image data or audio data with a specified identifier from the transport stream outputted by the reception unit 122. The TS decoder unit 123 outputs the separated data to the AV decoder unit 124. The TS decoder unit 123 also separates table data with a specified identifier and outputs the table data to an area maintained in the received data storage unit 125, in accordance with the identifier. The TS decoder unit 123 separates a PCR (standard clock information) with the specified identifier and outputs it to the AV decoder unit 124. Here, the filter condition storage unit 131 is capable of simultaneously storing a plurality of filter conditions, and the TS decoder unit 123 is capable of simultaneously performing a plurality of separating operations.

FIGS. 74A and 74B show examples of the filter condition tables stored in the filter condition storage unit 131. Each line in filter condition table 2201 is one filter condition. The "filter identification column" 2202 is used for recording numbers which identify each filter condition. The "start/stop" column 2203 is set so that the entry "start" denotes the started state of a filter condition, while the entry "stop" denotes the stopped state of a filter condition. The TS decoder unit 123 executes separating processes based on the filter conditions in the started state, and does not preform separating based on filter conditions in the stopped state. The "PID" column 2204 is used to record the value of the PID of the data separated by each filter condition. The "stream_id" column 2205 is used to record the value of the stream_id of the data separated by each filter condition. The "table_id_extension" column 2206 is used to record the value of the table_id_extension of the data separated by each filter condition. When the entries in the "PID" column 2204, the "stream_id" column 2205, and the "table_id_extension" column 2206 are all set the value "–", unconditional separating, which is to say separating regardless of the value of the identifiers, will be performed. Finally, the "output destination" column 2207 is used to record the output destination to which the separated data is to be outputted.

The line corresponding to the filter identification number "0" in the filter condition table 2201 shows the filter condition for image data. The entry in the "output destination" column 2207 for this line indicates the AV decoder unit 124, with it not being possible to set an entry in the "table_id_extension" column 2206. The entries in the "PID" column 2204 and in the "stream_id" column 2205 are set at the values of the PID and stream_id of the image data which is to be separated by the reception control unit 126.

The line corresponding to the filter identification number "1" shows the filter condition for audio data. The entry in the "output destination" column 2207 for this line indicates the AV decoder unit 124, with it not being possible to set an entry in the "table_id_extension" column 2206. The entries in the "PID" column 2204 and in the "stream_id" column 2205 are set at the values of the PID and stream_id of the audio data which is to be separated by the reception control unit 126.

The line corresponding to the filter identification number "2" in the filter condition table 2201 shows the filter condition for the stream correspondence table VET. The entry in the "output destination" column 2207 for this line indicates the stream correspondence information table storage unit 132, with it not being possible to set an entry the "stream_id" column 2205. The entries in the "PID" column 2204 and in the "table_id_extension" column 2206 are set at the values of the PID and table_id_extension of the stream correspondence table which is to be separated by the reception control unit 126.

The line corresponding to the filter identification number "3" in the filter condition table 2201 shows the filter condition for the navigation information table. The entry in the "output destination" column 2207 for this line indicates the navigation information table storage unit 133, with it not being possible to set an entry the "stream_id" column 2205. The entries in the "PID" column 2204 and in the "table_id_extension" column 2206 are set at the values of the PID and table_id_extension of the navigation information table which is to be separated by the reception control unit 126.

The entry in the "start/stop" column 2203 for each filter condition is set at "start" or "stop" by the reception control unit 126 to set the separating process of the TS decoder unit 123 into a started state or stopped state for each filter condition.

In addition to the information described above, the filter condition storage unit 131 also stores filter conditions for the system information tables, such as the NIT, the SDT, the EIT, the PAT, and the PMT, and the PCR (standard clock information). These conditions have not been illustrated.

When the filter condition for image data corresponding to filter identification number "0" and the condition for audio data corresponding to filter identification number "1" are set in the stopped state in the filter condition table 2201 by the reception control unit 126, the TS decoder unit 123 does not separate image data or audio data.

Here, suppose that the filter condition for the stream correspondence table VET corresponding to filter identification number "2" has been set by the reception control unit 126 so that the value in the "PID" column 2204 is "0x0083", the value in the "table_id_extension" column 2206 is "0x0005", and the started state is set in the "start/stop" column 2203. In this case, the TS decoder unit 123 separates the stream correspondence table VET(5) from the transport stream 1801 (shown in FIG. 70) transmitted from the transmission unit 106, in accordance with this filter condition. The TS decoder unit 123 stores the separated stream correspondence table VET(5) in the stream correspondence information table storage unit 132 and notifies the reception control unit 126. Here, the content of VET(5) is as shown in FIG. 63A.

Next, suppose that the filter condition for the navigation information table NVT corresponding to filter identification number "3" has been set by the reception control unit 126 so that the value in the "PID" column 2204 is "0x0082", the value in the "table_id_extension" column 2206 is "0x0005", and the started state is set in the "start/stop" column 2203. In this case, the TS decoder unit 123 separates the navigation information table NVT(5) from the transport stream 1801 (shown in FIG. 70) transmitted from the transmission unit 106, in accordance with this filter condition. The TS decoder unit 123 stores the separated navigation information table NVT(5) in the navigation information table storage unit 133 and notifies the reception control unit 126. Here, the content of the navigation information table NVT(5) is as shown in FIG. 61.

Next, in filter condition table 2208, suppose that the filter condition for the image data corresponding to filter identification number "0" has been set by the reception control unit 126 so that the value in the "PID" column is "0x0084", the value in the "stream_id" column is "0xe5", and the started state is set in the "start/stop" column. In this case, the TS decoder unit 123 separates the image data VE(5), the image data VE(21), the image data VE(37), and the image data VE(53) in order from the transport stream 1801 (shown in FIG. 70) transmitted from the transmission unit 106, in accordance with this filter condition. The TS decoder unit 123 outputs the separated sets of image data to the AV decoder unit 124. Here, out of these four sets of image data, the first set of image data to be separated will depend on the timing at which the reception control unit 126 sets the started condition for the filter condition. Also, by setting the stopped condition at the proper timing, the reception control unit 126 can have the TS decoder unit 123 separate only the first out of these four sets of image data and output it to the AV decoder unit 124.

2-3-3 AV Decoder Unit 124

The AV decoder unit 124 includes a clock unit which is not illustrated. This clock unit is synchronized to a standard time using the value of the PCR outputted by the TS decoder unit 123, and is used to measure time which is used as the standard for synchronized decoding of image data and audio data.

On receiving image data and/or audio data from the TS decoder unit 123, the AV decoder unit 124 reads the identifier of the image data and/or audio data written in the private area, in accordance with an indication from the reception control unit 126, and notifies the reception control unit 126 of the identifier(s). Next, the AV decoder unit 124 decodes the image data and/or audio data in predetermined units in accordance with an indication from the reception control unit 126 and outputs the decoded data to the reproduction unit 128 in synchronization with the clock unit, before informing the reception control unit 126 of the completion of the decoding.

2-3-4 Construction of the Received Data Storage Unit 125

The received data storage unit 125 can be composed of RAM (Random Access Memory), for example, and is provided with a stream correspondence information table storage unit 132, a navigation information table storage unit 133, and a system information table storage unit 134.

The stream correspondence information table storage unit 132 stores stream correspondence tables which have been separated by the TS decoder unit 123. The navigation information table storage unit-133 stores navigation information tables which have been separated by the TS decoder unit 123. The system information table storage unit 134 stores the system information tables, such as the NIT, the SDT, the EIT, the PAT, and the PMT, which have been separated by the TS decoder unit 123.

2-3-5 Signal Reception Unit 127

The signal reception unit 127 receives signals, such as remote controller operations made by a user, and informs the reception control unit 126 of the received signals.

2-3-6 Reproduction Unit 128

The reproduction unit 128 superimposes graphics information included in the navigation information table outputted from the reception control unit 126 and image data decoded by the AV decoder unit 124 in accordance with indications from the reception control unit 126. The reproduction unit 128 outputs this combined image to the display unit 129. The reproduction unit 128 also outputs audio data decoded by the AV decoder unit 124 to the audio output unit 130.

2-3-7 Display Unit 129

The display unit 129 can be realized by a CRT (Cathode Ray Tube) or liquid crystal display, and is used to display the images outputted by the reproduction unit 128. Examples of such display are the contents 151, 152, and 153 shown in FIG. 49.

2-3-8 Audio Output Unit 130

The audio output unit 130 can be realized by a speaker, and is used to output the audio signal outputted by the reproduction unit 128.

2-3-9 Construction of the Reception Control Unit 126

The reception control unit 126 controls the reception unit 122 and has it receive a desired transport stream. On receiving a user operation signal via the signal reception unit 127, the reception control unit 126 refers to the navigation information table presently stored in the navigation information table storage unit 133 and sets the filter condition for the next navigation information table and the filter condition for the stream correspondence table for obtaining the image data in the filter condition storage unit 131 of the TS decoder unit 123. The reception control unit 126 then refers to the stream correspondence table which has been newly separated by the TS decoder unit 123 and stored in the stream correspondence information table storage unit 132, and sets the filter condition for the image data in the filter condition storage unit 131.

The reception control unit 126 judges whether the image data which has been separated by the reception control unit 126 is the appropriate image data by referring to the image data identifier written into the private area of the image data. When the image data is the appropriate image data, the reception control unit 126 has the image data decoded and outputted to the reproduction unit 128. When the image data is not the appropriate image data, the reception control unit 126 changes the filter condition in the filter condition storage unit 131 and gives another indication for the separation of a stream correspondence table.

The reception control unit 126 also reads bitmap data for objects included in the navigation information table separated by the TS decoder unit 123. The reception control unit 126 also informs the reproduction unit 128 of this data and has the reproduction unit 128 combine the bitmap data with the image data.

2-3-9-1 Initial Control

The reception control unit 126 is composed of a CPU and a program for controlling the CPU. When the user makes an initial selection of an event stored in the transmission data storage unit 102 and multiplexed into the transport stream transmitted by the transmission unit 106 of the data transmission apparatus 101, the reception control unit 126 first refers to the system information tables in accordance with a procedure which is standardized according to the DVB-SI and MPEG2 system standards which are generally used by satellite digital broadcast reception apparatuses. The reception control unit 126 then instructs the reception unit 122 to receive a transport stream transmitted by the transmission unit 106 and instructs the TS decoder unit 123 to separate the PMT corresponding to the event selected by the user.

The reception control unit 126 then refers to the PMT stored in the system information table storage unit 134 and obtains the identifier of the PCR, and sets this identifier in the filter condition storage unit 131. The reception control unit 126 also obtains the identifiers of the image data and the navigation information of the entry content and respectively sets these in the filter condition of the stream correspondence table and the filter condition of the navigation information table in the filter condition storage unit 131.

The reception control unit 126 then refers to the PMT stored in the system information table storage unit 134 and obtains the PIDs of the component which is used to transfer the stream correspondence table and the component which is used to transfer the navigation information table. The reception control unit 126 then respectively sets these PIDs in the filter condition of the stream correspondence table and the filter condition of the navigation information table in the filter condition storage unit 131, in addition to setting both of these filter conditions into the started state.

On receiving notification from the TS decoder unit 123 indicating that the stream correspondence table has been separated, the reception control unit 126 sets the filter condition for the stream correspondence table in the filter condition storage unit 131 into the stopped state. Following this, the reception control unit 126 refers to the stream correspondence table in the stream correspondence information table storage unit 132 and reads the value of the "stream_id" for the image data, before setting the filter condition for image data in the filter condition storage unit 131. After this, the reception control unit 126 refers to the stream correspondence table in the stream correspondence information table storage unit 132 and reads the value of the "component_tag", and refers to the PMT in the system information table storage unit 134 and obtains the value of the PID which corresponds to the "component_tag" it has read. The reception control unit 126 then sets this PID in the filter condition for the image data in the filter condition storage unit 131, and sets this filter condition into the started state.

2-3-9-2 Judgement of Validity of Image Data

The data transmission apparatus 101 is constructed to transmit a plurality of different sets of image data with the same values of the PID and stream_id, so that having transmitting a stream correspondence table corresponding to a given set of image data, a predetermined time later the data transmission apparatus 101 will send a different set of image data with the same PID and stream_id as the given set of image data. This being the case, if the reception control unit 126 can complete the setting of the filter condition for the image data within a predetermined time period after receiving the stream correspondence table, the TS decoder unit 123 will be able to separate the desired image data without error and output it to the AV decoder unit 124.

Following this, the reception control unit 126 obtains the value of the image data identifier written into the private area of the image data outputted from the TS decoder unit 123 via the AV decoder unit 124. The reception control unit 126 then investigates whether this value matches the identifier of the image data to be obtained. When the values do not match the reception control unit 126 sets the filter condition for the image data in the filter condition storage unit 131 into the stopped state, and sets the PID of the component which transfers the stream correspondence table and the identifier of the image data which it is presently trying to obtain into the filter condition of the stream correspondence table, as well as setting the filter condition for the stream correspondence table into the started condition. It should be noted here that the value of the identifier "table_id_extension" for the stream correspondence table is the same as the value of the identifier "VE_id" for the image data. By doing so, when, for whatever reason, the processing whereby the reception control unit 126 refers to the stream correspondence table and sets the filter condition of the image data is delayed, the mistaken display of other image data can still be avoided.

When the identifier written in the private area of the image data outputted by the TS decoder unit 123 matches the value of the identifier of the image data which the reception control unit 126 is attempting to obtain, the reception control unit 126 refers to the stream correspondence table in the stream correspondence information table storage unit 132 and reads the value of the "first_pts". After this, the reception control unit 126 refers to the clock unit of the AV decoder unit 124 and checks whether notification of the completion of frame decoding has been received from the AV decoder unit 124. When no such notification has been received, the reception control unit 126 sets the filter condition of the image data in the filter condition storage unit 131 into the stopped state, and resets the PID of the component for transferring the stream correspondence table and the identifier of the image data to be obtained, before setting the filter condition of the stream correspondence table into the started state.

By performing the above processes, unintentional reproduction of image data which skips the beginning and starts midway can be avoided, even when, for whatever reason, there is a delay in the reception control unit 126 referring to the stream correspondence table and setting the filter condition for the image data.

When notification of the completion of frame decoding has been received from the AV decoder unit 124, the reception control unit 126 refers to the stream correspondence table in the stream correspondence information table storage unit 132 and reads the value of the "last_pts". After this, the reception control unit 126 refers to the clock unit of the AV decoder unit 124 and, once the time of the read "last_pts" has been reached, sets the filter condition for the image data in the filter condition storage unit 131 into the stopped condition. By doing so, only the desired image data will be separated and outputted to the AV decoder unit 124. As a result, other sets of image data with the same PID and stream_id will not be separated.

2-3-9-3 Generation of Graphics Information

On receiving notification from the TS decoder unit 123 indicating the separation of a navigation information table, the reception control unit 126 sets the filter condition for the navigation information table in the filter condition storage unit 131 into the stopped state. Following this, the reception control unit 126 refers to the object definition table in the navigation information table of the navigation information table storage unit 133 and obtains the display coordinates "X" and "Y" of the button object. For a button whose index number is "0", the reception control unit 126 obtains an index number for a "Focused Bitmap", while for other buttons, the reception control unit 126 obtains an index number for a "Normal Bitmap", before referring to the bitmap table and obtaining bitmap data corresponding to the obtained index number. The reception control unit 126 then uses this bitmap data to generate graphics information for buttons and outputs this graphics information to the reproduction unit 128.

2-3-9-4 Interpretation of User Operations

The reception control unit 126 resets the variable "cur_focus" which represents the index number of the button object which is presently displayed in the selection state to "0".

On receiving a signal for a user operation from the signal reception unit 127, the reception control unit 126 judges whether the signal is for an "Up" user operation, a "Down" user operation, or an "Enter" user operation. When the signal is for an "Up" user operation or a "Down" user operation, the reception control unit 126 adds or subtracts "1" to/from the value of the variable cur_focus. Following this, the reception control unit 126 refers to the navigation information table in the navigation information table storage unit 133 and first refers to the object definition table to obtain the "X" and "Y" display coordinates of the button object. The reception control unit 126 next obtains the index number of the "Focused Bitmap" for the button whose index number corresponds to the value of variable cur_focus and the index numbers of the "Normal Bitmap" for all other buttons, before referring to the bitmap table and obtaining the sets of bitmap data which correspond to these index numbers. The reception control unit 126 generates graphics information for buttons using the obtained bitmap data and outputs the graphics information to the reproduction unit 128.

When the signal is for an "Enter" user operation, the reception control unit 126 refers to the object definition table in the navigation information table NVT in the navigation information table storage unit 133 and obtains the index number of handler of the button object whose index number matches the value of cur_focus. The reception control unit 126 then refers to the handler definition table and reads the instruction word from the handler that corresponds to the index number. When the instruction word is "goto_content", the reception control unit 126 reads the index number which is the argument of this instruction word and refers to the hyperlink table, before reading the identifier of the content which is the link destination corresponding to the read index number as the identifier of the next content to be reproduced.

When the instruction word is "goto_entry" the reception control unit 126 refers to the system information table storage unit 134 to find the PMT of the event to which the navigation information table of the currently reproduced content belongs, and reads the identifier of the entry content as the identifier of the next content to be reproduced.

2-3-9-5 Setting of the Filter Conditions

When the identifier of the next content to be reproduced is equal to the identifier of the content presently being reproduced, the reception control unit 126 performs no action. When the original_network_id and transport_stream_id of the next content to be reproduced are different to the transport stream presently being received, the reception control unit 126 refers to the system information table and instructs the reception unit 122 to receive the desired transport stream, in accordance with a predetermined procedure for MPEG2 system standard and DVB-SI standard. On receiving instruction which indicate the reception of a transport stream which belongs to a different network, the reception unit 122 performs the necessary processes, such as the changing of the orientation of an antenna, and receives the indicated transport stream.

When the event to which the image data for the next content to be displayed belongs is different to the event to which the image display of the presently display content belongs, the reception control unit 126 refers to the system information table as described above and sets the identifier of the PMT of the event to which the image data of the next content belongs into the filter condition storage unit 131 of the TS decoder unit 123.

The TS decoder unit 123 separates the PMT in accordance with the filter condition and stores the PMT in the system information table storage unit 134, before notifying the reception control unit 126.

On receiving notification of the separation of the PMT of the event to which the image data belongs from the TS decoder unit 123, the reception control unit 126 refers to the PMT and sets the value of the "PCR PID" into the filter condition storage unit 131.

The reception control unit 126 refers to the system information tables as described above and sets the identifier of the PMT of the event to which the navigation information of the next content to be reproduced belongs into the filter condition storage unit 131 in the TS decoder unit 123. This procedure is executed even when the event to which the navigation information of the next content to be reproduced belongs differs from the event to which the navigation information of the presently reproduced content belongs.

When the value of the identifier "VE_id" of the image data of the next content to be displayed is different to the value of the identifier "VE_id" of the image data of the content which is presently being reproduced, the reception control unit 126 refers to the system information table storage unit 134 to find the PMT of the event to which the image data of the next content to be displayed belongs and obtains the PID of the component to which the VE_Information_Component_Descriptor is attached. The reception control unit 126 then sets this PID and the value "VE_id" into the filter condition for the stream correspondence table in the filter condition storage unit 131, in addition to setting this filter condition into the started condition.

When the value of the identifier "NE_id" of the image data of the next content to be displayed is different to the value of the identifier "VE_id" of the image data of the content which is presently being reproduced, the reception control unit 126 refers to the system information table storage unit 134 to find the PMT of the event to which the navigation information of the next content to be displayed belongs and obtains the PID of the component to which the NE_Component_Descriptor is attached. The reception control unit 126 then sets this PID and the value "NE_id" into the filter condition for the navigation information table in the filter condition storage unit 131, in addition to setting this filter condition into the started condition.

2-3-10 Specific Example of Content Display by the Data Reception Apparatus 121

When, as one example, the user initially selects the event multiplexed into the transport stream 1801 (shown in FIG. 70) which is identified by the original_network_id "0x0001", the transport_stream_id " 0x0001", the service_id "0x0001", and the event_id "0x0001", the reception control unit 126 refers to NIT 1301 in FIG. 66A and obtains the information for the transfer preface, such as the frequency of the transport stream 1801 identified by the original_network_id "0x0001" and the transport_stream_id "0x0001", in accordance with a procedure which is standardized in accordance with MPEG2 system standard and DVB-SI standard.

Next, the reception control unit 126 instructs the reception unit 122 to receive the transport stream 1801 and refers in the same way to the PAT 1401 in FIG. 67 to obtain the value "0x0080" of the PID of the PMT for the program whose "program_no" is equal to the service_id (here, "1"). The reception control unit 126 then sets this value in the filter condition for the PMT in the filter condition storage unit 131.

The TS decoder unit 123 separates the PMT 1501 shown in FIG. 68 and stores it in the system information table storage unit 134, before notifying the reception control unit 126. The reception control unit 126 reads the value "0x0081" of the "PCR_PID" from the PMT 1501 stored in the system information table storage unit 134 and sets this value in the filter condition of the PCR in the filter condition storage unit 131. Following this, the reception control unit 126 refers to the Entry_Descriptor (shown in FIG. 69A) of the PMT 1501 and obtains the value "0x0005" of the "entry_VE_id", before setting this in the "table_id_extension" entry of the filter condition for the stream correspondence table in the filter condition storage unit 131. After this, the reception control unit 126 obtains the value "0x0083" of the PID of the component attached to the VE_Information_Component_Descriptor from the PMT 1501 and sets this in the "PID" entry in the filter condition for the stream correspondence table, in addition to setting the filter condition for the stream correspondence table into the started state.

Following this, the reception control unit 126 refers to the Entry_Descriptor (shown in FIG. 69A) of the PMT 1501 and obtains the value "0x0005" of the "entry_NE_id", before setting this in the "table_id_extension" entry of the filter condition for the navigation information table in the filter condition storage unit 131. After this, the reception control unit 126 obtains the value "0x0082" of the PID of the component attached to the NE_Component_Descriptor from the PMT 1501 and sets this in the "PID" entry for the navigation information table, in addition to setting the filter condition for the navigation information table into the started state.

The TS decoder unit 123 separates the stream correspondence table 1201 shown in FIG. 63A, stores it in the stream correspondence information table storage unit 132, and notifies the reception control unit 126, in addition to separating the navigation information table 1001, storing it in the navigation information table storage unit 133, and informing the reception control unit 126.

On receiving notification of the separation the stream correspondence table, the reception control unit 126 refers to the stream correspondence table 1201 in the stream correspondence information table storage unit 132 and obtains the value "0xe5" of the "stream_id" which it then sets as the "stream_id" entry of the filter condition for image data. Following this, the reception control unit 126 obtains the value "0x00" of the "component_tag" from the stream correspondence table 1201, before obtaining the value "0x0084" of the "PID" of the component whose "component_tag" has been appended with the stream_identifier_descriptor of the value "0x00", meaning that its data type is image data. The reception control unit 126 then sets this value "0x0084" in the "PID" entry of the filter condition for image data in the filter condition storage unit 131, in addition to setting this filter condition into the started state.

It should be noted here that when the value of the "PID" is written directly into the stream correspondence table in place of the "component_tag", the reception control unit 126 does not need to refer to the PMT and so can instead obtain the "stream_id" and "PID" directly from the stream correspondence table, before setting the filter condition for the image data in the filter condition storage unit 131.

The TS decoder unit 123 separates the bitstream 901 for the image data shown in FIG. 60 and outputs it to the AV decoder unit 124. This bitstream 901 for the image data has the value "0x0005" of the "VE_id" written into the private area for the still image data 201 shown in the FIG. 53A.

The reception control unit 126 receives, via the AV decoder unit 124, notification of the value "0x0005" of the identifier written into the private area of the separated image data, and confirms that this value matches the value "0x0005" set beforehand in the table_id_extension of the stream correspondence table. After this, the reception control unit 126 refers to the clock unit of the AV decoder unit 124 and having confirmed that notification of the successful decoding to image data has been received from the AV decoder unit 124 has been received by the time indicated by the value "112500" of the "first_pts" in the stream correspondence table 1201, waits until the time indicated by the value "112500" of the "last_pts" in the stream correspondence table 1201, before setting the filter condition for image data in the filter condition storage unit 131 into the stopped state.

On receiving notification of the separation of the navigation information table, the reception control unit 126 sets the variable cur_focus at "0", before referring to the navigation information table 1001 in the navigation information table storage unit 133 and obtaining the display coordinates of a button corresponding to the index number "0", the bitmap data corresponding to the index number of the item "Focused bitmap", the display coordinates of a button corresponding to the index number "1", and the bitmap data corresponding to the index number of the item "Normal bitmap". The reception control unit 126 then uses these to generate graphics information for buttons which it outputs to the reproduction unit 128. The reproduction unit 128 superimposes this graphics information outputted by the reception control unit 126 onto the image data outputted by the AV decoder unit 124, and has the display image 2301 shown in FIG. 75A displayed on the display unit 129.

When a "Down" signal is inputted due to a user operation made via a remote controller or the like during the display of display image 2301, the reception control unit 126 receives notification of the "Down" input signal via the signal reception unit 127 and increases the value of "cur_focus" by one to "1". The reception control unit 126 then refers to the navigation information table 1001 in the navigation information table storage unit 133 and obtains the display coordinates corresponding to the index number "0" and the bitmap data corresponding to the index number for the "Normal Bitmap", as well as the display coordinates corresponding to the index number "1" and the bitmap data corresponding to the index number for the "Focused Bitmap", before using this information to generate graphics information for the buttons which it outputs to the reproduction unit 128. The reproduction unit 128 superimposes this graphics information outputted by the reception control unit 126 onto the image data outputted by the AV decoder unit 124, and has the display image 2302 shown in FIG. 75B displayed on the display unit 129.

When an "Enter" signal is inputted due to a user operation made via a remote controller or the like during the display of display image 2301, the reception control unit 126 receives notification of the "Enter" input signal via the signal reception unit 127. The reception control unit 126 then obtains the index number "0" of the handler of the button whose index number ("0") coincides with the value of the variable cur_focus from the object definition table 1002 in the navigation information table 1001 in the navigation information table storage unit 133. The reception control unit 126 refers to the handler definition table 1003 and obtains the script, instruction word "goto_content", and the argument index number "0" which correspond to index number "0".

The reception control unit 126 next refers to the hyperlink table 1004 and fetches the value "0x0001" of the "VE_id" of the content which is the link destination corresponding to the index number "0". The reception control unit 126 sets this extracted value in the "table_id_extension" of the filter condition for the stream correspondence table in the filter condition storage unit 131. The reception control unit 126 then fetches the value "0x0083" of the PID of the component attached to the VE_Information_Component_Descriptor and sets this in the "PID" entry of the filter condition for the stream correspondence table, before setting this filter condition into the started state.

The reception control unit 126 next fetches the value "0x0001" of the "NE_id" of the content which is the link destination corresponding to the index number "0", and sets this fetched value in the "table_id_extension" entry of the filter condition in the navigation information table in the filter condition storage unit 131. After this, the reception control unit 126 fetches the value "0x0082" of the PID of the component attached to the NE_Component_Descriptor from the PMT 1501, and sets this value in the "PID" entry in the filter condition for the navigation information table in the filter condition storage unit 131, before setting the filter condition for the navigation information table into the started state.

The TS decoder unit 123 separates the stream correspondence table 1202 shown in FIG. 63B, stores it in the stream correspondence information table storage unit 132, and notifies the reception control unit 126, in addition to separating the navigation information table 1101 shown in FIG. 62, storing it in the navigation information table storage unit 133, and notifying the reception control unit 126.

On receiving notification of the separation of the stream correspondence table from the TS decoder unit 123, the reception control unit 126 refers to the stream correspondence table 1202 and instructs the TS decoder unit 123 to separate the image data. On receiving notification of the separation of the navigation information table from the TS decoder unit 123, the reception control unit 126 refers to the navigation information table 1101, generates the graphics information for the button, and outputs it to the reproduction unit 128.

The reproduction unit 128 superimposes the graphics information outputted by the reception control unit 126 onto the image data outputted by the AV decoder unit 124 and outputs the display image 2303 shown in FIG. 75C to the display unit 129.

When an "Enter" signal is inputted due to a user operation made via a remote controller or the like during the display of display image 2301, the reception control unit 126 receives notification of the "Enter" input signal via the signal reception unit 127. The reception control unit 126 then refers to the navigation information table 1101 in the navigation information table storage unit 133 and obtains the script, instruction word "goto_entry". After this, the reception control unit 126 obtains the value "0x0005" of the "entry_VE_id" from the PMT 1501 stored in the system information table storage unit 134 and sets this value in the "table_id_extension" entry of the filter condition for the stream correspondence table in the filter condition storage unit 131.

The reception control unit 126 next receives the value "0x0083" of the component attached to the VE_Information_Component_Descriptor from the PMT 1501 and sets this value in the "PID" entry of the filter condition for the stream correspondence table, before setting the filter condition for the stream correspondence table into the started state.

Next, the reception control unit 126 refers to PMT 1501 and fetches the value "0x005" of the "entry_NE_id" which it sets in the "table_id_extension" of the filter condition of the navigation information table in the filter condition storage unit 131. Following this, the reception control unit 126 obtains the value "0x0082" of the PID of the component to which the NE_Component_Descriptor has been attached from the PMT 1501, before setting this value in the "PID" entry of the filter condition for the navigation information table and setting the filter condition for the navigation information table into the started state.

The TS decoder unit 123 separates the stream correspondence table 1201 shown in FIG. 63A, stores it in the stream correspondence information table storage unit 132, and notifies the reception control unit 126, in addition to separating the navigation information table 1001 shown in FIG. 61, storing it in the navigation information table storage unit 133, and notifying the reception control unit 126.

On receiving notification of the separation of the stream correspondence table from the TS decoder unit 123, the reception control unit 126 refers to the stream correspondence table 1201 and instructs the TS decoder unit 123 to separate the image data. On receiving notification of the separation of the navigation information table from the TS decoder unit 123, the reception control unit 126 refers to the navigation information table 1001, generates the graphics information for the button, and outputs it to the reproduction unit 128.

The reproduction unit 128 superimposes the graphics information outputted by the reception control unit 126 onto the image data outputted by the AV decoder unit 124 and outputs the display image 2303 shown in FIG. 75A to the display unit 129.

2-3-11 Operation of the Data Reception Apparatus 121

The following is an explanation of the operation of the data reception apparatus 121, with reference to the flowcharts in FIGS. 76 to 79.

2-3-11-1 Entire Operation

The following is a description of the entire operation procedure for the data reception apparatus 121 with reference to FIG. 76.

When the user switches the data reception apparatus 121 on, the reception control unit 126 operates in accordance with a predetermined procedure for MPEG2 system standard and DVB-SI standard to control the reception unit 122 and the TS decoder unit 123 so that the system information tables are received, with the reproduction unit 128 having a program table displayed on the display unit 129 to enable the user to select a program using an operation unit such as a remote controller. On receiving a selection signal from the operation unit via the signal reception unit 127, the reception control unit 126 selects an event out of the transmission data stored in the transmission data storage unit 102 sent in the transport stream transmitted by the transmission unit 106 of the data transmission apparatus 101. In doing so, the reception control unit 126 obtains the identifier of the event, the original_network_id, the transport_stream_id, the service_id, and the event_id (S2402).

When an event which has been multiplexed into the transmission data stored in the transmission data storage unit 102 is selected, the reception control unit 126 operates in accordance with a predetermined procedure for MPEG2 system standard and DVB-SI standard to refer to the system information tables. The reception control unit 126 then instructs the reception unit 122 to receive the transport stream transmitted by the transmission unit 106 and instructs the TS decoder unit 123 to separate the PMT corresponding to the selected event. The reception unit 122 receives the transport stream transmitted by the transmission unit 106 and outputs it to the TS decoder unit 123. The TS decoder unit 123 separates the PMT corresponding to the selected event and writes it into the system information table storage unit 134 in the received data storage unit 125, before notifying the reception control unit 126. On receiving notification of the reception of the PMT from the TS decoder unit 123, the reception control unit 126 refers to the PMT in the system information table storage unit 134 and obtains the PID of the PCR, before storing it in the filter condition storage unit 131 (S2404).

The reception control unit 126 sets the original_network_id of the selected event in the variable cur_original_network_id and set the transport_stream_id of the selected event into the variable cur_transport_stream_id. The reception control unit 126 also sets the service_id of the selected service into the variable cur_VE_service_id and the variable cur_NE_service_id, sets the event_id of the selected event into the variable cur_VE_event_id and the variable cur_NE_event_id, and clears the variable cur_VE_id and the variable cur_NE_id. These variables indicate the information for the identifiers of the content which is currently being reproduced (S2406).

The reception control unit 126 next sets the original_network_id of the selected event in the variable new_original_network_id, sets the transport_stream_id of the selected event into the variable new_transport stream_id, sets the service_id into the variable new_VE_service_id and the variable new_NE_service_id, and sets the event_id of the selected event into the variable new_VE_event_id and the variable new_NE_event_id. The reception control unit 126 also refers to the PMT in the system information table storage unit 134 and sets the respective values of the entry_VE_id and the entry_NE_id into the variable new VE_id and the variable new_NE_id (S2408).

Following this, the reception control unit 126 performs the content switching processing. The details of the contents switching processing are given later in this specification (S2410).

The reception control unit 126 next clears the value of the content change flag, which shows the content switching is necessary, to zero (S2412).

After this, the reception control unit 126 waits for notification from the signal reception unit 127 of an input of a signal for a selection operation made the user (S2414). When a signal is inputted from the signal reception unit 127, the reception control unit 126 processes the user input signal. The details of this processing are given later in this specification (S2416). The reception control unit 126 then judges whether the content change flag is set at "1" (S2418), and if so the processing returns to step S2410, or otherwise returns to step S2414.

2-3-11-2 Content Switching Processing

The following is an explanation of the details of the contents switching processing in S2410, with reference to the flowchart in FIG. 77.

First, the reception control unit 126 judges whether the value of the variable new_original_network_id stored by the reception control unit 126 is the same as cur_original_network_id and whether the value of the variable new_transport_stream_id is the same as the cur_transport_stream_id (S2502). When both are affirmative, the reception control unit 126 performs the switching process for image data (S2504) and the switching process for navigation information (S2506) in parallel before terminating the procedure. When the variables are not equal, the reception control unit 126 refers to the system information tables and performs a switching process for the transport stream identified by the variable new_original_network_stream_id and the variable new_transport_stream_id (S2508), sets the value of the variable cur_original_network_id at the variable new_original_network_id, sets the value of the variable cur_transport_stream_id at the variable new_transport_stream_id, clears the values of the variables, cur_VE_event_id, cur_VE_id, cur_NE_event_id, cur_NE_id (S2510), and performs the switching process for image data (S2504) and the switching process for navigation information (S2506) in parallel before terminating the procedure.

2-3-11-3 Image Data Switching Processing

The following is an explanation of the details of the image data switching processing in S2504, with reference to the flowchart in FIG. 78.

First, the reception control unit 126 judges whether the value of the variable new_VE_service_id stored by the reception control unit 126 is the same as cur_VE_service_id and whether the value of the variable new_VE_event_id is the same as the cur_VE_event_id (S2602). When both are affirmative, the reception control unit 126 judges whether the variable new_VE_id is equal to the cur_VE_id (S2604). If so, the reception control unit 126 terminates the processing, or if not, the reception control unit 126 advances to S2610. When the judgement in S2602 is negative, the reception control unit 126 refers to the system information tables corresponding to the variables new_VE_service_id and new_VE_event_id and instructs the TS decoder unit 123 to separate the PMT corresponding to the event identified by the variables new_VE_service_id and new_VE_event_id. The TS decoder unit 123 separates the indicated PMT and writes it into the system information table storage unit 134 of the received data storage unit 125, before notifying the reception control unit 126. On receiving notification of the separation of the PMT from the TS decoder unit 123, the reception control unit 126 refers to the received PMT and obtains the PID of the PCR which it then sets in the filter condition storage unit 131 (S2606). The reception control unit 126 then sets the value of the variable new_VE_service_id in the variable cur_VE_service_id and the value of the variable new_VE_event_id into the cur_VE_event_id (S2608).

The reception control unit 126 next refers to the PMT corresponding to the event identified by the variables cur_VE_service_id and cur_VE_event_id in the system information table storage unit 134 and obtains the PID of the component attached to the VE_Information_Component_Descriptor and sets the value of the variable new_VE_id as the table_id_extension in the filter condition for the stream correspondence table. The reception control unit 126 also sets this filter condition into the started condition. The TS decoder unit 123 then separates the stream correspondence table VET corresponding to the value of the variable new_VE_id from the transport stream in accordance with the filter condition, stores it in the stream correspondence information table storage unit 132, and notifies the reception control unit 126 (S2610).

The reception control unit 126 interprets the stream correspondence table VET in the stream correspondence information table storage unit 132 which was obtained in step S2610 and sets the value of "first_pts" in the variable firstPTS and the value of "last_pts" in the variable "lastPTS", before obtaining the values of the "stream_id" and the "component_tag" (S2612). Following this, the reception control unit 126 resets the value of the flag "first flag", which shows whether the decoding of the first frame of image data is complete, to zero (S2614).

After this, the reception control unit 126 refers to the PMT corresponding to the event identified by the variables cur_VE_service_id, cur_VE_event_id in the system information table storage unit 134, and obtains the PID of the component which transfers data of the data type "image data" and which has been given a stream_identifier_descriptor of the same value as the "component_tag" obtained in S2612. The reception control unit 126 sets this PID and the "stream_id" obtained in S2612 in the filter condition for image data in the filter condition storage unit 131, and sets this filter condition for image data into the started state. The TS decoder unit 123 then separates the image data in accordance with this filter condition and outputs it to the AV decoder unit 124 (S2616).

The reception control unit 126 sends a message to the AV decoder unit 124 and so obtains the value of the image data identifier written into the private area of the image data separated by the TS decoder unit 123, which it then compares with the value of the variable $new_{13}$_VE_id (S2618). When these values match, the processing advances to S2620, while when they do not match, the processing switches to S2619.

The reception control unit 126 sets the filter condition for image data in the filter condition storage unit 131 into the stopped state (S2619), and the processing returns to S2610.

On completing the decoding of the image data outputted by the TS decoder unit 123, the AV decoder unit 124 notifies the reception control unit 126 of the completion of decoding. The reception control unit 126 judges whether it has received a decoding completion signal (S2620). When it has, the processing advances to S2622, or if not, the processing advances to S2624.

The reception control unit 126 sets the value of the flag first_flag at "1" (S2622).

The reception control unit 126 refers to the value of the clock unit of the AV decoder unit 124 and obtains the present time expressed in units of one ninety-thousandth of one second. The reception control unit 126 then compares the obtained value with the value of the variable firstPTS (S2624). When the value of the present time is greater than or equal to the value of the variable firstPTS, the processing advances to S2626, while when it is less than firstPTS, the processing advances to S2628. The reception control unit 126 judges whether the value of the flag first_flag is "1" (S2626). When the value of first_flag is "0", the processing proceeds to S2619, while when the value is "1", the processing advances to S2628.

In step S2628, the reception control unit 126 refers to the value of the clock unit of the AV decoder unit 124 and obtains the present time expressed in units of one ninety-thousandth of one second. The reception control unit 126 then compares the obtained value with the value of the variable lastPTS. When the value of the present time is less than the variable lastPTS, the processing returns to S2620. When, however, the value of the present time is greater than or equal to the value of the variable lastPTS, the reception control unit 126 sets the filter condition for the image data in the filter condition storage unit 131 into the stopped state (S2630) and sets the variable cur_VE_id at the value of the variable new_VE_id (S2632). The reception control unit 126 then terminates the reproduction processing of the image data.

2-3-11-4 Switching Process for Navigation Information

The following is an explanation of the details of the navigation information switching processing in S2506, with reference to the flowchart in FIG. 79.

First, the reception control unit 126 judges whether the value of the variable new_NE_service_id stored by the reception control unit 126 is the same as cur_NE_service_id and whether the value of the variable new_NE_event_id is the same as the cur_NE_event_id (S2702). When both are affirmative, the reception control unit 126 judges whether the variable new_NE_id is equal to the cur_NE_id (S2704). If so, the reception control unit 126 terminates the processing, or if not, the reception control unit 126 advances to S2706. When the judgement in S2702 is negative, the reception control unit 126 refers to the system information tables corresponding to the variables new_NE_service_id and new_NE_event_id and instructs the TS decoder unit 123 to separate the PMT corresponding to the event identified by the variables new_NE_service_id and new_NE_event_id. The TS decoder unit 123 separates the indicated PMT and writes it into the system information table storage unit 134 of the received data storage unit 125, before notifying the reception control unit 126 (S2708).

The reception control unit 126 sets the value of the variable new_NE_service_id in the variable cur_NE_service_id and the value of the variable new_NE_event_id into the variable cur_NE_event_id (S2710).

In S2706, the reception control unit 126 refers to the PMT corresponding to the event identified by the variables cur_NE_service_id and cur_NE_event_id in the system information table storage unit 134 and obtains the PID of the component attached to the NE_Component_Descriptor and sets the value of the variable new NE_id as the table_id_extension in the filter condition for the navigation information table. The reception control unit 126 also sets this filter condition into the started condition. The TS decoder unit 123 then separates the navigation information table NVT corresponding to the value of the variable new_NE_id from the transport stream in accordance with the filter condition, stores it in the navigation information table storage unit 133, and notifies the reception control unit 126 (S2706).

The reception control unit 126 next refers to the object definition table in the navigation information table NVT in the navigation information table storage unit 133 which was obtained in S2706 and obtains the display coordinates "X", "Y" of the button object. The reception control unit 126 next obtains the index number of the "Normal Bitmap" and refers to the bitmap table so that it can obtain the bitmap data corresponding to this index number. The reception control unit 126 uses this bitmap data to generate graphics information for buttons which it outputs to the reproduction unit 128. The reproduction unit 128 superimposes this graphics information onto the image data decoded by the AV decoder unit 124 and has the combined image displayed on the display unit 129 (S2712).

The reception control unit 126 resets the variable cur_focus which expresses the index number of the button object currently in the selected state to zero (S2714). The reception control unit 126 then refers to the object definition table of the navigation information table NVT obtained in S2706 and obtains the display coordinates "X", "Y" of the button object which has an index number equal to the value of the variable cur_focus. The reception control unit 126 next obtains the index number of the "Focused Bitmap" and refers to the bitmap table so that it can obtain the bitmap data corresponding to this index number. The reception control unit 126 sets the bitmap of the button with the index number corresponding to the value of the variable cur_focus as the bitmap for the selected state and generates graphics information for the button objects which it outputs to the reproduction unit 128. The reproduction unit 128 superimposes this graphics information onto the image data decoded by the AV decoder unit 124 and has the combined image displayed on the display unit 129 (S2716). The reception control unit 126 then sets the variable cur_NE_id at the value of the variable new_NE_id (S2718) and completes the switching processing for navigation information.

2-3-11-5 Processing for a User Input Signal

The following is an explanation of the details of the processing for a user input signal in S2416, with reference to the flowchart in FIG. 80.

The reception control unit 126 first judges whether the user input reported by the signal reception unit 127 was an "up" signal. When it is an "up" signal, the processing advances to S2804, or if not, the processing advances to S2808 (S2802). In S2804, the reception control unit 126 reduces the value of the variable cur_focus by one. However, when the value of the variable cur_focus is already at zero, it is not reduced further and stays at zero.

The reception control unit 126 refers to the object definition table of the navigation information table NVT which was obtained in S2706 and which is stored in the navigation information table storage unit 133, and obtains the display coordinates "X", "Y" of the button object whose index number is equal to the variable cur_focus. Next, the reception control unit 126 obtains the index number of the "Focused Bitmap" and refers to the bitmap table so that it can obtain the bitmap data corresponding to this index number. Based on this information, the reception control unit 126 sets the bitmap of the button with the index number corresponding to the value of the variable cur_focus as the bitmap in the selected state, as well as setting the bitmap for the button corresponding to the index number which corresponds to the value of cur_focus as the bitmap in the normal state, before generating graphics information for the button objects and outputting the graphics information to the reproduction unit 128. The reproduction unit 128 superimposes the graphics information on the image data decoded by the AV decoder unit 124 and has the combined image displayed on the display unit 129 (S2806), and the reception control unit 126 terminates the user input processing.

In S2808, the reception control unit 126 judges whether the user input reported by the signal reception unit 127 was a "down" signal. When it is a "down" signal, the processing advances to S2810, or if not, the processing advances to S2812 (S2802). In S2810, the reception control unit 126 increases the value of the variable cur_focus by one. However, when the value of the variable cur_focus is already equal to the highest value out of the identifiers of the button objects in the navigation information table, it is not increased further and stays as it is with the processing proceeding to S2806.

In S2812, the reception control unit 126 judges whether the user input reported by the signal reception unit 127 was an "enter" signal. When it is an "enter" signal, the processing advances to S2814, or if not, the user input processing is terminated.

In S2814, the reception control unit 126 refers to the object definition table in the navigation information table NVT and obtains the index number of the handler of the button object whose index number is equal to the value of the variable cur_focus. The reception control unit 126 then refers to the handler definition table and reads the instruction word from the handler which corresponds to this index number. When the instruction word is "goto_content", the processing advances to S2818, while when this is not the case, the processing advances to S2824 (S2816).

In S2818, the reception control unit 126 reads the index number of the argument of the goto_content instruction from the handler.

After this, the reception control unit 126 refers to the hyperlink table for the navigation information table and sets the values of the original_network_id, the transport_stream_id, the VE_service_id, the VE_event_id, the VE_id, the NE_service_id, the NE_event_id, and the NE_id of the content which corresponds to the index number read in S2818 at the respective values of the new_original_network_id, the new_transport_stream_id, the new_VE_service_id, the new_VE_event_id, the new_VE_id, the new_NE_service_id, the new_NE_event_id, and the new_NE_id. However, when the identifiers have not been set values in the hyperlink table, which is to say the identifiers are given as "–", the original values are left unchanged (S2820).

The reception control unit 126 set the value of the content change flag at "1" (S2822) and terminates the user input processing.

In S2824, the reception control unit 126 judges whether the script instruction word is "goto_entry", and if not, terminates the user input processing. When the script instruction word is "goto_entry", the reception control unit 126 refers to the PMT corresponding to the event identified by the cur_NE_service_id and the cur_NE_event_id in the system information table storage unit 134, and sets the variable new VE_id and the variable new_NE_id at the values of the "entry_VE_id" and the "entry_NE_id". The reception control unit 126 also sets the variables new_VE_service_id and new VE_event_id at the values of the variables cur_NE_service_id and cur_event_id (S2826), before proceeding to step S2822.

As described above, the display can be switched between the display image 2301 shown in FIG. 75A and the display image 2303 shown in FIG. 75C in accordance with user operations.

2-3-12 Summary

As described above, the data reception apparatus 121 of the present invention can extract the presentation information and navigation information which are necessary for the reproduction of a specified content from the transport stream at the necessary time. By doing so, link destination contents can be extracted and reproduced in accordance with user operations, so that programs which allow user interaction can be achieved on a system which performs only one-directional communication.

It should be noted here that the reception unit 122, the TS decoder unit 123, the AV decoder unit 124, the reproduction unit 128, the display unit 129, the audio output unit 130, and the signal reception unit 127 in the data reception apparatus 121 may be provided using the same construction as a conventional digital TV broadcast receiver apparatus.

Accordingly, by merely adding the received data storage unit 125 and the reception control unit 126 described above to the reception unit, TS decoder unit and AV decoder unit of a conventional digital TV broadcast receiver apparatus, the interactive functions for programs of the present invention can be achieved. By using such a conventional construction as it is, a reception apparatus is capable of receiving conventional digital satellite broadcasts in addition to achieving the interactive functions of the present invention.

2-3-13 Modifications 2-3-13-1

The present embodiment describes the case where all of the image data is for still images, although reproduction by the data reception apparatus 121 of the present embodiment is still possible when the image data is moving pictures.

2-3-13-2

The above explanation also describes the case when each content is the combination of image data and navigation information, although audio data may also be included. In such a case, the reception control unit 126 may be constructed so as to perform a switching process for audio data at the same time as the switching process for image data, and to output the audio data to an audio output unit 130. The switching process for audio data may be performed using the same method as the switching process for image data.

2-3-13-3

The above embodiment also describes an example where the script which is included in the handler definition table of the navigation information and which denotes the operation to be taken by the data reception apparatus 121 merely indicates switching of contents, although complex script which is made up of a plurality of instruction words is also possible.

As one example, when a program is for shopping information, the script may represent the calculation of the total cost of the products selected by the user. To do so, the reception control unit 126 of the data reception apparatus 121 is provided with the suitable functions for script execution. These functions may calculate the total cost, and output the result to the reproduction unit 128 which has the total cost displayed by the display unit 129.

For the example of shopping, script for the ordering of products may also be included. To achieve this, the script may contain an instruction for a modem (not illustrated) of the data reception apparatus 121, which is connected to a telephone line, to connect to the retailer's computer system and transmit data which is used to order the desired products. With this construction, the user is able to first view the product information, and then confirm the total cost of the products before placing the actual order.

Third Embodiment

The following embodiment describes a digital broadcasting apparatus which can achieve interactive programs that are composed of stream-based contents and page-based contents.

3-1 Digital Broadcasting Apparatus 8101

FIG. 81 is a block diagram showing the construction of the digital broadcasting apparatus 8101. Components of the digital broadcasting apparatus 8101 which have been given the same reference numerals as components in the digital broadcasting apparatus 5101 of FIG. 4 or in the digital broadcasting apparatus 101 of FIG. 52 are the same as the corresponding components and so will not be described. The following explanation will instead focus on the differences with the previous embodiments.

The major difference between the data transmission apparatus 8101 and the data transmission apparatus 101 shown in FIG. 52 lies in the additional provision of the data multiplexing unit 5103. This is described in more detail below.

The transmission data storage unit 102 stores data (presentation information and navigation information) for both page-based contents and stream-based contents. The construction information storage unit 109, meanwhile, stores a construction information table for stream-based contents and a construction information table for page-based contents.

The data multiplexing unit 5103 multiplexes the data for the stream-based contents stored in the transmission data storage unit 102. The data multiplexing unit 103, meanwhile, multiplexes the data (presentation information and navigation information) for the page-based contents stored in the transmission data storage unit 102.

The data multiplexing unit 5103 and the data multiplexing unit 103 are the same as those described in the first and second embodiments, respectively.

The transmission unit 106 multiplexes the multiplexed streams outputted from the two data multiplexing units 5103 and 103 into a transport stream.

3-1-1 Construction Information Tables

FIGS. 82A and 82B show the construction information table 8201 for stream-based contents that is stored in the construction information storage unit 109 and the construction information table 8301 for page-based contents that is stored in the construction information storage unit 109.

In the construction information table 8201, the sets of image data with the filenames "Video100.m2v", "Video104.m2v", and "Video106.m2v" given in the "Video data" column are stored in the presentation information storage unit 107. Graphic representations of "Video100.m2v", "Video104.m2v" and "Video106.m2v" are given in FIGS. 84A to 84C. As shown in these figures, image data "Video100.m2v" is a world travel guide which has the same contents 100S to 103S as shown in FIGS. 1 to 3. Image data "Video104.m2v" is a Japan travel guide which has the same contents 104S, 105S, 105S', and 105" as shown in FIGS. 1 to 3. "Video106.m2v", meanwhile, is a China travel guide whose content is not illustrated in FIGS. 1 to 3. This is also the case for the "Audio data" column in the construction information table 8201.

The sets of navigation information which have the filenames "Navi100-0.nif" . . . in the "Navigation information" column in the construction information table 8201 are stored in the navigation information storage unit 108. FIGS. 85 (collectively FIGS. 85A and 85B) and 86 (collectively FIGS. 86A and 86B) show the correspondence between the sets of navigation information in the construction information table 8201 and each of the scenes in FIGS. 1 to 3. Here, FIG. 85 and FIG. 86 are the left and right sides of the line A–A'.

The construction information for the contents with the content numbers 100 to 104 in construction information table 8201 represents the contents 100S to 104S in FIGS. 85 and 86. In the present example, the content numbers correspond one-to-one with the contents.

As one example, the image data "Video100.m2v", the audio data "Audio100.m2a", and the navigation information "Navi100-0.nif, Navi100-1.nif, Navi100-2.nif, . . . " are indicated in the row for content number 100.

As shown in FIG. 84A, video data "Video100.m2v" represents a world travel guide for various countries such as China, Japan, and Egypt. This video data is based on the content 100S in FIG. 1. The audio data "Audio100.m2a" is a filename for audio data stored by the presentation information storage unit 107. This audio data "Audio100.m2a" represents audio which is to be reproduced together with the video data "Video100.m2v" to introduce the various countries.

The navigation information "Navi100-0.nif" represents the main menu for the travel guide scenes for China which include scene 100S1 shown as part of the video data "Video100.m2v" in FIG. 85. Similarly, the navigation information "Navi100-1.nif" is for the travel guide scenes for Japan which include scene 100S2, and the navigation information "Navi100-2.nif" is for the travel guide scenes for Egypt.

The construction information for content number 100, composed of the information described above, expresses the data for content 100 which is the world travel guide shown in FIGS. 1 to 3.

The construction information for content number 105 in the construction information 8201 represents contents 105S, 105S', and 105". These contents 105S, 105S', and 105" for content 105S are an example where one content number represents a plurality of contents (here, with a ratio of 1 to 3). This is to say, the navigation information "Navi105-1.nif" corresponds to all of the contents 105S, 105S', and 105" using scripts which change the display of button objects and text information. This switching of the display of button objects and text information is the same as in the first embodiment.

The construction information table 8301 in FIG. 82B is the same as that shown in FIG. 56 of the second embodiment. The image data and audio data indicated by the construction information table 8301 is stored in the presentation information storage unit 107 while the navigation information is stored in the navigation information storage unit 108.

The interactive program represented by the construction information table 8301 includes page-based contents for weather forecasts for around the world, in addition to the page-based contents for weather forecasts for Japan given in the second embodiment. Here, content 100P shows the world weather forecast (with a main menu for selecting various countries). The entry information stored in the construction information storage unit 109 indicates the content number 100, which is to say the stream-based content 100S.

The page-based contents in FIGS. 85 and 86 are included in the contents shown by the construction information table 8301, with the content 104P in particular corresponding to the content representing the weather forecast for Japan (with a main menu for selecting various regions) in content number 5 given in the second embodiment. However, it is somewhat different to the navigation information (shown in FIG. 54) for content number 5 in the second embodiment in that it additionally includes links to stream-based contents. FIG. 83 shows the navigation information for content number 5 in the present embodiment. As can be seen by comparing this figure with FIG. 54, this navigation information additionally includes a hyperlink to content number 100.

3-1-2 Navigation Information

A detailed explanation of the navigation information is given in the first and second embodiments, so that the following explanation will instead focus on the correspondence between contents and navigation information shown in FIGS. 85 and 86.

FIG. 87 gives a specific example of the navigation information "Navi100-0.nif". This is used for the travel guide scenes for China, including scene 100S1 in FIG. 85. This navigation information "Navi100-0.nif" has three button objects in its object definition table. These three button objects correspond to the "Details", "Weather", and "China" buttons in scene 100S1 in FIG. 85. As shown in the hyperlink table, the "Details" button has the content number 101 (content 101S) as its link destination. The "Weather" button has the content number 10 (content 100P shown by the arrow in FIG. 85) as its link destination. The "China" button, meanwhile, has the content number 106 as its link destination. Here, while not shown in FIG. 85, this content number 106 represents the content for the China travel guide which includes the video data "Video106.m2v" described above.

FIG. 88 gives a specific example of the navigation information "Navi100-1.nif". This is the same as the navigation information "Navi100-0.nif", except that the button for "China" has been replaced with a button for "Japan". The link destination of this button is the content number 104 (content 104S in FIG. 85) instead of the content number 106. This is because the version of the navigation information is changed reflecting the change in the video content of content 100S from scenes giving a travel guide for China to scenes giving a travel guide for Japan.

In the same way, FIG. 89 gives a specific example of the navigation information "Navi100-2.nif", FIG. 90 gives a specific example of the navigation information "Navi101-1.nif", FIG. 91 gives a specific example of the navigation information "Navi101-2.nif", FIG. 92 gives a specific example of the navigation information "Navi102-1.nif", FIG. 93 gives a specific example of the navigation information "Navi103-1.nif", and FIG. 94 gives a specific example of the navigation information "Navi104-1.nif".

FIG. 95, meanwhile, gives a specific example of the navigation information "Navi105-1.nif". This navigation information "Navi105-1.nif" represents the navigation information for all of contents 105S, 105S', and 105". The switching between contents 105S, 105S', and 105" is achieved by scripts. This switching according to scripts is the same as in FIG. 48 of the first embodiment.

As one example, the script for the hyperlink index number 0 is activated by the "Transport" button in content 105S, with the "Transport", "Accommodation", and "Return" buttons and "Nara . . . " picture (object indexes 0–3) being deleted from the display, and the "Getting to Nara" picture and "Return" buttons (object indexes 4, 5) being displayed. By doing so, the display is changed from 105S to 105S'.

The script for handler index 3 is activated by the "Return" button in Content 105S, and deletes the picture "Getting to Nara" and the "Return" button (object indexes 4 and 5), in addition to heving the "Transport", "Accommodation", and "Return" buttons and the "Nara " picture (objects indexes 0–3) displayed. By doing so, the display is switched from content 105S' back to 105S.

3-1-3 Navigation Information Table

The navigation information described above is converted into navigation information tables by the navigation information table generating unit 5111 or by the navigation information table generating unit 113.

In addition to generating the navigation information tables described in the first and second embodiments, the navigation information table generating units 5111, 113 set the respective identifiers in the "VE_comp_tag", the "AE_comp_tag" and "NE_id" columns of the hyperlink table when the content number for the link destination is a stream-based content, or the respective identifiers in the "VE_id", the "AE_id" and "NE_id" columns of the hyperlink table when the content number for the link destination is a page-based content.

FIG. 96 shows the navigation information table NVT (104.1) which is generated from the navigation information "Navi104-1.nif". This navigation information table NVT (1041) is such that each content number in the hyperlink table in "Navi104-1.nif" has been converted into a variety of identifiers.

The column for hyperlink index number 2 in this figure has the stream-based content 105S as its link destination, and so is converted into the "VE_comp_tag", "AE_comp_tag" and "NE_id" corresponding to content number 105. This is also the case for the hyperlink table index number 2, which has been converted into the "VE_comp_tag", "AE_comp_tag" and "NE_id" corresponding to content number 100.

The column for hyperlink index number 1 in this figure has the page-based content 5 (content 104P) as its link destination, and so is converted into the "VE_id", "AE_id" and "NE_id" corresponding to content number 5. However, this content does not contain audio data, so that the items related to audio data have been omitted.

3-1-4 Multiplexing

The presentation information and navigation information described above are multiplexed by the data multiplexing unit 103 and the data multiplexing unit 5103.

The data multiplexing unit 5103 multiplexes stream-based contents according to the construction information table 8201 in the same way as in the first embodiment. The data multiplexing unit 103 multiplexes page-based contents according to the construction information table 8301, in the same way as in the second embodiment. These processes are performed in parallel.

The multiplexed stream representing the stream-based contents and the multiplexed stream representing the page-based contents are multiplexed into a multiplexed stream by the transmission unit 106 and are transmitted.

FIG. 97 is a graphic representation of the transport stream multiplexed by the transmission unit 106. In the same way as FIGS. 29 and 70, the horizontal axis represents elapsed time while the vertical axis represents the content data and system information tables which are multiplexed at the same time.

In FIG. 97 (collectively FIGS. 97A, 97B and 97C), element 9701 represents the part of the multiplexed data stream where data for the stream-based contents has been multiplexed by the data multiplexing unit 5103. Element 9702 represents the part of the multiplexed data stream where data for the stream-based contents has been multiplexed by the data multiplexing unit 103. Element 9703 represents the part of the multiplexed data stream for the system information tables generated by the system information table generating unit 105.

3-2 Reception Apparatus 9121

FIG. 98 is a block diagram showing the construction of the reception apparatus 9121.

The elements of the reception apparatus 9121 which are the same as the reception apparatus 121 of the second embodiment shown in FIG. 52 have been given the same reference numerals, so that the following explanation will instead focus on the differences.

The differences with the reception apparatus 121 in FIG. 52 are that the reception apparatus 9121 includes a TS decoder unit 9123 and a reception control unit 9126 in place of the TS decoder unit 123 and the reception control unit 126. Here, the filter condition storage unit 9131 in the TS decoder unit 9123 is also somewhat different.

3-2-1 TS Decoder Unit 9123

The TS decoder unit 9123 is equipped with the functions of both the TS decoder unit 5123 of the first embodiment and the TS decoder unit 123 of the second embodiment. As a result, the TS decoder unit 9123 can handle both stream-based contents and page-based contents, and the filter condition storage unit 9131 stores all of the filter conditions of the filter condition storage unit 5131 and the filter condition storage unit 131 in the first and second embodiments, with the setting of these filter conditions being possible in the same way as before.

FIG. 99 shows the filter condition table that is stored in the filter condition storage unit 9131. This filter condition table 9131 stores a variety of filter conditions. As shown in FIG. 99, these filter conditions are composed of a "PID", a "stream_id", a "table_id_extension", a "version_no", and an "output destination". Each of these items is the same as in the first and second embodiments, and so will not be explained further.

3-2-2 Reception Control Unit 9126

The reception control unit 9126 is equipped with the functions of both the reception control unit 5126 in the first embodiment and the reception control unit 126 in the second embodiment. As a result, the reception control unit 9126 is able to handle both stream-based contents and page-based contents.

FIGS. 100 and 101 are flowcharts showing the control conten fo the reception control unit 9126. In FIG. 100, S2402, S2404, S2406, and S2408 represent the processes with the same reference numerals in FIG. 76. In FIG. 101, S2410, S2412, S2414, S2416, and S2418 represent the processes with the same reference numerals in FIG. 76. Also, in FIG. 101, S8110, S8112, and S8114 represent the processes with the same reference numerals in FIG. 36. However, the "cur_VE_comp_tag", "cur_AE_comp_tag", "new_VE_comp_tag", and "new_AE_comp_tag" are also handled in S2406 and S2408.

In FIG. 100, the reception control unit 9126 judges whether the various identifiers indicated in S2408 specify a stream-based content or a page-based content. More specifically, the reception control unit 9126 judges that a stream-based content is specified when "new_VE_comp_tag" is included, and that a page_based content is specified when "new_VE_id" is included.

Here, when the reception control unit 9126 judges that a stream-based content is specified, it performs the processing in S8110 onwards in FIG. 101, while when the reception control unit 9126 judges that a page-based content is specified, it performs the processing in S2410 onwards in FIG. 101. The details of this processing are the same as the corresponding processes in the first and second embodiment.

3-2-3 Other Modifications

In this third embodiment, the distinction between page-based contents and stream-based contents is made according to whether a "VE_comp_tag" or a "VE_id" is specified, but this need not be the case, with it being possible to provide other identifiers for making this distinction.

The construction information storage unit 109 is described as storing separate construction information tables for stream-based contents and page-based contents, although both types of contents may be provided in the same table. As one example, flags may be provided to indicate stream-based contents or page-based contents with these flags being multiplexed with the corresponding contents by the data multiplexing units 103, 5103.

In the first and third embodiments, the multiplexing of the video data included in stream-based contents is commenced at the same time as the start of multiplexing, although the video data may be multiplexed with only a partial overlap of reproduction times.

In the first and third embodiments, the video data in the stream-based contents are described with the premise of full-screen display on the display screen of the reception apparatus 5121, although video data of a smaller size may be used. As one example, the video data may be one quarter of the size of the video data, so that the total number of contents can still be increased when there is an upper limit for the bit rate which may be assigned to the interactive program. When doing so, the image data may be still be combined with objects described in the navigation information to give the reproduced image. It is also possible for contents to be composed of a simultaneous display of between two and four quarter-screen sets of video data.

The still images in the page-based contents of the second and third embodiments may also be image data which is smaller than the display screen. It is also possible for one content to include a plurality of sets of image data. As one example, one content may include between two and four quarter screen still images.

The still images may be used as background images with quarter-size sets of video data being reproduced on top of these.

In the first to third embodiments, the scripts in the handler definition table of the navigation information may describe operations of the reception apparatus aside from the switching of the display of buttons and graphics. As one example, the scripts may describe sounds (beeps or clicks) to be sounded when a button is selected or activated, or when an error occurs. For the example of contents in an interactive program which includes shopping information, script may receive numerical inputs (prices) from the operator and calculate a total cost.

The operation of the reception control unit shown in the flowcharts in the first to third embodiments may be achieved by software. This is to say, a program which includes these functions may be executed by a CPU to achieve the necessary control. The remaining construction elements are achieved by hardware, so that almost the same hardware as a conventional digital satellite broadcast tuner may be used. Accordingly, the reception apparatus described above can be realized by equipping a conventional digital satellite broadcast tuner with a program which realizes the functions of the reception control unit. As one example, the program may be provided to a conventional digital satellite broadcast tuner using a recording medium, such as a ROM card, on which the program is recorded. By doing so, the present invention may be achieved by making slight modifications to a conventional digital satellite broadcast tuner.

Although the present invention has been fully described by way of examples with reference to accompanying drawings, it is to be noted that various changes and modifications will be apparent to those skilled in the art. Therefore, unless such changes and modifications depart from the scope of the present invention, they should be construed as being included therein.

What is claimed is:

1. A broadcasting apparatus comprising:
content storing means for storing a plurality of contents, each content including a set of presentation information and a set of control information corresponding to the set of presentation information, the set of control information having a set of link information indicating the set of control information included in another linked content among the plurality of contents, wherein the set of link information included in the content indicates the set of presentation information and the set of control information included in another linked content among the plurality of contents and the set of control information has a setting of a valid period which expresses a period during which the set of control information is valid within an output period of the set of presentation information corresponding to the set of control information;
multiplexing means for multiplexing the plurality of contents stored in the content storing means to generate a multiplexed stream, bringing the set of control information into correspondence with the set of presentation information included in the same content, wherein the multiplexing means multiplexes the set of presentation information and repeatedly multiplexes the set of control information corresponding to the set of presentation information during the valid period of the set of control information to generate the multiplexed stream; and
broadcasting means for embodying the multiplexed stream generated by the multiplexing means in a broadcasting wave and broadcasting the broadcasting wave.

2. The broadcasting apparatus of claim 1, wherein the content has a plurality of sets of control information, each set of control information included in the content being appended a version number in accordance with the valid period of each set of control information.

3. The broadcasting apparatus of claim 2, wherein the version number of the control information is different from another version number of the control information which is included in the same content and has a different setting of the valid period.

4. The broadcasting apparatus of claim 3 further including multiplexing control means for controlling the multiplexing means, wherein the content storing means further comprises:
presentation information storing means for storing the set of presentation information included in each content;
control information storing means for storing the plurality of sets of control information included in each content;
construction table storing means for storing a construction table showing correspondence between the set of presentation information stored in the presentatation information storing means and the set of control information stored in the control information storing means, and for storing a valid period table indicating the valid period of the set of control information;
wherein the multiplexing means reads the set of presentation information stored in the presentation information storing means and the set of control information stored in the control information storing means as a digital data stream respectively, and multiplexes these digital data streams to generate the multiplexed stream,
wherein the multiplexing control means refers to the construction table stored in the construction table storing means and controls the multiplexing means to multiplex the set of presentation information and repeatedly multiplex the set of control information corresponding to the set of presentation information during the valid period of the set of control information according to the valid period table,
wherein the multiplexing control means appends the version number to each of the plurality of sets of control information included in the same content in accordance with the valid period of each set of control information,
wherein the broadcasting means embodies the multiplexed stream generated by the multiplexing means in a digital broadcasting wave and broadcasts the digital broadcasting wave.

5. The broadcasting apparatus of claim 4, wherein the multiplexing control means includes:
first determining means for determining a multiplexing start position in the multiplexed stream for the set of presentation information included in the content referring to the construction table; and
second determining means for determining a plurality of multiplexing start positions in the multiplexed stream for the set of control information included in the content referring to the construction table, wherein the multiplexing start positions for the set of control information are determined so that the set of control information is repeatedly multiplexed during the valid period according to the valid period table;
wherein the multiplexing means (i) reads the set of presentation information from the presentation information storing means as a digital stream in accordance with the multiplexing start positions determined by the first determining means, and multiplexes the read presentation information into the multiplexed stream, and (ii) reads a number of times the set of control information from the control information storing means as a digital stream in accordance with the multiplexing start positions determined by the second determining means, and repeatedly multiplexes the read control information into the multiplexed stream during the valid period of the control information.

6. The broadcasting apparatus of claim 5, wherein the multiplexing control means further includes:

bandwidth assigning table storing means for storing a bandwidth assigning table that shows a bandwidth for the digital data stream of the set of control information being part of a total bandwidth of the multiplexed stream, wherein the second determining means determines the multiplexing start positions of the set of control information in accordance with the bandwidths referring to the bandwidth assigning table, and wherein the multiplexing means multiplexes the digital data streams.

7. The broadcasting apparatus of claim 4, wherein the set of presentation information stored in the presentation information storing means has an identifier, wherein the set of control information stored in the control information storing means has an identifier, and the link information included in the set of control information has the identifier of the presentation information and the identifier of the control information included in the linked content, wherein the multiplexing control means further includes:

system information storing means for storing system information for specifying the multiplexed stream on the digital broadcasting wave, wherein the system information includes a stream ID for the set of presentation information and a stream ID for the set of control information;

identification information appending means for (i) converting the identifier of the set of presentation information and the identifier of the set of control information respectively into first identification information and second identification information, based on the system information stored in the system information storing means, and (ii) appending the first identification information to the set of presentation information, the second identification information to the set of control information, wherein the first identification information is expressed as the stream ID unique to the set of presentation information and the second identification information is expressed as a combination of the stream ID that is common to all sets of control information in the content and a parameter unique to each set of control information in the content; and link destination information converting means for converting an identifier of the set of presentation information and an identifier of the set of control information included in the linked content into the first identification information of the presentation information, and the second identification information of the control information included in the linked content respectively, wherein the multiplexing means generates the multiplexed stream using the system information, the first identification information, and the second identification information.

8. The broadcasting apparatus of claim 1, wherein the multiplexing means repeatedly multiplexes the set of control information, starting from a predetermined time before the set of control information becomes valid, the predetermined time being sufficiently long to enable a reception apparatus to process the set of control information.

9. The broadcasting apparatus of claim 1, wherein the set of control information further has a valid period indicating the valid period of the set of control information.

10. The broadcasting apparatus of claim 1, wherein the set of presentation information has either a set of image data, a set of sound data, or a combination of the set of image data and the set of sound data.

11. The broadcasting apparatus of claim 10, wherein the set of image data is a set of video data or a set of still image data.

12. A reception apparatus comprising:

receiving means for receiving a broadcasting wave including a multiplexed stream into which a plurality of contents have been multiplexed, each content including a set of presentation information and a set of control information corresponding to the set of presentation information, the set of control information having a set of link information indicating the set of control information included in another linked content among the plurality of contents, extracting means for extracting the set of presentation information and the set of control information corresponding to the set of presentation information included in a given content from the broadcasting wave received by the receiving means;

storing means for storing the set of control information extracted by the extracting means;

outputting means for outputting the set of presentation information extracted by the extracting means; and signal receiving means for receiving a content switching signal;

wherein the extracting means, in accordance with the content switching signal, extracts the set of control information indicated by the link information included in the set of control information stored in the storing means from the broadcasting wave as a new set of control information, and extracts the set of presentation information corresponding to the new set of control information from the broadcasting wave as a new set of presentation information, wherein the storing means stores the new set of control information extracted by the extracting means, wherein the outputting means outputs the new set of presentation information extracted by the extracting means, wherein the set of link information included in the content indicates the set of presentation information and the set of control information included in another content among the plurality of contents, wherein the extracting means, in accordance with the content switching signal, extracts the set of presentation information indicated by the link information included in the set of control information stored in the storing means from the broadcasting wave as a new set of presentation information, wherein the outputting means outputs the new set of presentation information, and wherein the set of control information has a setting of a valid period which expresses a period during which the set of control information is valid within an output period of the set of presentation information corresponding to the set of control information, the set of presentation information being multiplexed into the multiplexed stream and the set of control information corresponding to the set of presentation information being repeatedly multiplexed into the multiplexed stream during the valid period of the set of control information.

13. The reception apparatus of claim 12, wherein the content includes a plurality of sets of control information, each set of control information included in the content being appended a version number in accordance with the valid period of each set of control information,
  wherein, in case that a set of control information appended a version number is extracted from the broadcasting wave, and that the receiving means receives the broadcasting wave including another set of control information to which another version number that is the next number of the version number of the control information extracted is appended, then the extracting means extracts this other set of control information appended the next version number as a new set of control information, and
  wherein the storing means stores the new set of control information extracted by the extracting means.

14. The reception apparatus of claim 13, wherein the version number of the control information is different from another version number of the control information which is included in the same content and has a different setting of the valid period.

15. The reception apparatus of claim 12, wherein the set of control information in the multiplexed stream has been repeatedly multiplexed into the multiplexed stream starting from a predetermined time before the set of control information becomes valid, the predetermined time being sufficiently long to enable the reception apparatus to process the set of control information.

16. The reception apparatus of claim 12, wherein the set of control information further has a valid period table indicating the valid period of the set of control information.

17. The reception apparatus of claim 12, wherein the set of control information includes a set of supplementary images representing menu items for the linked content indicated by the set of link information included in the set of control information,
  wherein the outputting means further includes image outputting means for outputting supplementary images included in the set of control information stored in the storing means by way of superimposing the supplementary images onto the corresponding presentation information during the valid period of the set of control information.

18. The reception apparatus of claim 17, wherein the set of control information further includes a plurality of sets of additional information representing one of a text image and a graphic image,
  wherein the image outputting means additionally outputs one of the text image and the graphic image included in the set of control information stored in the storing means by way of superimposing the image onto the corresponding set of presentation information during the valid period of the set of control information.

19. The reception apparatus of claim 18, further including control means,
  wherein the set of control information includes a set of script information that validates one of the plurality of sets of additional information in the reception apparatus, in accordance with a user operation,
  wherein the control means determines the validated set of additional information by interpreting and executing the script information included in the set of control information stored in the storing means, and
  wherein the image outputting means outputs one of the text image and the graphic image included in the validated set of additional information which the control means has determined.

20. The reception apparatus of claim 19, wherein the set of control information includes:
  at least two groups made up of the set of link information and supplementary images;
  a set of initial information showing which group of the set of link information and supplementary images is valid at a start of an output of the presentation information corresponding to the control information from the outputting means; and
  a set of script information that changes a valid group made up of the set of link information and supplementary images in the reception apparatus in accordance with the user operation;
  wherein the control means determines the validated group by interpreting and executing the initial information and the script information stored in the storing means;
  wherein the image outputting means outputs the supplementary images in the validated group which the control means has determined.

21. A broadcast apparatus comprising:
  content storing means for storing a plurality of contents, each content including a set of presentation information and a set of control information corresponding to the set of presentation information, the set of control information having a set of link information indicating the set of control information included in another linked content among the plurality of contents, wherein the set of control information includes a set of supplementary images representing menu items for the linked content indicated by the set of link information included in the set of control information;
  multiplexing means for multiplexing the plurality of contents stored in the content storing means to generate a multiplexed stream, bringing the set of control information into correspondence with the set of presentation information included in the same content; and
  broadcasting means for embodying the multiplexed stream generated by the multiplexing means in a broadcasting wave and broadcasting the broadcasting wave,
  wherein the set of control information further includes:
    at least two groups made up of the set of link information and supplementary images;
    a set of initial information showing which group of the set of link information and supplementary images is valid at a start of an output from a reception apparatus, the output being an output of the set of presentation information corresponding to the set of control information; and
    a set of script information that changes a valid group made up of the set of link information and supplementary images in the reception apparatus in accordance with a user operation.

22. The broadcasting apparatus of claim 21, wherein the set of control information further includes a set of additional information representing one of text and a graphic image that is to be outputted by way of being superimposed onto the corresponding set of presentation information.

* * * * *